United States Patent
Hirasawa et al.

(10) Patent No.: US 11,496,017 B2
(45) Date of Patent: Nov. 8, 2022

(54) ROTATING ELECTRIC MACHINE, ELECTRIC POWER CONVERSION DEVICE AND METHOD OF MANUFACTURING ROTATING ELECTRIC MACHINE

(71) Applicant: DENSO CORPORATION, Kariya (JP)

(72) Inventors: Naoki Hirasawa, Nisshin (JP); Ryota Tanabe, Kariya (JP); Yuta Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 345 days.

(21) Appl. No.: 16/708,570

(22) Filed: Dec. 10, 2019

(65) Prior Publication Data

US 2020/0185997 A1 Jun. 11, 2020

(30) Foreign Application Priority Data

Dec. 10, 2018 (JP) .............................. JP2018-230895

(51) Int. Cl.
| | |
|---|---|
| *H02K 3/50* | (2006.01) |
| *H02K 7/08* | (2006.01) |
| *H02K 21/22* | (2006.01) |
| *H02K 15/00* | (2006.01) |
| *H02K 11/33* | (2016.01) |

(52) U.S. Cl.
CPC .............. *H02K 3/50* (2013.01); *H02K 7/085* (2013.01); *H02K 11/33* (2016.01); *H02K 15/0062* (2013.01); *H02K 21/22* (2013.01); *H02K 2203/09* (2013.01)

(58) Field of Classification Search
USPC ............................................................ 310/71
See application file for complete search history.

(56) References Cited

U.S. PATENT DOCUMENTS

| 6,791,224 | B1 | 9/2004 | Ozawa et al. | |
|---|---|---|---|---|
| 2010/0060223 | A1* | 3/2010 | Sakai | H02K 1/2766 |
| | | | | 310/156.01 |
| 2013/0113313 | A1* | 5/2013 | Ikura | H02K 3/522 |
| | | | | 310/71 |

(Continued)

FOREIGN PATENT DOCUMENTS

| JP | 2004-048823 A | 2/2004 |
|---|---|---|
| JP | 2004-297847 A | 10/2004 |

(Continued)

*Primary Examiner* — Alexander A Singh
(74) *Attorney, Agent, or Firm* — Oliff PLC

(57) ABSTRACT

A rotating electric machine includes a field that includes a magnet unit having a plurality of magnetic poles, an armature including a multi-phase armature coil, and an electric power conversion device that is configured to perform electric power conversion and supply electric power resulting from the electric power conversion to the armature. Moreover, one of the field and the armature is configured as a rotor while the other is configured as a stator. The electric power conversion device includes at least one band-shaped busbar through which electric current flows during the electric power conversion. The at least one busbar has a cross section where a thickness in a lateral direction of the cross section at one end of the cross section in a longitudinal direction of the cross section is smaller than a thickness in the lateral direction at the other end of the cross section in the longitudinal direction.

13 Claims, 61 Drawing Sheets

(56) References Cited

U.S. PATENT DOCUMENTS

| | | | |
|---|---|---|---|
| 2016/0020658 A1* | 1/2016 | Tamura | H02K 3/28 310/71 |
| 2016/0087494 A1* | 3/2016 | Fischer | H02K 1/2766 310/156.43 |
| 2016/0181882 A1* | 6/2016 | Iwaki | H02K 3/345 310/215 |
| 2016/0285335 A1* | 9/2016 | Watanabe | H02K 15/0068 |
| 2016/0294248 A1* | 10/2016 | Atarashi | H02K 5/16 |
| 2017/0187258 A1 | 6/2017 | Fujikawa et al. | |
| 2018/0177080 A1 | 6/2018 | Kitao et al. | |
| 2021/0057955 A1* | 2/2021 | Ryu | H02K 1/146 |

FOREIGN PATENT DOCUMENTS

| | | |
|---|---|---|
| JP | 2005-228529 A | 8/2005 |
| JP | 2006-246594 A | 9/2006 |
| JP | 2009-261139 A | 11/2009 |
| JP | 2010-041809 A | 2/2010 |
| JP | 2010-041842 A | 2/2010 |
| JP | 2012-200038 A | 10/2012 |
| JP | 2013-005541 A | 1/2013 |
| JP | 2014-053246 A | 3/2014 |
| JP | 2016-019421 A | 2/2016 |
| JP | 2017-070140 A | 4/2017 |
| JP | 2020-025438 A | 2/2020 |
| JP | 2020-025439 A | 2/2020 |
| JP | 2020-025440 A | 2/2020 |
| JP | 2020-025441 A | 2/2020 |
| JP | 2020-025442 A | 2/2020 |
| JP | 2020-025443 A | 2/2020 |
| JP | 2020-025446 A | 2/2020 |
| JP | 2020-025447 A | 2/2020 |
| JP | 2020-025448 A | 2/2020 |
| JP | 2020-025450 A | 2/2020 |

* cited by examiner

FIG.8
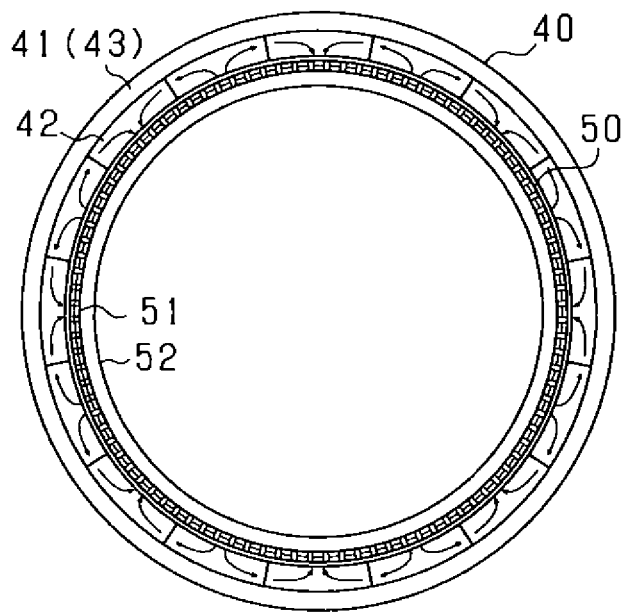
FIG. 9
FIG.9
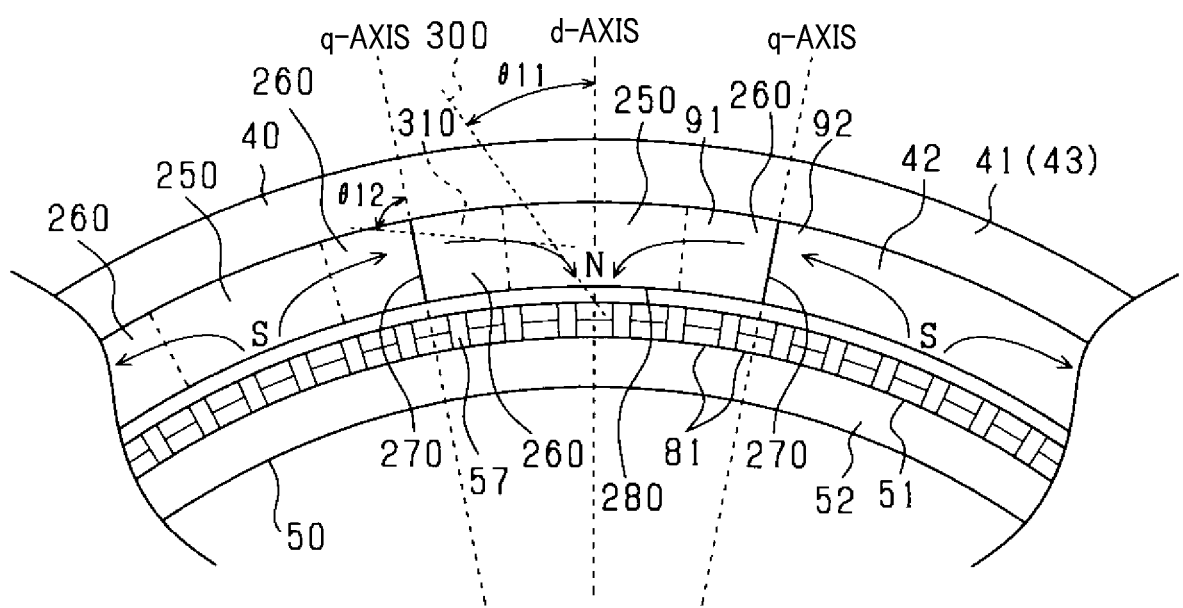

COMPARATIVE EXAMPLES

INSIDE OF VEHICLE ⟵⎯⎯⎯⟶ OUTSIDE OF VEHICLE

FIG.54
(a) OUTER LAYER
(b) INNER LAYER
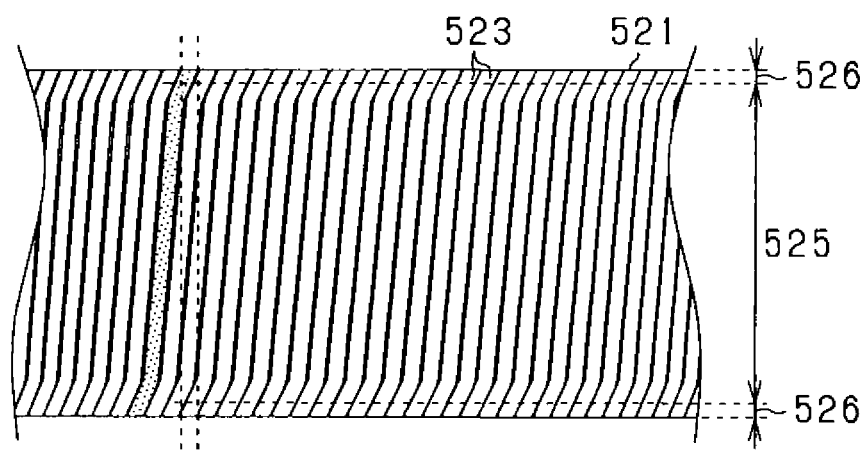
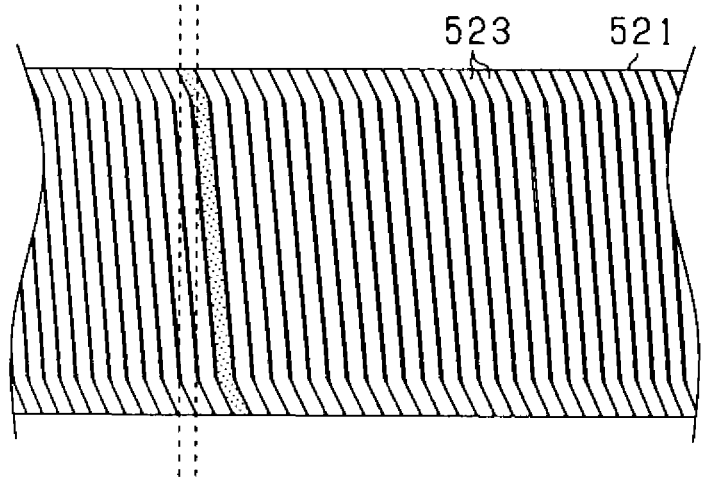
FIG.55
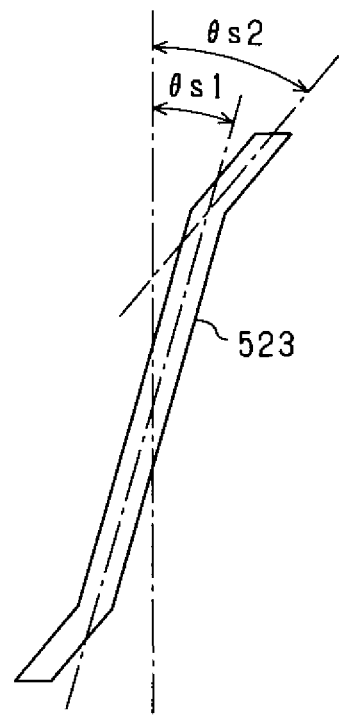

FIG.80A
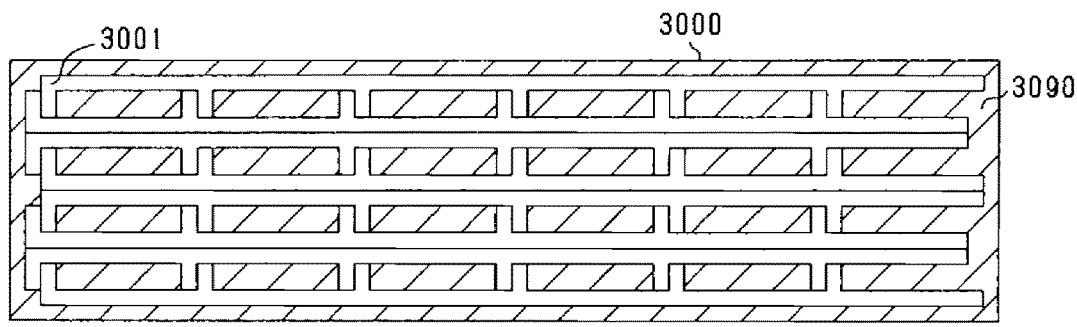
FIG.80B
FIG.80C
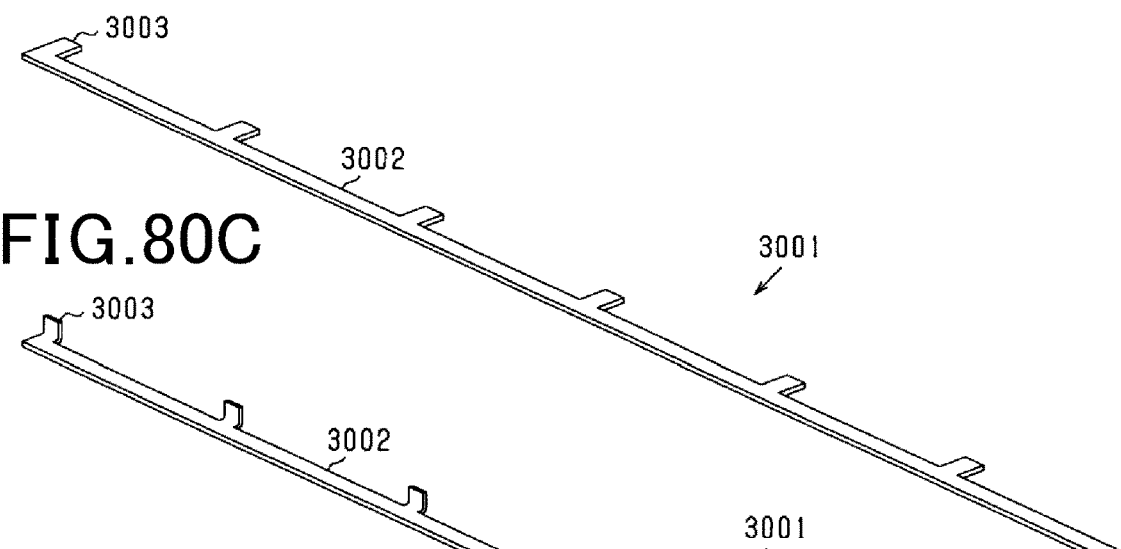
FIG.80D
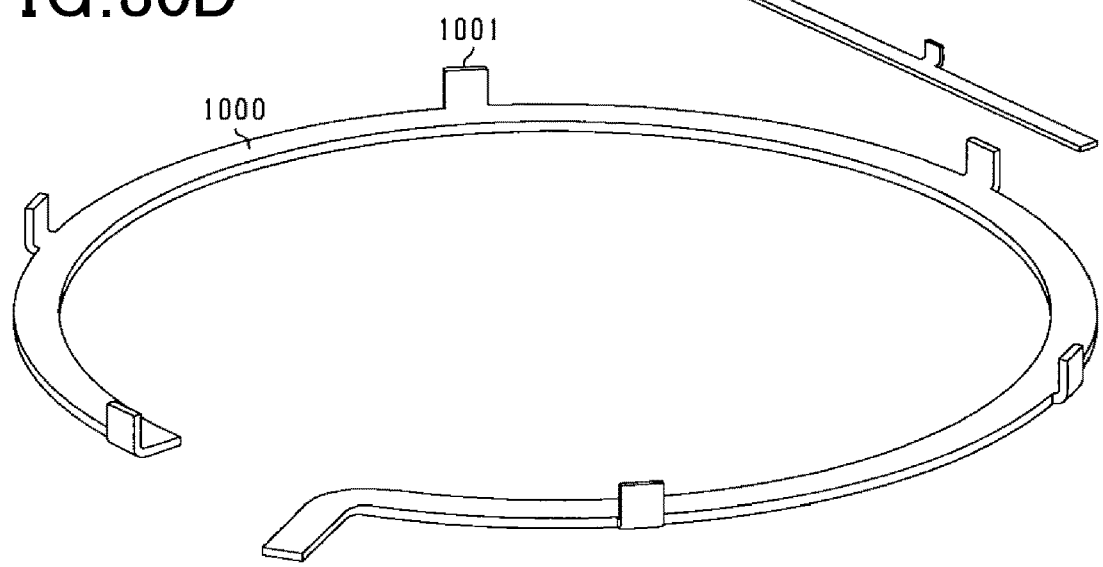

ROTATING ELECTRIC MACHINE, ELECTRIC POWER CONVERSION DEVICE AND METHOD OF MANUFACTURING ROTATING ELECTRIC MACHINE

CROSS-REFERENCE TO RELATED APPLICATION

This application is based on and claims priority from Japanese Patent Application No. 2018-230895 filed on Dec. 10, 2018, the contents of which are hereby incorporated by reference in their entirety into this application.

BACKGROUND

1. Technical Field

The present disclosure relates to rotating electric machines, electric power conversion devices and methods of manufacturing rotating electric machines.

2. Description of Related Art

There is known a rotating electric machine which has a controller integrated therein; the controller controls the rotating electric machine. Specifically, the controller includes power modules (or semiconductor modules) and busbars. The power modules are arranged around a rotating shaft of the rotating electric machine. Through the busbars, electric current flows when electric power is supplied from an electric power conversion circuit of the controller to the rotating electric machine and when electric power is outputted from the rotating electric machine to the electric power conversion circuit.

Moreover, in the case of the rotating electric machine being employed as a drive motor for driving a vehicle, such as an in-wheel motor, it is necessary to allow high current to flow through the busbars. Therefore, each of the busbars is flat plate-shaped to have a rectangular cross section. Consequently, it is possible to reduce the space required for receiving the controller and thereby minimize the size of the entire rotating electric machine while increasing the cross-sectional areas of the busbars.

SUMMARY

According to the present disclosure, there is provided a rotating electric machine which includes: a field including a magnet unit having a plurality of magnetic poles whose polarities are alternately different in a circumferential direction; an armature including a multi-phase armature coil; and an electric power conversion device configured to perform electric power conversion and supply electric power resulting from the electric power conversion to the armature. Moreover, one of the field and the armature is configured as a rotor and the other of the field and the armature is configured as a stator. The electric power conversion device includes at least one band-shaped busbar through which electric current flows during the electric power conversion. The at least one busbar has a cross section where a thickness in a lateral direction of the cross section at one end of the cross section in a longitudinal direction of the cross section is smaller than a thickness in the lateral direction at the other end of the cross section in the longitudinal direction.

According to the present disclosure, there is also provided an electric power conversion device which is configured to perform electric power conversion and supply electric power resulting from the electric power conversion to a dynamo-electric unit. The electric power conversion device includes at least one band-shaped busbar through which electric current flows during the electric power conversion. The at least one busbar has a cross section where a thickness in a lateral direction of the cross section at one end of the cross section in a longitudinal direction of the cross section is smaller than a thickness in the lateral direction at the other end of the cross section in the longitudinal direction.

According to the present disclosure, there is further provided a method of manufacturing the above rotating electric machine. The method includes the steps of: preparing a straight band-shaped plate member having a length, a width and a thickness; and bending the straight band-shaped plate member into an arc shape whose redial direction coincides with the width direction of the straight band-shaped plate member, thereby forming the at least one busbar.

BRIEF DESCRIPTION OF THE DRAWINGS

In the accompanying drawings:

FIG. 8 is a transverse cross-sectional view of both a rotor and a stator of the rotating electric machine;

FIG. 9 is an enlarged view of part of FIG. 8;

FIGS. 54(*a*) and 54(*b*) are each a development of a stator coil according to the third embodiment on a plane, wherein FIG. 54(*a*) shows electrical conductors located at a radially outer layer while FIG. 54(*b*) shows electrical conductors located at a radially inner layer;

FIG. 55 is a schematic view illustrating skew angles of the electrical conductors forming the stator coil according to the third embodiment;

FIGS. 80A-80D are schematic views illustrating a method of manufacturing the busbars of the busbar module according to the fourth embodiment;

DESCRIPTION OF EMBODIMENTS

Figure 1:
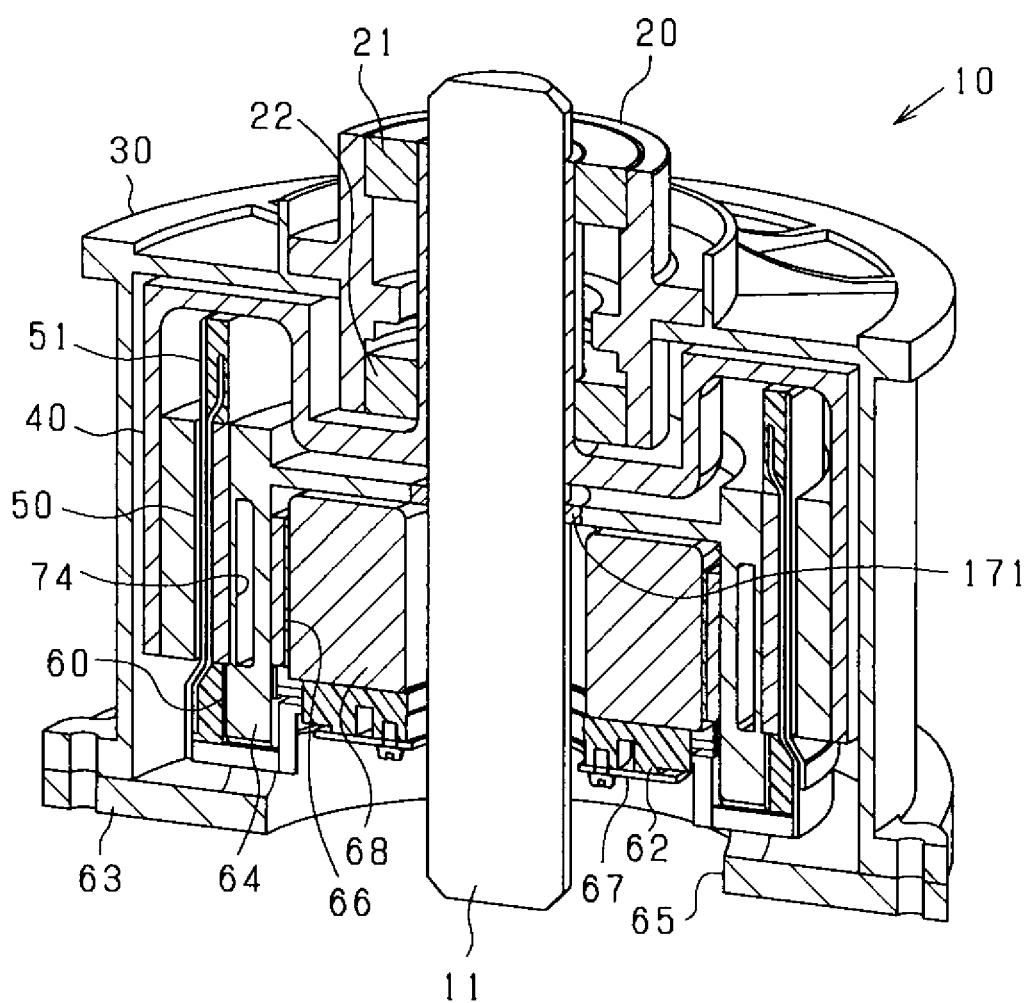
FIG. 1 is a perspective view, partially in longitudinal cross section, of a rotating electric machine according to a first embodiment.

In the above-described rotating electric machine known in the art (see, for example, International Publication No. WO2015087567A1), each of the busbars is flat plate-shaped to have a rectangular cross section. However, in this case, the geometrical moment of inertia (or second moment of area) in the lateral direction (or the direction of shorter sides) of the rectangular cross section is low, making it easy for the busbars to vibrate. Therefore, it may be difficult to ensure high vibration resistance of the busbars. Consequently, it may be difficult to prevent a connection failure from occurring in the rotating electric machine.

In contrast, in the above-described rotating electric machine according to the present disclosure, the at least one busbar has a cross section where a thickness in a lateral direction of the cross section at one end of the cross section in a longitudinal direction of the cross section is smaller than a thickness in the lateral direction at the other end of the cross section in the longitudinal direction. Consequently, it becomes possible to increase the geometrical moment of inertia in the lateral direction, thereby improving the vibration resistance of the at least one busbar.

In a further implementation of the rotating electric machine according to the present disclosure, the field is configured as the rotor that is rotatably provided and the armature is configured as the stator that is arranged to face the rotor. The electric power conversion device further includes a plurality of electrical components that are connected with the at least one busbar and arranged in alignment with each other in the circumferential direction. The at least one busbar is formed in an annular shape or an arc shape along the circumferential direction. The at least one busbar is arranged to have the lateral direction of the cross section thereof coinciding with an axial direction of the rotor and the longitudinal direction of the cross section thereof coinciding with a radial direction of the rotor. The cross section is tapered radially outward to have its axial thickness decreasing from its radially inner end to its radially outer end. The at least one busbar has the tapered cross-sectional shape over an entire circumference thereof.

With the above configuration, since the at least one busbar is formed in an annular shape or an arc shape, it becomes possible to arrange the at least one busbar around a rotating shaft of the rotating electric machine, thereby minimizing the axial thickness of the at least one busbar. Moreover, with the electrical components arranged in alignment with each other in the circumferential direction, it becomes possible to shorten the wiring between the at least one busbar and the electrical components, thereby lowering the inductance due to the wiring. In addition, the at least one busbar can be manufactured by the above-described method according to the present disclosure.

The at least one busbar may have at least one connection terminal formed on an inner periphery or an outer periphery thereof to protrude in a radial direction of the rotor. The at least one connection terminal may be bent to have its distal part extending in an axial direction of the rotor.

With the above configuration, it becomes possible to more easily connect the at least one connection terminal to the electrical components in comparison with the case of the at least one connection terminal extending straight in the radial direction without being bent. Moreover, with the at least one connection terminal bent to have its distal part extending in the axial direction, the vibration resistance of the at least one busbar is further improved. Furthermore, by the bending process, the at least one connection terminal is hardened, thereby further improving the vibration resistance of the at least one busbar.

The at least one busbar may include a positive busbar and a negative busbar each of which has a cross section as described above. Moreover, the positive and negative busbars may be arranged to at least partially overlap each other in the lateral direction.

With above arrangement, it becomes possible to shorten the wiring between the positive and negative busbars and the electrical components, thereby lowering the inductance due to the wiring. Moreover, it also becomes possible to minimize the radial size of a busbar module which includes both the positive and negative busbars.

The positive and negative busbars may be arranged to have a surface of the positive busbar and a surface of the negative busbar facing each other in the lateral direction and extending parallel to each other.

With the above arrangement, it becomes possible to reduce the volume (or gap) between the positive and negative busbars, thereby lowering the parasitic capacitance therebetween as well as the inductance.

Each of the positive and negative busbars may have a plurality of connection terminals formed therein so as to be spaced from each other in the circumferential direction. Moreover, the circumferential interval between each circumferentially-adjacent pair of the connection terminals of the positive and negative busbars may be set to be smaller than the circumferential interval between each circumferentially-adjacent pair of the connection terminals of the positive busbar and also smaller than the circumferential interval between each circumferentially-adjacent pair of the connection terminals of the negative busbar.

With the above configuration, it becomes possible to further shorten the wiring between the positive and negative busbars and the electrical components, thereby further lowering the inductance due to the wiring. Moreover, it also becomes possible to more effectively minimize the radial size of the busbar module.

Each of the connection terminals of the positive busbar may be arranged in alignment with one of the connection terminals of the negative busbar in a radial direction of the rotor.

With the above arrangement, it is possible to shorten the wiring between the positive and negative busbars and the electrical components, thereby lowering the inductance due to the wiring. Moreover, it is also possible to radially sandwich the positive and negative busbars between terminals of the electrical components which are respectively connected to the connection terminals of the positive and negative busbars, thereby suppressing radial vibration of the positive and negative busbars.

The magnet unit may be configured so that on a d-axis side, an axis of easy magnetization is oriented to be more parallel to the d-axis than on a q-axis side, the d-axis representing centers of the magnetic poles and the q-axis representing boundaries between the magnetic poles.

The magnet unit may be constituted of magnets whose intrinsic coercive force is higher than or equal to 400 [kA/m] and residual flux density is higher than or equal to 1.0 [T].

The armature winding may include a plurality of electrical conductor units arranged at predetermined intervals in the circumferential direction and facing the field. The armature may have one of: (A) a configuration in which inter-conductor members are provided between the circumferentially adjacent electrical conductor units, and the inter-conductor members are formed of such a magnetic material as to satisfy the relationship of Wt×Bs≤Wm×Br, where Wt is the total circumferential width of the inter-conductor members in each magnetic pole, Bs is the saturation flux density of the inter-conductor members, Wm is the circumferential width of each magnetic pole of the magnet unit and Br is the residual flux density of the magnet unit; (B) a configuration in which inter-conductor members are provided between the circumferentially adjacent electrical conductor units, and the inter-conductor members are formed of a nonmagnetic material; and (C) a configuration in which no inter-conductor members are provided between the circumferentially adjacent electrical conductor units.

The radial thickness of the electrical conductor units of the armature winding may be preferably set to be smaller than the circumferential width of the electrical conductor units per phase per magnetic pole.

Each of the electrical conductors forming the electrical conductor units of the armature winding may be constituted of a bundle of wires. Moreover, the resistance between the wires may be preferably set to be higher than the resistance of each of the wires.

In the above-described electrical power conversion device according to the present disclosure, the at least one busbar has a cross section where a thickness in a lateral direction of the cross section at one end of the cross section in a longitudinal direction of the cross section is smaller than a thickness in the lateral direction at the other end of the cross section in the longitudinal direction.

With the above configuration, it becomes possible to increase the geometrical moment of inertia in the lateral direction, thereby improving the vibration resistance of the at least one busbar.

With the above-described method of manufacturing the rotating electric machine according to the present disclosure, it is possible to easily form the at least one busbar. Moreover, it is also possible to lower the percentage of scrap, thereby improving the yield rate (or productivity). Moreover, by the bending process, the at least one busbar is hardened, thereby further improving the vibration resistance.

Exemplary embodiments and modifications thereof will be described hereinafter with reference to FIGS. 1-86. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIGS. 1-5 show the overall configuration of a rotating electric machine 10 according to the first embodiment.

Figure 2:
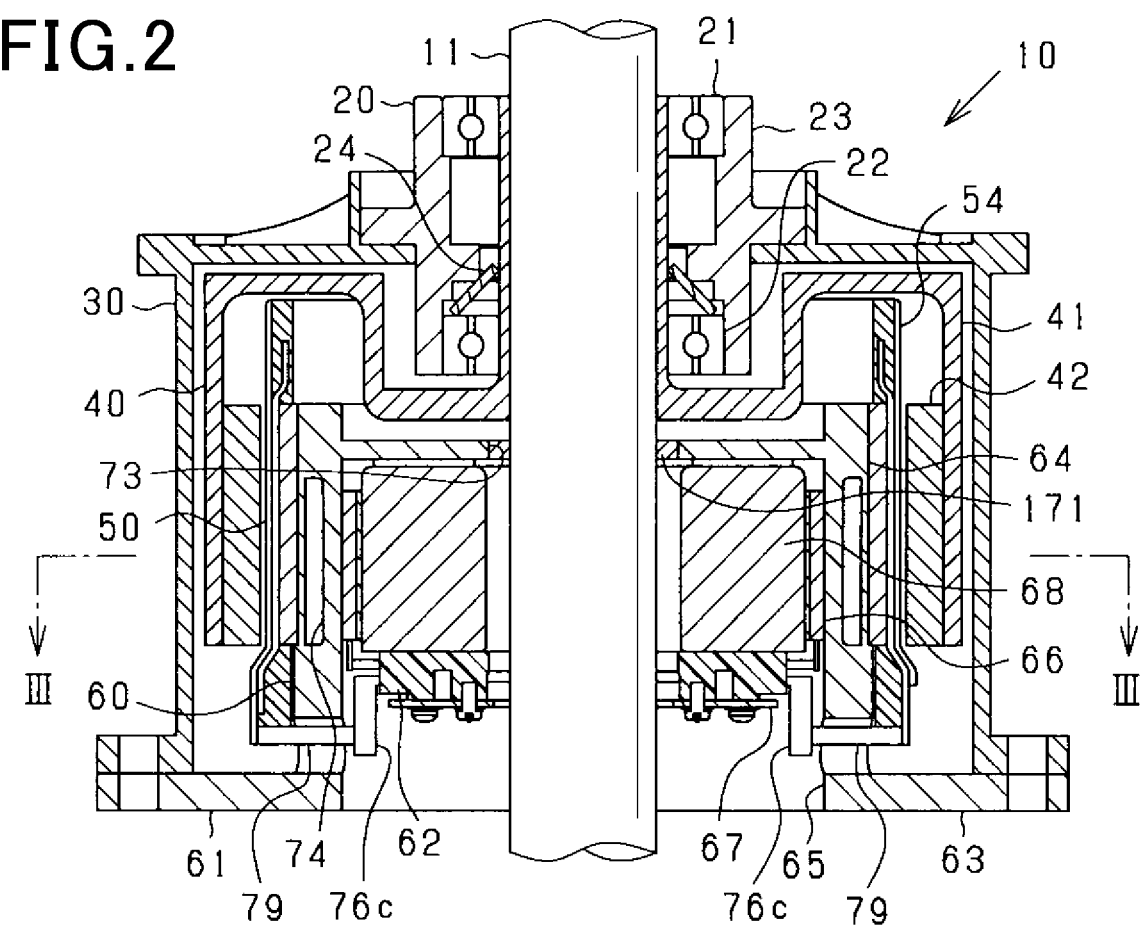
FIG. 2 is a longitudinal cross-sectional view of the rotating electric machine.
Figure 3:
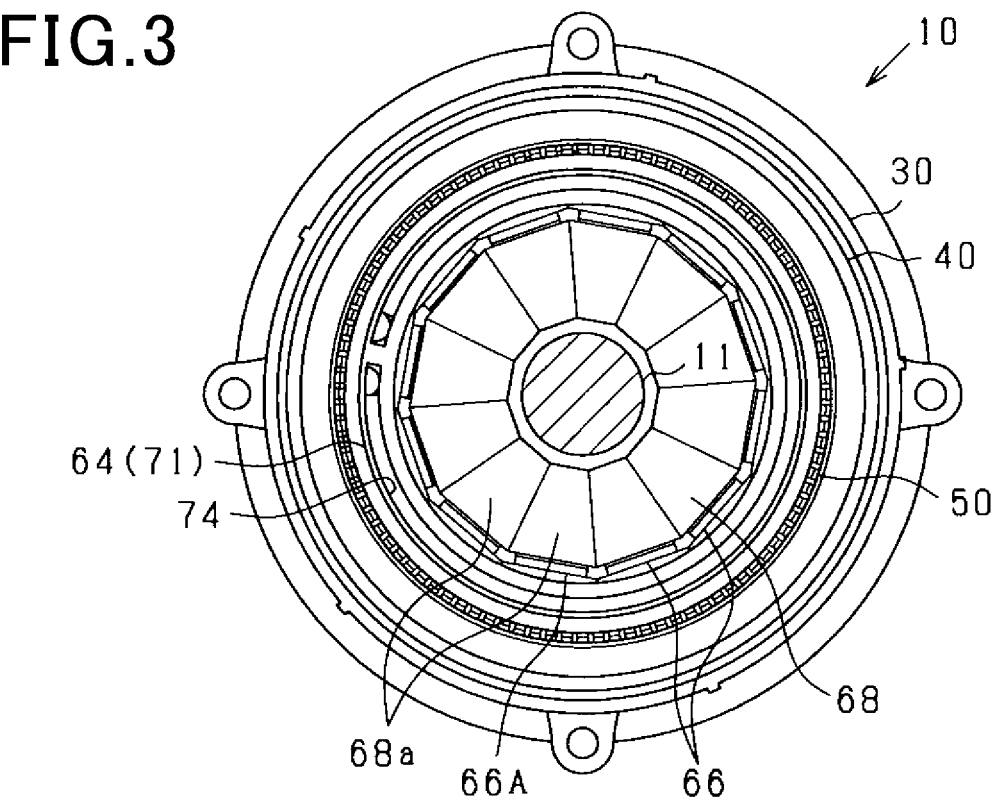
FIG. 3 is a cross-sectional view of the rotating electric machine taken along the line III-III in FIG. 2.
Figure 4:
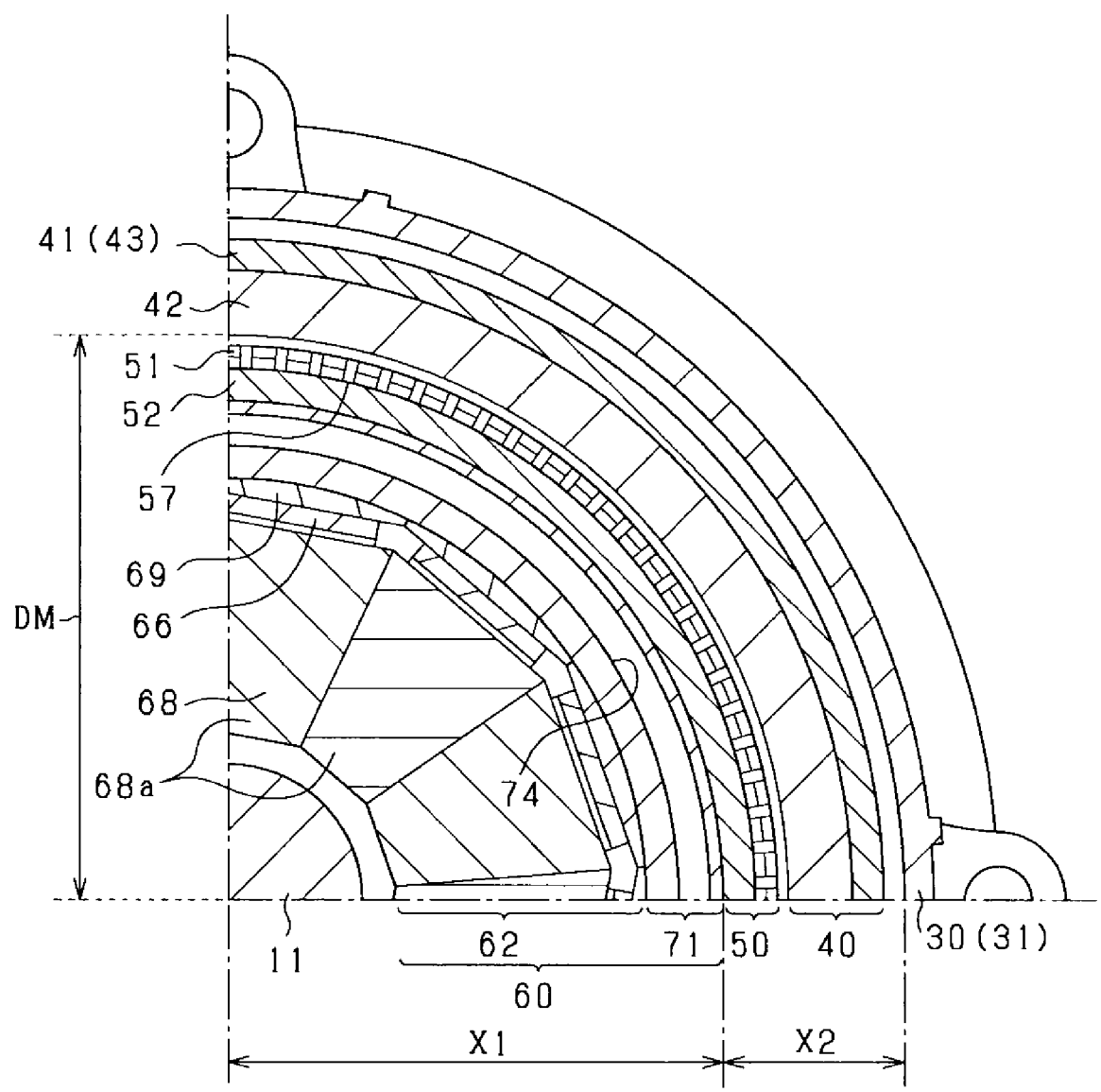
FIG. 4 is an enlarged view of part of FIG. 3.
Figure 5:
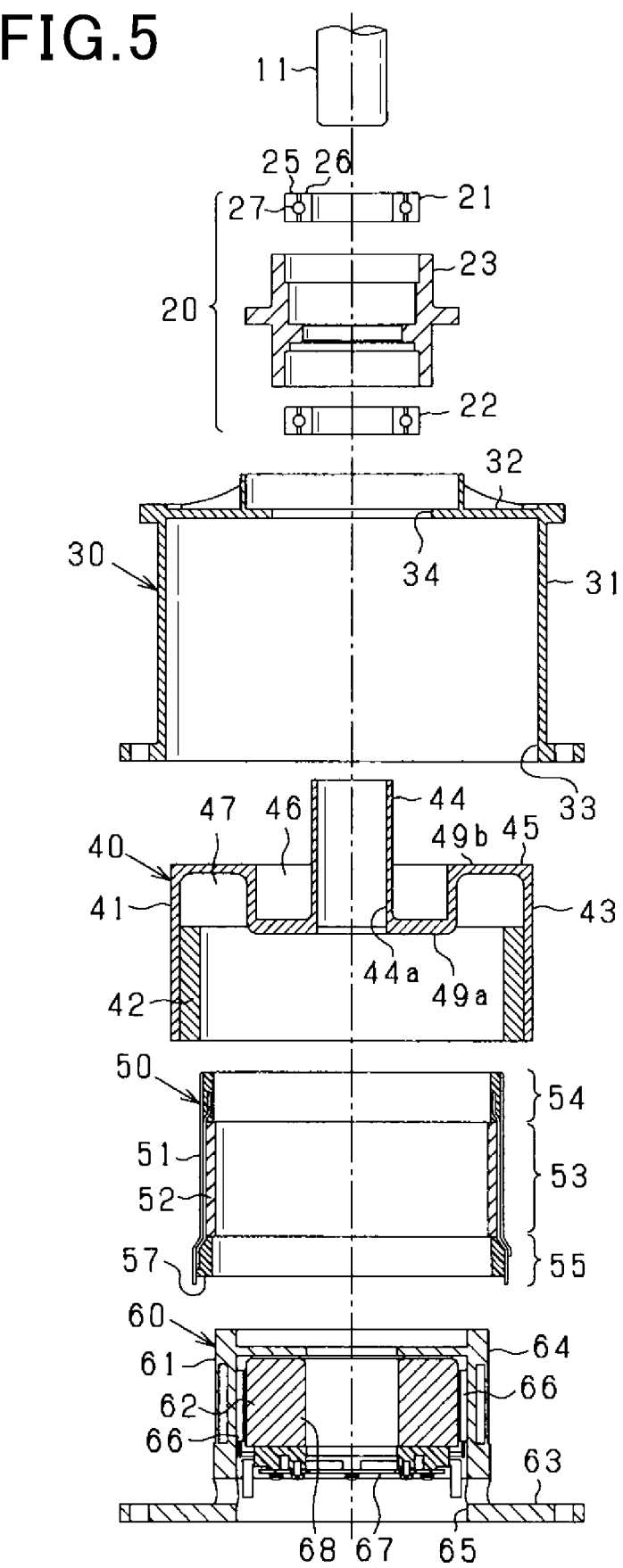
FIG. 5 is an exploded view of the rotating electric machine.

FIG. 1 is a perspective view, partially in longitudinal cross section, of the rotating electric machine 10. FIG. 2 is a longitudinal cross-sectional view of the rotating electric machine 10. FIG. 3 is a transverse cross-sectional view of the rotating electric machine 10 (taken along the line III-III in FIG. 2). FIG. 4 is an enlarged view of part of FIG. 3. FIG. 5 is an exploded view of the rotating electric machine 10. In addition, it should be noted that in FIG. 3, for the sake of simplicity, hatching lines designating cross sections of components of the rotating electric machine 10 except for the rotating shaft 11 are omitted.

Hereinafter, the direction in which a central axis of the rotating shaft 11 extends will be referred to as the axial direction; the directions extending radially from the central axis of the rotating shaft 11 will be referred to as radial directions; and the direction extending along a circle whose center is on the central axis of the rotating shaft 11 will be referred to as the circumferential direction.

In the present embodiment, the rotating electric machine 10 is designed to be used as a power source in, for example, a vehicle. In addition, the rotating electric machine 10 may alternatively be used for other applications, such as industrial, household, office automation and amusement applications.

More particularly, in the present embodiment, the rotating electric machine 10 is configured as synchronous multiphase AC motor having an outer rotor structure.

As shown in FIGS. 1-5, the rotating electric machine 10 includes a bearing unit 20, a housing 30, a rotor 40, a stator 50 and an inverter unit 60, all of which are arranged coaxially with the rotating shaft 11. In addition, all of these components 20-60 are assembled in a predetermined sequence in the axial direction to together constitute the rotating electric machine 10.

In the present embodiment, the rotor 40 functions as a field while the stator 50 functions as an armature. That is, the rotating electric machine 10 is of a rotating field type.

The bearing unit 20 includes a pair of bearings 21 and 22, which are arranged away from each other in the axial direction, and a holding member 23 that holds both the bearings 21 and 22. Each of the bearings 21 and 22 is implemented by, for example, a radial ball bearing. Specifically, each of the bearings 21 and 22 includes an outer ring (or outer raceway) 25, an inner ring (or inner raceway) 26 and a plurality of balls 27 disposed between the outer and inner rings 25 and 26. The holding member 23, which is substantially cylindrical in shape, has both the bearings 21 and 22 assembled thereto on the radially inner side thereof. Moreover, on the radially inner side of the bearings 21 and 22, there are rotatably supported the rotating shaft 11 and the rotor 40. In addition, the pair of bearings 21 and 22 constitutes a pair of bearings rotatably supporting the rotating shaft 11.

In each of the bearings 21 and 22, the balls 27 are retained by a retainer (not shown), thereby keeping the pitch between each pair of the balls 27. Moreover, encapsulating members (not shown) are provided, respectively on opposite axial sides of the retainer, to prevent leakage of non-electrically conductive grease (i.e., non-electrically conductive urea-based grease) that is filled in the bearing. In addition, the position of the inner ring 26 is mechanically kept by a spacer (not shown).

The housing 30 has a circumferential wall 31 that is cylindrical in shape. The circumferential wall 31 has a first end and a second end that are opposite to each other in the axial direction. Moreover, the housing 30 also has an end wall 32 formed at the first end of the circumferential wall 31 and an opening 33 formed at the second end of the circumferential wall 31. More specifically, the opening 33 is formed to open over the entire second end of the circumferential wall 31. In a central part of the end wall 32, there is formed a circular through-hole 34. The bearing unit 20 is partially inserted in the housing 30 via the through-hole 34 and fixed to the housing 30 by fixing means such as screws or rivets.

In an internal space of the housing 30 which is defined by the circumferential wall 31 and the end wall 32, there are received the rotor 40 and the stator 50 both of which are hollow cylindrical in shape. As mentioned above, in the present embodiment, the rotating electric machine 10 has the outer rotor structure such that in the housing 30, the rotor 40 is arranged radially outside the stator 50. Moreover, the rotor 40 is supported in a cantilever fashion by the rotating shaft 11 on the end wall 32 side in the axial direction.

The rotor 40 has a hollow cylindrical magnet holder 41 and an annular magnet unit 42 arranged on the radially inner periphery of the magnet holder 41.

More specifically, the magnet holder 41 is substantially cup-shaped and functions as a magnet holding member. The magnet holder 41 has a cylindrical portion 43, an attachment 44 that is also cylindrical in shape and has an outer diameter smaller than an inner diameter of the cylindrical portion 43, and an intermediate portion 45 connecting the cylindrical portion 43 and the attachment 44. On an inner circumferential surface of the cylindrical portion 43, there is mounted the magnet unit 42.

In addition, the magnet holder 41 is formed of a material having sufficient mechanical strength, such as a cold-rolled steel sheet (e.g., an SPCC steel sheet according to JIS), forged steel or Carbon Fiber-Reinforced Plastic (CFRP).

In a through-hole 44a of the attachment 44, there is inserted the rotating shaft 11. The attachment 44 is attached to the rotating shaft 11 that extends through the through-hole 44a. That is, the magnet holder 41 is fixed to the rotating shaft 11 via the attachment 44. In addition, the attachment 44 may be attached to the rotating shaft 11 by spline coupling using protrusions and recesses, key coupling, welding or crimping. Consequently, the rotor 40 rotates together with the rotating shaft 11.

To a radially outer periphery of the attachment 44 of the magnet holder 41, there are assembled both the bearings 21 and 22 of the bearing unit 20. As described above, the bearing unit 20 is fixed to the end wall 32 of the housing 30. Therefore, the rotating shaft 11 and the rotor 40 are rotatably supported by the housing 30 via the bearings 21 and 22 of the bearing unit 20. Consequently, the rotor 40 is rotatable in the housing 30.

The attachment 44 is provided at only one of two opposite axial ends of the rotor 40. Therefore, the rotor 40 is supported by the rotating shaft 11 in a cantilever fashion. Moreover, the attachment 44 is rotatably supported by the bearings 21 and 22 of the bearing unit 20 at two different axial positions. That is, the rotor 40 is rotatably supported, at one of two opposite axial ends of the magnet holder 41, by the two bearings 21 and 22 that are located away from each other in the axial direction. Therefore, though the rotor 40 is supported by the rotating shaft 11 in the cantilever fashion, it is still possible for the rotor 40 to stably rotate. In addition, the rotor 40 is supported by the bearings 21 and 22 on one axial side of an axially center position of the rotor 40.

In the bearing unit 20, the bearing 21 which is located on the axially outer side and the bearing 22 which is located on the axially inner side are different in gap dimensions between the outer and inner rings 25 and 26 and the balls 27. Specifically, the gap dimensions in the bearing 22 located on the axially inner side are greater than the gap dimensions in the bearing 21 located on the axially outer side. Therefore, on the axially inner side, even if vibration of the rotor 40 and/or vibration caused by imbalance due to parts tolerances act on the bearing unit 20, it is still possible to effectively absorb the vibration(s).

Specifically, in the bearing 22 located on the axially inner side, the play dimensions (or gap dimensions) are increased by preloading, thereby absorbing vibration caused by the cantilever structure. The preloading may be either fixed-position preloading or constant-pressure preloading.

In the case of performing fixed-position preloading, both the outer rings 25 of the bearings 21 and 22 are joined to the holding member 23 by, for example, press-fitting or bonding. On the other hand, both the inner rings 26 of the bearings 21 and 22 are joined to the rotating shaft 11 by, for example, press-fitting or bonding. In this case, a preload can be produced in the bearing 21 by locating the outer ring 25 of the bearing 21 at a different axial position from the inner ring 26 of the bearing 21. Similarly, a preload can be produced in the bearing 22 by locating the outer ring 25 of the bearing 22 at a different axial position from the inner ring 26 of the bearing 22.

In the case of performing constant-pressure preloading, a preloading spring, such as a wave washer 24 (see FIG. 2), is arranged in a region between the bearings 21 and 22 to produce a preload in the axial direction from the region toward the outer ring 25 of the bearing 22. In this case, both the inner rings 26 of the bearings 21 and 22 are joined to the rotating shaft 11 by, for example, press-fitting or bonding. The outer ring 25 of either of the bearings 21 and 22 is arranged with a predetermined clearance to the holding member 23. With the above configuration, a spring force is applied by the preloading spring to the outer ring 25 of the bearing 22 in the axial direction away from the bearing 21. Moreover, this force is transmitted via the rotating shaft 11 to the inner ring 26 of the bearing 21, pressing the inner ring 26 of the bearing 21 in the axial direction toward the bearing 22. Consequently, in each of the bearings 21 and 22, the axial positions of the outer and inner rings 25 and 26 are offset from each other, producing a preload in the bearing.

In addition, in the case of performing constant-pressure preloading, the spring force is not necessarily applied to the outer ring 25 of the bearing 22 as shown in FIG. 2. Instead, the spring force may be applied to the outer ring 25 of the bearing 21. Moreover, as an alternative, preload can be produced in both the bearings 21 and 22 by: (1) locating the inner ring 26 of either of the bearings 21 and 22 with a predetermined clearance to the rotating shaft 11; and (2) joining both the outer rings 25 of the bearings 21 and 22 to the holding member 23 by, for example, press-fitting or bonding.

Furthermore, in the case of applying a force to the inner ring 26 of the bearing 21 in the axial direction away from the bearing 22, the force may be applied to the inner ring 26 of the bearing 22 as well in the axial direction away from the bearing 21. In contrast, in the case of applying a force to the inner ring 26 of the bearing 21 in the axial direction toward the bearing 22, the force may be applied to the inner ring 26 of the bearing 22 as well in the axial direction toward the bearing 21.

In addition, in the case of the rotating electric machine 10 being used as a power source in a vehicle, vibration having a component in the preload producing direction may be applied to the preload producing mechanism and/or the direction of gravity acting on the preload application target may be changed. Therefore, in this case, it is preferable to perform fixed-position preloading.

The intermediate portion 45 of the magnet holder 41 of the rotor 40 has both an annular inner shoulder part 49a and an annular outer shoulder part 49b. The outer shoulder part 49b is located radially outside the inner shoulder part 49a. The inner shoulder part 49a and the outer shoulder part 49b are axially apart from each other. Consequently, the cylindrical portion 43 and the attachment 44 partially radially overlap each other. That is, the cylindrical portion 43 protrudes axially outward from a proximal end (i.e., a lower end in FIG. 5) of the attachment 44. With this configuration, it is possible to support the rotor 40 with respect to the rotating shaft 11 at a closer position to the center of gravity of the rotor 40 than in the case of configuring the intermediate portion 45 to be in the shape of a flat plate. Consequently, it is possible to ensure stable operation of the rotor 40.

Moreover, with the above configuration of the intermediate portion 45, there are formed both an annular bearing-receiving recess 46 and an annular coil-receiving recess 47 in the magnet holder 41 of the rotor 40. The bearing-receiving recess 46 is formed radially outside the attachment 44 to surround the attachment 44. In the bearing-receiving recess 46, part of the bearing unit 20 is received (see FIG. 2). The coil-receiving recess 47 is formed radially outside the bearing-receiving recess 46 so as to surround the bearing-receiving recess 46. In the coil-receiving recess 47, a coil end part 54 of a stator coil 51 of the stator 50 is received (see FIG. 2). The bearing-receiving recess 46 and the coil-receiving recess 47 are located to be radially adjacent to each other. Accordingly, part of the bearing unit 20 and the coil end part 54 of the stator coil 51 radially overlap each other. Consequently, it becomes possible to reduce the axial length of the rotating electric machine 10.

The intermediate portion 45 is formed to project radially outward from the attachment 44 that is attached to the rotating shaft 11. Moreover, in the intermediate portion 45, there is formed a contact prevention portion that extends in the axial direction to prevent contact with the coil end part 54 of the stator coil 51. In addition, the intermediate portion 45 corresponds to a projecting portion.

The coil end part 54 of the stator coil 51 may be bent radially inward or radially outward, thereby reducing the axial length of the coil end part 54 and thus the axial length of the stator 50. The direction of bending the coil end part 54 may be determined in consideration of the assembling of the stator 50 to the rotor 40. Specifically, considering the fact that the stator 50 is assembled to the radially inner periphery of the rotor 40, the coil end part 54, which is formed at the insertion end of the stator 50 with respect to the rotor 40, may be bent radially inward.

Moreover, a coil end part 55 of the stator coil 51, which is on the axially opposite side to the coil end part 54, may also be bent radially inward or radially outward. In addition, considering the fact that there is a space allowance on the radially outer side, it is preferable to bend the coil end part 55 radially outward.

The magnet unit 42 of the rotor 40 is constituted of a plurality of permanent magnets which are arranged on the radially inner periphery of the cylindrical portion 43 of the magnet holder 41 so that the polarities thereof alternate between N and S in the circumferential direction. Consequently, the magnet unit 42 has a plurality of magnetic poles arranged in the circumferential direction. The configuration of the magnet unit 42 will be described in detail later.

The stator 50 is provided radially inside the rotor 40. The stator 50 includes the aforementioned stator coil 51, which is wound into a substantially hollow cylindrical (or annular)

shape, and a stator core 52 that is arranged, as a base member, radially inside the stator coil 51.

The stator coil 51 is arranged to radially face the annular magnet unit 42 of the rotor 40 through a predetermined air gap formed therebetween. The stator coil 51 is comprised of a plurality of phase windings. Each of the phase windings is formed by connecting, at a predetermine pitch, a plurality of electrical conductors arranged in the circumferential direction. More particularly, in the present embodiment, the stator coil 51 includes a first three-phase coil comprised of U-phase, V-phase and W-phase windings and a second three-phase coil comprised of X-phase, Y-phase and Z-phase windings. That is, the stator coil 51 includes a total of six phase windings.

The stator core 52 is annular in shape and assembled to a radially inner periphery of the stator coil 51. The stator core 52 is formed by laminating a plurality of magnetic steel sheets (i.e., soft-magnetic material sheets) in the axial direction. The magnetic steel sheets are formed, for example, of silicon steel that is obtained by adding silicon by a few percent (e.g., 3%) to iron.

In addition, in the present embodiment, the stator coil 51 corresponds to an armature coil and the stator core 52 corresponds to an armature core.

As shown in FIG. 5, the stator coil 51 has a coil side part 53 and the aforementioned coil end parts 54 and 55. The coil side part 53 is arranged radially outside the stator core 52 so as to radially overlap the stator core 52. The coil side part 53 radially faces both the stator core 52 located on the radially inner side thereof and the magnet unit 42 of the rotor 40 located on the radially outer side thereof. The coil end parts 54 and 55 are arranged to protrude respectively from opposite axial ends of the stator core 52. In the state of the stator 50 being assembled to the rotor 40, the coil end part 54 is received in the coil-receiving recess 47 formed in the magnet holder 41 of the rotor 40 (see FIG. 2). In addition, the configuration of the stator 50 will be described in detail later.

The inverter unit 60 includes a unit base 61, which is fixed to the housing 30 by fastening means such as bolts, and a plurality of electrical components 62 assembled to the unit base 61.

The unit base 61 is formed, for example, of CFRP. The unit base 61 includes an end plate 63 fixed to the edge of the opening 33 of the housing 30 and a casing 64 formed integrally with the end plate 63 and extending in the axial direction. The end plate 63 has a circular opening 65 formed in a central part thereof. The casing 64 is formed to protrude from the peripheral edge of the opening 65.

On the radially outer surface of the casing 64, there is assembled the stator 50. The outer diameter of the casing 64 is equal to or slightly smaller than the inner diameter of the stator core 52. The stator 50 and the unit base 61 are integrated into one piece by assembling the stator core 52 to the radially outer surface of the casing 64. Moreover, since the unit base 61 is fixed to the housing 30, with the stator core 52 assembled to the casing 64, the stator 50 is also integrated with the housing 30 into one piece.

In addition, the stator core 52 may be assembled to the unit base 61 by, for example, bonding, shrink fitting or press-fitting. Consequently, circumferential or axial displacement of the stator core 52 relative to the unit base 61 is suppressed.

On the radially inner side of the casing 64, there is formed a receiving space for receiving the electrical components 62. In the receiving space, the electrical components 62 are arranged around the rotating shaft 11. That is, the casing 64 serves as a receiving-space forming portion.

The electrical components 62 include semiconductor modules 66 for forming an inverter circuit, a control substrate 67 and a capacitor module 68.

In addition, in the present embodiment, the unit base 61 corresponds to a stator holder (or armature holder) that is provided radially inside the stator 50 and holds the stator 50. The housing 30 and the unit base 61 together constitute a motor housing of the rotating electric machine 10. In the motor housing, the holding member 23 of the bearing unit 20 is fixed to the housing 30 on one axial side of the rotor 40; the housing 30 and the unit base 61 are joined to each other on the other axial side of the rotor 40. The rotating electric machine 10 is mounted to the vehicle by mounting the motor housing to a mount provided in the vehicle.

Figure 6:
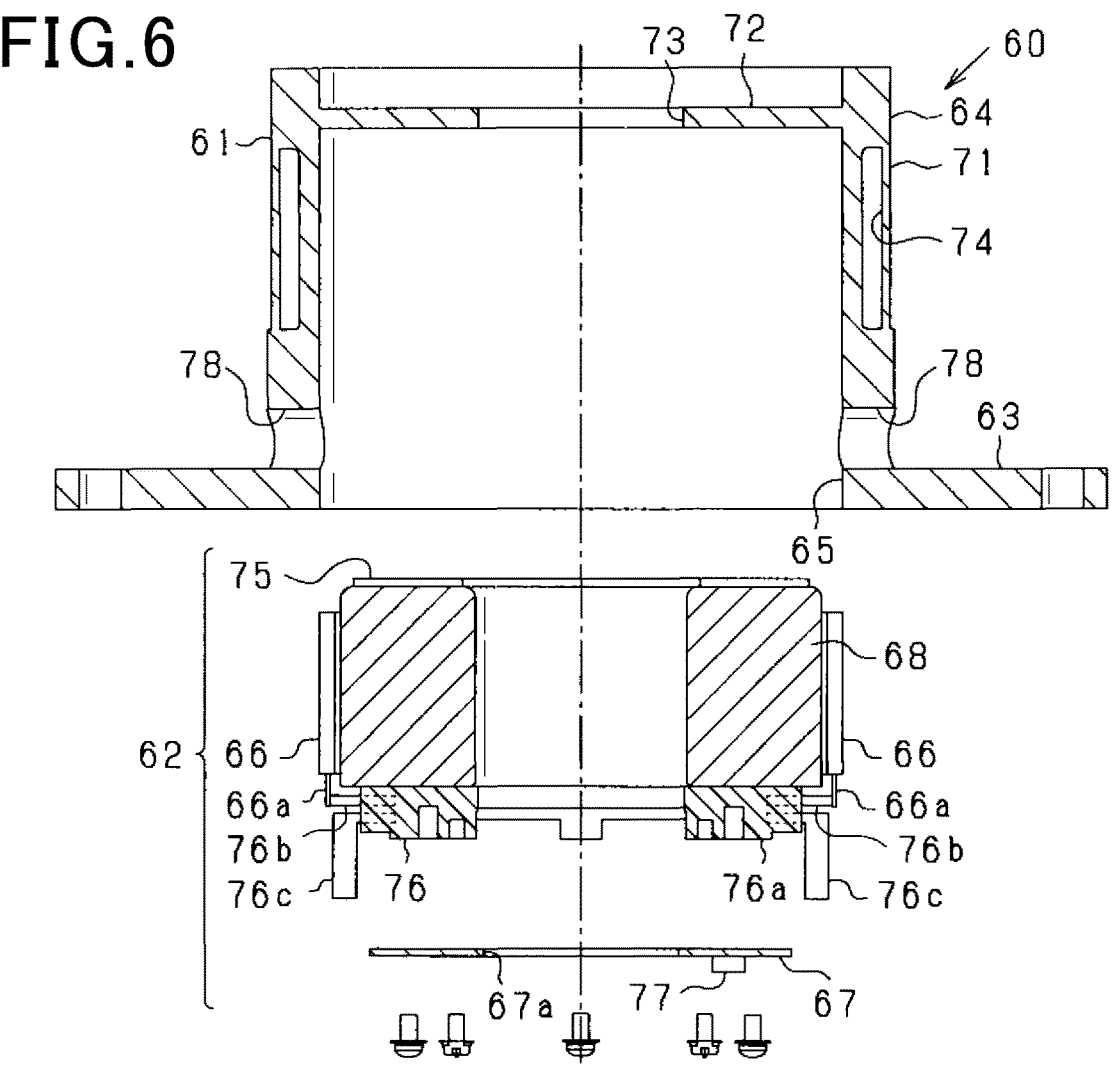
FIG. 6 is an exploded view of an inverter unit of the rotating electric machine.

Referring now to FIG. 6 together with FIGS. 1-5, the configuration of the inverter unit 60 will be described in detail. FIG. 6 is an exploded view of the inverter unit 60.

The casing 64 of the unit base 61 has a cylindrical portion 71 and an end wall 72 that is formed at one of the two opposite axial ends (more specifically, the bearing unit 20-side end) of the cylindrical portion 71. At the axial end of the cylindrical portion 71 on the opposite side to the end wall 72, the cylindrical portion 71 fully opens via the opening 65 of the end plate 63. In a central part of the end wall 72, there is formed a circular through-hole 73 through which the rotating shaft 11 extends in the axial direction. In the through-hole 73, there is provided a seal member 171 (see FIGS. 1 and 2) to seal the gap between the wall surface of the through-hole 73 and the outer circumferential surface of the rotating shaft 11. The seal member 171 may be implemented by, for example, a sliding seal formed of a resin material.

The cylindrical portion 71 of the casing 64 serves as a partition wall to partition between the rotor 40 and the stator 50 arranged on the radially outer side thereof and the electrical components 62 arranged on the radially inner side thereof. That is, the rotor 40, the stator 50 and the electrical components 62 are arranged in radial alignment with each other with the cylindrical portion 71 interposed between the stator 50 and the electrical components 62.

The electrical components 62 are provided to form the inverter circuit. The electrical components 62 together perform a power running function, i.e., a function of supplying electric current to each phase winding of the stator coil 51 in a predetermined sequence and thereby generating torque to rotate the rotor 40. Moreover, the electrical components 62 together also perform an electric power generation function, i.e., a function of rectifying three-phase alternating current, which is induced in the stator coil 51 with rotation of the rotor 40, into a direct current and outputting the resultant direct current to an external device (e.g., a battery of the vehicle). In addition, the electrical components 62 may together perform only either one of the power running function and the electric power generation function. Moreover, the electric power generation function may be a regenerative function, i.e., a function of outputting regenerative electric power to the external device.

As shown in FIGS. 3 and 4, the capacitor module 68 is hollow cylindrical in shape and arranged around the rotating shaft 11. On an outer circumferential surface of the capacitor module 68, there are arranged the semiconductor modules 66 in circumferential alignment with each other. The capacitor module 68 includes a plurality of smoothing capacitors 68a that are connected in parallel with each other. Each of the capacitors 68a is implemented by, for example, a laminated film capacitor that is formed by laminating a plurality of film capacitors. Each of the capacitors 68a has a trapezoidal cross section. In the present embodiment, the capacitor module 68 is constituted of twelve capacitors 68a that are arranged in an annular shape.

In addition, each of the capacitors 68a may be manufactured in the following way. First, a plurality of films are laminated to form a film laminate which has a predetermined length and a predetermined width. Then, the film laminate is cut into a plurality of trapezoidal capacitor elements such that: the width direction of the film laminate coincides with the height direction of the trapezoidal capacitor elements; the upper bases and the lower bases of the trapezoidal capacitor elements are alternately arranged in the longitudinal direction (or length direction) of the film laminate; and all the legs of the trapezoidal capacitor elements have the same length. Thereafter, to each of the capacitor elements, electrodes are attached to form one of the capacitors 68a.

Each of the semiconductor modules 66 includes a semiconductor switching element (e.g., a MOSFET or an IGBT) and is substantially plate-shaped. More particularly, in the present embodiment, the stator coil 51 includes two three-phase coils, for each of which one inverter circuit is provided. Accordingly, a total of twelve semiconductor modules 66 are arranged in an annular shape to form a semiconductor module group 66A (see FIG. 3).

The semiconductor modules 66 are sandwiched between the cylindrical portion 71 of the casing 64 and the capacitor module 68. More specifically, an outer circumferential surface of the semiconductor module group 66A abuts an inner circumferential surface of the cylindrical portion 71 of the casing 64; an inner circumferential surface of the semiconductor module group 66A abuts an outer circumferential surface of the capacitor module 68. With this arrangement, heat generated in the semiconductor modules 66 is transmitted to the end plate 63 via the casing 64, thereby being dissipated from the end plate 63.

In addition, a spacer 69 may be provided between the outer circumferential surface of the semiconductor module group 66A and the inner circumferential surface of the cylindrical portion 71 of the casing 64. More specifically, the shape of a cross section of the capacitor module 68 perpendicular to the axial direction is regular dodecagonal. On the other hand, the inner circumferential surface of the cylindrical portion 71 of the casing 64 is circular in cross-sectional shape. Accordingly, the spacer 69 may have an inner circumferential surface constituted of twelve flat surfaces and a cylindrical outer circumferential surface. Moreover, the spacer 69 may be formed in one piece so as to continuously extend in an annular shape on the radially outer side of the semiconductor module group 66A. The spacer 69 may be formed of a material having high heat conductivity, for example a metal such as aluminum or a heat dissipation gel sheet. In addition, the inner circumferential surface of the cylindrical portion 71 of the casing 64 may be modified to have the same regular dodecagonal cross-sectional shape as the capacitor module 68. In this case, the outer circumferential surface of the spacer 69 would also be constituted of twelve flat surfaces as the inner circumferential surface of the same.

In the present embodiment, in the cylindrical portion 71 of the casing 64, there is formed a cooling water passage 74 through which cooling water flows. Consequently, heat generated in the semiconductor modules 66 can be dissipated to the cooling water flowing through the cooling water passage 74. That is, the casing 64 includes a water-cooling mechanism. As shown in FIGS. 3 and 4, the cooling water passage 74 is annular-shaped to surround the electrical components 62 (i.e., the semiconductor modules 66 and the capacitor module 68). More specifically, the semiconductor modules 66 are arranged along the inner circumferential surface of the cylindrical portion 71 of the casing 64; the cooling water passage 74 is formed radially outside the semiconductor modules 66 so as to radially overlap them.

The cylindrical portion 71 of the casing 64 has the stator 50 arranged on the radially outer side thereof and the electrical components 62 arranged on the radially inner side thereof. Therefore, both heat generated in the stator 50 and heat generated in the electrical components 62 (more specifically, in the semiconductor modules 66) are transmitted to the cylindrical portion 71 of the casing 64. Consequently, with cooling water flowing through the cooling water passage 74 formed in the cylindrical portion 71, it is possible to cool both the stator 50 and the semiconductor modules 66 at the same time. That is, it is possible to effectively dissipate heat generated by the heat-generating members in the rotating electric machine 10. Moreover, at least part of the semiconductor modules 66, which constitute part or the whole of the inverter circuits for energizing the stator coil 51 and thereby driving the rotating electric machine 10, is arranged within a region surrounded by the stator core 52 that is located radially outside the cylindrical portion 71 of the casing 64. It is preferable that the whole of one of the semiconductor modules 66 is arranged within the region surrounded by the stator core 52. It is more preferable that the whole of each of the semiconductor modules 66 is arranged within the region surrounded by the stator core 52.

Moreover, at least part of the semiconductor modules 66 is arranged within a region surrounded by the cooling water passage 74. It is preferable that the whole of each of the semiconductor modules 66 is arranged within the region surrounded by the cooling water passage 74.

As shown in FIG. 6, the capacitor module 68 has an insulating sheet 75 arranged on one axial end face thereof and a wiring module 76 arranged on the other axial end face thereof. More specifically, the capacitor module 68 has two opposite axial end faces, i.e., a first axial end face on the side closer to the bearing unit 20 and a second axial end face on the side closer to the opening 65 of the end plate 63. The insulating sheet 75 is arranged on the first axial end face of the capacitor module 68 so as to be interposed between the capacitor module 68 and the end wall 72 of the casing 64. The wiring module 76 is mounted to the second axial end face of the capacitor module 68.

The wiring module 76 has a main body 76a, which is formed of a synthetic resin material into a discoid shape, and a plurality of busbars 76b and 76c embedded in the main body 76a. The wiring module 76 is electrically connected with the semiconductor modules 66 and the capacitor module 68 via the busbars 76b and 76c. More specifically, each of the semiconductor modules 66 has a connection pin 66a extending from an axial end face thereof; the connection pin 66a is connected, on the radially outer side of the main body 76a, to one of the busbars 76b. On the other hand, the busbars 76c extend, on the radially outer side of the main body 76a, in the axial direction away from the capacitor module 68. To distal end portions of the busbars 76c, there are respectively connected wiring members 79 (see FIG. 2).

As described above, the capacitor module 68 has the insulating sheet 75 arranged on the first axial end face thereof and the wiring module 76 arranged on the second axial end face thereof. With this arrangement, there are formed two heat dissipation paths of the capacitor module 68, i.e., a first heat dissipation path from the first axial end face of the capacitor module 68 to the end wall 72 of the casing 64 and a second heat dissipation path from the second axial end face of the capacitor module 68 to the cylindrical portion 71 of the casing 64. Consequently, it becomes possible to dissipate heat generated in the capacitor module 68 via the first and second axial end faces. That is, it becomes possible to dissipate heat generated in the capacitor module 68 not only in the radial direction but also in the axial direction.

Moreover, the capacitor module 68, which is hollow cylindrical in shape, has the rotating shaft 11 arranged on the radially inner side thereof with a predetermined gap formed therebetween. Consequently, heat generated in the capacitor module 68 can also be dissipated via the gap formed between the capacitor module 68 and the rotating shaft 11. In addition, with rotation of the rotating shaft 11, air flow is created in the gap, thereby more effectively cooling the capacitor module 68.

To the wiring module 76, there is mounted a control substrate 67 which has a discoid shape. The control substrate 67 includes a Printed Circuit Board (PCB) which has a predetermined wiring pattern formed thereon. On the PCB, there is mounted a controller 77 (or control unit) which is constituted of various ICs and a microcomputer. The control substrate 67 is fixed to the wiring module 76 by fixing means such as screws. In a central part of the control substrate 67, there is formed a through-hole 67a through which the rotating shaft 11 extends in the axial direction.

The wiring module 76 has a first surface and a second surface that are opposite to each other in the axial direction, i.e., in the thickness direction thereof. The first surface axially faces the capacitor module 68. The second surface has the control substrate 67 mounted thereon. The busbars 76c are configured to extend from one axial end face of the control substrate 67 to the other axial end face of the control substrate 67. To prevent interference with the busbars 76c, there may be formed cuts in a radially outer edge portion of the discoid control substrate 67.

As described above, the electrical components 62 are received in the space surrounded by the cylindrical portion 71 of the casing 64; the stator 50, the rotor 40 and the housing 30 are arranged in layers on the radially outer side of the cylindrical portion 71 of the casing 64. With this arrangement, electromagnetic noise generated in the inverter circuits can be suitably shielded. More specifically, in the inverter circuits, switching control is performed on each of the semiconductor modules 66 via PWM control with a predetermined carrier frequency. Consequently, electromagnetic noise may be caused by the switching control. However, the generated electromagnetic noise would be suitably shielded by the stator 50, the rotor 40 and the housing 30 all of which are located radially outside the electrical components 62.

Moreover, at least part of the semiconductor modules 66 is arranged within the region surrounded by the stator core 52 that is located radially outside the cylindrical portion 71 of the casing 64. With this arrangement, even if magnetic flux is generated by the semiconductor modules 66, the stator coil 51 would be hardly affected by the magnetic flux. In contrast, even if magnetic flux is generated by the stator coil 51, the semiconductor modules 66 would be hardly affected by the magnetic flux. In addition, the above advantageous effects would be more remarkable when the whole of each of the semiconductor modules 66 is arranged in the region surrounded by the stator core 52. Moreover, at least part of the semiconductor modules 66 is surrounded by the cooling water passage 74. With this arrangement, it becomes difficult for heat generated in the stator coil 51 and/or the magnet unit 42 to be transmitted to the semiconductor modules 66.

In an end plate 63-side end part of the cylindrical portion 71 of the casing 64, there are formed through-holes 78. Through the through-holes 78, the wiring members 79 respectively extend to electrically connect the stator 50 located radially outside the cylindrical portion 71 with the electrical components 62 located radially inside the cylindrical portion 71. More specifically, as shown in FIG. 2, the wiring members 79 are respectively joined, for example by crimping or welding, to winding ends of the stator coil 51 as well as to the busbars 76c of the wiring module 76. It is preferable that the wiring members 79 are implemented by busbars with flat joining surfaces. The number of the through-holes 78 formed in the cylindrical portion 71 of the casing 64 may be single or plural. More particularly, in the present embodiment, two through-holes 78 are formed respectively at two different positions in the cylindrical portion 71 of the casing 64. Consequently, it becomes easy to connect the winding ends of the first three-phase stator coil and the winding ends of the second three-phase stator coil respectively to the wiring members 79.

As shown in FIG. 4, in the housing 30, the rotor 40, the stator 50 and the inverter unit 60 are arranged in this order from the radially outer side to the radially inner side. More specifically, the rotor 40 and the stator 50 are arranged radially outward from the center of rotation of the rotor 40 by more than $d \times 0.705$, where d is the radius of the inner circumferential surface of the housing 30. With this arrangement, the area of a cross section of a first region X1 perpendicular to the axial direction becomes larger than the area of a cross section of a second region X2 perpendicular to the axial direction. Here, the first region X1 denotes the region enclosed by the inner circumferential surface of the stator 50 (i.e., the inner circumferential surface of the stator core 52); the second region X2 denotes the region between the inner circumferential surface of the stator 50 and the inner circumferential surface of the housing 30 (i.e., the inner circumferential surface of the circumferential wall 31 of the housing 30). Moreover, in an axial range where the magnet unit 42 of the rotor 40 and the stator coil 51 radially overlap each other, the volume of the first region X1 is larger than the volume of the second region X2.

In addition, the rotor 40 and the stator 50 together constitute a magnetic-circuit component assembly. Then, in the housing 30, the volume of the first region X1 enclosed by the inner circumferential surface of the magnetic-circuit component assembly (i.e., the inner circumferential surface of the stator core 52) is larger than the volume of the second region X2 between the inner circumferential surface of the magnetic-circuit component assembly and the inner circumferential surface of the housing 30.

Next, the configurations of the rotor 40 and the stator 50 according to the present embodiment will be described in more detail.

A conventional stator for a rotating electric machine is generally configured to include a stator core and a stator coil. The stator core is formed by laminating steel sheets into an annular shape. The stator core has a plurality of slots arranged in the circumferential direction. The stator coil is mounted on the stator core so as to be received in the slots of the stator core. More specifically, the stator core has an annular back yoke and a plurality of teeth that are spaced at predetermined intervals in the circumferential direction and each radially extend from the back yoke. Each of the slots is formed between one circumferentially-adjacent pair of the teeth. The stator coil is constituted of electrical conductors that are received in a plurality of radially-aligned layers in the slots of the stator core.

However, in the conventional stator, with the above structure, during energization of the stator coil, with increase in the magnetomotive force of the stator coil, magnetic saturation may occur in the teeth of the stator core, causing the torque density of the rotating electric machine to be limited. More specifically, in the stator core, rotating magnetic flux, which is generated with energization of the stator coil, may concentrate on the teeth, causing the teeth to be magnetically saturated.

Moreover, a conventional IPM (Interior Permanent Magnet) rotor for a rotating electric machine is generally configured to include a rotor core and a plurality of permanent magnets embedded in the rotor core. The permanent magnets are arranged on the d-axis of the d-q coordinate system while q-axis core portions of the rotor core are arranged on the q-axis of the d-q coordinate system. In this case, upon the stator coil on the vicinity of the d-axis being excited, exciting magnetic flux flows from the stator into the q-axis of the rotor according to Fleming's rule. Consequently, magnetic saturation may occur in a wide range in the q-axis core portions of the rotor.

Figure 7:
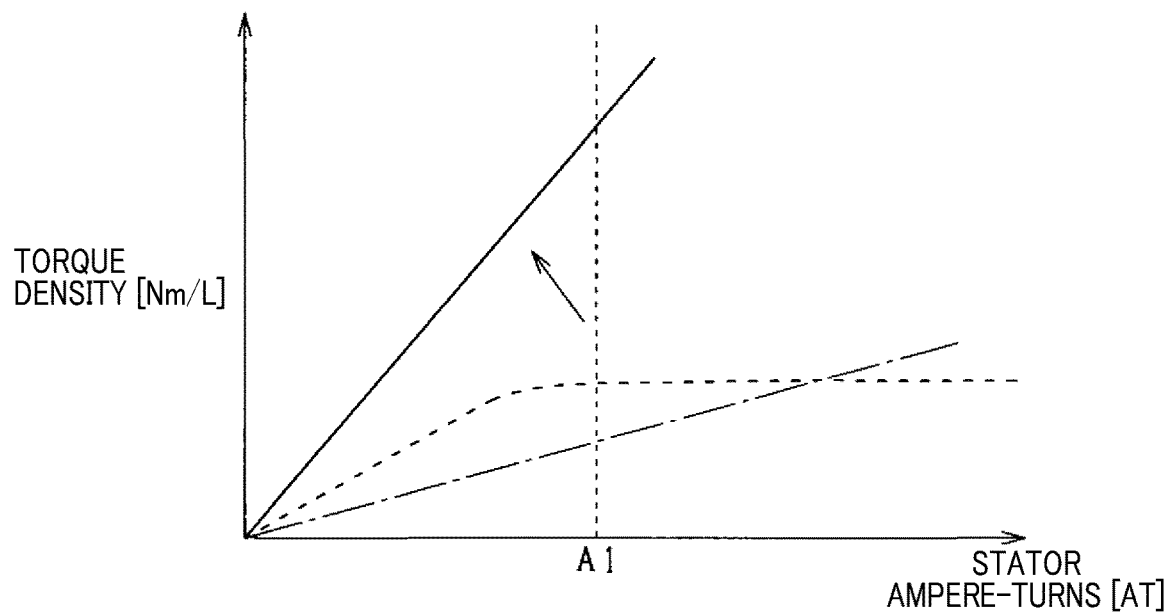
FIG. 7 is a characteristic diagram illustrating the relationship between stator ampere-turns and torque density.

FIG. 7 is a characteristic diagram illustrating the relationship between the stator ampere-turns [AT], which represents the magnetomotive force of the stator coil, and the torque density [Nm/L].

In FIG. 7, the relationship in a conventional IPM rotor rotating electric machine is designed by a dashed line. As can be seen from FIG. 7, in the conventional rotating electric machine, with increase in the magnetomotive force of the stator coil, magnetic saturation occurs in the teeth of the stator core and the q-axis core portions of the rotor, causing increase in the torque density to be limited. Therefore, in the conventional IPM rotor rotating electric machine, the design value of the stator ampere-turns is limited by A1.

In view of the above, in the rotating electric machine 10 according to the present embodiment, measures are taken to overcome the limitation on the torque density due to the magnetic saturation.

Specifically, as a first measure, to prevent magnetic saturation from occurring in the stator core 52, a slot-less structure is employed for the stator core 52. Moreover, to prevent magnetic saturation from occurring in the rotor 40, an SPM (Surface Permanent Magnet) structure is employed for the rotor 40.

However, with the first measure, torque may decrease in a low-electric current region, as shown with a one-dot chain line in FIG. 7.

Therefore, as a second measure, to increase the magnetic flux of the SPM rotor 40 and thereby suppress decrease in the torque, a polar anisotropic structure is employed in which magnet magnetic paths in the magnet unit 42 of the rotor 40 are lengthened to increase the magnetic force.

However, with the second measure, higher eddy current may be generated in the stator coil 51 that is arranged to radially face the magnet unit 42.

Therefore, as a third measure, to suppress decrease in the torque, a flat conductor structure is employed in which the radial thickness of the electrical conductors in the coil side part 53 of the stator coil 51 is reduced. Consequently, it becomes possible to suppress generation of radial eddy current in the stator coil 51.

As above, by taking the first, second and third measures, it becomes possible to considerably improve the torque characteristics with employment of the high-magnetic force magnets while suppressing generation of eddy current in the stator coil 51, as shown with a solid line in FIG. 7.

Furthermore, as a fourth measure, the magnet unit 42 is employed in which magnetic flux density distribution closer to a sine wave is realized using the polar anisotropic structure. Consequently, it becomes possible to improve the sine wave conformity ratio with the later-described pulse control and thereby increase the torque while more effectively suppressing eddy current loss with gentler magnetic flux change than radial magnets.

Hereinafter, the sine wave conformity ratio will be described. The sine wave conformity ratio can be determined based on comparison between the actual waveform of the surface magnetic flux density distribution, which is measured by tracing the surfaces of the magnets using a magnetic flux probe, and a sine wave that has the same period and peak values as the actual waveform. Specifically, the sine wave conformity ratio is defined as the ratio of the amplitude of the primary waveform, which is the fundamental wave of the rotating electric machine, to the amplitude of the actual waveform (i.e., the amplitude of the fundamental wave with harmonic components added thereto). The higher the sine wave conformity ratio, the more the actual waveform of the surface magnetic flux density distribution conforms to the shape of the sine wave. Upon supplying electric current of the primary sine wave to the rotating electric machine 10, high torque can be generated due to the improved sine wave conformity ratio of the magnets of the magnet unit 42 of the rotor 40. In addition, instead of measuring with the magnetic flux probe, the actual waveform of the surface magnetic flux density distribution may be estimated by, for example, an electromagnetic field analysis using Maxwell's equations.

Furthermore, as a fifth measure, a wire-bundle electrical conductor structure is employed in which each of the electrical conductors forming the stator coil 51 is constituted of a bundle of wires. Consequently, with the wires connected in parallel with each other, it becomes possible to allow high electric current to flow through the electrical conductors. Moreover, since the cross sectional area of each of the wires is small, it becomes possible to further effectively suppress generation of eddy current in the electrical conductors that are expanded in the circumferential direction of the stator 50 due to the flat conductor structure. In addition, forming each of the electrical conductors by twisting the wires, with respect to the magnetomotive force of the electrical conductors, it becomes possible to cancel eddy currents, which are induced by magnetic flux generated according to the right-hand rule with respect to the electric current supply direction, by each other.

As above, by further taking the fourth and fifth measures in addition to the first, second and third measures, it becomes possible to employ the high-magnetic force magnets (i.e., the second measure) while suppressing eddy current loss due to the high magnetic force and thereby further increasing the torque.

Hereinafter, the slot-less structure of the stator 50, the flat conductor structure of the stator coil 51 and the polar anisotropic structure of the magnet unit 42 of the rotor 40 will be described in detail.

Figure 10:
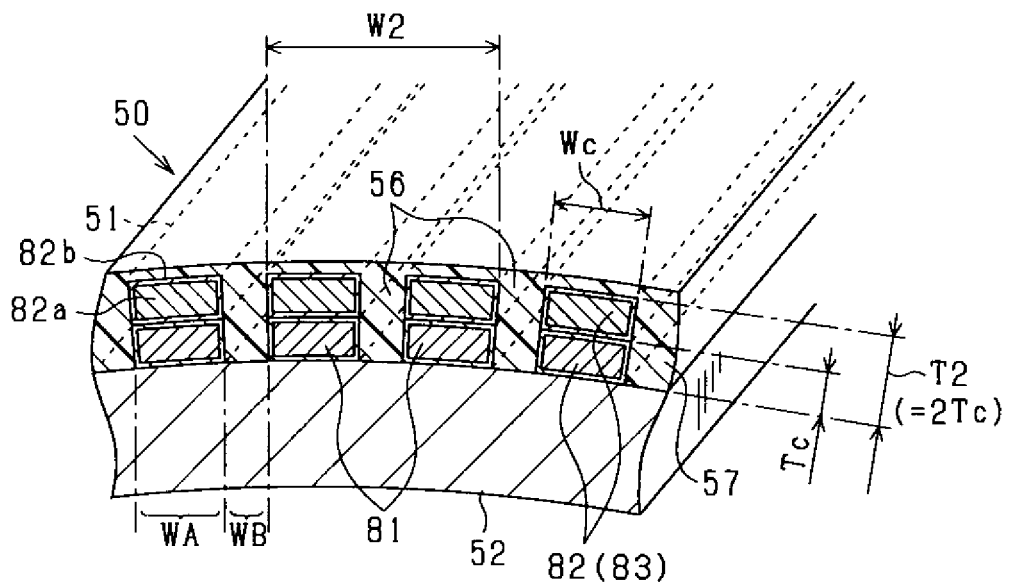
FIG. 10 is a transverse cross-sectional view of part of the stator, which is taken along the line X-X in FIG. 11.
Figure 11:
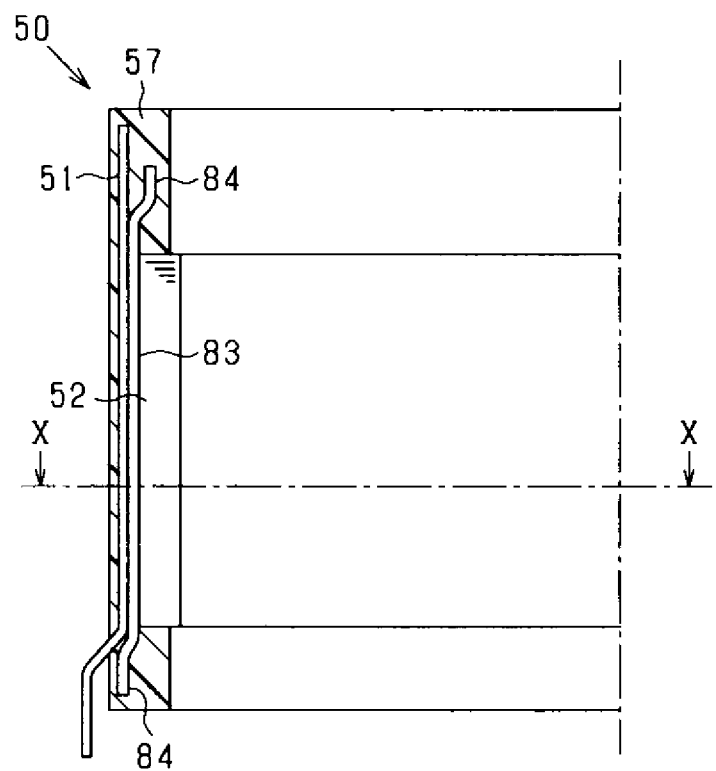
FIG. 11 is a longitudinal cross-sectional view of part of the stator.
Figure 12:
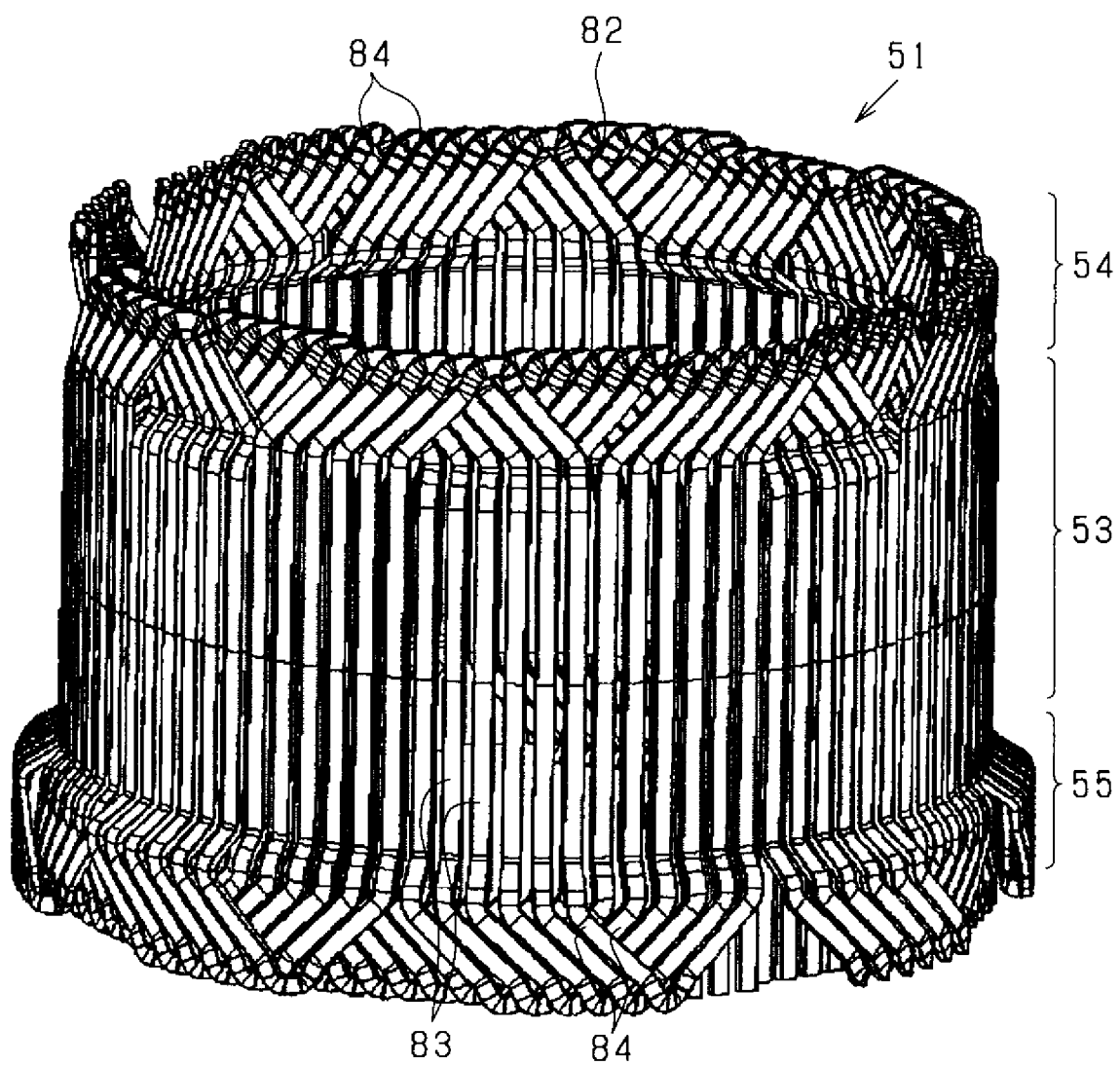
FIG. 12 is a perspective view of a stator coil of the stator.

FIG. 8 is a transverse cross-sectional view of both the rotor 40 and the stator 50. FIG. 9 is an enlarged view of part of FIG. 8. FIG. 10 is a transverse cross-sectional view of part of the stator 50, which is taken along the line X-X in FIG. 11. FIG. 11 is a longitudinal cross-sectional view of part of the stator 50. FIG. 12 is a perspective view of the stator coil 51. In addition, in FIGS. 8 and 9, the magnetization directions of the magnets of the magnet unit 42 are indicated by arrows.

As shown in FIGS. 8-11, the stator core 52 has a hollow cylindrical shape with a predetermined radial thickness. As described previously, in the present embodiment, the stator core 52 is formed by laminating a plurality of magnetic steel sheets in the axial direction. The stator coil 51 is assembled to the radially outer periphery (i.e., the rotor 40-side periphery) of the stator core 52. That is, the outer circumferential surface of the stator core 52 on the rotor 40 side constitutes an electrical conductor mounting part (or electrical conductor mounting area). The outer circumferential surface of the stator core 52 is a smooth cylindrical surface. A plurality of electrical conductor groups 81 are arranged on the outer circumferential surface of the stator core 52 at predetermined intervals in the circumferential direction. The stator core 52 functions as a back yoke to form part of a magnetic circuit for rotating the rotor 40. Between each circumferentially-adjacent pair of the electrical conductor groups 81, there is no tooth formed of a soft-magnetic material (i.e., no iron core). Accordingly, there is no slot formed in the stator core 52.

In the present embodiment, each of gaps 56 between the electrical conductor groups 81 is occupied by the resin material of an encapsulating member 57. That is, in the stator 50, the inter-conductor member provided between each circumferentially-adjacent pair of the electrical conductor groups 81 is constituted of the encapsulating member 57 that is formed of a nonmagnetic material. Before formation of the encapsulating member 57, on the outer circumferential surface of the stator core 52, the electrical conductor groups 81 are spaced in the circumferential direction with the gaps 56 (or inter-conductor regions) formed therebetween. Consequently, the stator 50 is constructed which has the slot-less structure. As will be described later, each of the electrical conductor groups 81 consists of, for example, two radially-stacked electrical conductors 82. The gap 56 formed between each circumferentially-adjacent pair of the electrical conductor groups 81 is occupied by only nonmagnetic materials. These nonmagnetic materials include, in addition to the resin material of the encapsulating member 57, nonmagnetic gas such as air and nonmagnetic liquid. In addition, the encapsulating member 57 may also be referred to as conductor-to-conductor member.

In contrast, in a conventional stator, the stator core has teeth each of which is located between one circumferentially-adjacent pair of the electrical conductor groups 81. Each of the teeth has a predetermined radial height and a predetermined circumferential width. Consequently, part of the magnetic circuit, i.e., magnet magnetic paths are formed between the electrical conductor groups 81. In this regard, in the stator 50 according to the present embodiment, no teeth are provided between the electrical conductor groups 81; thus, no part of the magnetic circuit is formed between the electrical conductor groups 81.

As shown in FIG. 10, the stator coil (or armature coil) 51 is formed to have a predetermine thickness T2 (or first dimension) and a predetermined width W2. The thickness T2 is represented by the minimum distance between a radially outer side surface and a radially inner side surface of the stator core 51. The width W2 is represented by the circumferential length of each part of the stator coil 51 which corresponds to one of the six phases (i.e., U-W and X-Z phases) of the stator oil 51. More specifically, in FIG. 10, one circumferentially-adjacent pair of the electrical conductor groups 81 corresponds to, for example, the U phase of the stator coil 51. The distance between two ends of the pair of the electrical conductor groups 81 in the circumferential direction represents the width W2. Moreover, in the present embodiment, the thickness T2 is set to be smaller than the width W2.

In addition, it is preferable that the thickness T2 is smaller than the sum of widths of two electrical conductor groups 81 present within the circumferential range of W2. Moreover, in the case of the cross-sectional shape of each of the electrical conductors 82 forming the stator coil 51 being a perfect circle, ellipse or polygon, in a cross section of each of the electrical conductors 82 perpendicular to the axial direction, the maximum radial length of the cross section may be designated by W12 and the maximum circumferential length of the cross section may be designated by W11.

As shown in FIGS. 10 and 11, the stator coil 51 is encapsulated by the encapsulating member 57 that is formed of an encapsulating material (or molding material), more particularly a synthetic resin material in the present embodiment. That is, the stator coil 51 is molded together with the stator core 52 by the molding material. In addition, a resin is a nonmagnetic material or an equivalent of a nonmagnetic material; thereof, the saturation flux density Bs of a resin can be regarded as being equal to zero (i.e., Bs=0).

As seen from FIG. 10, the gaps 56 between the electrical conductor groups 81 are filled with the synthetic resin material forming the encapsulating member 57. That is, the encapsulating member 57 is interposed between the electrical conductor groups 81 to function as an electrically insulating member. The encapsulating member 57 is provided, on the radially outer side of the stator core 52, in a region covering all the electrical conductor groups 81, i.e., in a region whose radial thickness is larger than the radial thickness of the electrical conductor groups 81.

Moreover, as seen from FIG. 11, the encapsulating member 57 is provided to encapsulate turn portions 84 of the stator coil 51 therein. On the radially inner side of the stator coil 51, the encapsulating member 57 covers at least part of each of opposite axial end faces of the stator core 52. Except for end portions of the phase windings, i.e., except for connection terminals connected with the inverter circuits, the stator coil 51 is substantially entirely encapsulated in the encapsulating member 51.

With the encapsulating member 57 covering the axial end faces of the stator core 52, it is possible to press the laminated steel sheets forming the stator core 52 axially inward, thereby maintaining the laminated state of the steel sheets.

In addition, in the present embodiment, the inner circumferential surface of the stator core 52 is not covered by the encapsulating member 57. As an alternative, the entire stator core 52 including the inner circumferential surface thereof may by encapsulated in the encapsulating member 57.

In the case of the rotating electric machine 10 being used in a vehicle as an electrical power source, it is preferable that the encapsulating member 57 is formed of a highly heat-resistant fluorocarbon resin, an epoxy resin, a PPS resin, a PEEK resin, an LCP resin, a silicon resin, a PAI resin or a PI resin. In terms of suppressing occurrence of cracking due to a difference in coefficient of linear expansion, it is preferable that the encapsulating member 57 is formed of the same material as insulating coats of the electrical conductors 82 of the stator coil 51. Therefore, silicon resins whose coefficients of linear expansion are higher than twice those of other resins may be excluded from candidates for the material of the encapsulating member 57. Furthermore, in the case of the rotating electric machine 10 being used in an electric vehicle that includes no internal combustion engine, an PPO resin, a phenol resin or an FRP resin, which have heat resistance of about 180° C., may be used as the material forming the encapsulating member 57. In addition, in the case of the ambient temperature of the rotating electric machine 10 being lower than 100° C., the material for forming the encapsulating member 57 is not limited to the aforementioned candidates.

The torque of the rotating electric machine 10 is proportional to the amplitude of magnetic flux. In a conventional stator where the stator core has teeth formed therein, the maximum amount of magnetic flux in the stator is limited depending on the saturation flux density at the teeth of the stator core. In contrast, in the stator 50 according to the present embodiment, the stator core 52 has no teeth formed therein; therefore, the maximum amount of magnetic flux in the stator 50 is not limited. Consequently, it is possible to increase the torque of the rotating electric machine 10 by increasing electric current supplied to the stator coil 51.

In the present embodiment, the inductance of the stator 50 is lowered by employing the slot-less structure (or tooth-less structure) for the stator 50. Specifically, the inductance of a conventional stator, which has electrical conductors received in slots partitioned by teeth of a stator core, is about 1 mH. In contrast, the inductance of the stator 50 according to the present embodiment is lowered to be in the range of 5-60 μH. Consequently, in the present embodiment, it becomes possible to lower the mechanical time constant Tm of the rotating electric machine 10 through the reduction in the inductance of the stator 50 while configuring the rotating electric machine 10 to have an outer rotor structure. That is, it becomes possible to achieve both increase in the torque of the rotating electric machine 10 and reduction in the mechanical constant Tm of the same. In addition, the mechanical time constant Tm can be calculated by the following equation:

$$Tm=(J \times L)/(Kt \times Ke)$$

where J is the inertia, L is the stator inductance, Kt is the torque constant and Ke is the counterelectromotive force constant.

From the above equation, it is clear that the mechanical time constant Tm decreases with decrease in the stator inductance L.

As shown in FIG. 10, each of the electrical conductor groups 81 arranged on the radially outer periphery of the stator core 52 is comprised of a plurality of electrical conductors 82 that each have a flat rectangular cross section and are arranged in radial alignment with each other. Moreover, each of the electrical conductors 82 is oriented so that in a transverse cross section thereof, the radial dimension (or thickness) is less than the circumferential dimension (or width). Consequently, each of the electrical conductor groups 81 becomes thinner in the radial direction. Meanwhile, the regions of the electrical conductors 82 are circumferentially expanded to those regions which would be occupied by teeth in a conventional stator, thereby realizing a flat conductor region structure. Consequently, increase in the amount of heat generated by the electrical conductors 82, which would otherwise be caused by the reduction in the radial dimension and thus reduction in the cross-sectional area of each of the electrical conductors 82, is suppressed by suppressing reduction in the cross-sectional area of each of the electrical conductors 82 through the increase in the circumferential dimension. In addition, in the case of arranging a plurality of electrical conductors in circumferential alignment with each other and connecting them in parallel with each other, it is possible to achieve the same effects as described above. It should be noted that each of the electrical conductor groups 81 and each of the electrical conductors 82 may be referred to as "electrically conductive member".

In the present embodiment, with the slot-less structure of the stator 50, it becomes possible to set the conductor regions occupied by the electrical conductors 82 forming the stator coil 51 to be greater than non-conductor regions not occupied by the electrical conductors 82 in each turn in the circumferential direction. In contrast, in a conventional stator where the stator core has slots formed therein, the conductor regions are less than the non-conductor regions in each turn of the circumferential direction.

More particularly, in the present embodiment, the electrical conductor groups 81 are configured to make the conductor regions equal to or greater than the non-conductor regions. Specifically, as shown in FIG. 10, the circumferential width WA of each of the conductor regions occupied by the electrical conductors 82 (or, straight portions 83 to be described later) is set to be larger than the circumferential width WB of each of the inter-conductor regions (or gaps) 56 between the circumferentially-adjacent electrical conductors 82.

Moreover, the radial thickness of the electrical conductor groups 81 is set to be smaller than the circumferential width of the electrical conductor groups 81 per phase per magnetic pole. More particularly, in the present embodiment, each of the electrical conductor groups 81 consists of two radially-stacked electrical conductors 82. In each region corresponding to one magnetic pole, there are provided two circumferentially-adjacent electrical conductor groups 81 per phase. Then, the following relationship is satisfied: Tc×2<Wc×2, where Tc is the radial thickness of each of the electrical conductors 82 and Wc is the circumferential width of each of the electrical conductors 82.

In addition, in an alternative configuration of the stator 50, each of the electrical conductor groups 81 consists of two radially-stacked electrical conductors 82; in each region corresponding to one magnetic pole, there is provided only one electrical conductor group 81 per phase. In this case, the following relationship is satisfied: Tc×2<Wc.

That is, for the electrical conductor units (i.e., electrical conductor groups 81) arranged at predetermined intervals in the circumferential direction, the radial thickness of each of the electrical conductor units is set to be smaller than the circumferential width of one or more electrical conductor units provided per phase in each region corresponding to one magnetic pole.

In addition, the radial thickness Tc of each of the electrical conductors 82 is set to be smaller than the circumferential width Wc of each of the electrical conductors 82. Further, the radial thickness T2 (i.e., 2Tc) of each of the electrical conductor groups 81 is set to be smaller than the circumferential width Wc of each of the electrical conductor groups 81.

The torque of the rotating electric machine 10 is approximately in inverse proportion to the radial thickness of the electrical conductor groups 81. Therefore, the torque of the rotating electric machine 10 can be increased by reducing the radial thickness of the electrical conductor groups 81 on the radially outer side of the stator core 52. This is because with reduction in the radial thickness of the electrical conductor groups 81, the distance from the magnet unit 42 of the rotor 40 to the stator core 52 (i.e., the distance across a portion containing no iron) is shortened, thereby lowering the magnetic reluctance. Consequently, it is possible to increase the magnetic flux generated by the permanent magnets of the magnet unit 42 of the rotor 40 and crossing the stator core 52, thereby increasing the torque of the rotating electric machine 10.

Moreover, with reduction in the radial thickness of the electrical conductor groups 81, it becomes easier for leakage magnetic flux from the electrical conductor groups 81 to be recovered by the stator core 52. Consequently, it becomes possible to suppress the magnetic flux from leaking outside without being effectively used for improvement of the torque of the rotating electric machine 10. That is, it becomes possible to suppress the magnetic force from being lowered due to leakage of the magnetic flux and increase the magnetic flux generated by the permanent magnets and crossing the stator core 52, thereby increasing the torque of the rotating electric machine 10.

As shown in FIG. 10, in the present embodiment, each of the electrical conductors 82 includes a conductor body 82*a* and an insulating coat 82*b* that covers the outer surface of the conductor body 82*a*. Therefore, electrical insulation is secured between each radially-stacked pair of the electrical conductors 82 and between the electrical conductors 82 and the stator core 52. As will be described later, in the present embodiment, the conductor body 82*a* is constituted of a bundle of wires 86 (see FIG. 13). In the case of each of the wires 86 being a coated wire, the insulating coat 82*b* may be constituted of the self-fusing coats of the wires 86. Otherwise, the insulating coat 82*b* may be constituted of an insulating member provided separately from the coats of the wires 86*b*.

The electrical insulation of the phase windings of the stator coil 51 formed of the electrical conductors 82 is secured, except for exposed portions of the phase windings for making electrical connection, by the insulating coats 82*b* of the electrical conductors 82. These exposed portions of the phase windings include, for example, input/output terminal portions, and neutral terminal portions when the phase windings are star-connected.

In each of the electrical conductor groups 81, the radially-stacked electrical conductors 82 are fixed to each other by the self-fused insulating coats 82*b* of the electrical conductors 82 and/or an insulating resin applied separately from the insulating coats 82*b*. Consequently, it is possible to prevent electrical breakdown form occurring due to the electrical conductors 82 rubbing against each other and to suppress vibration and noise.

Figure 13:
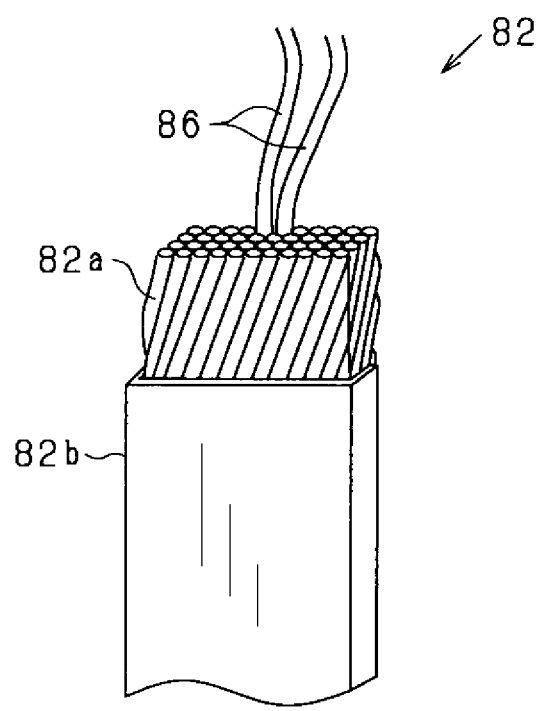
FIG. 13 is a perspective view illustrating the configuration of each of electrical conductors forming the stator coil.
Figure 14:
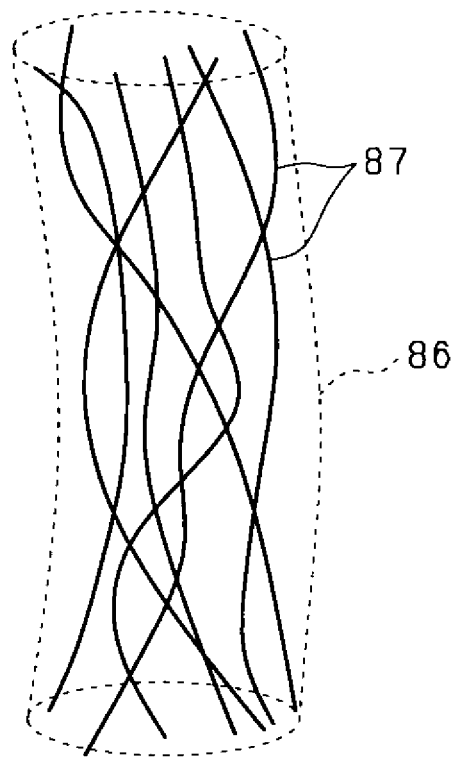
FIG. 14 is a schematic diagram illustrating the configuration of each of wires forming the electrical conductors.

As mentioned above, in the present embodiment, the conductor body 82*a* of each of the electrical conductors 82 is constituted of a bundle of wires 86. Specifically, as shown in FIG. 13, the conductor body 82*a* is formed, by twisting the wires 86, into the shape of a twine. Moreover, as shown in FIG. 14, each of the wires 86 is constituted of a bundle of electrically conductive fibers 87. The fibers 87 are implemented by, for example, CNT (Carbon Nanotube) fibers. The CNT fibers are micro fibers which are obtained by substituting at least part of carbon with boron. The fibers 87 may alternatively be implemented by other carbon micro fibers, such as Vapor Grown Carbon Fibers (VGCF). However, it is preferable for the fibers 87 to be implemented by the CNT fibers. In addition, the outer surface of each of the wires 86 is covered with an electrically-insulative polymer coat, such as an enamel coat. Moreover, it is preferable that the outer surface of each of the wires 86 is covered with an enamel coat, such as a polyimide coat or an amide-imide coat.

The electrical conductors 82 together form n phase windings of the stator coil 51. In each of the electrical conductors 82, all the wires 86 constituting the conductor body 82*a* of the electrical conductor 82 are adjacent to and in contact with one another. Moreover, in each of the electrical conductors 82, there is at least one place per phase where the wires 86 are twisted together. The electrical resistances between the twisted wires 86 are higher than the electrical resistance of each of the wires 86. More specifically, for each adjacent pair of the wires 86, a first electrical resistivity in the direction in which the wires 86 adjoin each other is higher than a second electrical resistivity in the longitudinal direction of each of the wires 86. In addition, in each of the electrical conductors 82, the wires 86, which are twisted together to constitute the conductor body 82*a* of the electrical conductor 82, may be covered with an insulating member which has extremely high first electrical resistivity.

In each of the electrical conductors 82, since the conductor body 82*a* of the electrical conductor 82 is constituted of the wires 86 that are twisted together, it becomes possible to suppress generation of eddy current in each of the wires 86, thereby reducing total eddy current in the conductor body 82*a*. Moreover, each of the wires 86 is twisted to have portions where the magnetic field application directions are opposite to each other; therefore, the counterelectromotive forces generated in these portions are canceled by each other. Consequently, it becomes possible to achieve further reduction in the eddy current. In particular, since each of the wires 86 is constituted of the electrically conductive fibers 87, it becomes possible to make the elements (i.e., the fibers 87) of the wire 86 extremely thin and considerably increase the number of twists in the wire 86, thereby more effectively reducing the eddy current.

The method of insulating between the wires 86 is not limited to employment of the above electrically-insulative polymer coat. As an alternative, it may be possible to make it difficult for electric current to flow between the wires 86 by increasing the contact resistance therebetween. That is, when the contact resistance between the wires 86 is higher than the resistance of each of the wires 86, it is difficult for electric current to flow between the wires 86. For example, the contact resistance between the wires 86 may be increased by: arranging the manufacturing equipment for manufacturing the wires 86 and the manufacturing equipment for manufacturing the stator 50 (or armature) of the rotating electric machine 10 to be separate from each other; and having the wires 86 oxidized during the delivery time and operation intervals.

As described above, in the present embodiment, each of the electrical conductor groups 81 is comprised of a plurality of electrical conductors 82 that each have a flat rectangular cross section and are arranged in radial alignment with each other. The shape of each of the electrical conductors 82 is maintained by: covering the outer surface of each of the wires 86 forming the electrical conductor 82 with a self-fusing insulating coat; and having the self-fusing insulating coats of the wires 86 fused. As an alternative, the shape of each of the electrical conductors 82 may be maintained by: twisting together the wires 86 with or without self-fusing insulating coats respectively covering the outer surfaces thereof; and fixing the twisted wires 86 together in a desired shape using a synthetic resin.

The thickness of the insulating coat 82*b* of each of the electrical conductors 82 may be set to be, for example, in the range of 80-100 μm. The thickness of the self-fusing insulating coat of each of the wires 86 may be set to be, for example, in the range of 5-40 μm. In this case, it is possible to ensure electrical insulation between the electrical conductors 82 and the stator core 52 without interposing insulating paper therebetween.

It is preferable for the insulating coats 82b of the electrical conductors 82 to be configured to have higher insulating performance than the insulating coats of the wires 86 and to be capable of making inter-phase insulation. For example, in the case of the polymer insulating coats of the wires 82b having a thickness of, for example, about 5 μm, it is preferable for the insulating coats 82b of the electrical conductors 82 to have a thickness in the range of 80-100 μm, thereby securing suitable inter-phase insulation.

Moreover, each of the electrical conductors 82 may be constituted of a bundle of wires 86 that are bundled together without being twisted. That is, each of the electrical conductors 82 may have any one of a configuration where the wires 86 are twisted over the entire length of the electrical conductor 82, a configuration where the wires 86 are twisted for only part of the entire length of the electrical conductor 82 and a configuration where the wires 86 are bundled together without being twisted over the entire length of the electrical conductor 82. To sum up, each of the electrical conductors 82 forming the electrical conductor units (i.e., electrical conductor groups 81) is constituted of a wire bundle where a plurality of wires 86 are bundled together and the electrical resistances between the bundled wires 86 are higher than the electrical resistance of each of the wires 86.

The electrical conductors 82 are bent so as to be arranged in a predetermined pattern in the circumferential direction. Consequently, each phase winding of the stator coil 51 is formed. As shown in FIG. 12, straight portions 83 of the electrical conductors 82, each of which extends straight in the axial direction, together constitute the coil side part 53 of the stator coil 51; turn portions 84 of the electrical conductors 82, each of which protrudes from the coil side part 53 toward one side (i.e., the upper side in FIG. 12) in the axial direction, together constitute the coil end part 54 of the stator coil 51; turn portions 84 of the electrical conductors 82, each of which protrudes from the coil side part 53 toward the other side (i.e., the lower side in FIG. 12) in the axial direction, together constitute the coil end part 55 of the stator coil 51. Each of the electrical conductors 82 is configured as a wave-wound continuous electrical conductor where the straight portions 83 are formed alternately with the turn portions. The straight portions 83 of the electrical conductors 82 are located to radially face the magnet unit 42 of the rotor 40. Each pair of the straight portions 83, which belong to the same phase and are spaced at a predetermined interval in the circumferential direction, are connected with each other by one of the turn portions 84 on an axially outer side of the magnet unit 42. In addition, the straight portions 83 correspond to "magnet facing portions".

In the present embodiment, the stator coil 51 is wound in a distributed winding manner into an annular shape. In the coil side part 53 of the stator coil 51, for each phase, the straight portions 83 of each of the electrical conductors 82 belonging to the phase are arranged in the circumferential direction at intervals corresponding to one pole pair of the magnet unit 42 of the rotor 40. In the coil end parts 54 and 55 of the stator coil 51, for each phase, the straight portions 83 of each of the electrical conductors 82 belonging to the phase are connected with one another by the substantially V-shaped turn portions 84 of the electrical conductor 82. For each pair of the straight portions 83 corresponding to one pole pair, the directions of electric currents respectively flowing in the straight portions 83 of the pair are opposite to each other. Moreover, those pairs of the straight portions 83 which are connected by the respective turn portions 84 in the coil end part 54 are different from those pairs of the straight portions 83 which are connected by the respective turn portions 84 in the coil end part 55. The connection of the straight portions 83 by the turn portions 84 in the coil end parts 54 and 55 is repeated in the circumferential direction, forming the stator coil 51 into the substantially hollow cylindrical (or annular) shape.

More specifically, in the present embodiment, each phase winding of the stator coil 51 is formed of two pairs of the electrical conductors 82. The first three-phase coil (U, V and W phases) and the second three-phase coil (X, Y and Z phases), which together constitute the stator coil 51, are provided in two radial layers. Let S be the number of phases of the stator coil 51, and let m be the number of the electrical conductors 82 per phase. Then, the number of the electrical conductors 82 per pole pair is equal to 2×S×m=2 Sm. Moreover, in the present embodiment, S is equal to 6, m is equal to 4, and the magnet unit 42 of the rotor 40 includes 8 pole pairs (or 16 poles). Accordingly, the total number of the electrical conductors 82 arranged in the circumferential direction is equal to 6×4×8=192.

As shown in FIG. 12, in the coil side part 53 of the stator coil 51, the straight portions 83 of the electrical conductors 82 are stacked in two radially-adjacent layers. In the coil end parts 54 and 55 of the stator coil 51, for each radially-stacked pair of the straight portions 83 of the electrical conductors 82, those two turn portions 84 of the electrical conductors 82 which are respectively connected with the pair of the straight portions 83 extend respectively toward opposite sides in the circumferential direction. That is, for each radially-adjacent pair of the electrical conductors 82, the orientations of the turn portions 84 of one of the pair of the electrical conductors 82 are opposite to those of the turn portions 84 of the other of the pair of the electrical conductors 82 except for end portions of the stator coil 51.

Hereinafter, the winding structure of the electrical conductors 82 forming the stator coil 51 will be described in more detail.

In the present embodiment, the wave-shaped electrical conductors 82 are arranged in a plurality (e.g., two) of radially-adjacent layers.

Figure 15:
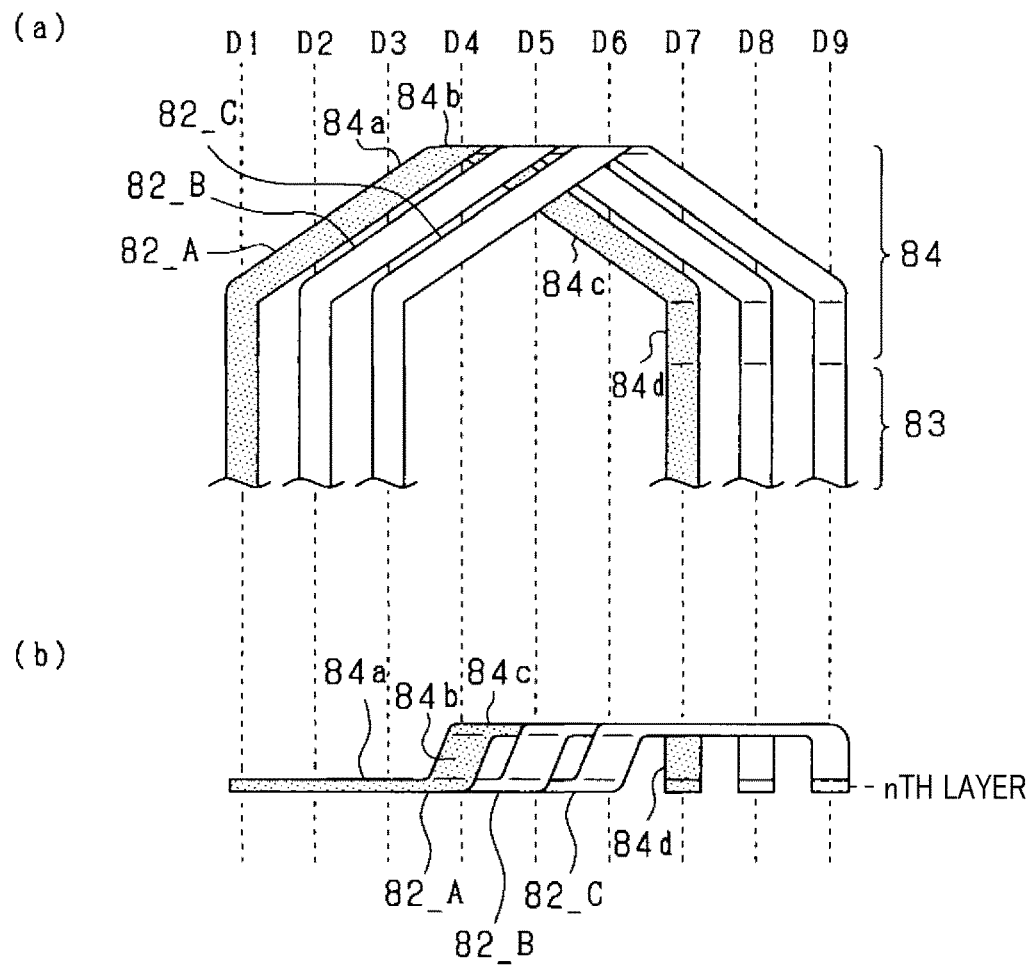
FIG. 15(a) and FIG. 15(b) are side views illustrating the configuration of the nth-layer electrical conductors.

FIG. 15(a) and FIG. 15(b) together show the shapes of the electrical conductors 82 in the nth layer. Specifically, FIG. 15(a) show the shapes of the electrical conductors 82 viewed from the radially outer side of the stator coil 51. FIG. 15(b) show the shapes of the electrical conductors 82 viewed from one axial side of the stator coil 51. In FIG. 15(a) and FIG. 15(b), the arrangement positions at which the electrical conductor groups 81 are arranged are respectively designated by D1-D9. Moreover, for the sake of convenience of explanation, there are illustrated only three electrical conductors 82, i.e., a first electrical conductor 82_A, a second electrical conductor 82_B and a third electrical conductor 82_C.

In each of the electrical conductors 82_A, 82_B and 82_C, all the straight portions 83 are located on the nth layer, i.e., located at the same radial position. Each pair of the straight portions 83, which are circumferentially apart from each other by six times the inter-arrangement position distances (corresponding to 3×m pairs), is connected one of the turn portions 84.

More particularly, in the present embodiment, in each of the electrical conductors 82_A, 82_B and 82_C, all of the seven straight portions 83 are arranged, on the same circle whose center is on the central axis of the rotor 40, to be adjacent to one another in the circumferential direction. Moreover, each pair of ends of the straight portions 83 are connected by one of the turn portions 84. For example, in the first electrical conductor 82_A, two straight portions 83, which are arranged respectively at the arrangement positions D1 and D7, are connected by one turn portion 84 that has an inverted V-shape. The second electrical conductor 82_B is circumferentially offset from the first electrical conductor 82_A by one inter-arrangement position distance. The third electrical conductor 82_C is circumferentially offset from the second electrical conductor 82_B by one inter-arrangement position distance. In this case, since all the electrical conductors 82_A, 82_B and 82_C are arranged on the same layer, the turn portions 84 of the electrical conductors 82_A, 82_B and 82_C may interfere with one another. Therefore, in the present embodiment, each of the turn portions 84 of the electrical conductors 82_A, 82_B and 82_C has part thereof radially offset to form an interference prevention part.

More specifically, each of the turn portions 84 of the electrical conductors 82_A, 82_B and 82_C is configured to include a first oblique part 84a, a shift part 84b, a second oblique part 84c and a return part 84d. The first oblique part 84a extends on the same circle (first circle) as and obliquely to the straight portions 83 connected by the turn portion 84. The shift part 84b extends from the first oblique part 84a radially inward (i.e., upward in FIG. 15(b)) to reach another circle (second circle). The second oblique part 84c extends on the second circle and obliquely to the straight portions 83 connected by the turn portion 84. The return part 84d extends from the second oblique part 84c radially outward (i.e., downward in FIG. 15(b)) to return to the first circle. The shift part 84b, the second oblique part 84c and the return part 84d together correspond to the interference prevention part. In addition, each of the turn portions 84 of the electrical conductors 82_A, 82_B and 82_C may alternatively be configured to have the second oblique part 84c located radially outside the first oblique part 84a.

That is, in each of the turn portions 84 of the electrical conductors 82_A, 82_B and 82_C, the first oblique part 84a and the second oblique part 84c are located respectively on opposite sides of the shift part 84b that is circumferential centered in the turn portion 84. Moreover, the first oblique part 84a and the second oblique part 84c are different from each other in radial position (i.e., position in the direction perpendicular to the paper surface of FIG. 15(a) and in the vertical direction in FIG. 15(b)). For example, in FIG. 15(a) and FIG. 15(b), the turn portion 84 of the first electrical conductor 82_A first extends from the arrangement position D1 in the nth layer (i.e., the start position) in the circumferential, then is bent radially inward at the shift part 84b that is circumferentially centered in the turn portion 84, then is bent to extend again in the circumferential direction, and thereafter is bent radially outward at the return part 84d to extend to the arrangement position D7 in the nth layer (i.e., the end position).

With the above configuration, the first oblique parts 84a of the electrical conductors 82_A, 82_B and 82_C are arranged in the axial direction from the outer side to the inner side (i.e., in the vertical direction from the upper side to the lower side in FIG. 15(a) and in the direction perpendicular to the paper surface of FIG. 15(b) from the front side to the rear side in FIG. 15b) in the order of the first electrical conductor 82_A, the second electrical conductor 82_B and the third electrical conductor 82_C. The arrangement order of the electrical conductors 82_A, 82_B and 82_C is inverted at the shift parts 84b so that the second oblique parts 84c of the electrical conductors 82_A, 82_B and 82_C are arranged in the axial direction from the outer side to the inner side in the order of the third electrical conductor 82_C, the second electrical conductor 82_B and the first electrical conductor 82_A. Consequently, it becomes possible to arrange the electrical conductors 82_A, 82_B and 82_C in the circumferential direction without causing interference therebetween.

Moreover, each of the electrical conductor groups 81 consists of a plurality of radially-stacked electrical conductors 82, more particularly two radially-stacked electrical conductors 82 in the present embodiment. For each of the electrical conductor groups 81, the turn portions 84 of the electrical conductors 82 of the group may be arranged more radially apart from each other than the straight portions 83 of the electrical conductors 82 are. Furthermore, in the case of the electrical conductors 82 of the same group being bent to the same radial side at the boundaries between the straight portions 83 and the turn portions 84, it is necessary to prevent electrical insulation from being degraded due to interference between the radially-adjacent electrical conductors 82.

Figure 16:
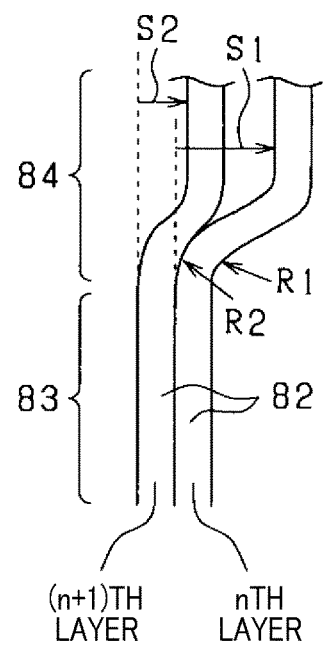
FIG. 16 is a side view illustrating the differences between the nth-layer and (n+1)th layer electrical conductors.

For example, at the arrangement positions D7-D9 in FIG. 15(a) and FIG. 15(b), the radially-stacked electrical conductors 82 are bent radially outward at the return parts 84d of the respective turn portions 84 thereof. In this case, as shown in FIG. 16, the radius of curvature of the bend of the nth-layer electrical conductor 82 may be set to be different from the radius of curvature of the bend of the (n+1)th-layer electrical conductor 82. More specifically, the radius of curvature R1 of the radially inner (i.e., the nth layer) electrical conductor 82 may be set to be smaller than the radius of curvature R2 of the radially outer (i.e., the (n+1)th layer) electrical conductor 82.

Moreover, the amount of radial shift of the nth-layer electrical conductor 82 may be set to be different from the amount of radial shift of the (n+1)th-layer electrical conductor 82. More specifically, the amount of radial shift S1 of the radially inner (i.e., the nth layer) electrical conductor 82 may be set to be larger than the amount of radial shift S2 of the radially outer (i.e., the (n+1)th layer) electrical conductor 82.

With the above configuration, even with the radially-stacked electrical conductors 82 of the same group bent to the same radial side, it is still possible to reliably prevent interference between the electrical conductors 82. Consequently, it is possible to ensure high insulation properties of the stator coil 51.

Next, the structure of the magnet unit 42 of the rotor 40 will be described in detail.

In the present embodiment, the magnet unit 42 is constituted of permanent magnets whose residual flux density Br is higher than or equal to 1.0 [T] and intrinsic coercive force Hcj is higher than or equal to 400 [kA/m]. More particularly, in the present embodiment, the permanent magnets are implemented by sintered magnets that are obtained by shaping and solidifying a granular magnetic material by sintering. The intrinsic coercive force Hcj of the permanent magnets on the J-H curve is higher than or equal to 400 [kA/m], and the residual flux density Br of the permanent magnets is higher than or equal to 1.0 [T]. When the magnetic length of one pole pair, i.e., the length of a magnetic path extending between one pair of N and S poles through the inside of the permanent magnets is equal to 25 [mm] upon application of 5000-10000 [AT] by interphase excitation, Hcj is equal to 10000 [A] and thus the permanent magnets are not demagnetized.

In other words, the magnet unit 42 is such that: the saturation flux density Js is higher than or equal to 1.2 [T];

the grain size is smaller than or equal to 10 [μm]; and Js×α is higher than or equal to 1.0 [T], where a is the orientation ratio.

Moreover, the magnet unit 42 (more specifically, the permanent magnets of the magnet unit 42) according to the present embodiment is characterized in that 2.15 [T]≥Js≥1.2 [T]. The permanent magnets constituting the magnet unit 42 may be formed of NdFe11TiN, Nd2Fe14B, Sm2Fe17N3 or L10-type FeNi. Samarium-cobalt magnets, such as SmCo5, FePt, Dy2Fe14B or CoPt cannot be employed as the permanent magnets of the magnet unit 42.

Magnets, which are formed of the same-type compounds (e.g., Dy2Fe14B and Nd2Fe14B) to have both high Js characteristics of neodymium and high coercive force of dysprosium, may satisfy the condition that 2.15 [T]≥Js≥1.2 [T]. In this case, these magnets may be employed as the permanent magnets of the magnet unit 42. In addition, these magnets may be referred to, for example, as [Nd1-xDyx]2Fe14B.

Furthermore, the permanent magnets of the magnet unit 42 may be formed of two or more types of materials having different compositions, such as FeNi plus Sm2Fe17N3. For example, magnets, which are formed by adding a small amount of Dy2Fe14B whose Js is lower than 1 [T] to Nd2Fe14B whose Js is equal to 1.6 [T] to improve the coercive force, may be employed as the permanent magnets of the magnet unit 42.

Moreover, in the case of the rotating electric machine 10 being operated at a temperature outside the temperature range of human activities (e.g., a temperature higher than or equal to 60° C. exceeding the temperature of a desert) or used in a vehicle where the temperature reaches 80° C. in summer, it is preferable for the permanent magnets of the magnet unit 42 to contain a component having a low temperature coefficient, such as FeNi or Sm2Fe17N3. This is because when the rotating electric machine 10 is operated in a temperature range from about −40° C. (within the temperature range of human activities in Northern Europe) to 60° C. or higher (exceeding the temperature of a desert) or to the heatproof temperature of coil enamel coats (e.g., 180-240° C.), the performance characteristics of the rotating electric machine 10 depends greatly on the temperature coefficient of the permanent magnets of the magnet holder 40; consequently, it becomes difficult to ensure optimal control with the same motor driver. The temperature coefficients of L10-type FeNi and Sm2Fe17N3 are lower than half the temperature coefficient of Nd2Fe14B. Therefore, forming the permanent magnets of the magnet holder 40 with L10-type FeNi or Sm2Fe17N3, it is possible to effectively reduce the burden on the motor driver.

The magnet unit 42 is also characterized in that the grain size in a fine powder state before orientation is smaller than or equal to 10 μm and larger than or equal to the single-domain grain size. In general, the coercive force of magnets can be increased by reducing the size of the grains of the powder to the order of several nanometers. Therefore, in recent years, powders have been used whose grains are reduced in size as small as possible. However, if the grain size was too small, the BH product of the magnets would be lowered due to, for example, oxidization. Therefore, it is preferable that the grain size is larger than or equal to the single-domain grain size. That is, to increase the coercive force, the grains of the powder may be reduced in size preferably to the extent that the grain size is not smaller than the single-domain grain size. In addition, the term "grain size" used hereinafter denotes the grain size in a fine powder state in an orientation step of the magnet manufacturing process.

The permanent magnets of the magnet unit 42 include first magnets 91 and second magnets 92. Each of the first and second magnets 91 and 92 is implemented by a sintered magnet that is obtained by sintering (i.e., heating and consolidating) magnetic powder. The sintering is performed so that the saturation magnetization Js of the magnet unit 42 is higher than or equal to 1.2 [T]; the grain size of the first and second magnets 91 and 92 is smaller than or equal to 10 [μm]; and Js×α is higher than or equal to 1.0 T (Tesla), where a is the orientation ratio. Moreover, each of the first and second magnets 91 and 92 is sintered so as to satisfy the following condition. In the orientation step of the magnet manufacturing process, orientation is performed on the first and second magnets 91 and 92. Consequently, the first and second magnets 91 and 92 have the orientation ratio unlike the magnetic force direction defined by a magnetization step for isotropic magnets. In the present embodiment, the orientation ratio of the first and second magnets 91 and 92 is set to be so high as to satisfy Jr≥Js×α≥1.0 [T] with the saturation magnetization Js of the magnet unit 42 being higher than or equal to 1.2 [T]. For example, in the case of each of the first and second magnets 91 and 92 having six axes of easy magnetization, if five of the six axes are oriented in the same direction A10 and the remaining one is oriented in a direction B10 that is inclined by 90 degrees to the direction A10, then α=5/6. Otherwise, if the remaining one axis is oriented in a direction B10 that is inclined by 45 degrees to the direction A10, then the component of the remaining one axis in the direction A10 is equal to cos 45°=0.707 and thus α=(5+0.707)/6. As described previously, in the present embodiment, the first and second magnets 91 and 92 are formed by sintering. However, provided that the above condition is satisfied, the first and second magnets 91 and 92 may alternatively be formed by other methods, such as a method of forming MQ3 magnets.

In the present embodiment, the axes of easy magnetization of the first and second magnets 91 and 92 are controlled by orientation. Consequently, it becomes possible to increase the magnetic circuit length inside the first and second magnets 91 and 92 in comparison with the magnetic circuit length inside conventional straight-oriented magnets of 1.0 [T] or higher. That is, it becomes possible to obtain the same magnetic circuit length per pole pair with a less amount of the magnet material in comparison with conventional straight-oriented magnets. Moreover, even if the first and second magnets 91 and 92 are subjected to a sever high-temperature condition, it is still possible to maintain the reversible demagnetization range. Furthermore, the inventors of the present application have found a configuration with which it is possible to realize characteristics close to those of polar anisotropic magnets using conventional magnets.

In addition, an axis of easy magnetization denotes a crystal direction in a magnet along which it is easy for the magnet to be magnetized. The orientation of axes of easy magnetization in a magnet is represented by the direction in which the orientation ratio is higher than or equal to 50%; the orientation ratio indicates the degree of alignment of the axes of easy magnetization. Otherwise, the orientation of axes of easy magnetization in a magnet is the direction which represents the average orientation of the magnet.

Referring back to FIGS. 8 and 9, in the present embodiment, the magnet unit 42 is annular-shaped and arranged on the radially inner periphery of the cylindrical portion 43 of the magnet holder 41. The magnet unit 42 is constituted of the first and second magnets 91 and 92 that are polar anisotropic magnets. The polarity of the first magnets 91 (e.g., N) is different from the polarity of the second magnets 92 (e.g., S). The first magnets 91 are arranged alternately with the second magnets 92 in the circumferential direction. That is, the first magnets 91 form N poles in the vicinity of the stator coil 51 while the second magnets 92 form S poles in the vicinity of the stator coil 51. The first and second magnets 91 and 92 are rare earth permanent magnets such as neodymium magnets.

As shown in FIG. 9, in each of the first and second magnets 91 and 92, the magnetization direction extends in an arc shape between the d-axis (i.e., direct-axis) and the q-axis (i.e., quadrature-axis) in the well-known d-q coordinate system. The d-axis represents the center of the magnetic pole while the q-axis represents the boundary between one pair of N and S poles (in other words, a direction in which the magnetic flux density is 0 T). At the d-axis, the magnetization direction becomes coincident with a radial direction of the annular magnet unit 42. At the q-axis, the magnetization direction becomes coincident with the circumferential direction of the annular magnet unit 42.

Specifically, as shown in FIG. 9, each of the first and second magnets 91 and 92 is configured to have a first part 250 and two second parts 260 located respectively on opposite sides of the first part 250 in the circumferential direction of the magnet unit 42. That is, the first portion 250 is located closer than the second parts 260 to the d-axis; the second portions 260 are located closer than the first part 250 to the q-axis. The magnet unit 42 is configured so that the direction of the axis of easy magnetization 300 of the first part 250 is more parallel than the direction of the axis of easy magnetization 310 of each of the second parts 260 to the d-axis. In other words, the magnet unit 42 is configured so that the angle θ11 between the d-axis and the axis of easy magnetization 300 of the first part 250 is smaller than the angle θ12 between the q-axis and the axis of easy magnetization 310 of each of the second parts 260.

More specifically, the angle θ11 is the angle between the d-axis and the axis of easy magnetization 300 with the direction from the stator 50 (or armature) toward the magnet unit 42 along the d-axis being defined as positive. The angle θ12 is the angle between the q-axis and the axis of easy magnetization 310 with the direction from the stator 50 toward the magnet unit 42 along the q-axis being defined as positive. In the present embodiment, both the angle θ11 and the angle θ12 are smaller than 90°.

Moreover, in the present embodiment, in each of the first parts 250 of the magnets 91 and 92, in the case of one axis of easy magnetization being oriented in the direction A11 and another axis of easy magnetization being oriented in the direction B11, the axis of easy magnetization 300 is represented by the absolute value of the cosine of an angle θ between the direction A11 and the direction B11 (i.e., |cos θ|). Similarly, in each of the second parts 260 of the magnets 91 and 92, in the case of one axis of easy magnetization being oriented in the direction A11 and another axis of easy magnetization being oriented in the direction B11, the axis of easy magnetization 310 is represented by the absolute value of the cosine of an angle θ between the direction A11 and the direction B11 (i.e., |cos θ|).

That is, in each of the first and second magnets 91 and 92, the orientation of the axis of easy magnetization on the d-axis side (or in the d-axis-side part) is different from the orientation of the axis of easy magnetization on the q-axis side (or in the q-axis-side parts). On the d-axis side, the orientation of the axis of easy magnetization is close to a direction parallel the d-axis. In contrast, on the q-axis side, the orientation of the axis of easy magnetization is close to a direction perpendicular to the q-axis. Consequently, depending on the change in the orientation of the axis of easy magnetization, arc-shaped magnetic paths are formed in the magnet. In addition, on the d-axis side, the axis of easy magnetization may be oriented to be parallel to the d-axis; on the q-axis side, the axis of easy magnetization may be oriented to be perpendicular to the q-axis.

Moreover, in each of the first and second magnets 91 and 92, a stator-side circumferential surface (i.e., lower surface in FIG. 9) and a pair of q-axis-side end surfaces (i.e., left and right surfaces in FIG. 9) constitute magnetic flux acting surfaces through which magnetic flux flows into and out of the magnet. The magnetic paths are formed in the magnet to connect the magnetic flux acting surfaces (i.e., the stator-side circumferential surface and the q-axis-side end surfaces) of the magnet.

Figure 17:
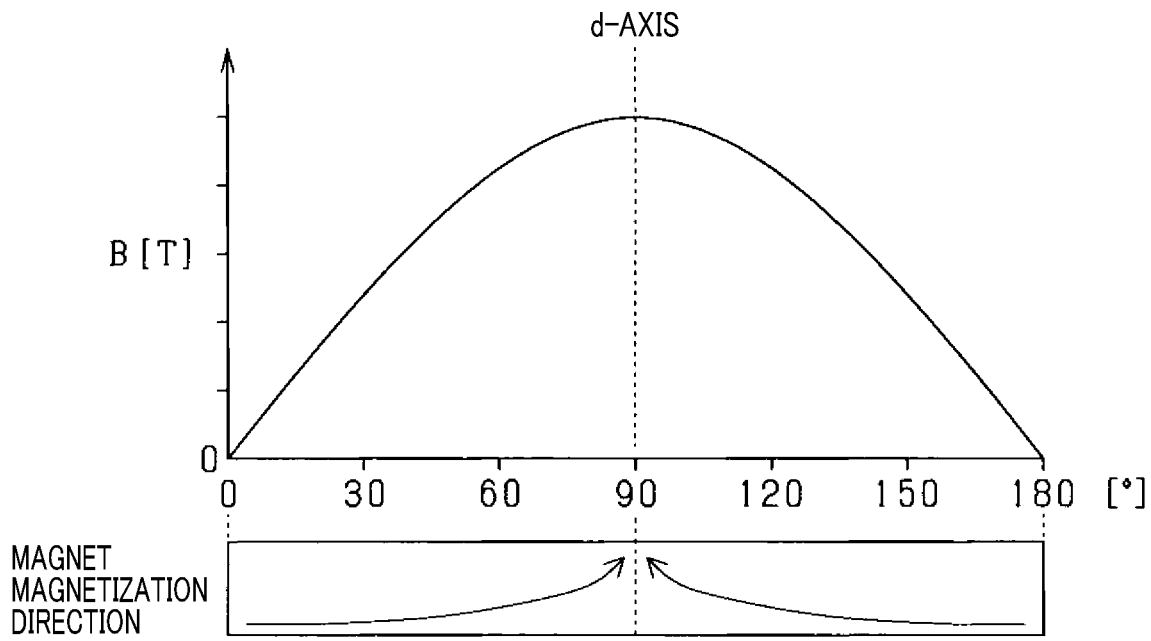
FIG. 17 is a graphical representation illustrating the magnetic flux density distribution in magnets according to the first embodiment.

In the magnet unit 42 according to the present embodiment, magnetic flux flows along the arc-shaped magnetic paths between the circumferentially adjacent N and S poles (i.e., the first and second magnets 91 and 92). Therefore, the magnet magnetic paths are lengthened in comparison with the case of employing, for example, radial anisotropic magnets. Consequently, as shown in FIG. 17, the magnetic flux density distribution becomes close to a sine wave. As a result, as shown in FIG. 18, it becomes possible to concentrate magnetic flux on the magnetic pole center side (unlike the magnetic flux density distribution in a comparative example where radial anisotropic magnets are employed), thereby increasing the torque of the rotating electric machine 10.

Moreover, the magnetic flux density distribution in the magnet unit 42 according to the present embodiment is also different from the magnetic flux density distribution in a comparison example where magnets are arranged in a conventional Halbach array. In addition, in each of FIGS. 17 and 18, the horizontal axis represents electrical angle and the vertical axis represents magnetic flux density; 90° on the horizontal axis represents the d-axis (i.e., the magnetic pole center) and 0° and 180° on the horizontal axis represents the q-axis.

Figure 18:
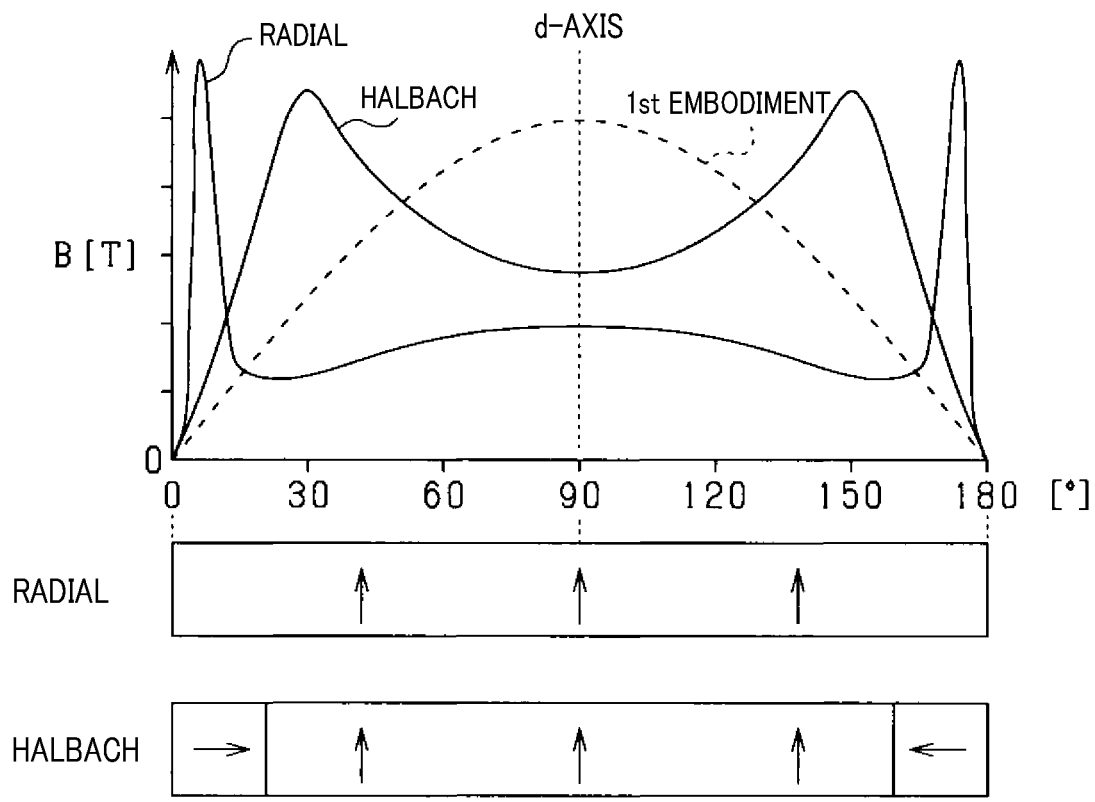
FIG. 18 is a graphical representation giving comparison between the magnetic flux density distribution in the magnets according to the first embodiment and those in magnets according to comparative examples.

As can be seen from FIGS. 17 and 18, with the configuration of the first and second magnets 91 and 92 according to the present embodiment, the magnet magnetic flux at the d-axis is intensified and the magnetic flux change in the vicinity of the q-axis is suppressed. Consequently, it becomes possible to have the surface magnetic flux gradually changing from the q-axis to the d-axis in each magnetic pole.

The sine wave conformity ratio of the magnetic flux density distribution may be 40% or higher. In this case, it is possible to reliably increase the amount of magnetic flux at the central portion of the waveform in comparison with the case of employing radial-oriented magnets and the case of employing parallel-oriented magnets. In the case of employing radial-oriented magnets, the sine wave conformity ratio is about 30%.

Moreover, it is preferable that sine wave conformity ratio of the magnetic flux density distribution is higher than or equal to 60%. In this case, it is possible to reliably increase the amount of magnetic flux at the central portion of the waveform in comparison with the case of employing magnets arranged in a magnetic flux concentration array such as a Halbach array.

As shown in FIG. 18, in the comparative example where radial anisotropic magnets are employed, the magnetic flux density changes sharply in the vicinity of the q-axis. The sharp change in the magnetic flux density causes the amount of eddy current generated in the stator coil 51 to increase. Moreover, the magnetic flux on the stator coil 51 side also changes sharply. In contrast, in the present embodiment, the waveform of the magnetic flux density distribution is close to a sine wave. Consequently, in the present embodiment, the change in the magnetic flux density in the vicinity of the q-axis is considerably gentler than in the comparative example where radial anisotropic magnets are employed. As a result, it becomes possible to effectively suppress generation of eddy current in the stator coil 51.

In the magnet unit 42 according to the present embodiment, in each of the first and second magnets 91 and 92, in the vicinity of the d-axis (i.e., the magnetic pole center), magnetic flux is generated in a direction perpendicular to the stator-side magnetic flux acting surface 280 (see FIG. 9). The generated magnetic flux flows along the arc-shaped magnetic paths that extend away from the d-axis as they extend away from the stator-side magnetic flux acting surface 280. Moreover, the closer the direction of the magnetic flux to a direction perpendicular the stator-side magnetic flux acting surface 280, the stronger the magnetic flux is. In this regard, in the rotating electric machine 10 according to the present embodiment, the radial thickness of the electrical conductor groups 81 is reduced as described previously. Consequently, the radial center position of the electrical conductor groups 81 becomes closer to the stator-side magnetic flux acting surfaces 280 of the magnets 91 and 92 of the magnet unit 42, thereby allowing the stator 50 to receive the stronger magnet magnetic flux from the rotor 40.

Furthermore, the stator 50 has the hollow cylindrical stator core 52 arranged on the radially inner side of the stator coil 51, i.e., on the opposite side of the stator coil 51 to the rotor 40. Therefore, the magnetic flux flowing out from the stator-side magnetic flux acting surfaces 280 of the magnets 91 and 92 of the magnet unit 42 is attracted by the stator core 52 to circulate through the stator core 52 that constitutes part of the magnetic circuit. Consequently, it becomes possible to optimize the direction and paths of the magnet magnetic flux.

Next, a method of manufacturing the rotating electric machine 10 according to the present embodiment, more particularly a process of assembling the bearing unit 20, the housing 30, the rotor 40, the stator 50 and the inverter unit 60 will be described with reference to FIG. 5.

In addition, the inverter 60 includes the unit base 61 and the electrical components 62 as shown in FIG. 6. Therefore, the assembling process includes a step of assembling the unit base 61 and the electrical components 62. Moreover, for the sake of convenience of explanation, hereinafter, the assembly of the stator 50 and the inverter unit 60 will be referred to as the first subassembly while the assembly of the bearing unit 20, the housing 30 and the rotor 40 will be referred to as the second subassembly.

The assembly process according to the present embodiment includes: a first step of mounting the electrical components 62 to the radially inner periphery of the unit base 61; a second step of mounting the unit base 61 to the radially inner periphery of the stator 50, thereby forming the first subassembly; a third step of inserting the attachment 44 of the magnet holder 41 of the rotor 40 into the bearing unit 20 that is previously assembled to the housing 30, thereby forming the second subassembly; a fourth step of mounting the first subassembly to the radially inner periphery of the second subassembly; and a fifth step of fastening the housing 30 and the unit base 61 to each other. These steps are performed in the sequence of the first step, the second step, the third step, the fourth step and the fifth step.

According to the above assembling process, the bearing unit 20, the housing 30, the rotor 40, the stator 50 and the inverter unit 60 are first assembled into a plurality of subassemblies (i.e., the first and second subassemblies) and then the subassemblies are further assembled together to form the rotating electric machine 10. Consequently, it becomes possible to realize ease of handling and complete inspection for each subassembly, thereby making it possible build a suitable assembly line. As a result, it becomes possible to easily cope with multi-product production.

In the first step, a heat conducting member with high heat conductivity may be attached, for example by coating or bonding, to the radially inner periphery of the unit base 61 or the radially outer periphery of the electrical components 62. Then, the electrical components 62 may be mounted to the unit base 61 so that the heat conducting member is interposed between the radially inner periphery of the unit base 61 and the radially outer periphery of the electrical components 62. In this case, with the heat conducting member, it is possible to more effectively transfer heat generated in the semiconductor modules 66 to the unit base 61.

In the third step, the insertion of the attachment 44 of the magnet holder 41 of the rotor 40 into the bearing unit 20 may be performed keeping coaxiality between the housing 30 and the rotor 40. Specifically, a jig may be used to position the outer circumferential surface of the rotor 40 (i.e., the outer circumferential surface of the magnet holder 41) or the inner circumferential surface of the rotor 40 (or the inner circumferential surface of the magnet unit 42) with respect to the inner circumferential surface of the housing 30. Then, the assembling of the housing 30 and the rotor 40 may be performed with either of the housing 30 and the rotor 40 sliding along the jig. In this case, it is possible to assemble the housing 30 and the rotor 40 without imposing unbalanced load on the bearing unit 20 that is previously assembled to the housing 20. Consequently, it is possible to ensure reliability of the bearing unit 20.

In the fourth step, the assembling of the first and second subassemblies may be performed keeping coaxiality between them. Specifically, a jig may be used to position the inner circumferential surface of the unit base 61 with respect to the inner circumferential surface of the attachment 44 of the magnet holder 41 of the rotor 40. Then, the assembling of the first and second subassemblies may be performed with either of them sliding along the jig. In this case, it is possible to perform the assembling of the first and second subassemblies without causing interference between the rotor 40 and the stator 50 that are arranged with the minute air gap formed therebetween. Consequently, it is possible to prevent the stator coil 51 and the permanent magnets of the magnet unit 42 from being damaged during the assembling of the first and second subassemblies.

Alternatively, the assembly process may be performed in the sequence of the second step, the third step, the fourth step, the fifth step and the first step. In this case, the delicate electrical components 62 are assembled to the other components of the rotating electric machine 10 in the final step. Consequently, it is possible to minimize stress induced in the electrical components 62 during the assembly process.

Next, the configuration of a control system for controlling the rotating electric machine 10 according to the present embodiment will be described with reference to FIGS. 19 and 20.

Figure 19:
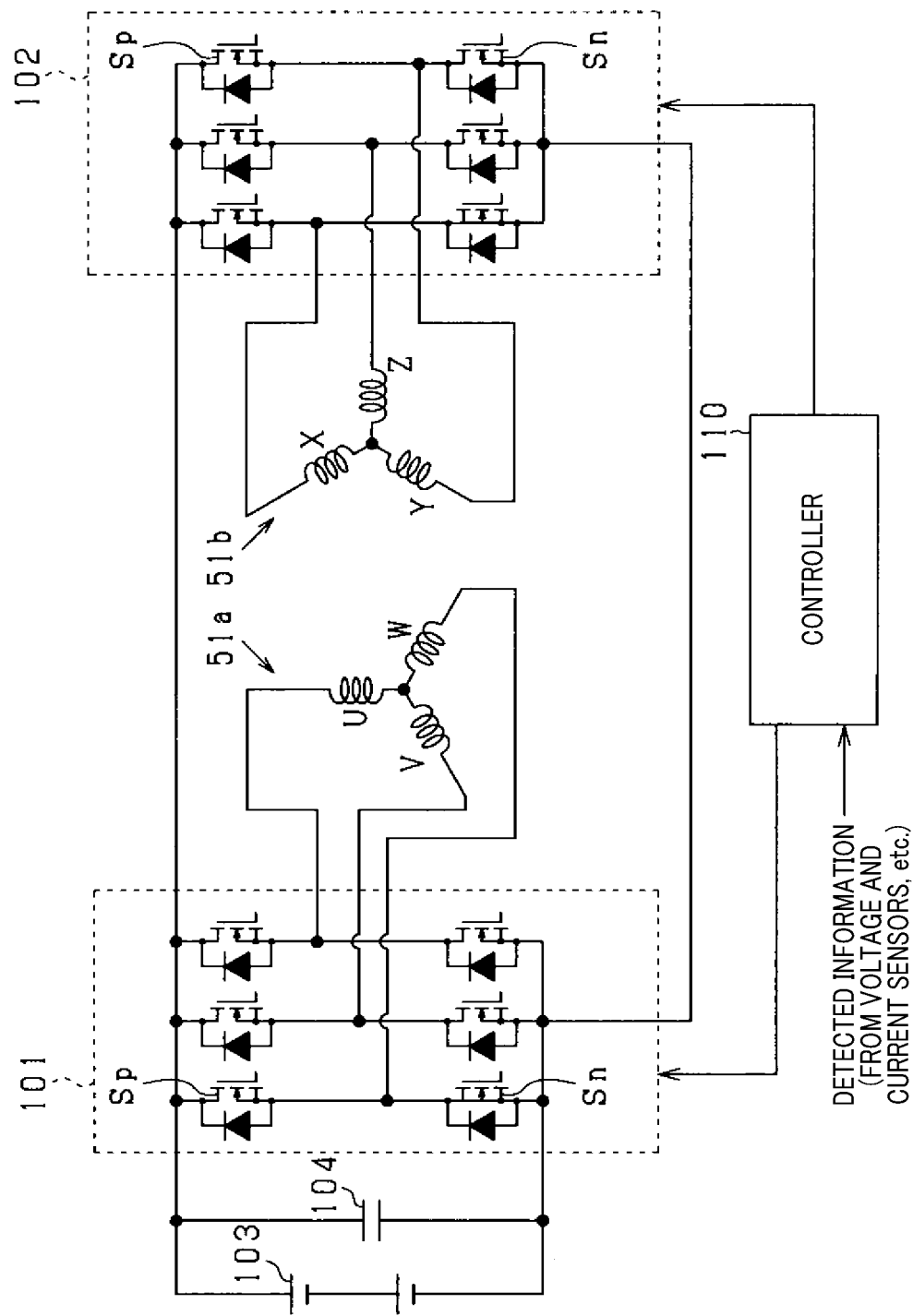
FIG. 19 is a schematic circuit diagram of a control system of the rotating electric machine according to the first embodiment.

FIG. 19 is a schematic circuit diagram of the control system of the rotating electric machine 10. FIG. 20 is a functional block diagram illustrating a current feedback control process performed by a controller 110 of the control system.

As shown in FIG. 19, in the present embodiment, the stator coil 51 is comprised of a pair of three-phase coils, i.e., the first three-phase coil 51a and the second three-phase coil 51b. Moreover, the first three-phase coil 51a is comprised of the U-phase, V-phase and W-phase windings and the second three-phase winding 51b is comprised of the X-phase, Y-phase and Z-phase windings.

In the control system, there are provided, as electric power converters, a first inverter 101 and a second inverter 102 respectively for the first and second three-phase coils 51a and 51b. In each of the first and second inverters 101 and 102, there is formed a full bridge circuit having a plurality of pairs of upper and lower arms. The number of pairs of the upper and lower arms in each of the first and second inverters 101 and 102 is equal to the number of the phase windings of each of the first and second three-phase coils 51a and 51b. Each of the upper and lower arms has a switch (or semiconductor switching element) provided therein. Electric current supplied to each phase winding of the stator coil 51 is regulated by controlling the on/off operation of the switch of each of the upper and lower arms.

A DC power supply 103 and a smoothing capacitor 104 are connected in parallel to the first and second inverters 101 and 102. The DC power supply 103 is implemented by, for example, an assembled battery that is obtained by connecting a plurality of battery cells in series with each other. In addition, each of the switches of the first and second inverters 101 and 102 corresponds to one of the semiconductor modules 66 shown in FIGS. 3 and 4. The smoothing capacitor 104 corresponds to the capacitor module 68 shown in FIGS. 3 and 4.

The controller 110 includes a microcomputer which is configured with a CPU and various memories. Based on various types of detected information on the rotating electric machine 10 and power running drive and electric power generation requests, the controller 110 performs energization control by turning on and off the switches of the first and second inverters 101 and 102. The controller 110 corresponds to the controller 77 shown in FIG. 6. The detected information on the rotating electric machine 10 includes, for example, a rotation angle (or electrical angle information) of the rotor 40 detected by a rotation angle detector such as a resolver, a power supply voltage (or inverter input voltage) detected by a voltage sensor, and phase currents detected by respective current sensors. The controller 110 generates and outputs operation signals for operating the switches of the first and second inverters 101 and 102. In addition, in the case of the rotating electric machine 10 being used as a power source in a vehicle, the power generation request is a regenerative drive request.

The first inverter 101 includes, for each of the U, V and W phases, one serially-connected switch pair consisting of an upper-arm switch Sp and a lower-arm switch Sn. A high potential-side terminal of the upper-arm switch Sp is connected to a positive terminal of the DC power supply 103. A low potential-side terminal of the lower-arm switch Sn is connected to a negative terminal of the DC power supply 103 (or ground). To an intermediate junction point between the upper-arm switch Sp and the lower-arm switch Sn, there is connected a first end of a corresponding one of the U-phase, V-phase and W-phase windings of the first three-phase coil 51a. The U-phase, V-phase and W-phase windings are star-connected (or Y-connected) to define a neutral point therebetween, at which second ends of these windings are connected with each other.

Similarly, the second inverter 102 includes, for each of the X, Y and Z phases, one serially-connected switch pair consisting of an upper-arm switch Sp and a lower-arm switch Sn. A high potential-side terminal of the upper-arm switch Sp is connected to the positive terminal of the DC power supply 103. A low potential-side terminal of the lower-arm switch Sn is connected to the negative terminal of the DC power supply 103 (or ground). To an intermediate junction point between the upper-arm switch Sp and the lower-arm switch Sn, there is connected a first end of a corresponding one of the X-phase, Y-phase and Z-phase windings of the second three-phase coil 51b. The X-phase, Y-phase and Z-phase windings are star-connected (or Y-connected) to define a neutral point therebetween, at which second ends of these windings are connected with each other.

Figure 20:
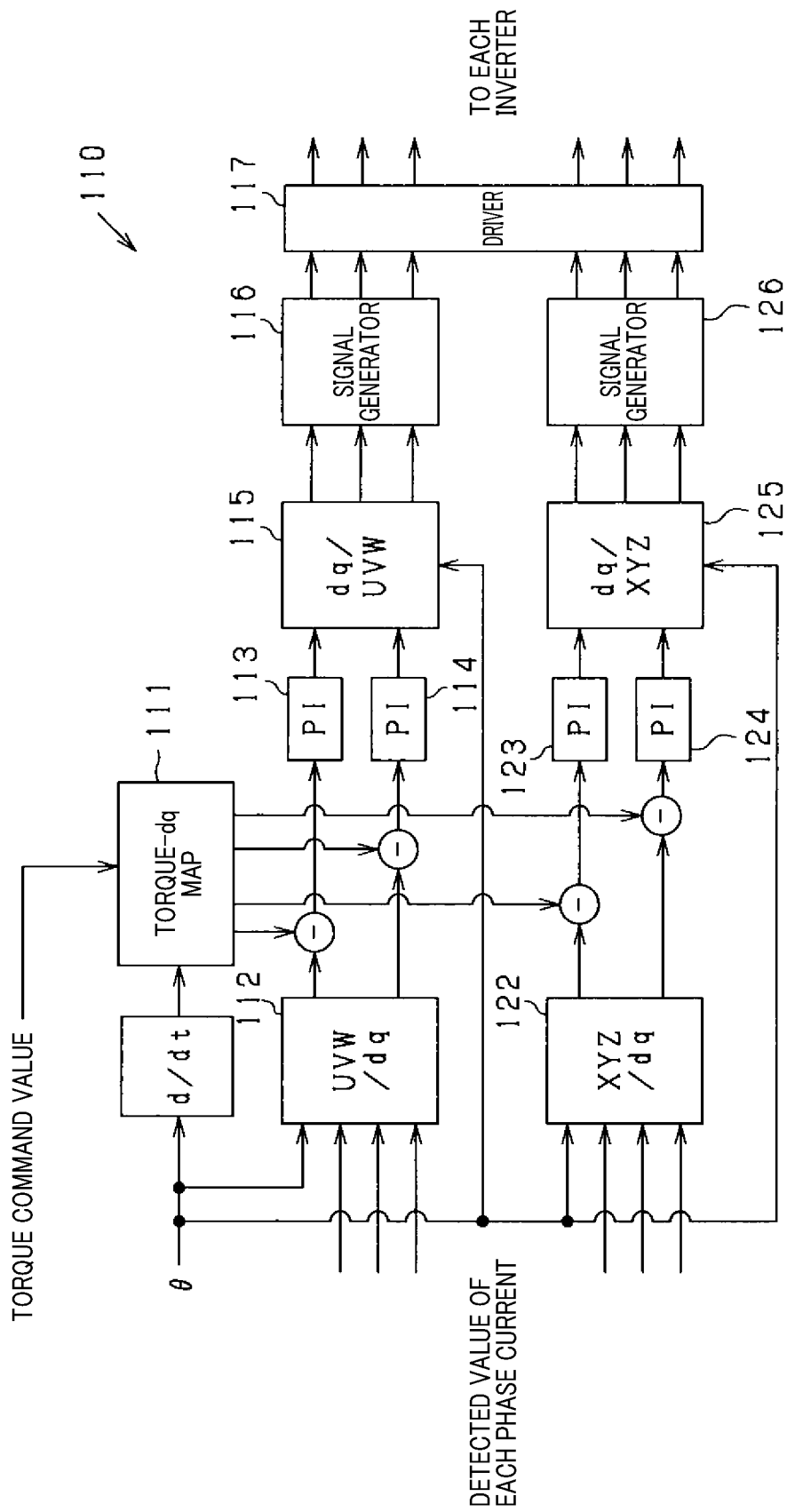
FIG. 20 is a functional block diagram illustrating a current feedback control process performed by a control device of the control system.

FIG. 20 shows the current feedback control process performed by the controller 110 for controlling the U-phase, V-phase and W-phase currents and the X-phase, Y-phase and Z-phase currents.

First, the current feedback control process for the U-phase, V-phase and W-phase currents will be described.

As shown in FIG. 20, in the controller 110, a current command value setter 111 is configured to set, using a torque-dq map, both a d-axis current command value and a q-axis current command value on the basis of a power running torque command value or an electric power generation torque command value to the rotating electric machine 10 and an electrical angular speed co obtained by differentiating the electrical angle θ with respect to time. In the present embodiment, the current command value setter 111 is provided for both control of the U-phase, V-phase and W-phase currents and control of the X-phase, Y-phase and Z-phase currents. In addition, in the case of the rotating electric machine 10 being used as a power source in a vehicle, the electric power generation torque command value is a regenerative torque command value.

A dq converter 112 is configured to convert detected values of the U-phase, V-phase and W-phase currents, which are detected by the respective current sensors, into d-axis current and q-axis current which are current components in a Cartesian two-dimensional rotating coordinate system whose d-axis indicates a field direction (or direction of the axis of a magnetic field).

A d-axis current feedback controller 113 is configured to calculate a d-axis command voltage as a manipulated parameter for feedback-controlling the d-axis current to a d-axis current command value. A q-axis current feedback controller 114 is configured to calculate a q-axis command voltage as a manipulated parameter for feedback-controlling the q-axis current to a q-axis current command value. These feedback controllers 113 and 114 are configured to calculate, using a PI feedback method, the command voltages on the basis of the differences of the d-axis current and the q-axis current from the respective current command values.

A three-phase converter 115 is configured to covert the d-axis and q-axis command voltages into U-phase, V-phase and W-phase command voltages. In addition, the above units 111-115 together correspond to a feedback control unit for performing feedback control of fundamental currents based on the dq conversion theory. The U-phase, V-phase and W-phase command voltages are the feedback-controlled values.

An operation signal generator 116 is configured to generate, using a well-known triangular-wave carrier comparison method, the operation signals for operating the switches of the first inverter 101 on the basis of the U-phase, V-phase and W-phase command voltages. More specifically, the operation signal generator 116 generates the operation signals (or duty signals) for operating the upper-arm and lower-arm switches Sp and Sn of the U, V and W phases via PWM control based on comparison in amplitude between signals, which are obtained by normalizing the U-phase, V-phase and W-phase command voltages with the power supply voltage, and a triangular-wave carrier signal.

Similar to the above-described dq converter 112, d-axis current feedback controller 113, q-axis current feedback controller 114, three-phase converter 115 and operation signal generator 116 provided for control of the U-phase, V-phase and W-phase currents, in the controller 110, there are also provided a dq converter 122, a d-axis current feedback controller 123, a q-axis current feedback controller 124, a three-phase converter 125 and an operation signal generator 126 for control of the X-phase, Y-phase and Z-phase currents.

The dq converter 122 is configured to convert detected values of the X-phase, Y-phase and Z-phase currents, which are detected by the respective current sensors, into d-axis current and q-axis current which are current components in the Cartesian two-dimensional rotating coordinate system whose d-axis indicates the field direction.

The d-axis current feedback controller 123 is configured to calculate a d-axis command voltage. The q-axis current feedback controller 124 is configured to calculate a q-axis command voltage. The three-phase converter 125 is configured to covert the d-axis and q-axis command voltages into X-phase, Y-phase and Z-phase command voltages. The operation signal generator 126 is configured to generate the operation signals for operating the switches of the second inverter 102 on the basis of the X-phase, Y-phase and Z-phase command voltages. More specifically, the operation signal generator 126 generates the operation signals (or duty signals) for operating the upper-arm and lower-arm switches Sp and Sn of the X, Y and Z phases via PWM control based on comparison in amplitude between signals, which are obtained by normalizing the X-phase, Y-phase and Z-phase command voltages with the power supply voltage, and a triangular-wave carrier signal.

The driver 117 is configured to drive (i.e., turn on and off) the switches Sp and Sn of the first and second inverters 101 and 102 based on the operation signals generated by the operation signal generators 116 and 126.

Next, a torque feedback control process performed by the controller 110 will be described. This process is performed mainly for reducing losses and thereby increasing the output of the rotating electric machine 10 in operating conditions where the output voltages of the first and second inverters 101 and 102 become high, such as in a high-rotation region and a high-output region. In the present embodiment, the controller 110 selectively performs either one of the torque feedback control process and the current feedback control process according to the operating condition of the rotating electric machine 10.

Figure 21:
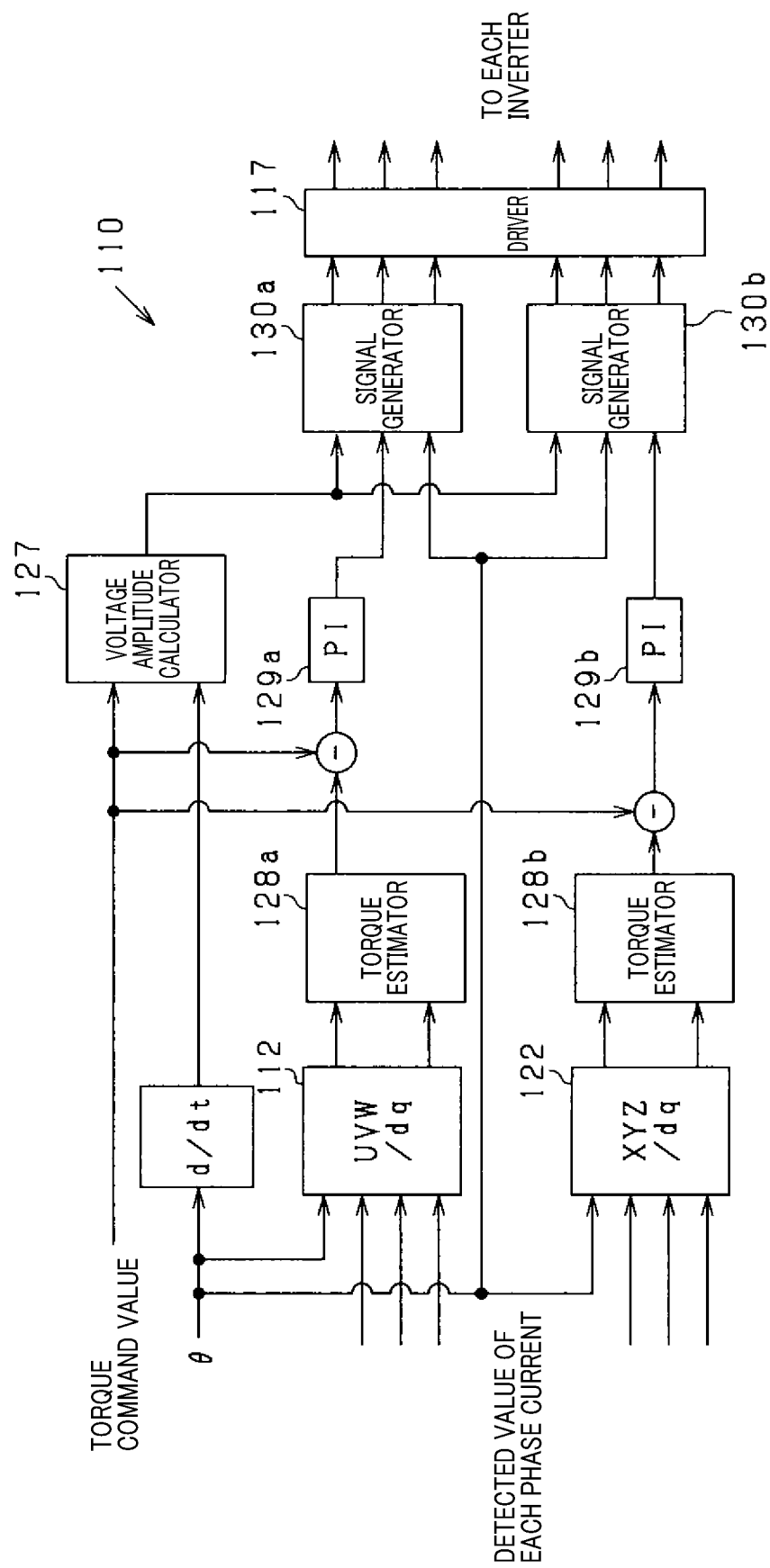
FIG. 21 is a functional block diagram illustrating a torque feedback control process performed by the controller.

FIG. 21 shows the torque feedback control process performed by the controller 110 for the U, V and W phases and the X, Y and Z phases. In addition, in FIG. 21, functional blocks identical to those in FIG. 20 are designated by the same reference numerals as in FIG. 20 and descriptions of them will be omitted hereinafter.

First, the torque feedback control process for the U, V and W phases will be described.

As shown in FIG. 21, in the controller 110, a voltage amplitude calculator 127 is configured to calculate a voltage amplitude command value on the basis of the power running torque command value or the electric power generation torque command value to the rotating electric machine 10 and the electrical angular speed ω obtained by differentiating the electrical angle θ with respect to time.

A torque estimator 128a is configured to calculate a torque estimated value corresponding to the U, V and W phases on the basis of the d-axis current and q-axis current obtained by the dq converter 112. In addition, the torque estimator 128a may calculate the torque estimated value on the basis of map information associating the d-axis and q-axis currents with the torque estimated value.

A torque feedback control unit 129a is configured to calculate a voltage phase command value as a manipulated parameter for feedback-controlling the torque estimated value to the power running torque command value or the electric power generation torque command value. More specifically, the torque feedback control unit 129a calculates, using a PI feedback method, the voltage phase command value on the basis of the difference of the torque estimated value from the power running torque command value or the electric power generation torque command value.

An operation signal generator 130a is configured to generate the operation signals for operating the switches of the first inverter 101 on the basis of the voltage amplitude command value, the voltage phase command value and the electrical angle θ. More specifically, the operation signal generator 130a first calculates U-phase, V-phase and W-phase command voltages on the basis of the voltage amplitude command value, the voltage phase command value and the electrical angle θ. Then, the operation signal generator 130a generates the operation signals for operating the upper-arm and lower-arm switches Sp and Sn of the U, V and W phases via PWM control based on comparison in amplitude between signals, which are obtained by normalizing the calculated U-phase, V-phase and W-phase command voltages with the power supply voltage, and a triangular-wave carrier signal.

In addition, as an alternative, the operation signal generator 130a may generate the operation signals on the basis of pulse pattern information, the voltage amplitude command value, the voltage phase command value and the electrical angle θ. The pulse pattern information is map information associating the operation signals with the voltage amplitude command value, the voltage phase command value and the electrical angle θ.

Similar to the above-described torque estimator 128a, torque feedback control unit 129a and operation signal generator 130a provided for the U, V and W phases, in the controller 110, there are also provided a torque estimator 128b, a torque feedback control unit 129b and an operation signal generator 130b for the X, Y and Z phases.

The torque estimator 128b is configured to calculate a torque estimated value corresponding to the X, Y and Z phases on the basis of the d-axis current and q-axis current obtained by the dq converter 122.

The torque feedback control unit 129b is configured to calculate a voltage phase command value as a manipulated parameter for feedback-controlling the torque estimated value to the power running torque command value or the electric power generation torque command value. More specifically, the torque feedback control unit 129*b* calculates, using a PI feedback method, the voltage phase command value on the basis of the difference of the torque estimated value from the power running torque command value or the electric power generation torque command value.

An operation signal generator 130*b* is configured to generate the operation signals for operating the switches of the second inverter 102 on the basis of the voltage amplitude command value, the voltage phase command value and the electrical angle θ. More specifically, the operation signal generator 130*b* first calculates X-phase, Y-phase and Z-phase command voltages on the basis of the voltage amplitude command value, the voltage phase command value and the electrical angle θ. Then, the operation signal generator 130*b* generates the operation signals for operating the upper-arm and lower-arm switches Sp and Sn of the X, Y and Z phases via PWM control based on comparison in amplitude between signals, which are obtained by normalizing the calculated X-phase, Y-phase and Z-phase command voltages with the power supply voltage, and a triangular-wave carrier signal.

In addition, as an alternative, the operation signal generator 130*b* may generate the operation signals on the basis of pulse pattern information, the voltage amplitude command value, the voltage phase command value and the electrical angle θ. The pulse pattern information is map information associating the operation signals with the voltage amplitude command value, the voltage phase command value and the electrical angle θ.

Moreover, the driver 117 is configured to drive (i.e., turn on and off) the switches Sp and Sn of the first and second inverters 101 and 102 based on the operation signals generated by the operation signal generators 130*a* and 130*b*.

In the rotating electric machine 10, galvanic corrosion may occur in the bearings 21 and 22 due to generation of shaft current. For example, when energization of the stator coil 51 is switched by the on/off operation of the switches of the first and second inverters 101 and 102, magnetic flux distortion may occur due to a slight switching-timing deviation (or unbalanced switching), causing galvanic corrosion to occur in the bearings 21 and 22 that support the rotating shaft 11. More specifically, the magnetic flux distortion, which occurs depending on the inductance of the stator 50, induces an axial electromotive force. Due to the axial electromotive force, electrical breakdown may occur in the bearings 21 and 22, allowing galvanic corrosion to progress therein.

Therefore, in the present embodiment, three galvanic corrosion countermeasures are taken which will be described hereinafter.

As the first galvanic corrosion countermeasure, the inductance of the stator 50 is lowered with employment of the tooth-less structure (or slot-less structure) and the magnet unit 42 is configured to make change in the magnet magnetic flux gentle. As the second galvanic corrosion countermeasure, the rotating shaft 11 is supported in a cantilever fashion by the bearings 21 and 22. As the third galvanic corrosion countermeasure, the annular stator coil 51 is molded, together with the stator core 52, in a molding material.

Hereinafter, each of the three galvanic corrosion countermeasures will be described in more detail.

First, as the first galvanic corrosion countermeasure, the tooth-less structure is employed for the stator 50 so that no stator teeth are interposed between the circumferentially adjacent electrical conductor groups 81. Instead, the encapsulating member 57, which is formed of a nonmagnetic material, is interposed between the circumferentially adjacent electrical conductor groups 81 (see FIG. 10). Consequently, it becomes possible to lower the inductance of the stator 50. Further, with reduction in the inductance of the stator 50, even if a switching-timing deviation occurs during energization of the stator coil 51, it is possible to suppress occurrence of magnetic flux distortion due to the switching-timing deviation. As a result, it is possible to suppress occurrence of galvanic corrosion in the bearings 21 and 22. In addition, the d-axis inductance is preferably lower than the q-axis inductance.

Moreover, in the magnets 91 and 92 of the magnet unit 42, on the d-axis side, the axis of easy magnetization is oriented to be more parallel to the d-axis than on the q-axis side (see FIG. 9). Consequently, the magnet magnetic flux at the d-axis is intensified and the surface magnetic flux gradually changes from the q-axis to the d-axis in each magnetic pole. As a result, it becomes possible to suppress occurrence of sharp voltage change due to unbalanced switching, thereby suppressing occurrence of galvanic corrosion in the bearings 21 and 22.

As the second galvanic corrosion countermeasure, in the rotating electric machine 10, the bearings 21 and 22 are arranged on one axial side of the axial center position of the rotor 40 (see FIG. 2). With this arrangement, it is possible to reduce the influence of galvanic corrosion in comparison with the case of a pair of bearings being arranged respectively on opposite axial sides of a rotor. More specifically, in the case of supporting a rotor by a pair of bearings arranged respectively on opposite axial sides of the rotor, with generation of high-frequency magnetic flux, a closed circuit may be formed which extends through the rotor, the stator and the pair of bearings, causing galvanic corrosion to occur in the bearings due to shaft current. In contrast, in the present embodiment, with the rotor 40 supported in a cantilever fashion by the bearings 21 and 22, no closed circuit is formed in the rotating electric machine 10; consequently, occurrence of galvanic corrosion due to shaft current is suppressed.

Moreover, in the rotating electric machine 10, in the intermediate portion 45 of the magnet holder 41 which projects radially outward, there is formed a contact prevention portion that extends in the axial direction to prevent contact with the coil end part 54 of the stator coil 51 (see FIG. 2). Therefore, even if a closed circuit of shaft current is formed through the magnet holder 41, it is possible to increase the length of the closed circuit and thus the circuit resistance. Consequently, it is possible to more reliably suppress occurrence of galvanic corrosion in the bearings 21 and 22.

In the rotating electric machine 10, on one axial side of the rotor 40, the holding member 23 of the bearing unit 20 is fixed to the housing 30; on the other axial side of the rotor 40, the housing 30 and the unit base 61 (i.e., stator holder) are joined to each other (see FIG. 2). With this configuration, it becomes possible to suitably arrange the bearings 21 and 22 on one side of the rotor 40 in the axial direction of the rotating shaft 11. Moreover, with this configuration, the unit base 61 is connected with the rotating shaft 11 via the housing 30. Consequently, it becomes possible to arrange the unit base 61 at a position electrically separated from the rotating shaft 11. In addition, interposing an insulating member (e.g., resin member) between the unit base 61 and the housing 30, the unit base 61 and the rotating shaft 11 are further electrically separated from each other. Consequently, it is possible to more reliably suppress occurrence of galvanic corrosion in the bearings 21 and 22.

As described above, in the rotating electric machine 10 according to the present embodiment, the shaft voltage applied to the bearings 21 and 22 is lowered by the one-side arrangement of the bearings 21 and 22. Moreover, the electric potential difference between the rotor 40 and the stator 50 is reduced. Consequently, it becomes possible to reduce the electric potential difference acting on the bearings 21 and 22 without using electrically conductive grease in the bearings 21 and 22. In general, electrically conductive grease contains fine particles such as carbon, and thus may cause abnormal noise to occur. In this regard, in the present embodiment, non-electrically conductive grease is used in the bearings 21 and 22. Consequently, it becomes possible to suppress generation of abnormal noise in the bearings 21 and 22. Accordingly, the rotating electric machine 10 is particularly suitable for use in an electric vehicle.

As the third galvanic corrosion countermeasure, in the rotating electric machine 10, the stator coil 51 is molded, together with the stator core 52, by a molding material (i.e., the encapsulating member 57), thereby suppressing displacement of the stator coil 51 in the stator 50 (see FIG. 11). In particular, in the present embodiment, no stator teeth are interposed between the circumferentially adjacent electrical conductor groups 81. Therefore, displacement of the stator coil 51 may occur which is formed of the electrical conductor groups 81. In this regard, molding the stator coil 51 together with the stator core 52, it becomes possible to suppress displacement of the electrical conductor groups 81 forming the stator coil 51. Consequently, it becomes possible to suppress magnetic flux distortion due to displacement of the stator coil 51 in the stator 50; thus it also becomes possible to suppress occurrence of galvanic corrosion in the bearings 21 and 22 due to magnetic flux distortion.

Moreover, in the rotating electric machine 10, the unit base 61, which functions as a housing member to fix the stator core 52, is formed of CFRP. Consequently, it becomes possible to suppress electric discharge to the unit base 61 in comparison the case of the unit base 61 being formed of aluminum or the like. As a result, it is possible to more reliably suppress occurrence of galvanic corrosion in the bearings 21 and 22.

In addition, as a further galvanic corrosion countermeasure, in each of the bearings 21 and 22, at least one of the outer ring 25 and the inner ring 26 may be formed of a ceramic material or an insulating tape may be provided on the outer side of the outer ring 25.

Second Embodiment

In the second embodiment, the polar anisotropic structure of the magnet unit 42 of the rotor 40 is modified in comparison with that described in the first embodiment.

Figure 22:
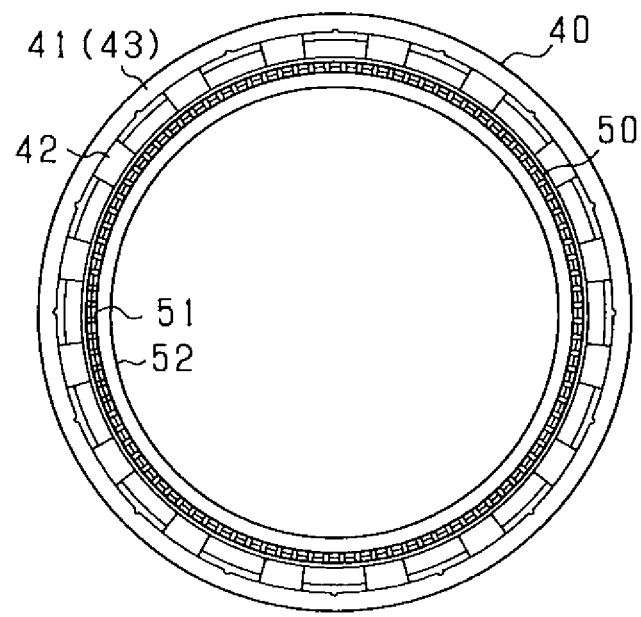
FIG. 22 is a transverse cross-sectional view of both a rotor and a stator according to a second embodiment.
Figure 23:
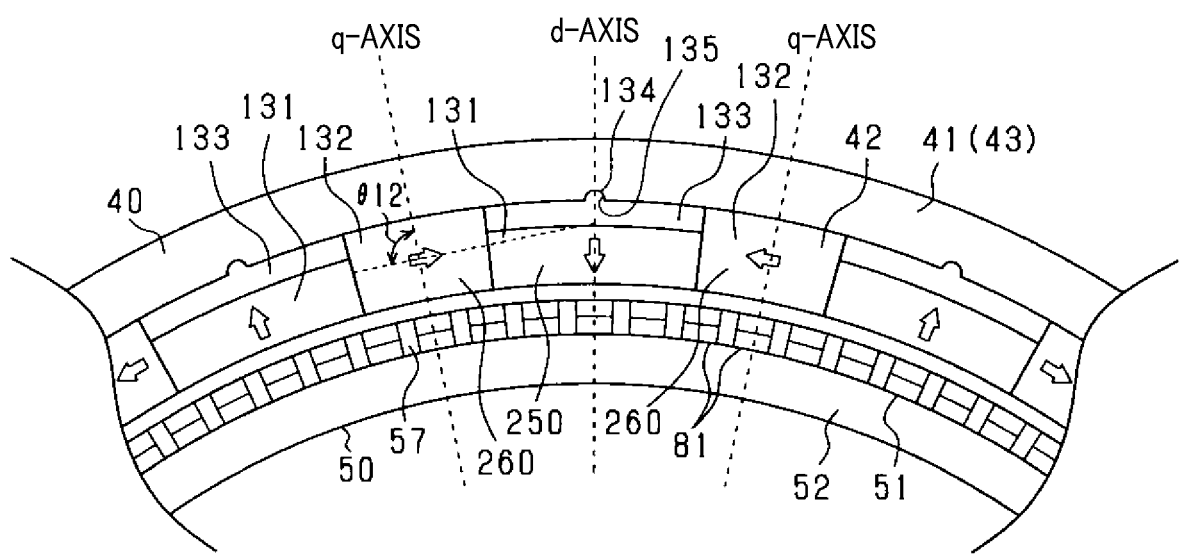
FIG. 23 is an enlarged view of part of FIG. 22.

As shown in FIGS. 22 and 23, in the present embodiment, the magnet unit 42 is configured with a magnet array called a Halbach array. Specifically, the magnet unit 42 includes first magnets 131 each having its magnetization direction (or the direction of the magnetization vector thereof) coincident with a radial direction and second magnets 132 each having its magnetization direction (or the direction of the magnetization vector thereof) coincident with the circumferential direction. The first magnets 131 are arranged at predetermined intervals in the circumferential direction. Each of the second magnets 132 is arranged between one circumferentially-adjacent pair of the first magnets 131. In addition, each of the first and second magnets 131 and 132 is implemented by, for example, a rare earth permanent magnet such as a neodymium magnet.

The first magnets 131 are arranged apart from one another in the circumferential direction so that on the radial side facing the stator 50 (i.e., the radially inner side in the present embodiment), the polarities of the first magnets 131 alternate between N and S in the circumferential direction. Moreover, the second magnets 132 are arranged in the circumferential direction so that the magnetization directions of the second magnets 132 are alternately directed toward opposite sides in the circumferential direction.

The cylindrical portion 43 of the magnet holder 41 is provided to surround the first and second magnets 131 and 132. The cylindrical portion 43, which functions as a back core, may be formed of a soft-magnetic material.

In the present embodiment, the relationship of the axes of easy magnetization of the magnets of the magnet unit 42 to the d-axis and the q-axis on the d-q coordinate system is the same as described in the first embodiment.

Moreover, on the radially outer side (i.e., the radial side facing the cylindrical portion 43 of the magnet holder 41) of each of the first magnets 131, there is arranged a magnetic body 133 that is formed a soft-magnetic material. More specifically, the magnetic body 133 may be formed, for example, of a magnetic steel sheet, soft iron or green compact core material.

The circumferential length of the magnetic bodies 133 is set to be equal to the circumferential length of the first magnets 131 (more specifically, the circumferential length of radially outer peripheral portions of the first magnets 131). In a state of each radially-adjacent pair of the first magnets 131 and the magnetic bodies 133 being integrated into one piece, the radial thickness of the integrated piece is equal to the radial thickness of the second magnets 132. In other words, the radial thickness of the first magnets 131 is smaller than the radial thickness of the second magnets 132 by the radial thickness of the magnetic bodies 133. The first magnets 131, the second magnets 132 and the magnetic bodies 133 are fixed to one another by, for example, an adhesive. In the magnet unit 42, the radially outer side of the first magnets 131 is the opposite radial side to the stator 50. The magnetic bodies 133 are arranged on the opposite radial side of the first magnets 131 to the stator 50 (i.e., on the anti-stator side of the first magnets 131).

On the radially outer surface of each of the magnetic bodies 133, there is formed a key 134 as a protrusion protruding radially outward (i.e., toward the cylindrical portion 43 of the magnet holder 41). Moreover, in the inner circumferential surface of the cylindrical portion 43 of the magnet holder 41, there are formed a plurality of keyways 135 in each of which one of the keys 134 of the magnetic bodies 133 is fitted. That is, the number of the keys 134 of the magnetic bodies 133 is equal to the number of the keyways 135 of the cylindrical portion 43 of the magnet holder 41. The protruding shape of the keys 134 conforms to the recessed shape of the keyways 135. With engagement between the keys 134 and the keyways 135, the displacement of the first and second magnets 131 and 132 relative to the magnet holder 41 in the circumferential direction (or rotational direction) is suppressed.

In addition, as an alternative, each of the magnetic bodies 133 may have a keyway 135 formed in the radially outer surface thereof; in the inner circumferential surface of the cylindrical portion 43 of the magnet holder 41, there may be formed a plurality of keys 134 each of which is fitted in one of the keyways 135 of the magnetic bodies 133.

In the magnet unit 42 according to the present embodiment, with the alternate arrangement of the first magnets 131 and the second magnets 132 in the circumferential direction, it becomes possible to increase the magnetic flux density in the first magnets 131. Consequently, it becomes possible to cause one-side concentration of magnetic flux to occur in the magnet unit 42, thereby intensifying magnetic flux on the side closer to the rotor 50.

Moreover, with the magnetic bodies 133 arranged on the radially outer side (i.e., anti-stator side) of the first magnets 131, it becomes possible to suppress local magnetic saturation on the radially outer side of the first magnets 131; thus it becomes possible to suppress demagnetization of the first magnets 131 due to magnetic saturation. As a result, it becomes possible to increase the magnetic force of the magnet unit 42. That is, the magnet unit 42 according to the present embodiment can be regarded as being formed by replacing those portions of the first magnets 131 where it is easy for demagnetization to occur with the magnetic bodies 133.

Figure 24A:
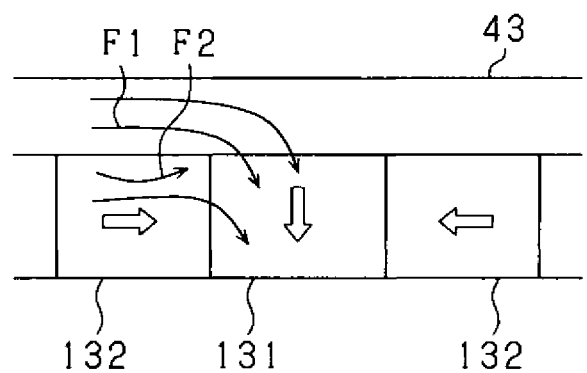
FIG. 24A is a schematic diagram illustrating the flow of magnetic flux in a magnet unit according to a comparative example.
Figure 24B:
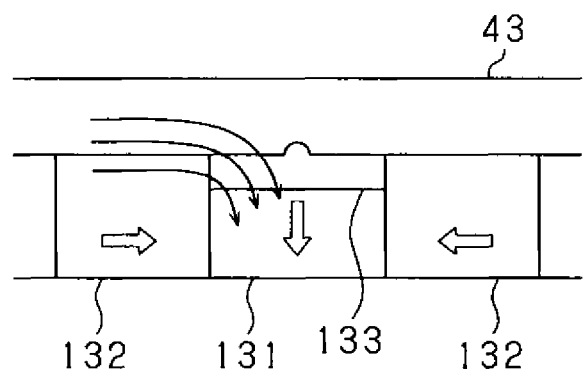
FIG. 24B is a schematic diagram illustrating the flow of magnetic flux in a magnet unit of the rotor according to the second embodiment.

FIG. 24A illustrates the flow of magnetic flux in a magnet unit 42 according to a comparative example, where no magnetic bodies 133 arranged on the radially outer side of the first magnets 131. FIG. 24B illustrates the flow of magnetic flux in the magnet unit 42 according to the present embodiment. In addition, in FIGS. 24A and 24B, for the sake of simplicity, both the cylindrical portion 43 of the magnet holder 41 and the magnet unit 42 are developed to be straight in shape; the upper side corresponds to the stator side whereas the lower side corresponds to the anti-stator side.

As shown in FIG. 24A, in the magnet unit 42 according to the comparative example, the magnetic flux acting surfaces of the first magnets 131 and the radially outer side surfaces of the second magnets 132 are arranged in contact with the inner circumferential surface of the cylindrical portion 43 of the magnet holder 41. Moreover, the magnetic flux acting surfaces of the second magnets 132 are arranged in contact with the corresponding circumferential side surfaces of the first magnets 131. With the above arrangement, in the cylindrical portion 43 of the magnet holder 41, there is generated a resultant magnetic flux of magnetic flux F1, which flows through a magnetic path on the radially outer side of the second magnets 132 to enter the magnetic flux acting surfaces of the first magnets 131, and magnetic flux that flows substantially parallel to the cylindrical portion 43 and attracts magnetic flux F2 of the second magnets 132. Consequently, in the cylindrical portion 43 of the magnet holder 41, local magnetic saturation may occur in the vicinities of the contact surfaces between the first magnets 131 and the second magnets 132.

In contrast, as shown in FIG. 24B, in the magnet unit 42 according to the present embodiment, on the opposite side of the first magnets 131 to the stator 50, there are provided the magnetic bodies 133 between the magnetic flux acting surfaces of the first magnets 131 and the inner circumferential surface of the cylindrical portion 43 of the magnet holder 41, allowing magnetic flux to flow through the magnetic bodies 133. Consequently, it becomes possible to suppress occurrence of magnetic saturation in the cylindrical portion 43 of the magnet holder 41, thereby improving the resistance of the magnet unit 42 to demagnetization.

Moreover, in the magnet unit 42 according to the present embodiment, it is possible to eliminate magnetic flux F2 which is generated in the magnet unit 42 according to the comparative example to facilitate occurrence of local magnetic saturation. Consequently, it is possible to effectively improve the permeance of the entire magnetic circuit. Moreover, it is possible to maintain the magnetic circuit characteristics even in a severe high-temperature operating condition.

Furthermore, in the magnet unit 42 according to the present embodiment, the magnet magnetic paths through the inside of the magnets are lengthened in comparison with radial magnets in a conventional SPM rotor. Consequently, the magnet permanence is increased, thereby making it possible to increase the magnetic force and thus the torque. Moreover, the magnetic flux is concentrated on the center of the d-axis, thereby making it possible to increase the sine wave conformity ratio. In particular, setting the electric current waveform, via the PWM control, to be a sine wave or a trapezoidal wave or using a switching IC of 120° energization, it is possible to more effectively increase the torque of the rotating electric machine 10.

In addition, in the case of the stator core 52 being formed of magnetic steel sheets laminated in the axial direction, the radial thickness of the stator core 52 may be set to be larger than or equal to ½ of the radial thickness of the magnet unit 42. For example, the radial thickness of the stator core 52 may be set to be larger than or equal to ½ of the radial thickness of the first magnets 131 arranged on the magnetic pole centers in the magnet unit 42. Moreover, the radial thickness of the stator core 52 may be set to be smaller than the radial thickness of the magnet unit 42. In this case, since the magnet magnetic flux is about 1 [T] and the saturation flux density of the stator core 52 is equal to 2 [T], setting the radial thickness of the stator core 52 to be larger than or equal to ½ of the radial thickness of the magnet unit 42, it is possible to prevent magnetic flux leakage to the radially inner peripheral side of the stator core 52.

In magnets with a Halbach structure or a polar anisotropic structure, the magnetic paths are pseudo-arc-shaped; therefore it is possible to increase magnetic flux in proportion to the thickness of those magnets which handle the circumferential magnetic flux. With such a configuration, it is considered that the magnetic flux flowing to the stator core 52 does not exceed the circumferential magnetic flux. That is, in the case of using an iron-based metal whose saturation flux density is 2 [T] with respect to the magnet magnetic flux being 1 [T], setting the thickness of the stator core 52 to be larger than or equal to half the thickness of the magnets, it is possible reduce both the size and weight of the rotating electric machine 10 without causing magnetic saturation of the stator core 52. On the other hand, the magnet magnetic flux is generally lower than or equal to 0.9 [T] since a demagnetizing field from the stator 50 acts on the magnet magnetic flux. Therefore, setting the thickness of the stator core 52 to be larger than or equal to half the thickness of the magnets, it is possible to suitably keep high permeability of the stator core 52.

[First Modification of First and Second Embodiments]

In the above-described embodiments, the outer circumferential surface of the stator core 52 is configured as a smooth curved surface; on the outer circumferential surface of the stator core 52, the electrical conductor groups 81 are arranged at predetermined intervals in the circumferential.

Figure 25:
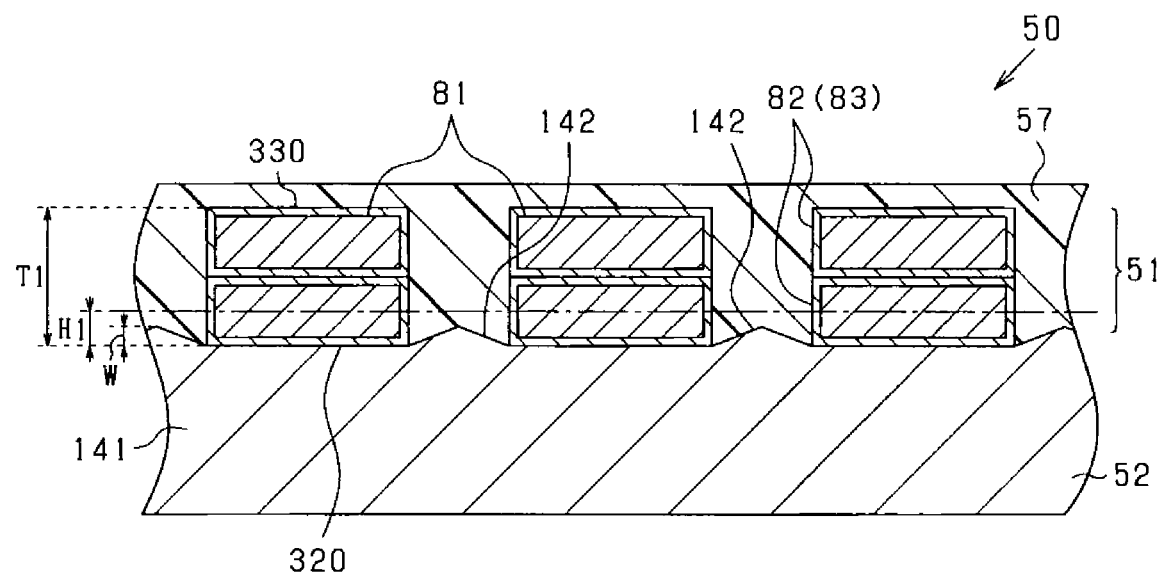
FIG. 25 is a schematic cross-sectional view illustrating a stator configuration according to a first modification of the first and second embodiments.

In contrast, in this modification, as shown in FIG. 25, the stator core 52 includes an annular yoke 141 and a plurality of protrusions 142 each of which radially protrudes from the yoke 141 so as to be located between one circumferentially-adjacent pair of the electrical conductor groups 81. That is, the protrusions 142 are located on the radially outer side (i.e., the rotor 40 side) of the yoke 141 and arranged at predetermined intervals in the circumferential direction. The electrical conductor groups 81 forming the stator coil 51 engage with the protrusions 142 in the circumferential direction. That is, the protrusions 142 serve as positioning members for circumferential positioning the electrical conductor groups 81. In addition, the protrusions 142 also correspond to "inter-conductor members".

The radial height of the protrusions 142 from the yoke 141, i.e., the radial distance W from the radially inner side surfaces 320 of the electrical conductor groups 81, which adjoin the yoke 141, to the tops of the protrusions 142 is set to be smaller than H1. As shown in FIG. 25, H1 is equal to ½ of the radial thickness of those electrical conductors 82 (more specifically, straight portions 83 of the electrical conductors 82) of the electrical conductor groups 81 which radially adjoin the yoke 141. In other words, the radial range corresponding to ¾ of T1 may be occupied by the nonmagnetic member (i.e., encapsulating member 57), where T1 is the radial thickness of the electrical conductor groups 81 (i.e., the minimum distance from the radially inner side surfaces 320 of the electrical conductor groups 81 adjoining the yoke 141 of the stator core 52 to the radially outer side surfaces 330 of the electrical conductor groups 81 facing the rotor 40) and twice the radial thickness of each of the electrical conductors 82. Limiting the radial height of the protrusions 142 as above, it becomes possible to prevent the protrusions 142 from functioning as stator teeth between the circumferentially-adjacent electrical conductor groups 81 (more specifically, straight portions 83 of the electrical conductors 82) and thus prevent magnetic paths from being formed by stator teeth.

In addition, the protrusions 142 are not necessarily provided in all of the gaps formed between the circumferentially-adjacent electrical conductor groups 81. For example, as an alternative, there may be provided only one protrusion 142 which is located in the gap formed between one circumferentially-adjacent pair of the electrical conductor groups 81. As another alternative, there may be provided a plurality of protrusions 142 which are arranged at equal intervals in the circumferential direction so as to be respectively received in every predetermined number of the gaps formed between the circumferentially-adjacent electrical conductor groups 81. The protrusions 142 may have any suitable cross-sectional shape, such as a rectangular or arc-like cross-sectional shape.

Moreover, on the outer circumferential surface of the stator core 52, the straight portions 83 of the electrical conductors 82 may alternatively be provided in a single radial layer. In this case, the radial height of the protrusions 142 from the yoke 141 is set to be smaller than ½ of the radial thickness of each of the straight portions 83 of the electrical conductors 82.

That is, in any cases, the radial height of the protrusions 142 from the yoke 141 is set to be smaller than ½ of the radial thickness of the stator coil 51.

In addition, the protrusions 142 may be formed so as not to protrude radially outside an imaginary circle whose center is on the central axis of the rotating shaft 11 and which extends through the radial center position of each of the straight portions 83 of the electrical conductors 82 which radially adjoin the yoke 141.

With the above configuration, the radial height of the protrusions 142 is limited so that the protrusions 142 do not function as stator teeth between the circumferentially-adjacent straight portions 83 of the electrical conductors 82. Consequently, it becomes possible to arrange the circumferentially-adjacent straight portions 83 of the electrical conductors 82 closer to one another than in the case of providing stator teeth between the circumferentially-adjacent straight portions 83. As a result, it becomes possible to increase the cross-sectional area of the conductor body 82a of each of the electrical conductors 82, thereby reducing the amount of heat generated with energization of the stator coil 51. Moreover, since no teeth are provided in the stator 50, it is possible to prevent occurrence of magnetic saturation in the stator core 52, thereby making it possible to increase the energization current of the stator coil 51. Further, since the cross-sectional area of the conductor body 82a of each of the electrical conductors 82 can be increased as described above, it is possible to suppress the amount of heat generated in the stator coil 51 from being increased with increase in the energization current of the stator coil 51.

In addition, in the stator coil 51, each of the turn portions 84 has part thereof radially offset to form an interference prevention part. With the interference prevention parts of the turn portions 84, it becomes possible to arrange the turn portions 84 radially away from each other. Consequently, it becomes possible to improve heat dissipation at the turn portions 84.

As above, it becomes possible to improve heat dissipation in the stator 50.

In addition, in the case of the yoke 141 of the stator core 52 being located radially away from the magnet unit 42 (i.e., the magnets 91 and 92) of the rotor 40 by a predetermined distance or more, the radial height of the protrusions 142 from the yoke 141 is not subjected to the parameter H1 shown in FIG. 25. More specifically, when the yoke 141 is radially away from the magnet unit 42 by 2 mm or more, the radial height of the protrusions 142 may be set to be larger than H1. For example, when the radial thickness of each of the straight portions 83 of the electrical conductors 82 is larger than 2 mm and each of the electrical conductor groups 81 consists of two or more radially-stacked electrical conductors 82, the protrusions 142 may be provided within a radial range from the yoke 141 to the radial center position of the second radially innermost electrical conductor 82 in each of the electrical conductor groups 81. In this case, setting the radial height of the protrusions 142 from the yoke 141 to be not larger than (H1×3/2), it is possible to achieve the above-described advantageous effects by increasing the cross-sectional area of the conductor body 82a of each of the electrical conductors 82.

Figure 26:
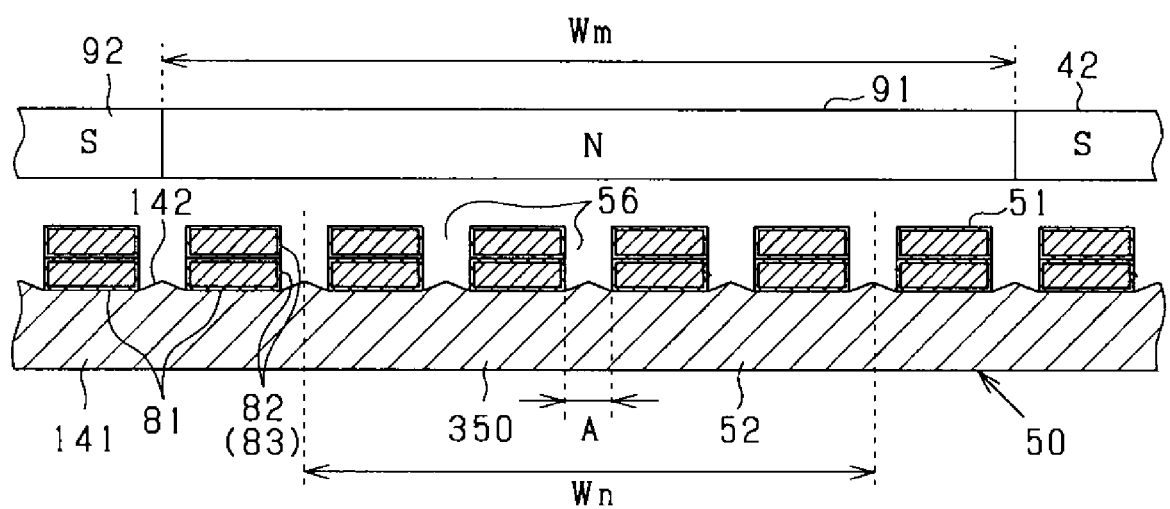
FIG. 26 is a schematic cross-sectional view illustrating another stator configuration according to the first modification of the first and second embodiments.

Alternatively, the stator core 52 may have a configuration as shown in FIG. 26. It should be noted that: the encapsulating resin 57 is omitted from FIG. 26; however, the encapsulating resin 57 may be included in the configuration shown in FIG. 26. In addition, in FIG. 26, for the sake of simplicity, both the magnet unit 42 and the stator core 52 are developed to be straight in shape.

In the configuration shown in FIG. 26, the stator 50 has, as inter-conductor members, protrusions 142 each being formed between one circumferentially-adjacent pair of the electrical conductor groups 81. The stator 50 also has a circumferentially-extending portion 350 that magnetically functions together with one magnetic pole (N or S pole) of the magnet unit 42 when the stator coil 51 is energized. The portion 350 has a circumferential length Wn.

The protrusions 142 are formed of such a magnetic material as to satisfy the following relationship:

$$Wt \times Bs \leq Wm \times Br \qquad (1)$$

where Wt is the total width of the protrusions 142 (i.e., the sum of circumferential widths of the protrusions 142) present in the circumferential range of Wn, Bs is the saturation flux density of the protrusions 142, Wm is the circumferential width of each magnetic pole of the magnet unit 42 and Br is the residual flux density of the magnet unit 42.

In addition, the circumferential range Wn is set to include a plurality of circumferentially-adjacent electrical conductor groups 81 whose energization periods overlap each other. The references (or boundaries) in setting the range Wn may be preferably set to the centers of the gaps 56 formed between the electrical conductor groups 81. For example, in the configuration shown in FIG. 26, the circumferential range Wn is set to include four electrical conductor groups 81 located closest to the magnetic pole center of an N pole in the circumferential direction. The ends (start and end points) of the range Wn are respectively set to the centers of two of all the gaps 56 formed between the electrical conductor groups 81.

Moreover, in the configuration shown in FIG. 26, at each end of the range Wn, half of one protrusion 142 is included in the range Wn. Therefore, it can be considered that in the range Wn, there are included a total of four protrusions 142. Accordingly, the total width Wt of the protrusions 142 included in the range Wn can be calculated as follows: Wt=1/2 A+A+A+A+1/2 A=4 A, where A is the circumferential width of each of the protrusions 142 (i.e., the circumferential width of each of the gaps 56 formed between the electrical conductor groups 81).

Specifically, in the present embodiment, the three-phase coils of the stator coil 51 are wound in a distributed winding manner. In the stator coil 51, the number of protrusions 142 (or the number of the gaps 56 formed between the electrical conductor groups 81) per magnetic pole of the magnet unit 42 is set to (number of phases×Q), where Q is the number of those of the electrical conductors 82 of each phase which are in contact with the stator core 52. In the case of the electrical conductors 82 being radially stacked to form the electrical conductor groups 81, Q is equal to the number of those electrical conductors 82 of the electrical conductor groups 81 of each phase which are located radially innermost in the electrical conductor groups 81. In this case, when the phase windings of the three-phase coils of the stator coil 51 are energized in a predetermined sequence, in each magnetic pole, the protrusions 142 corresponding to two phases are excited. Accordingly, in the range of each magnetic pole of the magnet unit 42, the total circumferential width Wt of the protrusions 142 that are excited by energization of the stator coil 51 is equal to (the number of excited phases×Q×A=2×2×A), where A is the circumferential width of each of the protrusions 142 (or the circumferential width of each of the gaps 56).

Moreover, upon specifying the total width Wt as above, in the stator core 52, the protrusions 142 are formed of such a magnetic material as to satisfy the above relationship (1). In addition, the total width Wt is also equal to the circumferential width of that portion in each magnetic pole whose relative permeability may become higher than 1. Moreover, giving a margin, the total width Wt may be determined to be the sum of circumferential widths of the protrusions 142 in each magnetic pole. More specifically, since the number of protrusions 142 per magnetic pole of the magnet unit 42 is equal to (the number of phases×Q), the total circumferential width Wt of the protrusions 142 in each magnetic pole may be determined to be (the number of phases×Q×A=3×2×A=6 A).

In addition, the distributed winding manner is such that there is one pole pair of the stator coil 51 per magnetic pole pair (i.e., per pair of N and S poles). One pole pair of the stator coil 51 is constituted of two straight portions 83 where electric currents respectively flow in opposite directions and which are electrically connected with each other via one turn portion 84, and the one turn portion 84. Satisfying the above condition, a short pitch winding may be regarded as being equivalent to a full pitch winding wound in the distributed winding manner.

Next, examples of the stator coil 51 being wound in a concentrated winding manner will be illustrated. The concentrated winding manner is such that the width of each magnetic pole pair is different from the width of each pole pair of the stator coil 51. The examples include an example where three electrical conductor groups 81 are provided with respect to each magnetic pole pair, an example where three electrical conductor groups 81 are provided with respect to two magnetic pole pairs, nine electrical conductor groups 81 are provided with respect to four magnetic pole pairs, and an example where nine electrical conductor groups 81 are provided with respect to five magnetic pole pairs.

In the case of the stator coil 51 being wound in the concentrated winding manner, when the phase windings of the three-phase coils of the stator coil 51 are energized in a predetermined sequence, two of the phase windings are excited at the same time. Consequently, the protrusions 142 corresponding to the two exited phase windings are also excited. Accordingly, in the range of each magnetic pole of the magnet unit 42, the total circumferential width Wt of the protrusions 142 that are excited by energization of the stator coil 51 is equal to (A×2). Moreover, upon specifying the total width Wt as above, in the stator core 52, the protrusions 142 are formed of such a magnetic material as to satisfy the above relationship (1).

In addition, in the case of the stator coil 51 being wound in the concentrated winding manner, the parameter A is represented by the sum of circumferential widths of the protrusions 142 in a region surrounded by the electrical conductor groups 81 of the same phase. Moreover, the parameter Wm is represented by (the entire circumference of the surface of the magnet unit 42 facing the air gap)×(the number of phases)±(the distribution number of the electrical conductor groups 81).

In the case of magnets whose BH products are higher than or equal to 20 [MGOe (KJ/m$^3$)], such as neodymium magnets, samarium-cobalt magnets or ferrite magnets, Bd is higher than or equal to 1.0 [T]. In the case of iron, Br is higher than or equal to 2 [T]. Therefore, in the case of the rotating electric machine 10 being configured as a high-output motor, in the stator core 52, the protrusions 142 may be formed of such a magnetic material as to satisfy the relationship of Wt<1/2×Wm.

Moreover, in the case of each of the electrical conductors 82 including an outer coat 182 as will be described later, the electrical conductors 82 may be arranged in the circumferential direction of the stator core 52 to have the outer coats 182 thereof in contact with one another. In this case, the parameter Wt may be considered to be equal to 0 or the sum of thicknesses of the outer coats 182 of two adjoining electrical conductors 82.

In the configurations shown in FIGS. 25 and 26, the inter-conductor members (i.e., the protrusions 142) are disproportionately small with respect to the magnet magnetic flux on the rotor 40 side. In addition, the rotor 40 is configured as a low-inductance and flat SPM motor; thus the rotor 30 has no saliency in terms of magnetic reluctance. With these configurations, it is possible to lower the inductance of the stator 50. Further, with reduction in the inductance of the stator 50, it is possible to suppress occurrence of magnetic flux distortion due to a switching-timing deviation in the stator coil 51. As a result, it is possible suppress occurrence of galvanic corrosion in the bearings 21 and 22.

[Second Modification of First and Second Embodiments]

Figure 27:
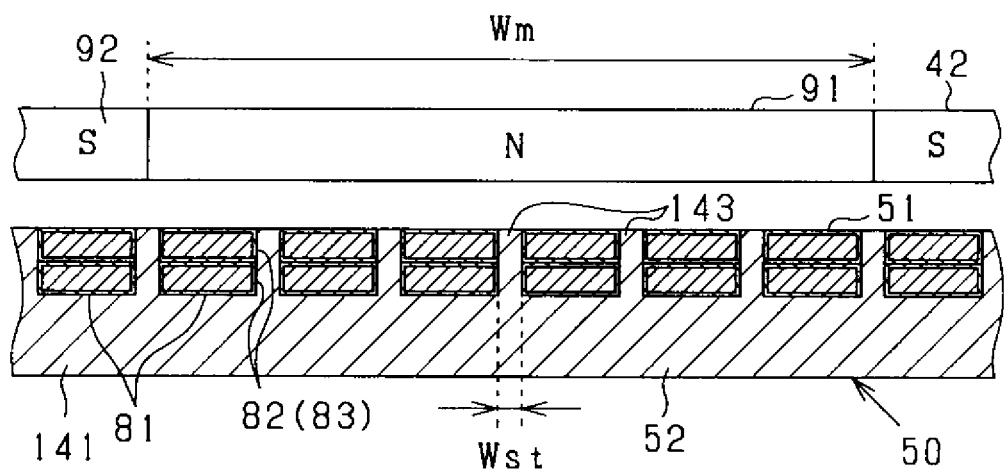
FIG. 27 is a schematic cross-sectional view illustrating a stator configuration according to a second modification of the first and second embodiments.

FIG. 27 shows another configuration of the stator 50 which employs inter-conductor members satisfying the above relationship (1).

Specifically, in the configuration of the stator 50 according to this modification, tooth-shaped portions 143 are provided, as inter-conductor members, on a radially outer periphery of the stator core 52. The tooth-shaped portions 143 each protrude radially outward from the yoke 141 and are arranged at predetermined intervals in the circumferential direction. The tooth-shaped portions 143 have a radial height equal to the radial thickness of the electrical conductor groups 81. Circumferential side surfaces of the tooth-portions 143 abut the electrical conductors 82 of the electrical conductor groups 81. Alternatively, there may be formed gaps between the tooth-shaped portions 143 and the electrical conductors 82 in the circumferential direction.

The tooth-shaped portions 143 are limited in circumferential width. That is, the tooth-shaped portions 143 are disproportionately thin with respect to the magnet magnetic flux. With this configuration, the tooth-shaped portions 143 can be reliably saturated by a magnet magnetic flux of 1.8 T or higher, thereby lowering the permeance and thus the inductance.

The magnetic flux on the magnet unit 42 side can be expressed as (Sm×Br), where Sm is the area of the stator-side magnetic flux acting surface per magnetic pole and Br is the residual flux density of the magnet unit 42. On the other hand, supposing that the tooth-shaped portions 143 corresponding to two phases are excited by energization of the stator coil 51 in each magnetic pole, then the magnetic flux on the stator 50 side can be expressed as (St×m×2×Bs), where St is the area of the rotor-side surface of each tooth-shaped portion 143 and m is the number of the electrical conductors 82 per phase. In this case, the inductance can be lowered by limiting the dimensions of the tooth-shaped portions 143 so as to satisfy the following relationship:

$$St \times m \times 2 \times Bs < Sm \times Br \quad (2)$$

In addition, in the case of the tooth-shaped portions 143 having the same axial dimension as the magnet unit 42, the above relationship (2) can be replaced with the following relationship:

$$Wst \times m \times 2 \times Bs < Wm \times Br \quad (3)$$

where Wm is the circumferential width of the magnet unit 42 per magnetic pole and Wst is the circumferential width of each tooth-shaped portion 143 (see FIG. 27).

More specifically, supposing that Bs=2 T, Br=1 T and m=2, the above relationship (3) can be reduced to the relationship of (Wst<Wm/8). In this case, the inductance can be lowered by setting the circumferential width Wst of each tooth-shaped portion 143 to be smaller than ⅛ of the circumferential width Wm of the magnet unit 42 per magnetic pole. In addition, in the case of m being equal to 1, the circumferential width Wst of each tooth-shaped portion 143 may be set to be smaller than ¼ of the circumferential width Wm of the magnet unit 42 per magnetic pole.

In addition, in the above relationship (3), (Wst×m×2) corresponds to the total circumferential width of the tooth-shaped portions 143 that are excited by energization of the stator coil 51 in the range of each magnetic pole of the magnet unit 42.

With the configuration of the stator 50 shown in FIG. 27, the inter-conductor members (tooth-shaped portions 143) are disproportionately small with respect to the magnet magnetic flux on the rotor 40 side. Consequently, it is possible to lower the inductance of the stator 50. Further, with reduction in the inductance of the stator 50, it is possible to suppress occurrence of magnetic flux distortion due to a switching-timing deviation in the stator coil 51. As a result, it is possible suppress occurrence of galvanic corrosion in the bearings 21 and 22.

[Third Modification of First and Second Embodiments]

In the above-described embodiments, the encapsulating member 57 is provided, on the radially outer side of the stator core 52, in a region covering all the electrical conductor groups 81, i.e., in a region whose radial thickness is larger than the radial thickness of each electrical conductor group 81.

Figure 28:
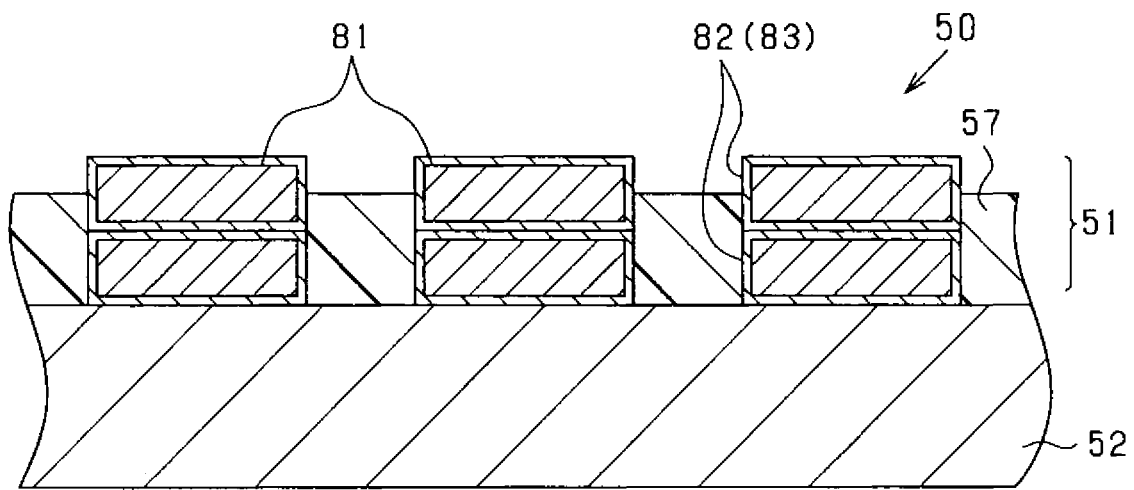
FIG. 28 is a schematic cross-sectional view illustrating a stator configuration according to a third modification of the first and second embodiments.

In contrast, in this modification, as shown in FIG. 28, the encapsulating member 57 is provided so that some of the electrical conductors 82 are partially exposed from the encapsulating member 57. More specifically, those of the electrical conductors 82 which are arranged radially outermost in the electrical conductor groups 81 are partially exposed, on the radially outer side (i.e., the rotor 40 side), from the encapsulating member 57. In this case, the radial thickness of the encapsulating member 57 may be set to be equal to or smaller than the radial thickness of each electrical conductor group 81.

[Fourth Modification of First and Second Embodiments]

Figure 29:
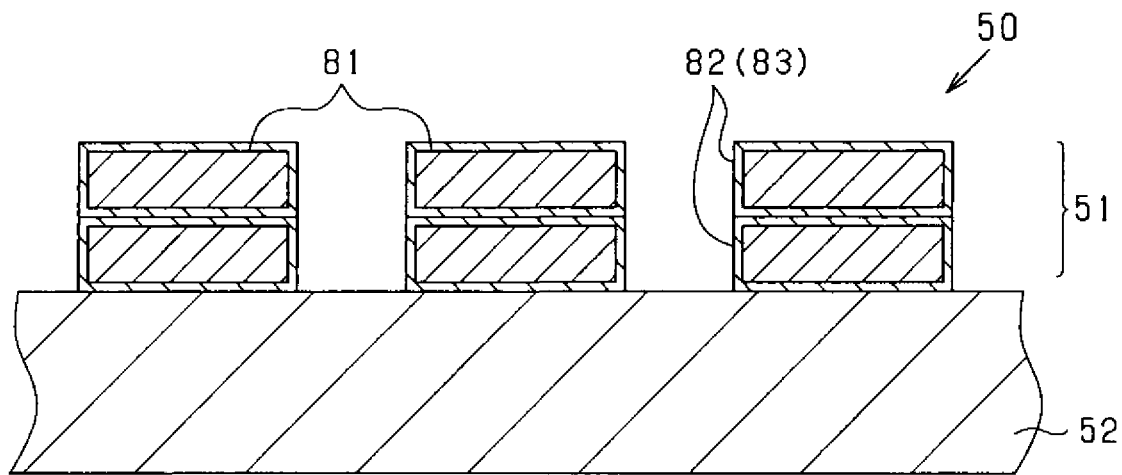
FIG. 29 is a schematic cross-sectional view illustrating a stator configuration according to a fourth modification of the first and second embodiments.

In this modification, as shown in FIG. 29, in the stator core 50, no encapsulating member 57 is provided to encapsulate the electrical conductor groups 81 therein. That is, no encapsulating member 57 is employed in the stator 50 to cover the stator coil 51. In this case, the gaps between the circumferentially-adjacent electrical conductor groups 81 are not occupied by any inter-conductor members, remaining void. In other words, no inter-conductor members are provided between the circumferentially-adjacent electrical conductor groups 81. In addition, air, which can be regarded as a nonmagnetic material or an equivalent of a nonmagnetic material (i.e., Bs=0), may be filled in the gaps.

[Fifth Modification of First and Second Embodiments]

In the case of forming the inter-conductor members in the stator 50 with a nonmagnetic material, the nonmagnetic material may be implemented by a non-resin material, for example a nonmagnetic metal material such as SUS 304 according to JIS which is an austenitic stainless steel.

[Sixth Modification of First and Second Embodiments]

The stator 50 may include no stator core 52. In this case, the stator 50 is configured with the stator coil 51 shown in FIG. 12. Moreover, the stator coil 51 may be encapsulated with an encapsulating material.

Alternatively, the stator 50 may include, instead of the stator core 52 formed of a soft-magnetic material, a stator coil holder that is annular in shape and formed of a non-magnetic material such as a synthetic resin.

[Seventh Modification of First and Second Embodiments]

In the first embodiment, the magnet unit 42 of the rotor 40 is configured with a plurality of magnets 91 and 92 arranged in the circumferential direction.

Figure 30:
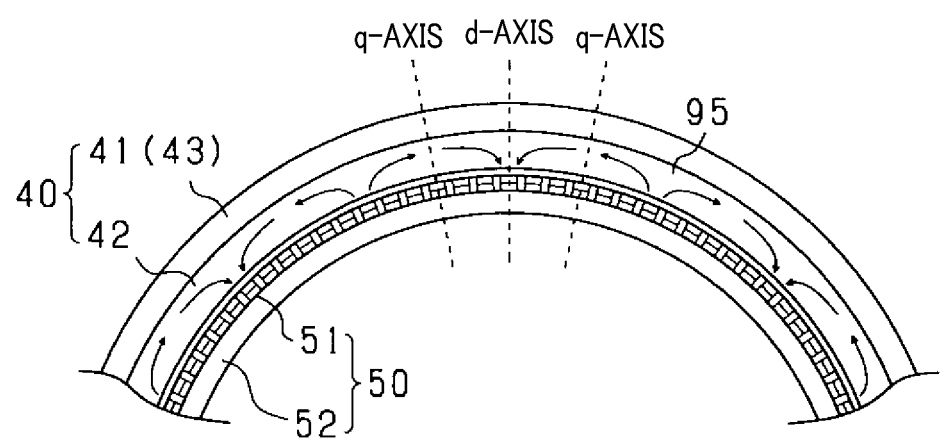
FIG. 30 is a transverse cross-sectional view of both a rotor and a stator according to a seventh modification of the first and second embodiments.

In contrast, in this modification, as shown in FIG. 30, the magnet unit 42 is configured with an annular permanent magnet 95 that is formed into one piece. The annular magnet 95 is fixed to the radially inner periphery of the cylindrical portion 43 of the magnet holder 41. In the annular magnet 95, there are formed a plurality of magnetic poles the polarities of which alternate between N and S in the circumferential direction. Moreover, both the d-axis and the q-axis are defined in the one-piece structured annular magnet 95. Furthermore, in the annular magnet 95, arc-shaped magnetic paths are formed such that the axis of easy magnetization is oriented in a radial direction at the d-axis in each of the magnetic poles, and oriented in the circumferential direction at the q-axis between each adjacent pair of the magnetic poles.

In addition, in the annular magnet 95, arc-shaped magnetic paths may be formed such that the axis of easy magnetization is oriented to be parallel to or near parallel to the d-axis in d-axis-side portions, and oriented to be perpendicular to or near perpendicular to the q-axis in q-axis-side portions.

[Eighth Modification of First and Second Embodiments]

In this medication, the control processes performed by the controller 110 are partially modified.

First, the processes performed by the operation signal generators 116 and 126 shown in FIG. 20 and the operation signal generators 130a and 130b shown in FIG. 21 will be described with reference to FIG. 31.

In addition, the processes performed by the operation signal generators 116, 126, 130a and 130b are basically the same; therefore, only the process performed by the operation signal generator 116 will be described hereinafter.

Figure 31:
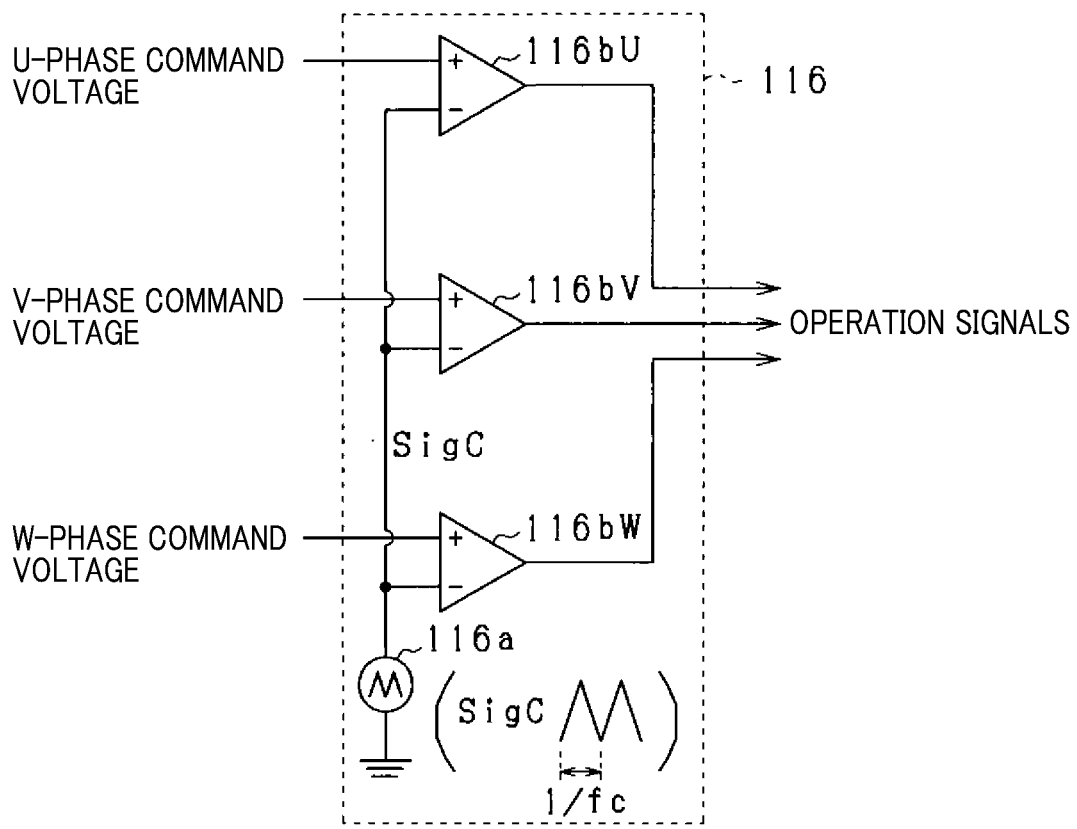
FIG. 31 is a functional block diagram illustrating part of a process performed by an operation signal generator according to an eighth modification of the first and second embodiments.

As shown in FIG. 31, the operation signal generator 116 includes a carrier signal generator 116a and U-phase, V-phase and W-phase comparators 116bU, 116bV and 116bW.

The carrier signal generator 116a generates and outputs a triangular-wave signal as a carrier signal SigC.

The carrier signal SigC generated by the carrier signal generator 116a is inputted to each of the U-phase, V-phase and W-phase comparators 116bU, 116bV and 116bW. Moreover, the U-phase, V-phase and W-phase command voltages calculated by the three-phase converter 115 are respectively inputted to the U-phase, V-phase and W-phase comparators 116bU, 116bV and 116bW. The U-phase, V-phase and W-phase command voltages are each in the form of a sine wave and offset in phase from each other by 120° in electrical angle.

The U-phase, V-phase and W-phase comparators 116bU, 116bV and 116bW generate, via a PWM (Pulse-Width Modulation) control based on comparison in amplitude between the U-phase, V-phase and W-phase command voltages and the carrier signal SigC, the operation signals for operating the upper-arm and lower-arm switches Sp and Sn of the U, V and W phases in the first inverter 101. More specifically, the U-phase, V-phase and W-phase comparators 116bU, 116bV and 116bW generate the operation signals for operating the upper-arm and lower-arm switches Sp and Sn of the U, V and W phases via the PWM control based on comparison in amplitude between signals, which are obtained by normalizing the U-phase, V-phase and W-phase command voltages with the power supply voltage, and the carrier signal SigC. Then, the driver 117 drives (i.e., turns on and off) the upper-arm and lower-arm switches Sp and Sn of the U, V and W phases in the first inverter 101 based on the operation signals generated by the U-phase, V-phase and W-phase comparators 116bU, 116bV and 116bW of the operation signal generator 116.

In the present modification, the controller 110 performs a process of variably setting the carrier frequency fc of the carrier signal SigC, i.e., variably setting the switching frequency of the switches Sp and Sn. Specifically, the carrier signal fc is variably set so as to be higher in a low-torque region or a high-rotation region of the rotating electric machine 10 and lower in a high-torque region of the rotating electric machine 10. Such a variable setting is performed for suppressing the controllability of electric current flowing in each phase winding from being lowered.

The inductance of the stator 50 can be lowered by employing a core-less (or tooth-less) structure for the stator 50. However, with the lowering of the inductance of the stator 50, the electrical time constant of the rotating electric machine 10 is accordingly lowered. Consequently, ripple of electric current flowing in each phase winding of the stator coil 51 may be increased to lower the controllability of the electric current, causing the electric current control to diverge. Moreover, the influence of the controllability drop may become more remarkable when the electric current (e.g., the effective value of the electric current) flowing in each phasing winding is within a low-current region than when the electric current is within a high-current region. To cope with this problem, in this modification, the controller 110 variably sets the carrier frequency fc.

Figure 32:
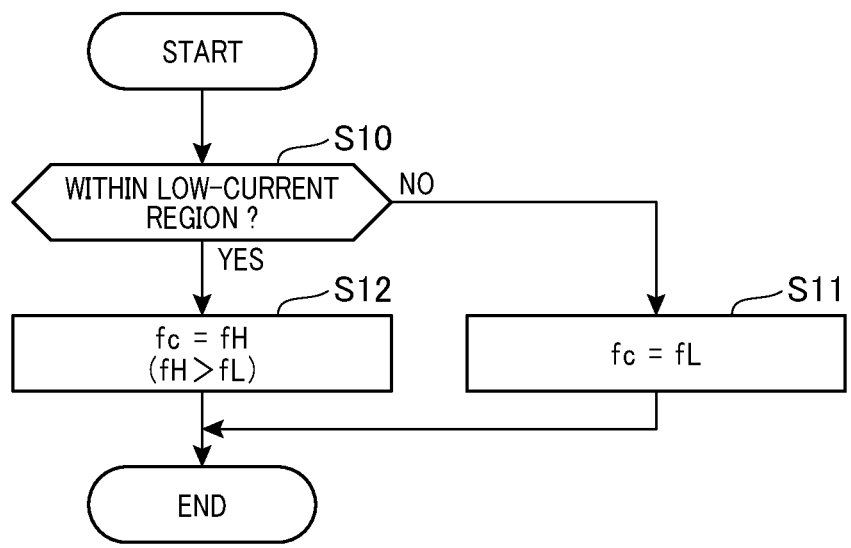
FIG. 32 is a flow chart illustrating a process of variably setting a carrier frequency according to the eighth modification of the first and second embodiments.

FIG. 32 shows the process of variably setting the carrier frequency fc. This process is repeatedly performed by the controller 110 in a predetermined control cycle.

First, in step S10, the controller 110 determines whether electric current flowing in each phase winding of the stator coil 51 is within the low-current region.

The determination in step S10 is made for determining whether the current torque of the rotating electric machine 10 is within the low-torque region. The determination in step S10 can be made using either of the following first and second methods.

(First Determination Method)

According to the first method, a torque estimation value of the rotating electric machine 10 is first calculated on the basis of the d-axis and q-axis currents obtained by the dq converter 112. Then, a determination is made as to whether the calculated torque estimation value is lower than a torque threshold value. If the determination results in a "YES" answer, i.e., if the calculated torque estimation value is lower than the torque threshold value, it is determined that the electric current flowing in each phase winding of the stator coil 51 is within the low-current region. In contrast, if the determination results in a "NO" answer, i.e., if the calculated torque estimation value is higher than or equal to the torque threshold value, it is determined that the electric current flowing in each phase winding of the stator coil 51 is within the high-current region. In addition, the torque threshold value may be set to, for example, ½ of a stating torque (or locked torque) of the rotating electric machine 10.

(Second Determination Method)

According to the second method, a determination is made as to whether the rotational speed of the rotor 40 is higher than or equal to a speed threshold value. Here, the rotational speed of the rotor 40 may be calculated on the basis of the rotation angle of the rotor 40 detected by the rotation angle detector. If the determination results in a "YES" answer, i.e., if the rotational speed of the rotor 40 is higher than or equal to the speed threshold value, it is determined that the rotational speed of the rotor 40 is within the high-rotation region, i.e., the electric current flowing in each phase winding of the stator coil 51 is within the low-current region. In contrast, if the determination results in a "NO" answer, i.e., if the rotational speed of the rotor 40 is lower than the speed threshold value, it is determined that the rotational speed of the rotor 40 is within a low-rotation region, i.e., the electric current flowing in each phase winding of the stator coil 51 is within the high-current region. In addition, the speed threshold value may be set to, for example, the rotational speed value at which the maximum torque of the rotating electric machine 10 becomes equal to the torque threshold value.

Referring back to FIG. 32, if the determination in step S10 results in a "NO" answer, i.e., if the electric current flowing in each phase winding of the stator coil 51 is within the high-current region, the process proceeds to step S11.

In step S11, the controller 110 sets the carrier signal fc to a first frequency fL. Then, the process terminates.

On the other hand, if the determination in step S10 results in a "YES" answer, i.e., if the electric current flowing in each phase winding of the stator coil 51 is within the low-current region, the process proceeds to step S12.

In step S12, the controller 110 sets the carrier signal fc to a second frequency fH that is higher than the first frequency fL. Then, the process terminates.

As described above, in the present modification, the carrier frequency fc is variably set so as to be higher when the electric current flowing in each phase winding of the stator coil 51 is within the low-current region than when the electric current is within the high-current region. Accordingly, the switching frequency of the switches Sp and Sn of the first and second inverters 101 and 102 is set to be higher when the electric current flowing in each phase winding of the stator coil 51 is within the low-current region than when the electric current is within the high-current region. Consequently, when the electric current flowing in each phase winding of the stator coil 51 is within the low-current region, it is possible to suppress increase in ripple of the electric current flowing in each phase winding of the stator coil 51, thereby suppressing the controllability of the electric current from being lowered.

On the other hand, when the electric current flowing in each phase winding of the stator coil 51 is within the high-current region, the amplitude of the electric current is higher than when the electric current is within the low-current region. Therefore, the increase in ripple of the electric current due to the lowering of the inductance affects the controllability of the electric current less. Accordingly, it is allowed to set the carrier frequency fc to be lower when the electric current flowing in each phase winding of the stator coil 51 is within the high-current region than when the electric current is within the low-current region, thereby reducing switching loss in the first and second inverters 101 and 102.

Moreover, the following further modifications may be made in addition to the present modification.

(1) In the process shown in FIG. 32, in the case of the carrier frequency fc having been set to the first frequency fL, when the determination in step S10 results in a "YES" answer, the carrier frequency fc may be gradually increased from the first frequency fL to the second frequency fH.

In contrast, in the case of the carrier frequency fc having been set to the second frequency fH, when the determination in step S10 results in a "NO" answer, the carrier frequency fc may be gradually decreased from the second frequency fH to the first frequency fL.

(2) The operation signals for operating the switches Sp and Sn of the first and second inverters 101 and 102 may be generated via a SVM (Space Vector Modulation) control instead of the PWM control. In this case, it is also possible to apply the above-described process of variably setting the carrier frequency fc.

[Ninth Modification of First and Second Embodiments]

In the above-described embodiments, there are provided two pairs of electrical conductors per phase, which constitute the electrical conductor groups 81. Moreover, as shown in FIG. 33A, first and second electrical conductors 88a and 88b, each of which consists of one pair of electric conductors, are connected in parallel with each other.

Figures 33A, 33B, 33C:
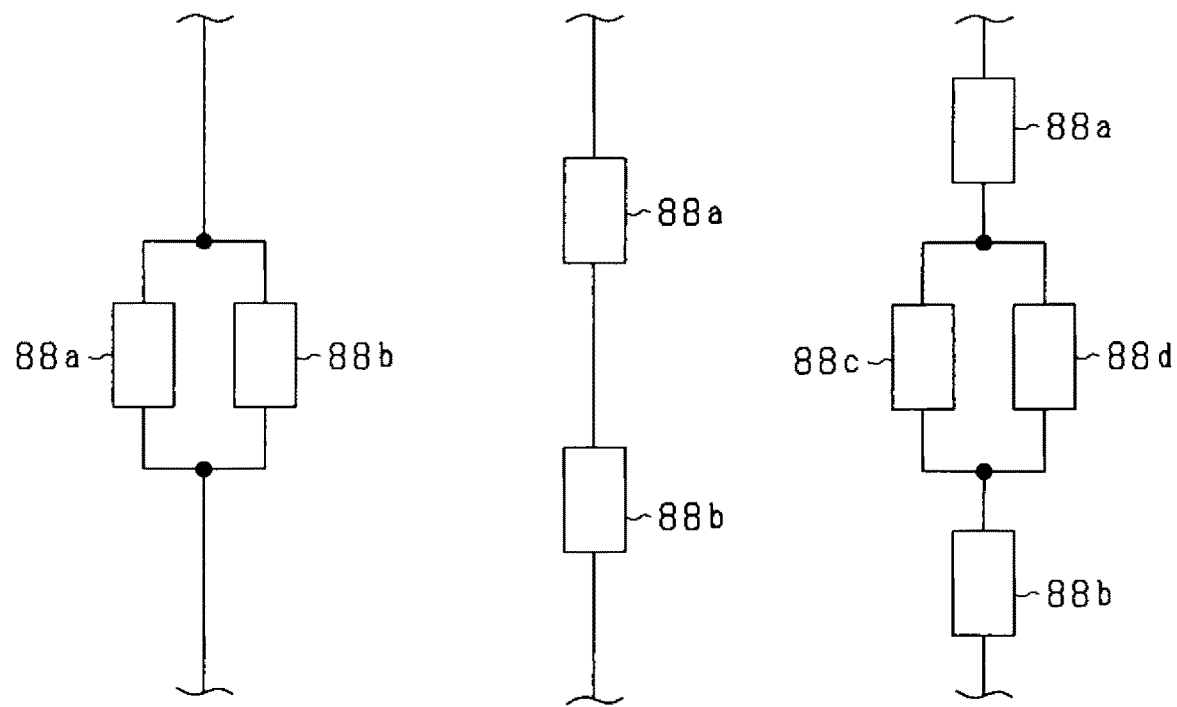
FIG. 33A is a schematic view illustrating a manner of connecting electrical conductors according to the first and second embodiments.
FIG. 33B is a schematic view illustrating a manner of connecting electrical conductors according to a ninth modification of the first and second embodiments.
FIG. 33C is a schematic view illustrating another manner of connecting electrical conductors according to the ninth modification of the first and second embodiments.

As an alternative, as shown in FIG. 33B, the first and second electrical conductors 88a and 88b may be connected in series with each other.

Figure 34:
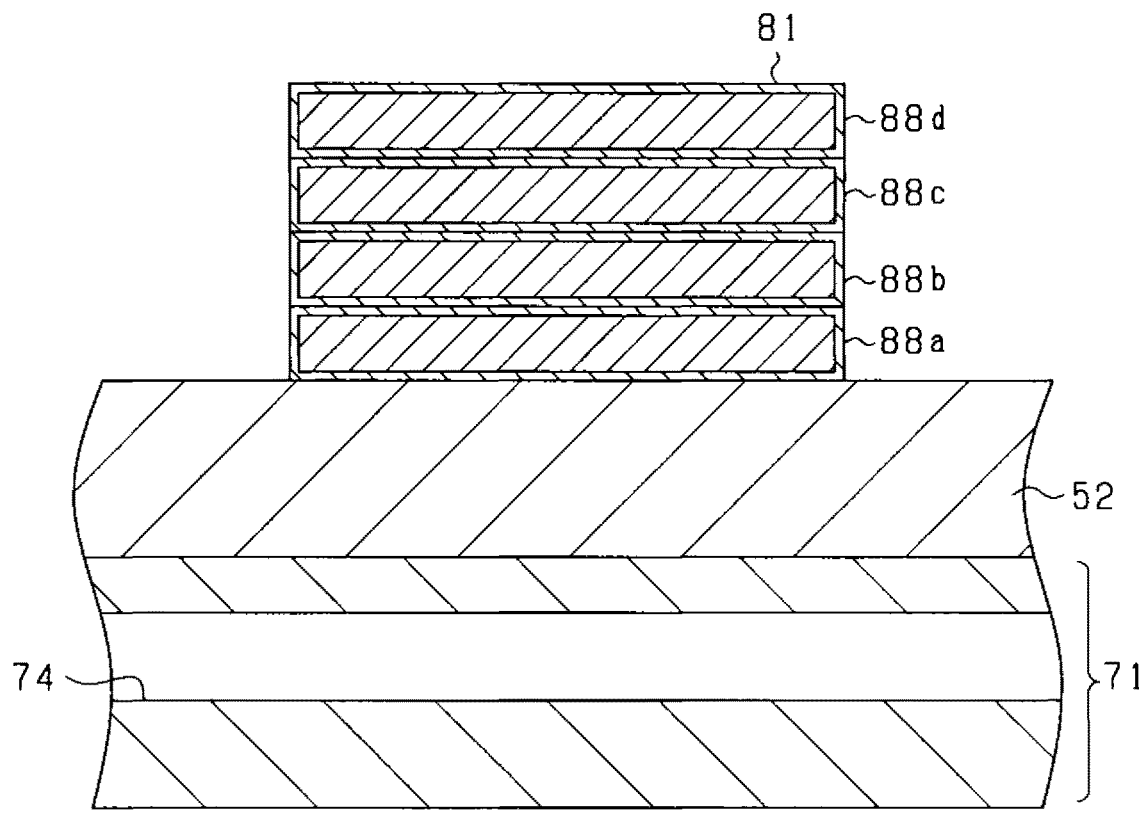
FIG. 34 is a schematic cross-sectional view illustrating a manner of radially stacking electrical conductors according to the ninth modification of the first and second embodiments.

As another alternative, three or more pairs of multi-layer electrical conductors may be radially stacked. For example, as shown in FIG. 34, first, second, third and fourth electrical conductors 88a, 88b, 88c and 88d, each of which consists of one pair of electric conductors, are radially stacked. More specifically, the first, second, third and fourth electrical conductors 88a, 88b, 88c and 88d are radially stacked in this order from the radially inner side (i.e., the stator core 52 side) so as to be in radial alignment with each other.

Moreover, as shown in FIG. 33C, the third and fourth electrical conductors 88c and 88d may be connected in parallel with each other to form a parallel-connected electric conductor pair; further, the first and second electrical conductors 88a and 88b may be respectively connected to opposite ends of the parallel-connected electric conductor pair. With the parallel connection, it is possible to lower the electric current density of the third and fourth electrical conductors 88c and 88d, thereby reducing heat generated in these electrical conductors 88c and 88d during energization thereof.

Furthermore, as shown in FIG. 34, in the rotating electric machine 10 where the stator core 52 is assembled to the casing 64 of the unit base 61 which has the cooling water passage 74 formed therein, the first and second electrical conductors 88a and 88b, which are not connected in parallel, are located closer than the parallel-connected third and fourth electrical conductors 88c and 88d to the stator core 52. Consequently, it becomes possible to equalize the cooling performances of the multi-layer structured electrical conductors 88a-88d.

In addition, the radial thickness of the electrical conductor groups 81, which are constituted of the electrical conductors 88a-88d, may be set to be smaller than the circumferential width per phase in each magnetic pole.

[Tenth Modification of First and Second Embodiments]

In the above-described embodiments, the rotating electric machine 10 is configured to have the outer rotor structure such that in the housing 30, the rotor 40 is arranged radially outside the stator 50.

Alternatively, the rotating electric machine 10 may be configured to have an inner rotor structure such that in the housing 30, the rotor 40 is arranged radially inside the stator 50. Moreover, in this case, the inverter unit 60 may be provided at either or both of axial ends of the rotor 40 and the stator 50.

Figure 35:
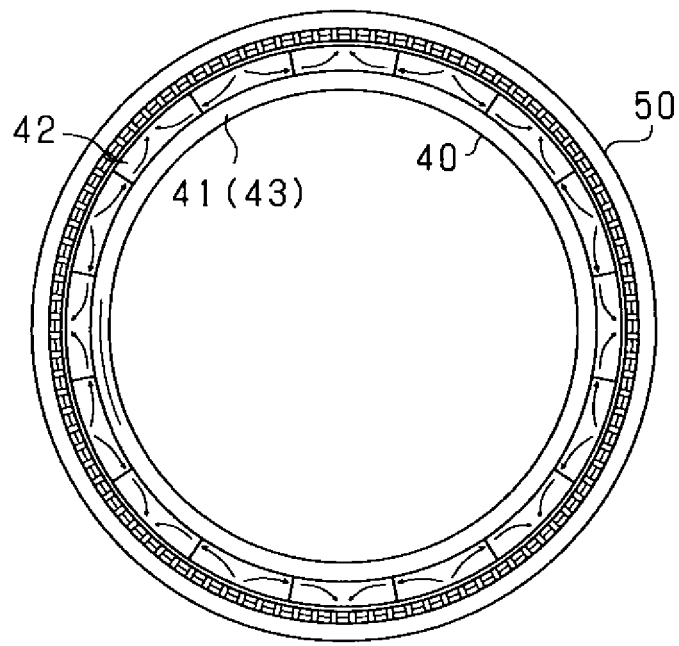
FIG. 35 is a transverse cross-sectional view of both a rotor and a stator of an inner rotor type rotating electric machine according to a tenth modification of the first and second embodiments.
Figure 36:
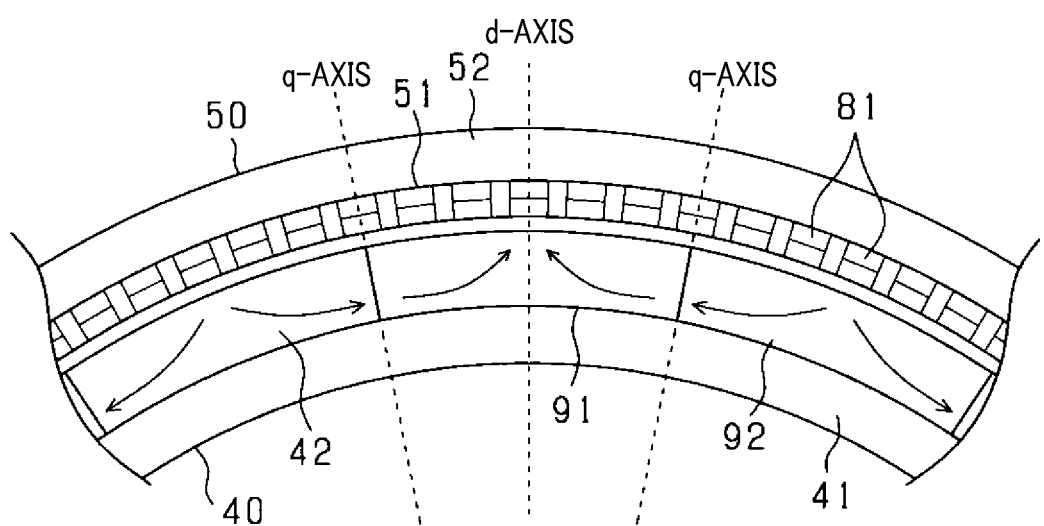
FIG. 36 is an enlarged view of part of FIG. 35.

FIG. 35 is a transverse cross-sectional view of both the rotor 40 and the stator 50 of an inner rotor type rotating electric machine 10 according to the tenth modification. FIG. 36 is an enlarged view of part of FIG. 35.

The configuration of the inner rotor type rotating electric machine 10 shown in FIGS. 35 and 36 is identical to the configuration of the outer rotor type rotating electric machine 10 shown in FIGS. 8 and 9 except for the radial positional relationship between the rotor 40 and the stator 50.

Specifically, in the inner rotor type rotating electric machine 10 according to the present modification, the stator 50 includes a stator coil 51 having a flat conductor structure, and a tooth-less stator core 52. The stator coil 51 is assembled to the radially inner periphery (i.e., the rotor 40-side periphery) of the stator core 52.

Moreover, the stator 50 may have any of the following configurations (A)-(C).

(A) In the stator 50, inter-conductor members are provided between the circumferentially adjacent electrical conductor groups 81. The inter-conductor members are formed of such a magnetic material as to satisfy the following relationship: Wt×Bs≤Wm×Br, where Wt is the total circumferential width of the inter-conductor members in each magnetic pole, Bs is the saturation flux density of the inter-conductor members, Wm is the circumferential width of each magnetic pole of the magnet unit 42 and Br is the residual flux density of the magnet unit 42.

(B) In the stator 50, inter-conductor members are provided between the circumferentially adjacent electrical conductor groups 81. The inter-conductor members are formed of a nonmagnetic material.

(C) In the stator 50, no inter-conductor members are provided between the circumferentially adjacent electrical conductor groups 81.

In the inner rotor type rotating electric machine 10 according to the present modification, the magnet unit 42 of the rotor 40 is constituted of magnets 91 and 92 where axes of easy magnetization are oriented as described in the previous embodiments. In addition, the magnet unit 42 may alternatively be constituted of an annular magnet 95 as shown in FIG. 30.

Figure 37:
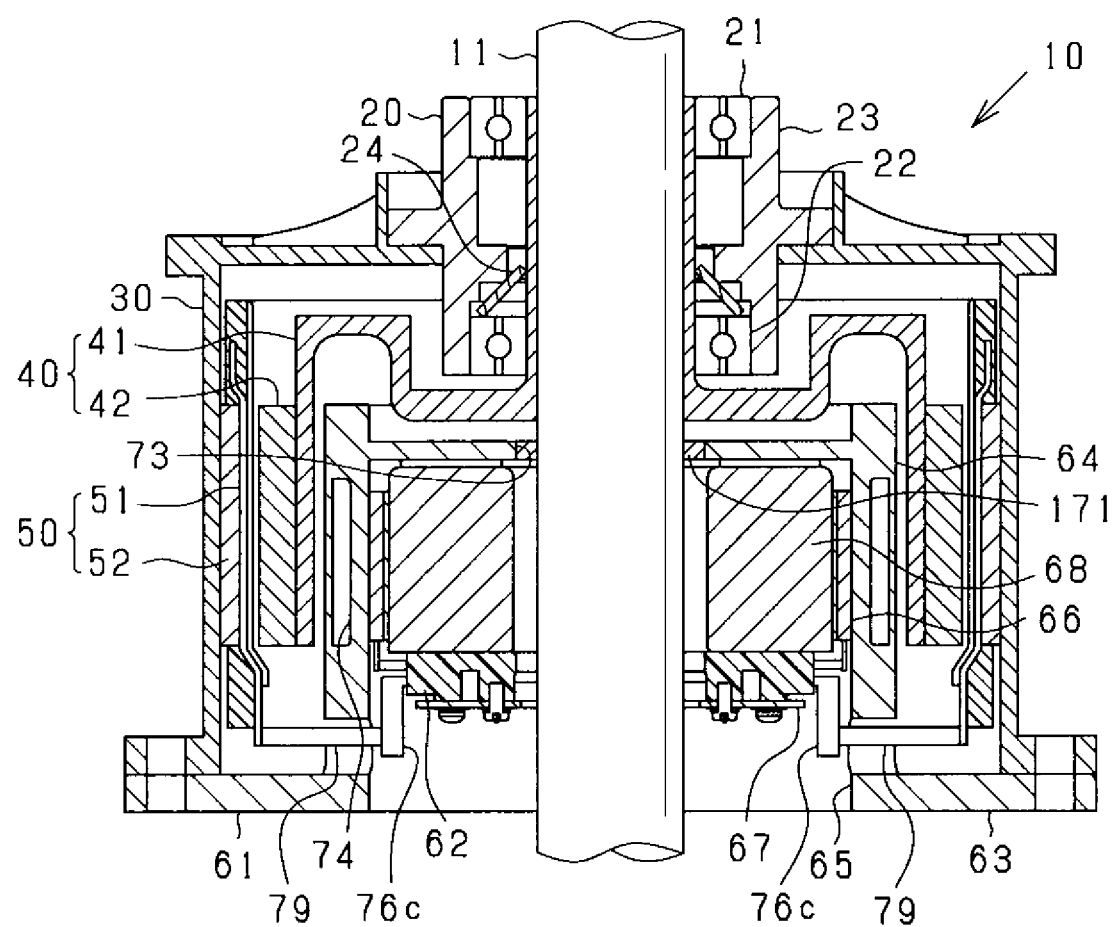
FIG. 37 is a longitudinal cross-sectional view of the inner rotor type rotating electric machine according to the tenth modification of the first and second embodiments.

FIG. 37 is a longitudinal cross-sectional view of the inner rotor type rotating electric machine 10 according to the present modification.

As shown in FIG. 37, in the inner rotor type rotating electric machine 10, the annular stator 50 is fixed to the radially inner periphery of the housing 30. The rotor 40 is rotatably provided radially inside the stator 50 so as to radially face the stator 50 with a predetermined air gap formed therebetween. The rotor 40 is supported in a cantilever fashion via the bearings 21 and 22 that are arranged on one axial side of the axially center position of the rotor 40. The inverter unit 60 is provided radially inside the magnet holder 41 of the rotor 40.

Figure 38:
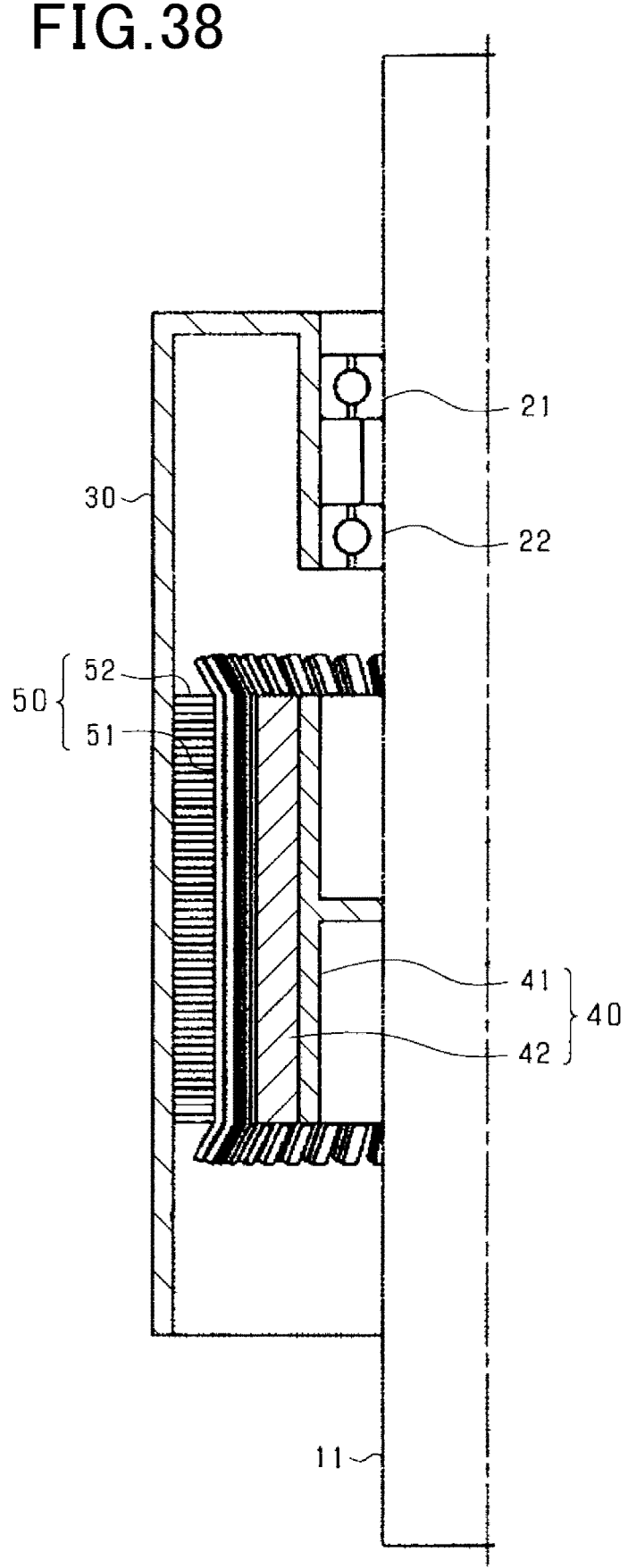
FIG. 38 is a schematic longitudinal cross-sectional view illustrating an alternative configuration of the inner rotor type rotating electric machine.

FIG. 38 shows an alternative configuration of the inner rotor type rotating electric machine 10. In this configuration, in the housing 30, the rotating shaft 11 is rotatably supported directly by the bearings 21 and 22. The rotor 40 is fixed on the rotating shaft 11 so as to rotate together with the rotating shaft 11. The bearings 21 and 22 are arranged on one axial side of the axially center position of the rotor 40. The rotor 40 includes the magnet holder 41 and the magnet unit 42.

The configuration shown in FIG. 38 differs from the configuration shown in FIG. 37 in that no inverter unit 60 is provided radially inside the rotor 40. The magnet holder 41 is located radially inside the magnet unit 42 and connected to the rotating shaft 11. The stator 50 includes the stator coil 51 and the stator core 52. The stator 50 is mounted to the housing 30.

[Eleventh Modification of First and Second Embodiments]

Figure 39:
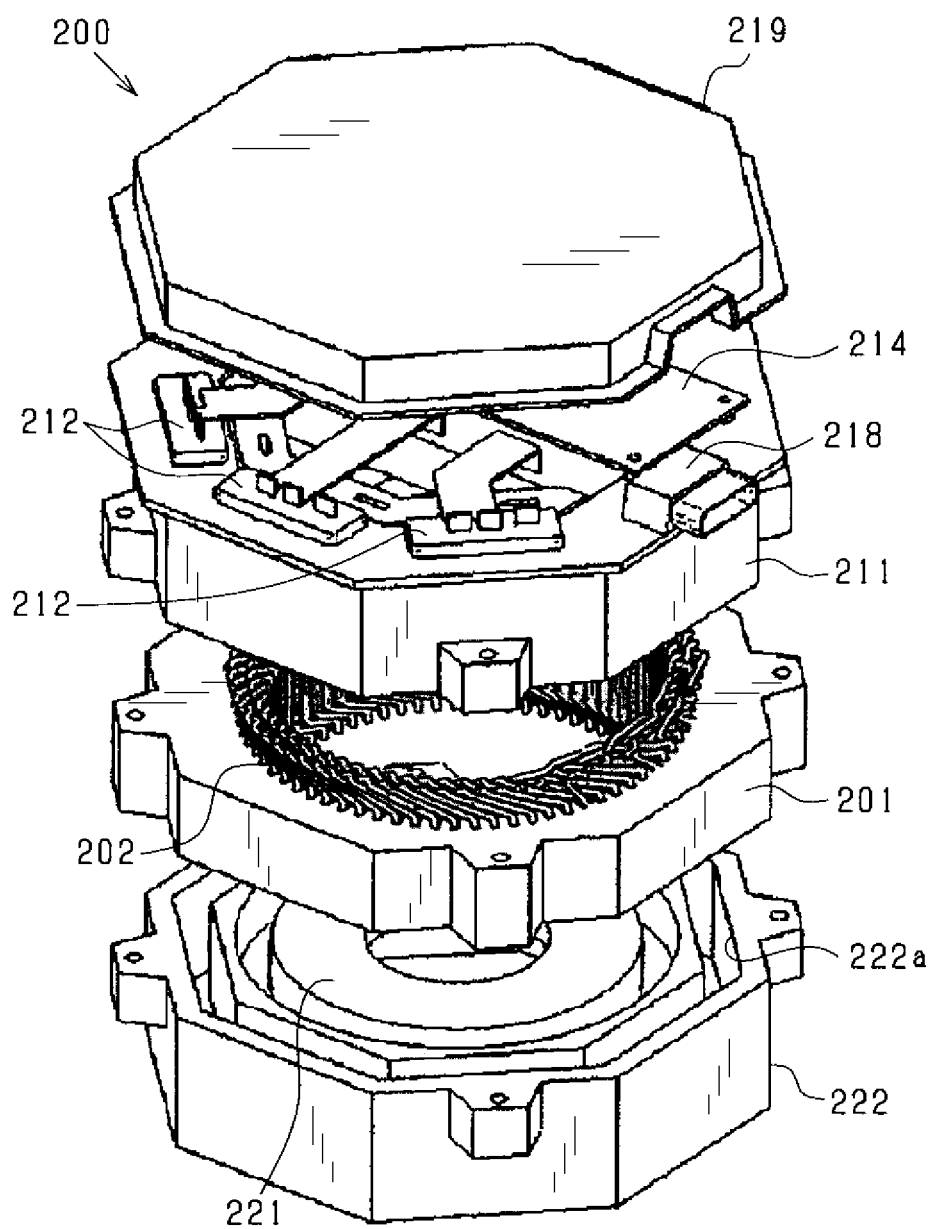
FIG. 39 is an exploded perspective view of an inner rotor type rotating electric machine according to an eleventh modification of the first and second embodiments.
Figure 40:
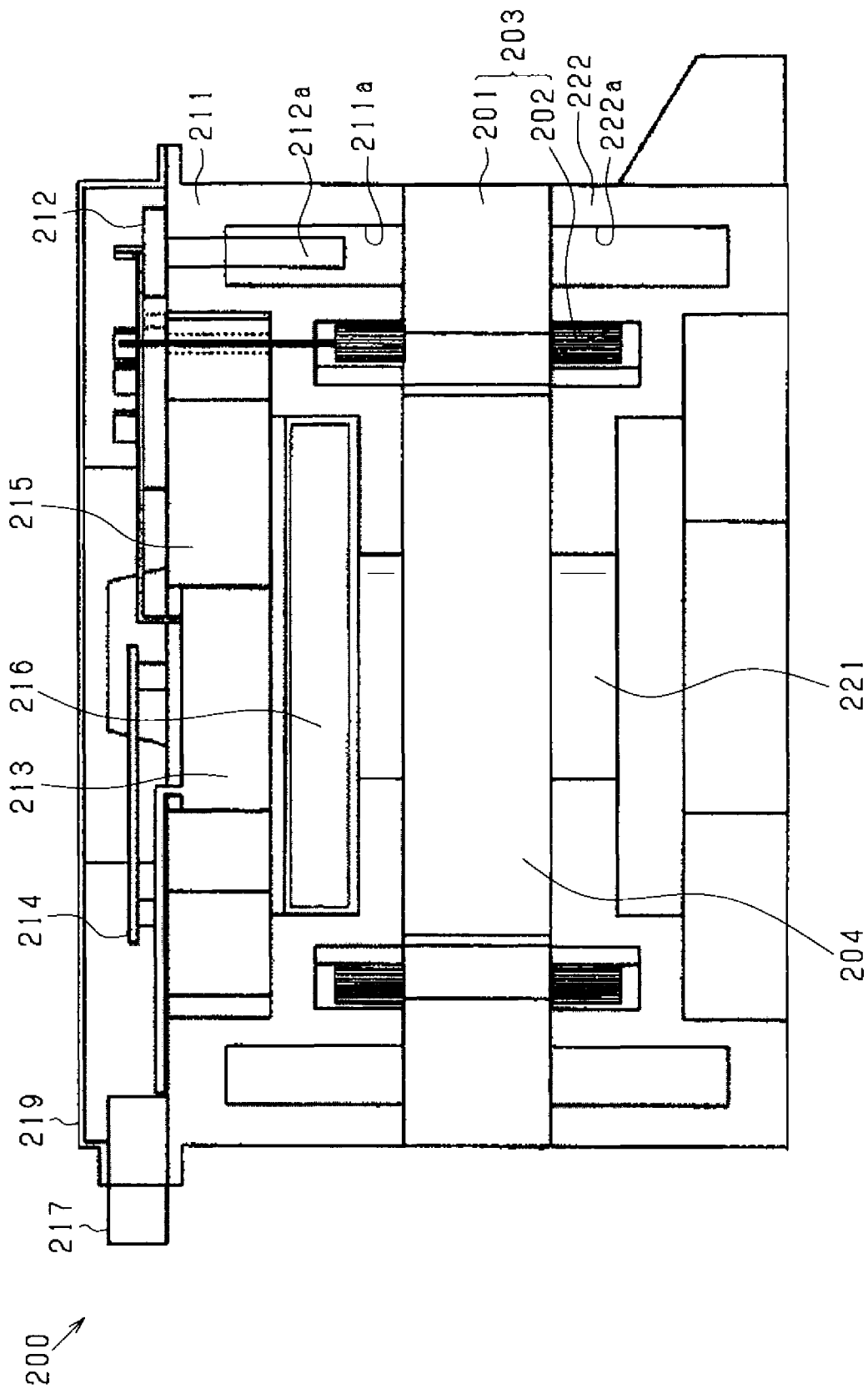
FIG. 40 is a schematic cross-sectional view illustrating the configuration of the inner rotor type rotating electric machine according to the eleventh modification of the first and second embodiments.

FIG. 39 is an exploded perspective view of an inner rotor type rotating electric machine 200 according to the eleventh modification. FIG. 40 is a schematic cross-sectional view illustrating the configuration of the inner rotor type rotating electric machine 200.

As shown in FIGS. 39 and 40, the rotating electric machine 200 includes a stator 203, which includes an annular stator core 201 and a multi-phase stator coil 202, and a rotor 204 that is rotatably disposed radially inside the stator core 201. The stator 203 functions as an armature while the rotor 204 functions as a field.

The stator core 201 is formed by laminating a plurality of silicon steel sheets. The stator coil 202 is mounted to the stator core 201.

The rotor 204 includes, though not shown in the figures, a rotor core and a magnet unit constituted of a plurality of permanent magnets. In the rotor core, there are formed a plurality of magnet insertion holes at equal intervals in the circumferential direction. In each of the magnet insertion holes, there is inserted one of the permanent magnets. The permanent magnets are magnetized so that the magnetization directions of adjacent magnetic poles alternately change.

In addition, the arrangement of the permanent magnets may be the same as or similar to the Halbach array shown in FIG. 23. Alternatively, the permanent magnets may have polar anisotropic characteristics as shown in FIG. 9 or FIG. 30; the polar anisotropic characteristics are such that the magnetization direction extends in an arc shape between the d-axis at the center of each of the magnetic poles and the q-axis at the boundary between each adjacent pair of the magnetic poles.

The stator 203 may have any of the following configurations (A)-(C).

(A) In the stator 203, inter-conductor members are provided between the circumferentially adjacent electrical conductor units. The inter-conductor members are formed of such a magnetic material as to satisfy the following relationship: Wt×Bs≤Wm×Br, where Wt is the total circumferential width of the inter-conductor members in each magnetic pole, Bs is the saturation flux density of the inter-conductor members, Wm is the circumferential width of each magnetic pole of the magnet unit and Br is the residual flux density of the magnet unit.

(B) In the stator 203, inter-conductor members are provided between the circumferentially adjacent electrical conductor units. The inter-conductor members are formed of a nonmagnetic material.

(C) In the stator 203, no inter-conductor members are provided between the circumferentially adjacent electrical conductor units.

In the rotor 204, in the permanent magnets of the magnet unit, on the d-axis side, the axis of easy magnetization is oriented to be more parallel to the d-axis than on the q-axis side.

At one axial end of the rotating electric machine 200, there is arranged an annular inverter case 211 so that an axial end face (i.e., lower end face in FIG. 39) of the inverter case 211 abuts an axial end face (i.e., upper end face in FIG. 39) of the stator core 201. In the inverter case 211, there are provided: a plurality of power modules 212 forming an inverter circuit; a smoothing capacitor 213 for suppressing voltage/current ripple caused by switching operation of semiconductor switching elements; a control substrate 214 including a controller; current sensors 215 for detecting phase currents; and a resolver stator 216 that is a stator part of a resolver for detecting the rotational speed of the rotor 204. The power modules 212 include the respective semiconductor switching elements, which are implemented by, for example, IGBTs, and diodes.

On a peripheral portion of the inverter case 211, there are provided a power connector 217 connected to a DC circuit of a battery mounted on a vehicle, and a signal connector 218 used for exchange of various signals between the rotating electric machine 200 and a vehicle-side control apparatus. The inverter case 211 is covered by a top cover 219. DC power from the in-vehicle battery is inputted via the power connector 217, converted into AC power by the switching operation of the power modules 212, and supplied to phase windings of the stator coil 202.

On an opposite axial side of the stator core 201 to the inverter case 211, there are provided: a bearing unit 221 for rotatably supporting a rotating shaft of the rotor 204; and an annular rear case 222 that receives the bearing unit 221 therein. The bearing unit 221, which includes a pair of bearings, is arranged on one axial side of an axially center position of the rotor 204. It should be noted the bearing unit 221 may alternatively include a pair of bearings respectively arranged on opposite axial sides of the stator core 201 to rotatably support the rotating shaft. The rotating electric machine 200 is configured to be mounted to a mounting part (e.g., a gear case or transmission case) of the vehicle by bolt-fastening the rear case 222 to the mounting part.

In the inverter case 211, there is formed a coolant passage 211a through which a coolant flows. The coolant passage 211a is constituted of an annular recess that is formed in the axial end face (i.e., lower end face in FIG. 39) of the inverter case 211 and closed by the axial end face (i.e., upper end face in FIG. 39) of the stator core 201. Moreover, the coolant passage 211a is formed so as to surround a coil end part of the stator coil 202. Similarly, in the coolant passage 211a, there are inserted module cases 212a of the power modules 212. In the rear case 222, there is formed a coolant passage 222a so as to surround another coil end part of the stator coil 202. The coolant passage 222a is constituted of an annular recess that is formed in an axial end face (i.e., upper end face in FIG. 39) of the rear case 222 and closed by an axial end face (i.e., lower end face in FIG. 39) of the stator core 201.

[Twelfth Modification of First and Second Embodiments]

In the above-described embodiments and modifications, the rotating-field type rotating electric machines are illustrated. In contrast, this modification illustrates a rotating-armature type rotating electric machine 230.

Figure 41:
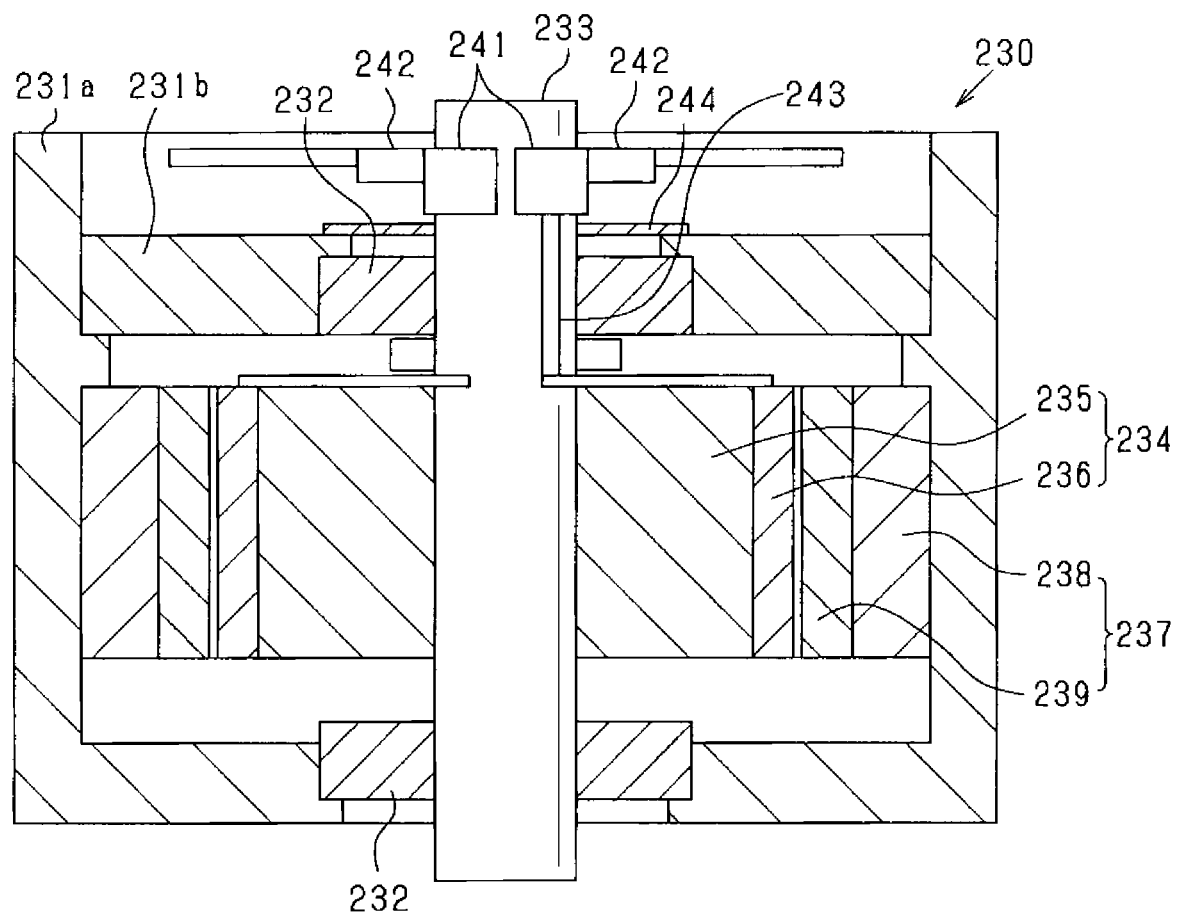
FIG. 41 is a schematic cross-sectional view illustrating the configuration of a rotating-armature type rotating electric machine according to a twelfth modification of the first and second embodiments.

FIG. 41 shows the configuration of the rotating-armature type rotating electric machine 230 according to the present modification.

In the rotating electric machine 230, each of housings 231a and 231b has one bearing 232 fixed thereto. A rotating shaft 233 is rotatably supported by the bearings 232. In addition, the bearings 232 may be implemented by, for example, oil-retaining bearings that are formed by impregnating oil into a porous metal.

On the rotating shaft 233, there is fixed a rotor 234 that functions as an armature. The rotor 234 includes a rotor core 235 and a multi-phase rotor coil 236 fixed to a radially outer periphery of the rotor core 235. In the rotor 234, the rotor core 235 has a slot-less structure and the rotor coil 236 has a flat conductor structure. That is, the rotor coil 236 has a flat structure such that each region per phase is longer in a circumferential direction than in a radial direction.

On a radially outer side of the rotor 234, there is provided a stator 237 that functions as a field. The stator 237 has a stator core 238 fixed to the housing 231a and a magnet unit 239 fixed to a radially inner periphery of the stator core 238. The magnet unit 239 is configured to include a plurality of magnetic poles the polarities of which alternate between N and S in the circumferential direction. In the magnet unit 239, on the d-axis side, the axis of easy magnetization is oriented to be more parallel to the d-axis than on the q-axis side. The magnet unit 239 includes sintered neodymium magnets whose intrinsic coercive force is higher than or equal to 400 [kA/m] and residual flux density is higher than or equal to 1.0 [T].

The rotating electric machine 230 according to the present modification is configured as a two-pole, three-coil, brushed and coreless motor. The rotor coil 236 is divided into three sub-coils, and the magnet unit 239 has two magnetic poles. In addition, brushed motors have, depending on the application, various ratios of the number of poles to the number of coils, such as 2:3, 4:10 and 4:21.

To the rotating shaft 233, there is also fixed a commutator 241. On the radially outer side of the commutator 241, there are arranged a plurality of brushes 242. The commutator 241 is electrically connected to the rotor coil 236 via electrical conductors 243 embedded in the rotating shaft 233. Consequently, DC current flows into and out of the rotor coil 236 via the commutator 241, the brushes 242 and the electrical conductors 243. The commutator 241 is circumferentially divided, according to the number of phases of the rotor coil 236, into a plurality of commutator segments. In addition, the brushes 242 may be electrically connected to a DC power supply (e.g., a storage battery) via electrical wiring or a terminal block.

On the rotating shaft 233, there is provided, as a seal member, a resin washer 244 between the commutator 241 and the bearing 232 which is fixed to the housing 231b. With the resin washer 244, oil seeping from the bearing 232, which is implemented by an oil-retaining bearing, is suppressed from flowing to the commutator 241 side.

[Thirteenth Modification of First and Second Embodiments]

In the rotating electric machine 10 according to the above-described embodiments, the electrical conductors 52 forming the stator coil 51 may be configured to have a plurality of insulating coats. For example, each of the electrical conductors 82 may be formed by bundling a plurality of wires each having an insulating coat into a wire bundle and then covering the wire bundle with an outer insulating coat. In this case, the insulating coats respectively covering the wires correspond to inner insulating coats with respect to the outer insulating coat covering the entire wire bundle. Moreover, it is preferable to configure the outer insulating coat to have higher insulating capability than the inner insulating coats. Specifically, the outer insulating coat may have a larger thickness than the inner insulating coats. For example, the thickness of the outer insulating coat may be set to 100 μm while the thickness of each of the inner insulating coats is set to 40 μm. Moreover, the outer insulating coat may be formed of material having lower permittivity than the inner insulating coats. That is, the insulating capability of the outer insulating coat may be set to be higher than the insulating capability of the inner insulating coats using at least one of the above methods. In addition, each of the wires may be formed of an aggregate of a plurality of electrically conductive bodies.

Setting the insulating capability of the outer insulating coat to be higher in each of the electrical conductors 82, the rotating electric machine 10 is made to be suitable for use in a high-voltage vehicular system. Moreover, it is possible to suitably drive the rotating electric machine 10 in a low-atmospheric pressure high-altitude area.

[Fourteenth Modification of First and Second Embodiments]

Figure 42:
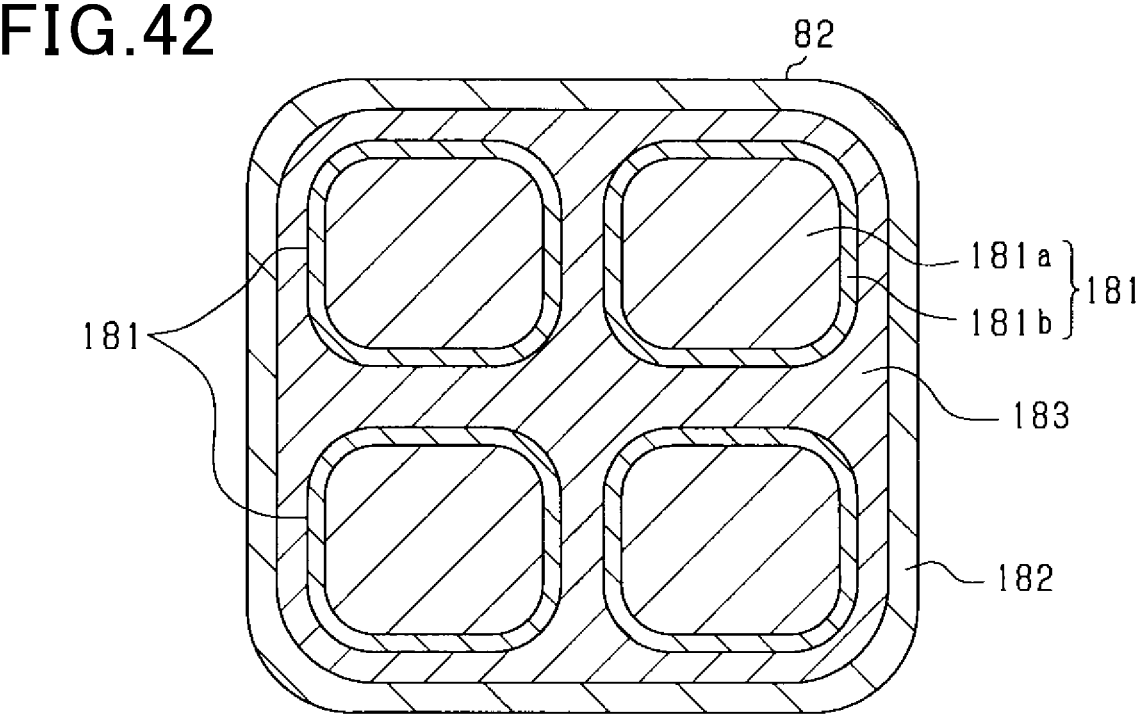
FIG. 42 is a schematic cross-sectional view illustrating the configuration of electrical conductors according to a fourteenth modification of the first and second embodiments.

FIG. 42 shows the configuration of electrical conductors 82 according to the fourteenth modification.

As shown in FIG. 42, in this modification, each of the electrical conductors 82 includes a plurality (e.g., four) of wires 181, a resin-made outer insulating coat 182 covering all of the plurality of wires 181, and an intermediate insulating coat 183 filled around each of the wires 181 within the outer insulating coat 182. Each of the wires 181 includes a wire body 181a formed of copper and an inner insulating coat 181b formed of an insulating material and covering the wire body 181a. In the stator coil, the inter-phase insulation is made by the outer insulating coats 182 of the electrical conductors 82. In addition, each of the wires 181 may be formed of an aggregate of a plurality of electrically conductive bodies.

In each of the electrical conductors 82, the intermediate insulating coat 183 has a coefficient of linear expansion higher than a coefficient of linear expansion of the inner insulating coats 181*b* of the wires 181 and lower than a coefficient of linear expansion of the outer insulating coat 182. That is, in each of the electrical conductors 82, the coefficient of linear expansion increases from the inner side to the outer side.

In general, the coefficient of linear expansion of the outer insulating coat 182 is higher than the coefficient of linear expansion of the inner insulating coats 181*b*. Interposing the intermediate insulating coat 183 between the inner insulating coats 181*b* and the outer insulating coat 182 and setting the coefficient of linear expansion of the intermediate insulating coat 183 as above, the intermediate insulating coat 183 can function as a cushion member to prevent the inner insulating coats 181*b* and the outer insulating coat 182 from being cracked as the same time.

In each of the electrical conductors 82, the inner insulating coat 181*b* is adhered to the wire body 181*a* in each of the wires 181 and the intermediate insulating coat 183 is adhered to both the inner insulating coats 181*b* of the wires 181 and the outer insulating coat 182. Moreover, in each of the electrical conductors 82, the adhesion strength decreases from the inner side to the outer side. Specifically, the adhesion strength between the wire body 181*a* and the inner insulating coat 181*b* in each of the wires 181 is higher than both the adhesion strength between the inner insulating coats 181*b* of the wires 181 and the intermediate insulating coat 183 and the adhesion strength between the intermediate insulating coat 183 and the outer insulating coat 182. Further, the adhesion strength between the inner insulating coats 181*b* of the wires 181 and the intermediate insulating coat 183 is higher than or equal to the adhesion strength between the intermediate insulating coat 183 and the outer insulating coat 182. In addition, the adhesion strength between two insulating coats can be determined based on the tensile strength required to tear them off from each other.

Setting the adhesion strengths in each of the conductors 82 as above, when a temperature difference between the inner and outer sides occurs due to heating or cooling, it is possible to prevent cracking from occurring on both the inner and outer sides.

In the rotating electric machine, heat generation and temperature change occur mainly as copper loss at the wire bodies 181*a* of the wires 181 in each of the electrical conductors 82 and iron loss in the core. That is, these two types of losses occur at the wire bodies 181*a* of the wires 181 in each of the electrical conductors 82 or outside the electrical conductors 82; there is no heat source in the intermediate insulating coats 183 of the electrical conductors 82. In this case, in each of the electrical conductors 82, with the adhesion strengths set as described above, the intermediate insulating coat 183 can function as a cushion member to prevent the inner insulating coats 181*b* of the wires 181 and the outer insulating coat 182 from being cracked as the same time. Therefore, the rotating electric machine can be suitably used in an environment where it is required to withstand great pressure and temperature changes, such as in a vehicle.

Each of the wires 181 may be enamel-coated. In this case, each of the wires 181 has the inner insulating coat 181*b* formed of a resin such as a PA, PI or PAI resin. The outer insulating coat 182, which is provided outside the wires 181, may also be formed of a resin such as a PA, PI or PAI resin. In this case, it is preferable for the outer insulating coat 182 to have a larger thickness than the inner insulating coats 181*b* of the wires 181. Consequently, it is possible to prevent the insulating coats from being damaged due to the difference in coefficients of linear expansion. On the other hand, in terms of improving the conductor density of the rotating electric machine, it is preferable to form the outer insulating coat 182 with a resin having lower permittivity than the PA, PI or PAI resin, such as a PPS, PEEK, fluorine, polycarbonate, silicone, epoxy, polyethylene naphthalate or LCP resin. In this case, with the smaller or same thickness of the outer insulating coat 182 in comparison with the case of using the PA, PI or PAI resin, it is possible to improve the insulating capability of the outer insulating coat 182, thereby improving the space factors of the electrical conductor units. In general, the aforementioned resins have higher insulating capability than enamel-formed insulating coats. As a matter of course, the permittivity may be degraded depending on the forming state and impurities. Among the aforementioned resins, a PPS or PEEK resin, whose coefficient of linear expansion is higher than those of enamel-formed insulating coats but lower than those of other resins, is particularly suitable for forming the outer insulating coat 18.

Moreover, it is preferable that the adhesion strengths between the two types of insulating coats (i.e., the intermediate insulating coat 183 and the outer insulating coat 182) provided outside the wires 181 and the enamel-formed insulating coats of the wires 181 are lower than the adhesion strength between the copper wire and the enamel-formed insulating coat in each of the wires 181. Consequently, it is possible to prevent the enamel-formed insulating coats of the wires 181 and the two types of insulating coats provided outside the wires 181 from being damaged at the same time.

In the case of a stator having a water-cooled, liquid-cooled or air-cooled structure, it is basically considered that thermal stress and/or impact stress act first on the outer insulating coat 182. However, even when the inner insulating coats 181*b* of the wires 181 are formed of a different resin from the two types of insulating coats (i.e., the intermediate insulating coat 183 and the outer insulating coat 182) provided outside the wires 181, it is possible to have portions of the wires 181 not adhered to the two types of insulating coats, thereby reducing the aforementioned thermal stress and/or impact stress. Specifically, the outer insulating coat 182 may be formed, using a fluorine, polycarbonate, silicone, epoxy, polyethylene naphthalate or LCP resin, outside the wires 181 with a void space provided between the wires 181 and the outer insulating coat 182. In this case, it is preferable to bond the outer insulating coat 182 and the inner insulating coats 181*b* of the wires 181 to each other using an adhesive which has low permittivity and low coefficient of linear expansion, such as an epoxy adhesive. In this case, it is possible to enhance the mechanical strength, prevent the inner and outer insulating coasts 181*b* and 182 from being damaged due to friction caused by vibration of the electrical conductor units and prevent the outer insulating coat 182 from being damaged due to the difference in coefficient of linear expansion between the outer insulating coat 182 and the inner insulating coats 181*b* of the wires 181.

In addition, in the step of fixing the electrical conductors 82 which is generally performed as a final insulation step of the manufacturing process of the stator, it is preferable to use a resin having excellent formability and similar properties (e.g., permittivity, coefficient of linear expansion, etc.) to the enamel-formed insulating coats, such as an epoxy, PPS, PEEK or LCP resin.

In general, resin potting is performed using a urethane or silicone resin. However, these resins have a coefficient of linear expansion considerably different from those of the other resins used; therefore thermal stress may be induced which may shear these resins. Therefore, these resins are not suitable for applications of 60V or higher on which strict insulation regulations are internationally imposed. In this regard, performing injection molding with an epoxy, PPS, PEEK or LCP resin as the final insulation step, it is possible to satisfy the above requirements.

[Other Modifications of First and Second Embodiments]

In addition to the first to the fourteenth modifications, the following modifications may also be made to the first and second embodiments.

(1) The radial distance DM from the armature-side circumferential surface of the magnet unit 42 to the central axis (or the axis of rotation) of the rotor may be set to be greater than or equal to 50 mm. More specifically, in the first embodiment, as shown in FIG. 4, the radial distance DM from the inner circumferential surface of the magnet unit 42 (i.e., the radially inner surfaces of the first and second magnets 91 and 92) to the central axis of the rotor 40 may be set to be greater than or equal to 50 mm.

(2) As slot-less rotating electric machines, small-scale rotating electric machines are known whose outputs are from several tens of watts to several hundreds of watts. However, the inventors of the present application have found no examples where large-scale rotating electric machines for industrial applications, whose outputs generally exceed 10 kW, employ a slot-less structure. Therefore, the inventors have investigated the reasons.

Recent mainstream rotating electric machines can be classified into the following four types: brushed motors, squirrel cage induction motors, permanent magnet synchronous motors and reluctance motors.

Brushed motors are supplied with exciting current via brushes. However, in the case of large-scale brushed motors, the size of brushes is large and maintenance is troublesome. Therefore, with remarkable developments in semiconductor technologies, large-scale brushed motors have been replaced with brushless motors such as induction motors. On the other hand, some of small-scale brushed motors employ a coreless structure due to low inertia and economic benefits.

Squirrel cage induction motors generate torque by having the magnetic field, which is created by a primary-side stator coil, received by a secondary-side rotor core and causing induced current to intensely flow to a squirrel cage-shaped electrical conductor to create a counteracting magnetic field. Therefore, configuring both the rotor and the stator to include no core is not necessarily beneficial in terms of minimization of the sizes and improvement of the efficiencies of squirrel cage induction motor.

Reluctance motors generate torque utilizing the reluctance change in a core. Therefore, in terms of basic principles, it is undesirable to eliminate the core.

Regarding permanent magnet synchronous motors, IPM (Interior Permanent Magnet) motors are the recent mainstream. Therefore, unless for special reasons, large-scale permanent magnet synchronous motors are IPM motors in most cases.

IPM motors can generate both magnet torque and reluctance torque. Moreover, IPM motors are operated with the ratio between the generated magnet and reluctance torques suitably adjusted by an inverter control. Therefore, IPM motors are small in size and superior in controllability.

Figure 43:
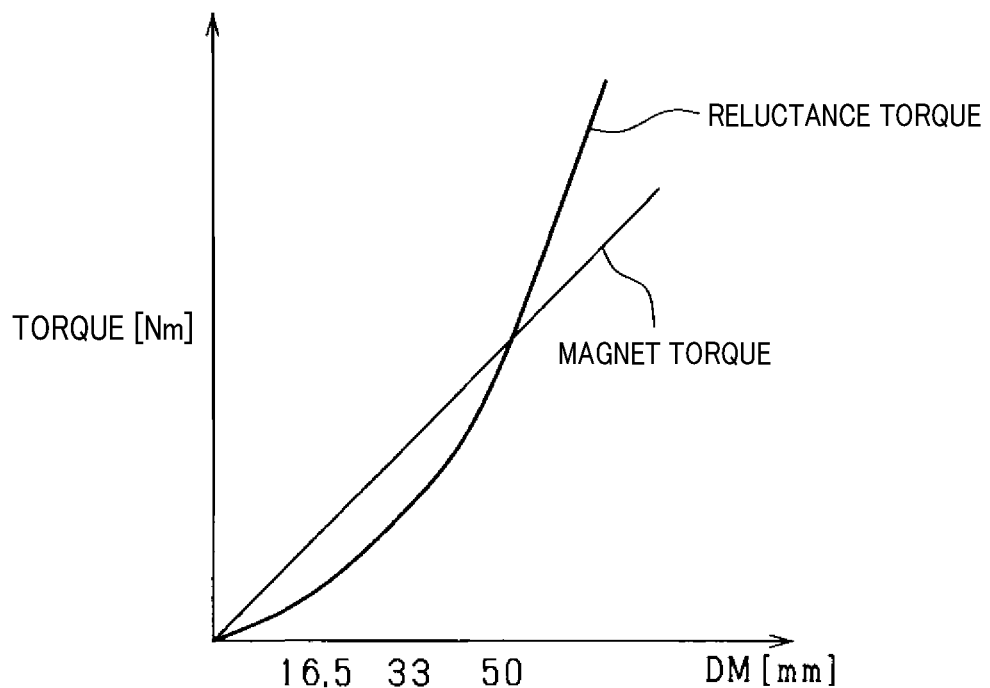
FIG. 43 is a graphical representation illustrating the relationships between reluctance torque, magnet torque and radial distance DM.

According to the analysis of the inventors of the present application, the relationships between magnet torque, reluctance torque and the radial distance DM from the armature-side circumferential surface of the magnet unit to the central axis of the rotor (i.e., the radius of the stator core in the case of the rotating electric machine being of inner rotor type) are as shown in FIG. 43.

The magnet torque has its potential determined by the strength of the magnetic field created by the permanent magnets as shown in the following (Equation 1). In contrast, the reluctance torque has its potential determined by the amplitudes of the inductances, in particular the amplitude of the q-axis inductance as shown in the following (Equation 2).

$$\text{Magnet torque} = k \times \Psi \times Iq \qquad \text{(Equation 1)}$$

$$\text{Reluctance torque} = k \times (Lq - Ld) \times Iq \times Id \qquad \text{(Equation 2)}$$

The strength of the magnetic field created by the permanent magnets, i.e., the amount of magnetic flux $\Psi$, is proportional to the total surface area of the permanent magnets facing the stator. In the case of the rotor being cylindrical in shape, the total surface area is represented by the surface area of the cylinder. Strictly speaking, due to the presence of N and S poles, the amount of magnetic flux $\Psi$ is proportional to half the surface area of the cylinder. Moreover, the surface area of the cylinder is proportional to both the radius of the cylinder and the axial length of the cylinder. That is, with the axial length of the cylinder being constant, the amount of magnetic flux $\Psi$ is proportional to the radius of the cylinder.

Figure 44:
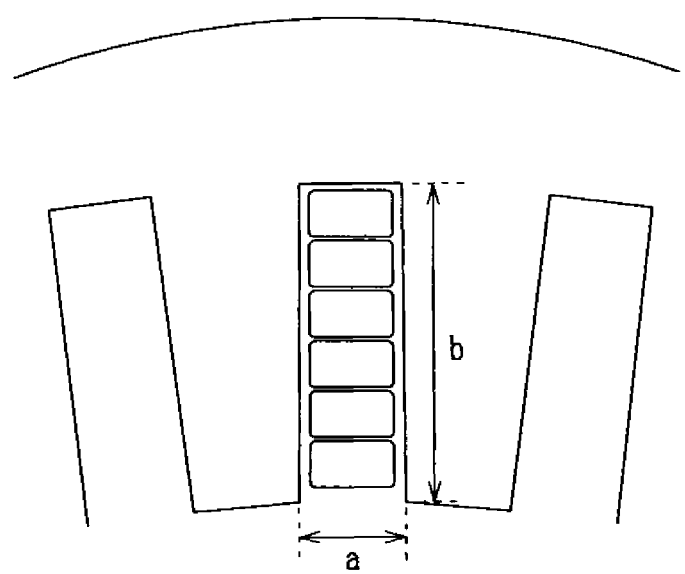
FIG. 44 is a schematic view illustrating the slot area of a stator.

On the other hand, the inductance Lq of the stator coil is dependent on, but less sensitive to the core shape. The inductance Lq is proportional to the square of the number of turns of the stator coil, i.e., highly dependent on the number of turns of the stator coil. Moreover, the inductance L can be determined by the following equation: $L = \mu \times N^2 \times S / \delta$, where $\mu$ is the permeability of the magnetic circuit, N is the number of turns, S is the cross-sectional area of the magnetic circuit and $\delta$ is the effective length of the magnetic circuit. The number of turns depends on the volume of the winding space. In the case of the rotating electric machine being a cylindrical motor, the number of turns depends on the winding space of the stator, i.e., depends on the slot area. As shown in FIG. 44, in the case of the slots having a substantially rectangular shape, the slot area is proportional to the product of the circumferential dimension a and the radial dimension b of each slot (i.e., a×b).

The circumferential dimension of each slot increases in proportion to the diameter of the cylinder. The radial dimension of each slot also increases in proportion to the diameter of the cylinder. Therefore, the slot area is proportional to the square of the diameter of the cylinder. Moreover, as can be seen from above (Equation 2), the reluctance torque is proportional to the square of the stator current. Therefore, the performance of the rotating electric machine depends on the amplitude of the stator current and thus on the slot area of the stator. As above, with the axial length of the cylinder being constant, the reluctance torque is proportional to the square of the diameter of the cylinder.

The relationships between the magnet torque, the reluctance torque and the radial distance DM are determined based on the above observations and shown in FIG. 43.

As can be seen from FIG. 23, the magnet torque linearly increases with the radial distance DM while the reluctance torque quadratically increases with the radial distance DM. When the radial distance DM is relatively small, the magnet torque is dominant. However, with increase in the radial distance DM, the reluctance torque becomes dominant.

The inventors have concluded that the intersection point between the magnet torque and the reluctance torque in FIG. 43 is in the vicinity of DM=50 mm under predetermined conditions. That is, in 10 kW-class electric motors where the stator core radius sufficiently exceeds 50 mm, the current mainstream is to utilize the reluctance torque; therefore, it is difficult to eliminate the core. This can be considered to be one of the reasons why the slot-less structure is not employed in large-scale rotating electric machines.

In the case of rotating electric machines including a stator core, magnetic saturation of the stator core is always a problem to be solved. In particular, in radial-gap type rotating electric machines, the rotating shaft has a longitudinal cross section which has one fan-shaped sector per magnetic pole. The magnetic path width decreases in a radially inward direction and the performance limit of the rotating electric machine is determined by the radially inner-side dimensions of the stator teeth forming the slots. Even when high-performance permanent magnets are employed, upon occurrence of magnetic saturation at radially inner portions of the stator teeth, it becomes impossible to sufficiently utilize the high performance of the permanent magnets. To prevent magnetic saturation from occurring at the radially inner portions of the stator teeth, it is necessary to increase the inner diameter of the stator core. However, with increase in the inner diameter of the stator core, the size of the entire rotating electric machine is increased.

For example, in a distributed-winding rotating electric machine which includes a three-phase coil, there are provided, for each magnetic pole, three to six teeth through which magnetic flux flows. However, magnetic flux tends to concentrate on those of the teeth located on the front side in the circumferential direction (or the rotational direction); i.e., magnetic flux is unevenly distributed to the three to six teeth. In this case, magnetic flux concentratedly flows to some (e.g., one or two) of the three to six teeth; with rotation of the rotor, the magnetically-saturated teeth also move in the circumferential direction, causing slot ripple to occur.

As above, in slot-less rotating electric machines where DM is greater than or equal to 50 mm, to prevent occurrence of magnetic saturation, it is desirable to eliminate teeth. However, when teeth are eliminated, magnetic reluctance of the magnetic circuit in the rotor and the stator may increase, thereby lowering the torque of the rotating electric machine. This is because without teeth, the air gap between the rotor and the stator may increase. Therefore, there is room to increase torque in slot-less rotating electric machines where DM is greater than or equal to 50 mm. Consequently, significant advantages can be achieved by applying the above-described torque-increasing configurations to slot-less rotating electric machines where DM is greater than or equal to 50 mm.

In addition, the radial distance DM from the armature-side circumferential surface of the magnet unit to the central axis of the rotor may be preferably set to be greater than or equal to 50 mm not only in outer rotor type rotating electric machines but also in inner rotor type rotating electric machines.

(3) In the stator coil 51 of the rotating electric machine 10, the straight portions 83 of the electrical conductors 82 may be arranged in a single layer in the radial direction. Otherwise, in the case of arranging the straight portions 83 of the electrical conductors 82 in a plurality of layers in the circumferential direction, the number of the layers may be set to any suitable number, such as 3, 4, 5 or 6.

(4) In the configuration shown in FIG. 2, the rotating shaft 11 protrudes to both axial sides of the rotating electric machine 10. As an alternative, the rotating shaft 11 may protrude to only one axial side of the rotating electric machine 10. For example, the rotating shaft 11 may have an end portion supported in a cantilever fashion by the bearing unit 20; the remainder of the rotating shaft 11 protrudes, on the opposite axial side of the bearing unit 20 to the inverter unit 60, axially outside the rotating electric machine 10. In this case, the rotating shaft 11 does not protrude inside the inverter unit 60. Consequently, the available internal space of the inverter unit 60, more specifically the available internal space of the cylindrical portion 71 is increased.

(5) In the rotating electric machine 10 according to the first embodiment, non-electrically conductive grease is used in the bearings 21 and 22. As an alternative, electrically conductive grease may be used in the bearings 21 and 22. For example, electrically conductive grease which contains metal particles or carbon particles may be used in the bearings 21 and 22.

(6) The rotating shaft 11 may be rotatably supported by bearings provided at two locations respectively on opposite axial sides of the rotor 40. More specifically, in the configuration shown in FIG. 1, the rotating shaft 11 may alternatively be rotatably supported by bearings provided at two locations respectively on opposite axial sides of the inverter unit 60.

(7) In the rotating electric machine 10 according to the first embodiment, the intermediate portion 45 of the magnet holder 41 of the rotor 40 has both the annular inner shoulder part 49a and the annular outer shoulder part 49b formed therein. As an alternative, the intermediate portion 45 may be flat plate-shaped without the shoulder parts 49a and 49b formed therein.

(8) In the rotating electric machine 10 according to the first embodiment, each of the electrical conductors 82 forming the stator coil 51 is constituted of a bundle of wires 86. As an alternative, each of the electrical conductors 82 may be constituted of a single wire having a rectangular, circular or elliptical cross-sectional shape.

(9) In the rotating electric machine 10 according to the first embodiment, the inverter unit 60 is provided radially inside the stator 50. As an alternative, the inverter unit 60 may not be provided radially inside the stator 50. In this case, the internal space of the stator 50, which was occupied by the inverter unit 60, may remain as a hollow space or be occupied by a different component from the inverter unit 60.

(10) In the rotating electric machine 10 according to the first embodiment, there is provided the housing 30 in which both the rotor 40 and the stator 50 are received. As an alternative, the housing 30 may be omitted from the configuration of the rotating electric machine 10. In this case, both the rotor 40 and the stator 50 may be held by a wheel or other vehicle components.

Third Embodiment

This embodiment illustrates a rotating electric machine 500 which is configured as an in-wheel motor that is incorporated in a wheel of a vehicle. In addition, the rotating electric machine 500 (i.e., in-wheel motor) according to the present embodiment can be regarded as a vehicular drive unit.

Figure 45:
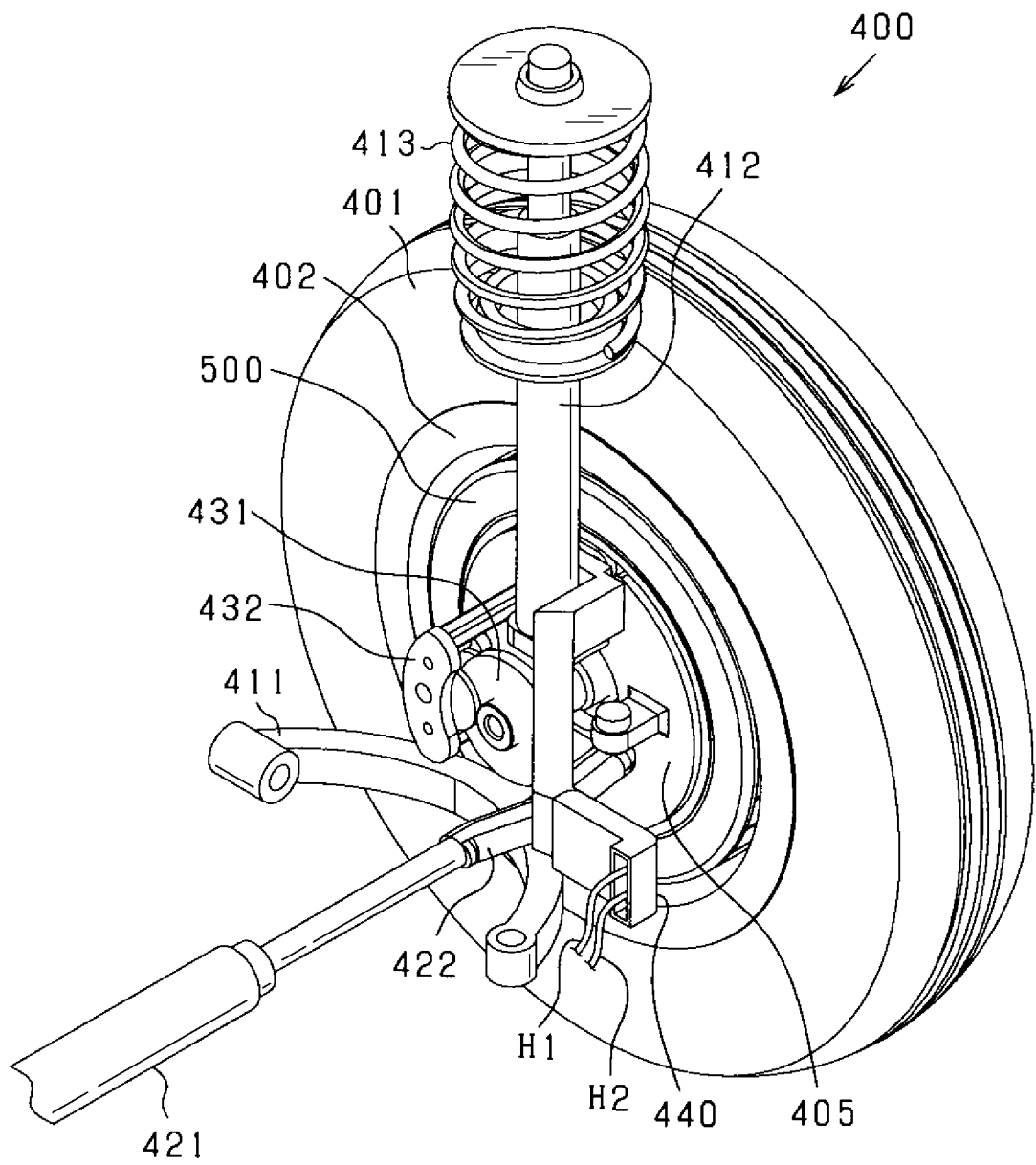
FIG. 45 is a perspective view of a vehicle wheel, in which a rotating electric machine according to a third embodiment is incorporated, and its peripherals.
Figure 46:
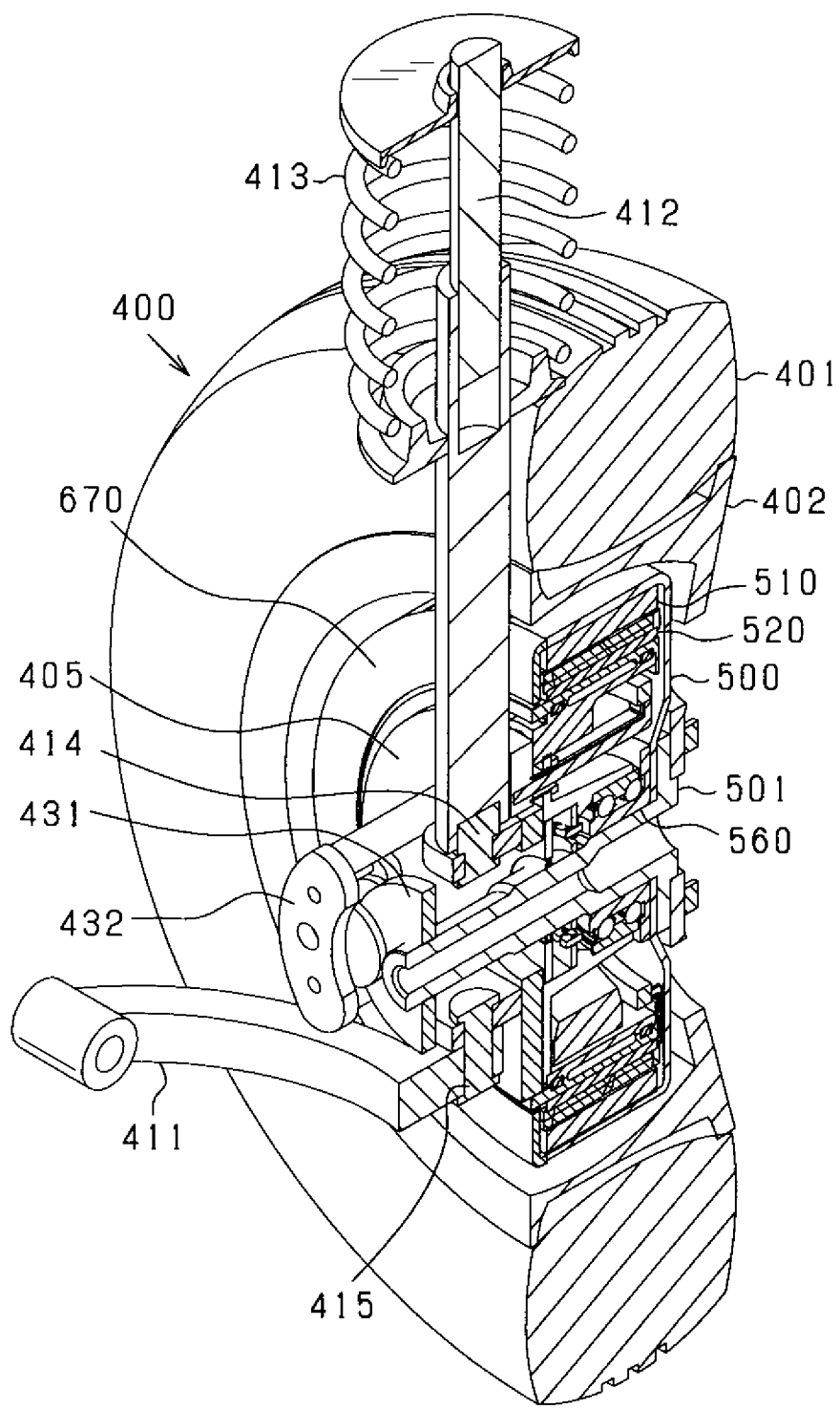
FIG. 46 is a perspective view, partially in longitudinal cross section, of the wheel and its peripherals.
Figure 47:
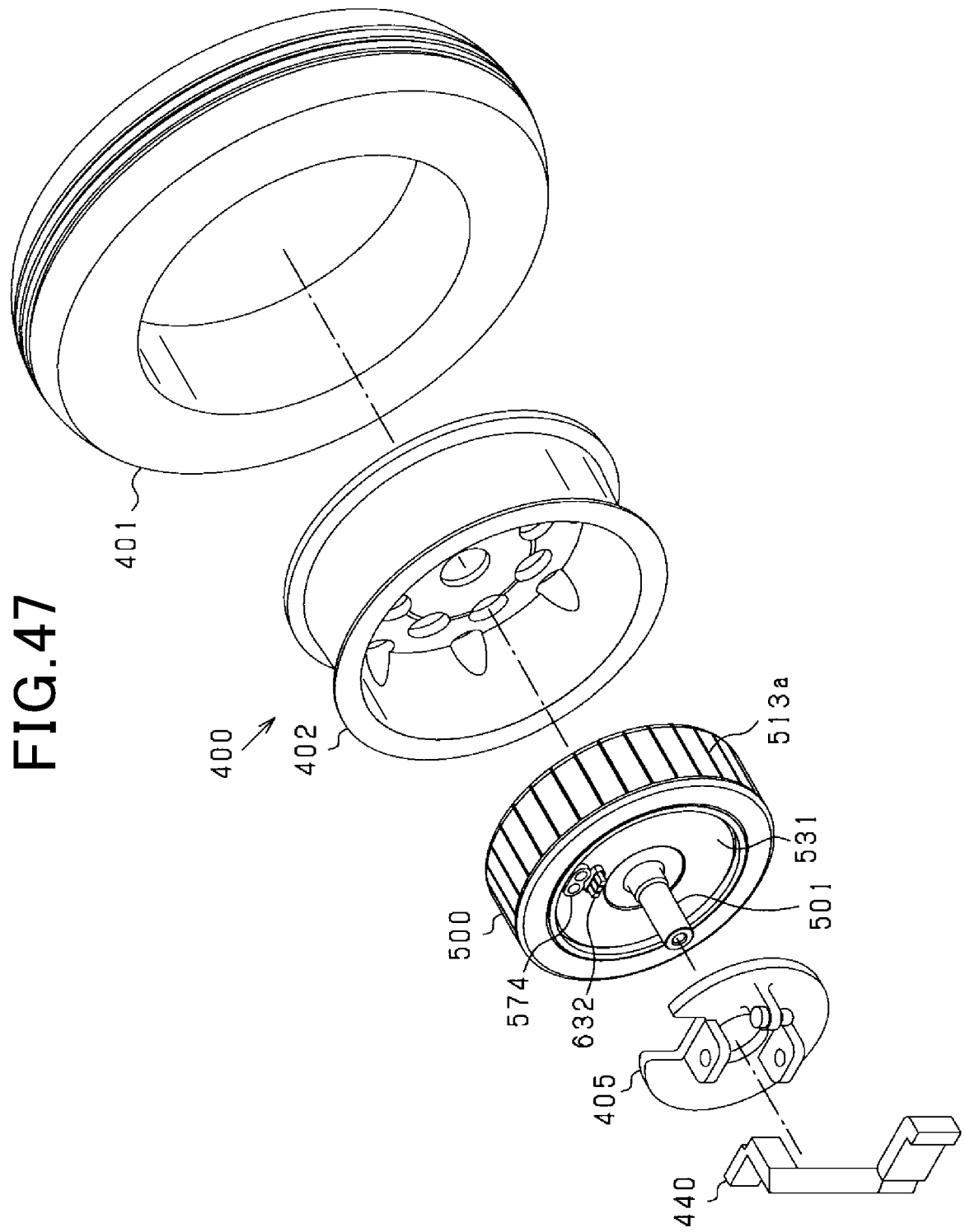
FIG. 47 is an exploded perspective view of the wheel.

FIG. 45 is a perspective view of a wheel 400, in which the rotating electric machine 500 according to the present embodiment is incorporated, and its peripherals. FIG. 46 is a perspective view, partially in longitudinal cross section, of the wheel 400 and its peripherals. FIG. 47 is an exploded perspective view of the wheel 400. It should be noted that each of FIGS. 45-47 shows the wheel 400 viewed from the inside of the vehicle.

In the vehicle, the in-wheel motor structure according to the present embodiment may be applied in various modes. For example, in the case of the vehicle having two front wheels and two rear wheels, the in-wheel motor structure according to the present embodiment may be applied to only the two front wheels, only the two rear wheels or all of the four wheels. In addition, the in-wheel motor structure according to the present embodiment may also be applied to the case of the vehicle having, on either of the front and rear sides, only a single wheel.

As shown in FIGS. 45-47, the wheel 400 includes a tire 401 which is, for example, a well-known pneumatic tire, a rim 402 fixed to the radially inner periphery of the tire 401, and the rotating electric machine 500 fixed to the radially inner periphery of the rim 402.

The rotating electric machine 500 has a fixed part that includes a stator, and a rotating part that includes a rotor. The fixed part is fixed to the vehicle body side while the rotating part is fixed to the rim 402. With rotation of the rotating part of the rotating electric machine 500, the tire 401 and the rim 402 also rotate. In addition, the configuration of the rotating electric machine 500 including the fixed part and the rotating part will be described in detail later.

Moreover, though not shown in the figures, to the wheel 400, there are mounted, as peripheral equipment, a suspension apparatus for holding the wheel 400 with respect to the vehicle body, a steering apparatus for varying orientation of the wheel 400, and a brake apparatus for performing braking of the wheel 400.

The suspension apparatus is an independent suspension apparatus. The suspension apparatus may be of any suitable type, such as trailing arm type, strut type, wishbone type or multi-link type. In the present embodiment, the suspension apparatus includes a lower arm 411 oriented to extend toward the vehicle body center, and a suspension arm 412 and a spring 413 both of which are oriented to extend in the vertical direction. The suspension arm 412 may be configured as, for example, a shock absorber. It should be noted that the details of the suspension arm 412 are not shown in the figures. Each of the lower arm 411 and the suspension arm 412 is connected to the vehicle body side as well as to a circular base plate 405 that is fixed to the fixed part of the rotating electric machine 500. As shown in FIG. 46, on the rotating electric machine 500 side (or the base plate 405 side), the lower arm 411 and the suspension arm 412 are supported, by supporting shafts 414 and 415, so as to be coaxial with each other.

The steering apparatus may employ, for example, a rack and pinion mechanism, a ball and nut mechanism, hydraulic power steering system or an electric power steering system. In the present embodiment, the steering apparatus includes a rack device 421 and a tie rod 422. The rack device 421 is connected, via the tie rod 422, to the base plate 405 on the rotating electric machine 500 side. In operation, with rotation of a steering shaft (not shown), the rack device 421 operates to cause the tie rod 422 to move in the left-right direction (or lateral direction) of the vehicle. Consequently, the wheel 400 is turned about the supporting shaft 414 and 415 of the lower arm 411 and the suspension arm 412, changing the orientation of the wheel 400.

It is preferable for the brake apparatus to employ a disc brake or a drum brake. In the present embodiment, the brake apparatus includes a disc rotor 431 fixed to a rotating shaft 501 of the rotating electric machine 500 and a brake caliper 432 fixed to the base plate 405 on the rotating electric machine 500 side. In the brake caliper 432, brake pads are hydraulically actuated to be pressed on the disc rotor 431, generating a braking force by friction. Consequently, with the generated braking force, rotation of the wheel 400 is stopped.

Moreover, to the wheel 400, there are mounted a receiving duct 440 that receives an electrical wiring H1 and a cooling water piping H2 both of which extend from the rotating electric machine 500. The receiving duct 440 extends, from its end on the side of the fixed part of the rotating electric machine 500, along an end face of the rotating electric machine 500 without interfering with the suspension arm 412. The receiving duct 440 is fixed to the suspension arm 412. Consequently, the positional relationship between a connection portion of the suspension arm 412, to which the receiving duct 440 is connected, and the base plate 405 is fixed. As a result, it is possible to suppress stress induced in the electrical wiring H1 and the cooling water piping H2 by, for example, vibration of the vehicle. In addition, the electrical wiring H1 is connected to an in-vehicle power supply (not shown) and an in-vehicle ECU (not shown) while the cooling water piping H2 is connected to a radiator (not shown).

Next, the configuration of the rotating electric machine 500 according to the present embodiment will be described in detail.

As mentioned above, in the present embodiment, the rotating electric machine 500 is configured as an in-wheel motor. The rotating electric machine 500 has superior operational efficiency and output to a motor of a conventional vehicular drive unit which includes a speed reducer. Here, the operational efficiency is an indicator used in a test in a traveling mode for evaluating the fuel economy of the vehicle. In addition, the rotating electric machine 500 may alternatively be used in other applications provided that a reasonable price can be realized by cost reduction and superior performance can be maintained.

Figure 48:
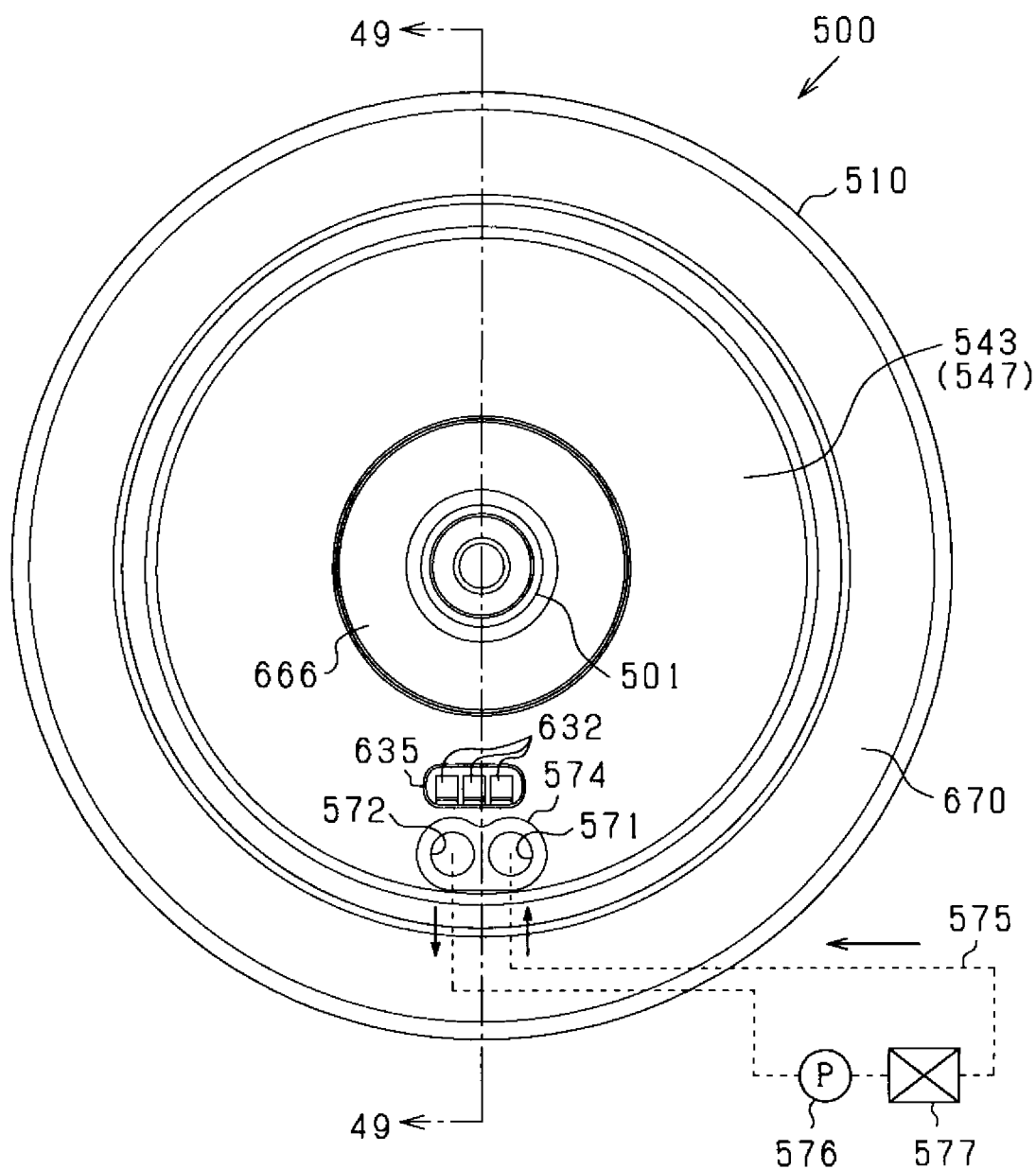
FIG. 48 is a side view, from the protruding side of a rotating shaft, of the rotating electric machine according to the third embodiment.
Figure 49:
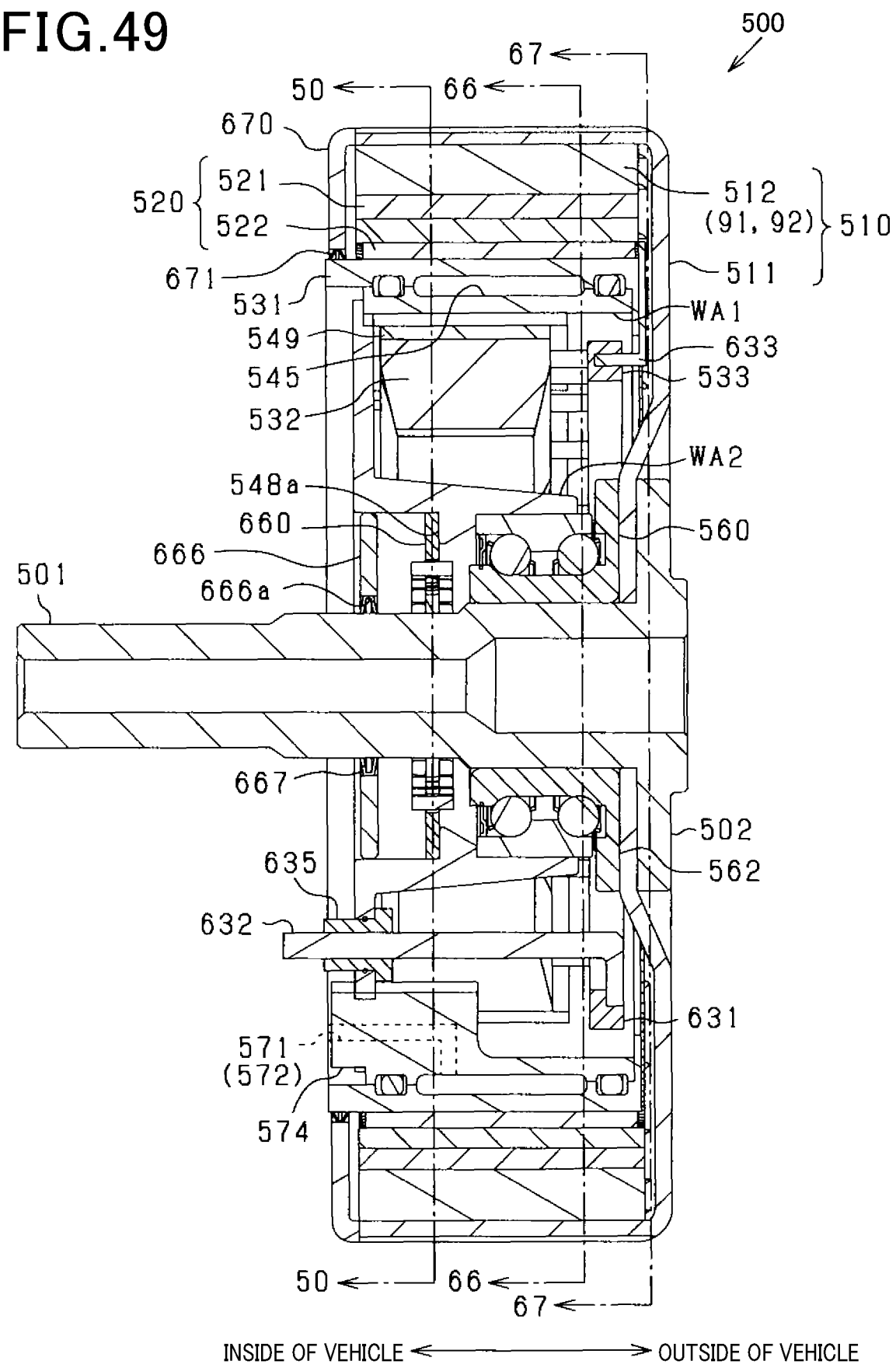
FIG. 49 is a cross-sectional view taken along the line 49-49 in FIG. 48.
Figure 50:
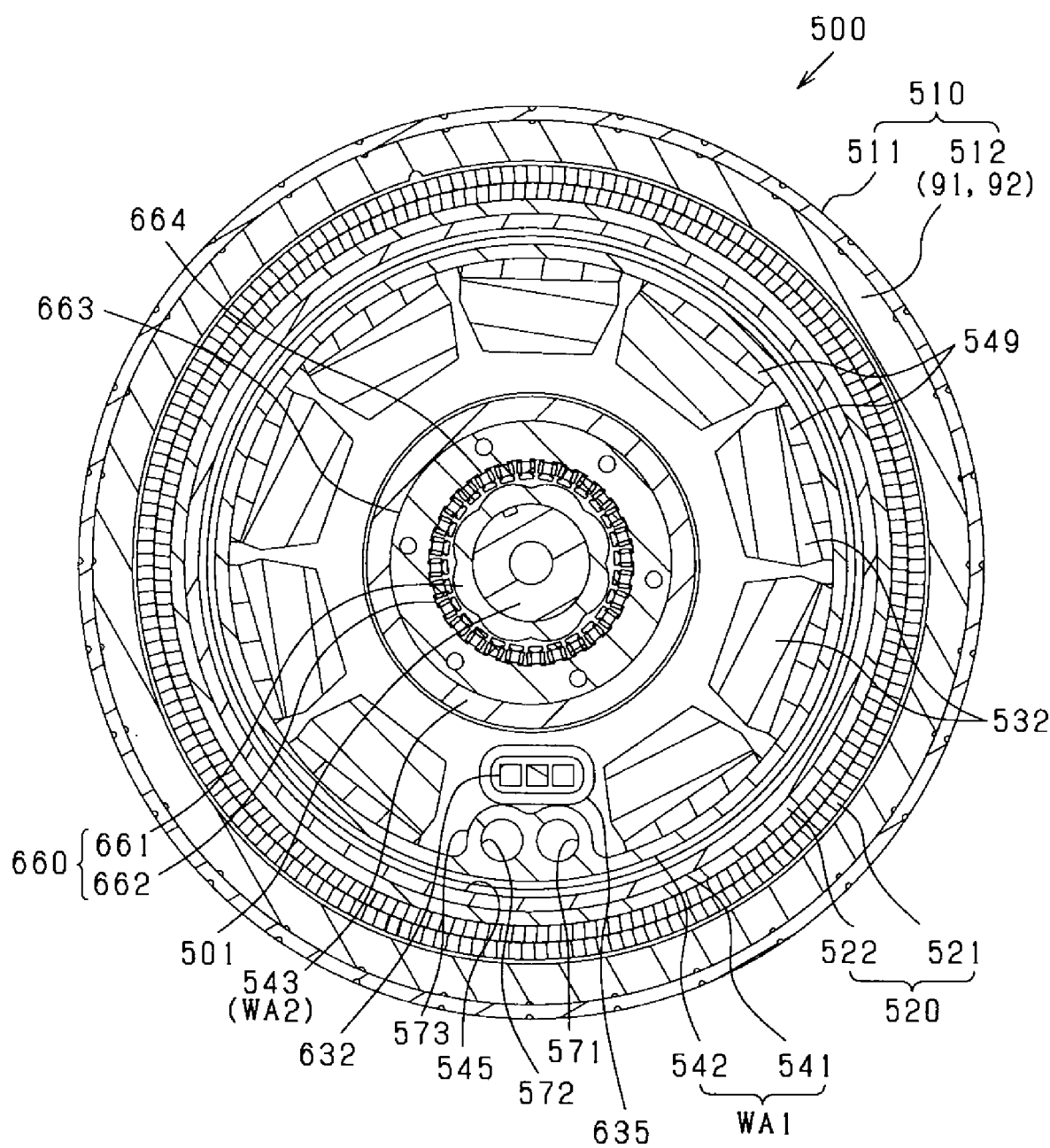
FIG. 50 is a cross-sectional view taken along the line 50-50 in FIG. 49.
Figure 51:
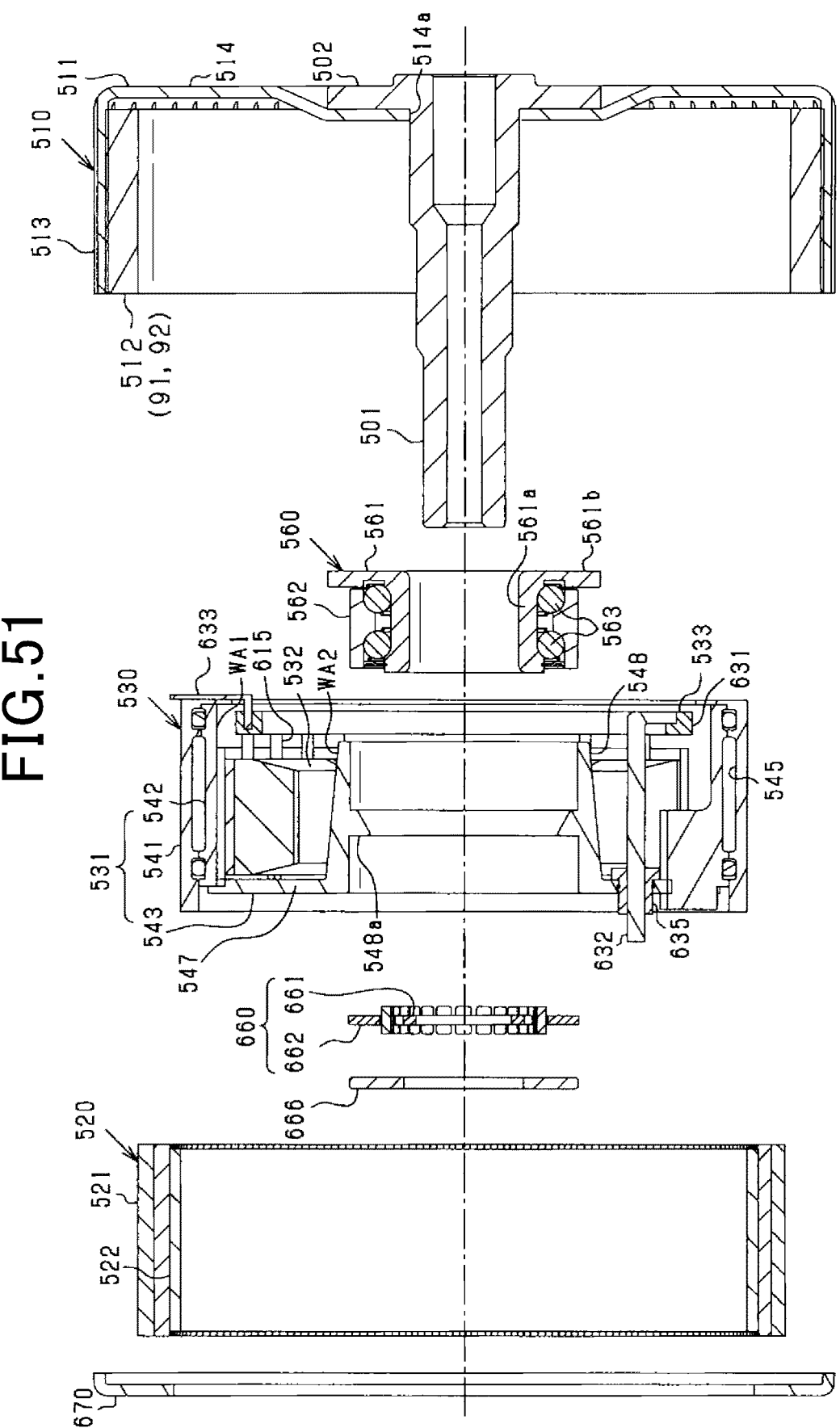
FIG. 51 is an exploded cross-sectional view of the rotating electric machine according to the third embodiment.

FIG. 48 is a side view of the rotating electric machine 500 from the protruding side of the rotating shaft 501 (or from the inside of the vehicle). FIG. 49 is a longitudinal cross-sectional view of the rotating electric machine 500 (i.e., a cross-sectional view taken along the line 49-49 in FIG. 48). FIG. 50 is a transverse cross-sectional view of the rotating electric machine 500 (i.e., a cross-sectional view taken along the line 50-50 in FIG. 49). FIG. 51 is an exploded cross-sectional view of the rotating electric machine 500.

Hereinafter, the direction in which a central axis of the rotating shaft 501 extends will be referred to as the axial direction; the directions extending radially from the central axis of the rotating shaft 501 will be referred to as radial directions; and the direction extending along a circle whose center is on the central axis of the rotating shaft 501 will be referred to as the circumferential direction. Moreover, in the state of the rotating electric machine 500 being mounted to the wheel 400 of the vehicle, the right side in FIG. 49 corresponds to the outside of the vehicle while the left side in FIG. 49 corresponds to the inside of the vehicle.

The rotating electric machine 500 according to the present embodiment is an outer rotor type SPM (Surface Permanent Magnet) motor. The rotating electric machine 500 mainly includes a rotor 510, a stator 520, an inverter unit 530, a bearing 560 and a rotor cover 670. These components are coaxially arranged with the rotating shaft 501 that is formed integrally with the rotor 510. These components are assembled in a predetermined sequence in the axial direction to together constitute the rotating electric machine 500.

In the rotating electric machine 500, the rotor 510 and the stator 520 are each cylindrical-shaped and radially opposed to each other with a predetermined air gap formed therebetween. The rotor 510 rotates, together with the rotating shaft 501, on the radially outer side of the stator 520. In the present embodiment, the rotor 510 functions as a field while the stator 520 functions as an armature. That is, the rotating electric machine 500 is of a rotating field type.

The rotor 510 includes a substantially cylindrical rotor carrier 511 and an annular magnet unit 512 fixed to the rotor carrier 511. The rotating shaft 501 is also fixed to the rotor carrier 511.

The rotor carrier 511 has a cylindrical portion 513. On an inner circumferential surface of the cylindrical portion 513, there is mounted the magnet unit 512. That is, the magnet unit 512 is provided so as to be surrounded by the cylindrical portion 513 of the rotor carrier 511 from the radially outer side. The cylindrical portion 513 of the rotor carrier 511 has an axially opposite pair of first and second ends. The first end is located further than the second from the vehicle body (or from the base plate 405). At the first end of the cylindrical portion 513, there is formed an end plate 514 of the rotor carrier 511 continuously with the cylindrical portion 513. That is, the cylindrical portion 513 and the end plate 514 are integrally formed into one piece. At the second end of the cylindrical portion 513, there is formed an opening.

In addition, the rotor carrier 511 is formed of a material having sufficient mechanical strength, such as a cold-rolled steel sheet (e.g., an SPCC steel sheet according to JIS or an SPHC steel sheet according to JIS having a larger thickness than the SPCC steel sheet), forged steel or Carbon Fiber-Reinforced Plastic (CFRP).

The axial length of the rotating shaft 501 is larger than the axial length of the rotor carrier 511. Therefore, the rotating shaft 501 protrudes from the second end (or the opening) of the rotor carrier 511 in the direction toward the inside of the vehicle. On a protruding end portion of the rotating shaft 501, there are mounted other components such as the above-described brake apparatus.

In a central part of the end plate 514 of the rotor carrier 511, there is formed a through-hole 514a. The rotating shaft 501 is fixed to the rotor carrier 511 in a state of being inserted in the through-hole 514a of the end plate 514. The rotating shaft 501 has a flange 502 formed at an axial end thereof so as to radially extend. The rotating shaft 501 is fixed to the rotor carrier 511 with the flange 502 of the rotating shaft 501 in surface contact with an outer surface of the end plate 514 of the rotor carrier 511. In addition, in the wheel 400, the rim 402 is fixed to the rotating shaft 501 using fastening means such as bolts extending from the flange 502 of the rotating shaft 501 in the direction toward the outside of the vehicle.

The magnet unit 512 of the rotor 510 is constituted of a plurality of permanent magnets which are arranged on the inner circumferential surface of the cylindrical portion 513 of the rotor carrier 511 so that the polarities thereof alternate between N and S in the circumferential direction. Consequently, the magnet unit 512 has a plurality of magnetic poles arranged in the circumferential direction. The configuration of the magnet unit 42 will be described in detail later. The permanent magnets are fixed to the rotor carrier 511 by, for example, bonding.

In the present embodiment, the magnet unit 512 has a similar configuration to the magnet unit 42 described with reference to FIGS. 8 and 9 in the first embodiment. Moreover, the permanent magnets of the magnet unit 512 are implemented by sintered neodymium magnets whose intrinsic coercive force is higher than or equal to 400 [kA/m] and residual flux density Br is higher than or equal to 1.0 [T].

Similar to the magnet unit 42 described with reference to FIGS. 8 and 9 in the first embodiment, the magnet unit 512 according to the present embodiment is also constituted of first and second magnets 91 and 92 that are polar anisotropic magnets. The polarity of the first magnets 91 (e.g., N) is different from the polarity of the second magnets 92 (e.g., S). The first magnets 91 are arranged alternately with the second magnets 92 in the circumferential direction. Moreover, in each of the first and second magnets 91 and 92, the orientation of the axis of easy magnetization on the d-axis side (or in the d-axis-side part) is different from the orientation of the axis of easy magnetization on the q-axis side (or in the q-axis-side parts). On the d-axis side, the orientation of the axis of easy magnetization is close to a direction parallel the d-axis. In contrast, on the q-axis side, the orientation of the axis of easy magnetization is close to a direction perpendicular to the q-axis. Consequently, depending on the change in the orientation of the axis of easy magnetization, arc-shaped magnetic paths are formed in the magnet. In addition, on the d-axis side, the axis of easy magnetization may be oriented to be parallel to the d-axis; and on the q-axis side, the axis of easy magnetization may be oriented to be perpendicular to the q-axis. That is, the magnet unit 512 is configured so that on the d-axis side, the axis of easy magnetization is oriented to be more parallel to the d-axis than on the q-axis side.

With the above configuration, the magnet magnetic flux at the d-axis is intensified and the magnetic flux change in the vicinity of the q-axis is suppressed. Consequently, it becomes possible to have the surface magnetic flux gradually changing from the q-axis to the d-axis in each magnetic pole. In addition, the magnet unit 512 may alternatively employ the configuration of the magnet unit 42 shown in FIGS. 22 and 23 or the configuration of the magnet unit 42 shown in FIG. 30.

The magnet unit 512 may have, on the radially outer side (i.e., the radial side facing the cylindrical portion 513 of the rotor carrier 511), a rotor core (or back yoke) that is formed by laminating a plurality of magnet steel sheets in the axial direction. That is, it is possible to employ a configuration where a rotor core is arranged radially inside the cylindrical portion 513 of the rotor carrier 511 and the first and second magnets 91 and 92 are arranged radially inside the rotor core.

Figure 52:
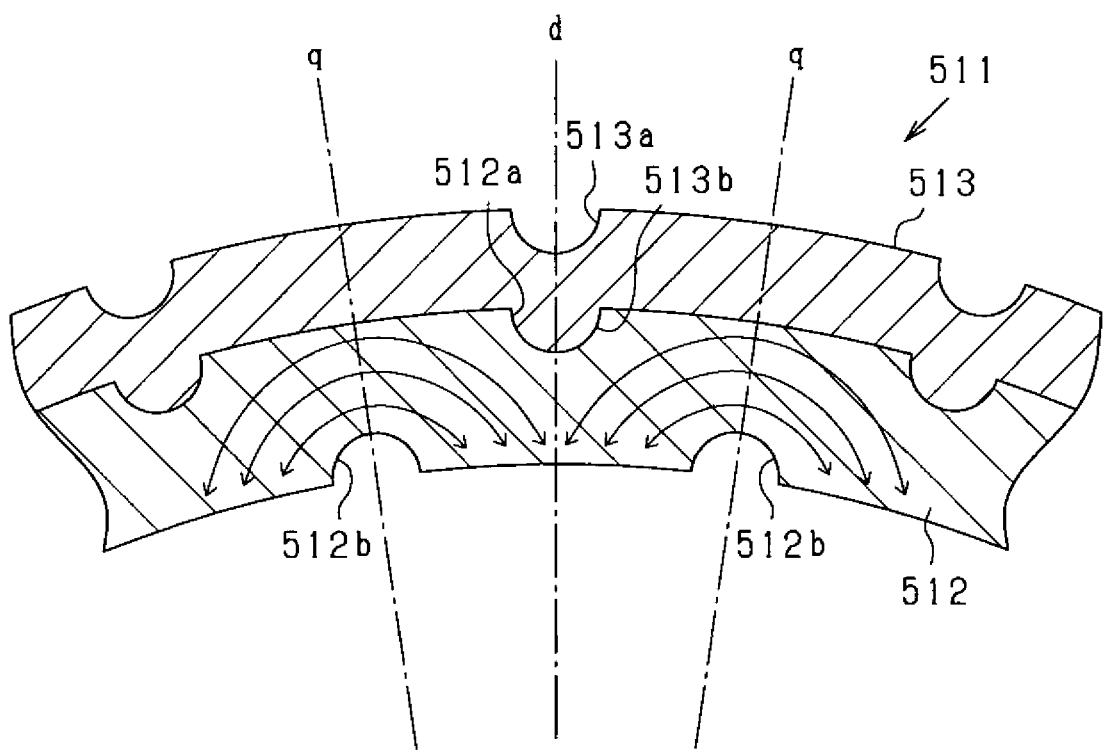
FIG. 52 is a cross-sectional view of part of a rotor of the rotating electric machine according to the third embodiment.

As shown in FIG. 47, in an outer circumferential surface of the cylindrical portion 513 of the rotor carrier 511, there are formed a plurality of recesses 513a that each extend in the axial direction and are spaced at predetermined intervals in the circumferential direction. The recesses 513a may be formed by, for example, press working. Moreover, as shown in FIG. 52, on the inner circumferential surface of the cylindrical portion 513 of the rotor carrier 511, there are formed a plurality of protrusions 513b each of which is located in radial alignment with one of the recesses 513a. On the other hand, in an outer circumferential surface of the magnet unit 512, there are formed a plurality of recesses 512a conforming to the protrusions 513b of the cylindrical portion 513 of the rotor carrier 511. Each of the protrusions 513b is fitted in one of the recesses 512a, thereby suppressing circumferential displacement of the magnet unit 512.

That is, the protrusions 513b of the rotor carrier 511 together function as a rotation stopper of the magnet unit 512. In addition, the protrusions 513b may be formed by any suitable method such as the aforementioned press working.

In FIG. 52, the directions of magnet magnetic paths in the magnet unit 512 are indicated with arrows. The magnet magnetic paths extend in arc shapes across the q-axis at the boundaries between the magnetic poles. Moreover, at the d-axis representing the centers of the magnetic poles, the magnet magnetic paths are oriented to be parallel to or near parallel to the d-axis. In an inner circumferential surface of the magnet unit 512, there are formed a plurality of recesses 512b each of which is located at one of circumferential positions corresponding to the d-axis. In this case, in the magnet unit 512, the lengths of the magnet magnetic paths on the closer side to the stator 520 (i.e., the lower side in FIG. 52) are different from those on the further side from the stator 520 (i.e., the upper side in FIG. 52). More specifically, the lengths of the magnet magnetic paths on the closer side to the stator 520 are shorter than those on the further side from the stator 520. The recesses 512b are formed at those locations in the magnet unit 512 where the magnet magnetic paths become shortest. That is, in consideration of the fact that it is difficult to generate sufficient magnet magnetic flux at those locations in the magnet unit 512 where the magnet magnetic paths are short, the magnets are cut off at those locations where the magnet magnetic flux is weak.

The effective magnetic flux density Bd of the magnets increases with the length of the magnetic circuit through the inside of the magnets. Moreover, the permeance coefficient Pc increases with the effective magnetic flux density Bd of the magnets. With the configuration shown in FIG. 52, it is possible to achieve reduction in the amount of magnetic material used for forming the magnets of the magnet unit 512 while suppressing decrease in the permeance coefficient Pc that is an indicator of the effective magnetic flux density Bd of the magnets. In addition, on the B-H coordinate system, the intersection point between the permeance straight-line dependent on the shapes of magnets and the demagnetization curve represents the operating point; the magnetic flux density at the operating point represents the effective magnetic flux density Bd of the magnets. In the present embodiment, the rotating electric machine 500 is configured to reduce the amount of iron used in the stator 520. With such configuration, the method of setting the magnetic circuit across the q-axis is very effective.

Moreover, the recesses 512b of the magnet unit 512 can be utilized as air passages extending in the axial direction. Consequently, it is possible to improve the air cooling performance.

Next, the configuration of the stator 520 will be described.

Figure 53:
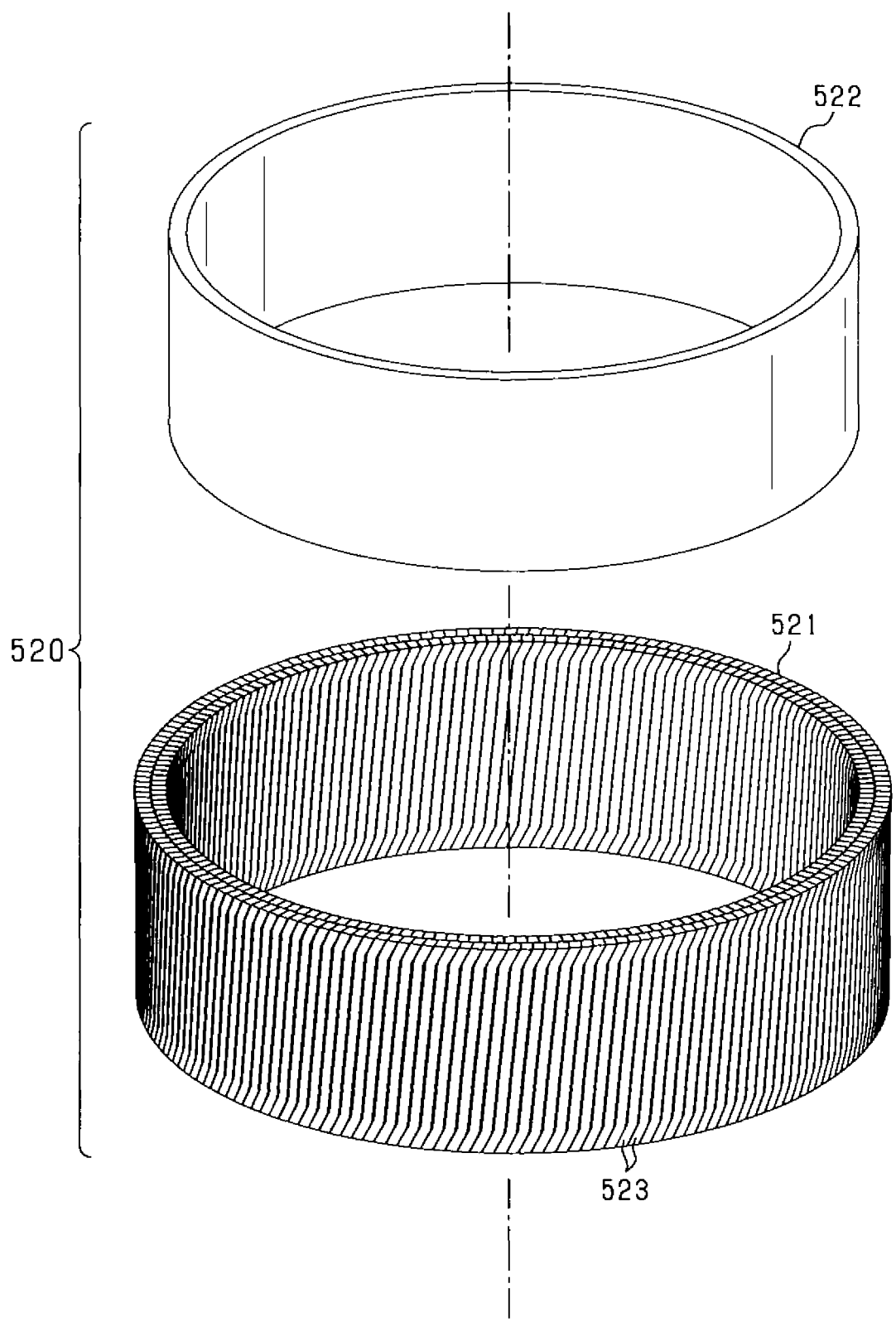
FIG. 53 is an exploded perspective view of a stator of the rotating electric machine according to the third embodiment.

As shown in FIG. 53, the stator 520 includes a stator coil 521 and a stator core 522.

The stator coil 521 is substantially hollow cylindrical (or annular) in shape. The stator coil 521 is a multi-phase coil comprised of a plurality of phase windings. The stator core 522 is assembled, as a base member, to the radially inner periphery of the stator coil 521.

More particularly, in the present embodiment, the stator coil 521 is a three-phase coil comprised of U, V and W phase windings. Each phase winding is constituted of two radially-stacked layers of electrical conductors 523.

Similar to the stator 50 described in the first embodiment, the stator 520 according to the present embodiment also has both a slot-less structure and a flat conductor structure. That is, the stator 520 has a configuration that is the same as or similar to the configuration of the stator 50 shown in FIGS. 8-16.

The stator core 522 is formed by laminating a plurality of magnetic steel sheets in the axial direction. The stator core 522 has a hollow cylindrical shape with a predetermined radial thickness. The stator coil 521 is assembled to the outer circumferential surface (i.e., the rotor 510-side circumferential surface) of the stator core 522. The outer circumferential surface of the stator core 522 is a smooth cylindrical surface. After the assembly of the stator 520, the electrical conductors 523 forming the stator coil 521 are arranged in the circumferential direction on the outer circumferential surface of the stator core 522 that functions as a back core.

Moreover, the stator 520 may have any of the following configurations (A)-(C).

(A) In the stator 520, inter-conductor members are provided between the circumferentially adjacent electrical conductors 523. The inter-conductor members are formed of such a magnetic material as to satisfy the following relationship: Wt×Bs≤Wm×Br, where Wt is the total circumferential width of the inter-conductor members in each magnetic pole, Bs is the saturation flux density of the inter-conductor members, Wm is the circumferential width of each magnetic pole of the magnet unit 512 and Br is the residual flux density of the magnet unit 512.

(B) In the stator 520, inter-conductor members are provided between the circumferentially adjacent electrical conductors 523. The inter-conductor members are formed of a nonmagnetic material.

(C) In the stator 520, no inter-conductor members are provided between the circumferentially adjacent electrical conductors 523.

With any of the above configurations, the inductance of the stator 520 can be lowered in comparison with a conventional stator where teeth of a stator core are interposed between the circumferentially adjacent electrical conductor units of the stator coil for forming magnetic paths. More specifically, the inductance of the stator 520 can be lowered to be lower than or equal to 1/10 of the inductance of the conventional stator. Moreover, with the lowering of the inductance, the impedance of the stator 520 can also be lowered, thereby increasing the torque of the rotating electric machine 500 and thus the output power of the rotating electric machine 500 with respect to the input power. Consequently, the rotating electric machine 500 can output more power than a rotating electric machine which includes an IPM (Interior Permanent Magnet) rotor and output torque by utilizing a voltage of an impedance component (or utilizing reluctance torque).

In the present embodiment, the stator coil 521 is molded together with the stator core 522 by a molding material (or insulating member) that is implemented by a resin or the like. Consequently, the molding material is interposed between the circumferentially adjacent electrical conductors 523. That is, the stator 520 according to the present embodiment has the configuration (B) among the aforementioned configurations (A)-(C).

In addition, the electrical conductors 523 are arranged so that circumferential side surfaces of circumferentially adjacent electrical conductors 523 abut one another or face one another with minute gaps formed therebetween. Therefore, the stator 520 may alternatively have the above configuration (C). On the other hand, in the case of employing the above configuration (A), protrusions may be formed on the outer circumferential surface of the stator core 522 according to the orientation of the electrical conductors 523 with respect to the axial direction, i.e., according to the skew angles when the stator coil 521 has a skew structure.

Next, the configuration of the stator coil 521 will be described with reference to FIG. 54(a) and FIG. 54(b).

FIGS. 54(a) and 54(b) are each a development of the stator coil 521 on a plane. FIG. 54(a) shows the electrical conductors 523 located at the radially outer layer while FIG. 54(b) shows the electrical conductors 523 located at the radially inner layer.

In the present embodiment, the stator coil 521 is wound in a distributed winding manner into an annular shape. The electrical conductors 523 forming the stator coil 521 are arranged in two radially-stacked layers. Moreover, the electrical conductors 523 located at the radially outer layer (see FIG. 54(a)) are skewed in a different direction from the electrical conductors 523 located at the radially inner layer (see FIG. 54(b)). The electrical conductors 523 are electrically insulated from each other. Each of the electrical conductors 523 may be constituted of a bundle of wires 86 (see FIG. 13). The electrical conductors 523 are arranged in pairs in the circumferential direction; each pair consists of two circumferentially adjacent electrical conductors 523 that belong to the same phase and are energized in the same direction. Every two pairs of electrical conductors 523 (i.e., every four electrical conductors 523), which are located respectively at the radially inner and radially outer layers and in radial alignment with each other, constitute one electrical conductor unit.

It is preferable that the radial thickness of each of the electrical conductor units is set to be smaller than the total circumferential width of the electrical conductor units per phase in each magnetic pole, thereby realizing a flat conductor structure of the stator coil 521. For example, in each magnetic pole, there may be provided two electrical conductor units (i.e., a total of eight electrical conductors 523) per phase. In this case, the radial thickness of each of the electrical conductor units is set to be smaller than the total circumferential width of the two electrical conductor units per phase in each magnetic pole. Moreover, on a transverse cross section of the stator coil 521 as shown in FIG. 50, the circumferential width of each electrical conductor 523 may be set to be larger than the radial thickness of each electrical conductor 523. In addition, the stator coil 521 according to the present embodiment may alternatively have the same configuration as the stator coil 51 shown in FIG. 12. However, in this case, it is necessary to secure in the rotor carrier 511 a space for receiving a coil end part of the stator coil.

In the stator coil 521, the electrical conductors 523 are arranged in the circumferential direction so that in the coil side part 525 of the stator coil 521, each of the electrical conductors 523 extends obliquely at a predetermined angle with respect to the axial direction. Moreover, the stator coil 521 is folded back at the two coil end parts 526 of the stator coil 521, which are located axially outside the stator core 522, so as to realize continuous connection of the electrical conductors 523. In addition, the axial ranges of the coil side part 525 and coil end parts 526 of the stator coil 521 are shown in FIG. 54(a).

The electrical conductors 523 located at the radially inner layer and the electrical conductors 523 located at the radially outer layer are connected with one another at the coil end parts 526 of the stator coil 521. Consequently, the locations of the electrical conductors 523 are alternately changed between the radially inner layer and the radially outer layer each time the stator coil 521 is folded back at either of the coil end parts 526. That is, the stator coil 521 is configured so that for each circumferentially continuous (or connected) pair of the electric conductors 523, the two electrical conductors 523 of the pair are located respectively at the radially inner layer and the radially outer layer and the directions of electric currents flowing respectively in the two electrical conductors 523 of the pair are opposite to each other.

Moreover, in the stator coil 521, two types of skew are performed on each electrical conductor 523 so that the skew angle of axial end parts of each electrical conductor 523 is different from the skew angle of an axial central part of each electrical conductor 523. Specifically, as shown in FIG. 55, in each of the electrical conductors 523, the skew angle $\theta s1$ of the axial central part is different from, more particularly smaller than the skew angle $\theta s2$ of the two axial end parts. Each of the axial end parts of the electrical conductors 523 is defined within an axial range including one of the coil end parts 526 of the stator coil 521 and part of the coil side part 525 of the stator coil 521. The skew angle $\theta s1$ represents an oblique angle with which the axial central part of each electrical conductor 523 extends obliquely with respect to the axial direction; the skew angle $\theta s2$ represents an oblique angle with which the two axial end parts of each electrical conductor 523 extend obliquely with respect to the axial direction. In addition, the skew angle $\theta s1$ of the axial central part of each electrical conductor 523 may be set within such a suitable range as to reduce harmonic components of magnetic flux generated by energization of the stator coil 521.

Setting the skew angle $\theta s1$ to be smaller than the skew angle $\theta s2$, it is possible to increase the winding factor of the stator coil 521 while reducing the size of the coil end parts 526. In other words, it is possible to secure a desired winding factor while reducing the axial length of the coil end parts 526, i.e., the length by which the coil end parts 526 axially protrude from the stator core 522. As a result, it is possible to increase the torque of the rotating electric machine 500 while minimizing the size of the same.

Here, the suitable range of the skew angle $\theta s1$ will be described. In the case of the stator coil 521 having X electrical conductors 523 arranged in each magnetic pole, the Xth order harmonic component may be generated by energization of the stator coil 521. $X=2 \times S \times m$, where S is the number of phases and m is the number of pole pairs. The inventors of the present application have recognized that since the Xth order harmonic component corresponds to the resultant of the $(X-1)$th order and $(X+1)$th order harmonic components, the Xth order harmonic component can be reduced by reducing at least one of the $(X-1)$th order and $(X+1)$th order harmonic components. Base on this understanding, the inventors have found that the Xth order harmonic component can be reduced by setting the skew angle $\theta s1$ within the range of $360°/(X+1)$ to $360°/(X-1)$ in electrical angle.

For example, when S=3 and m=2, X=12. In this case, to reduce the twelfth order harmonic component, the skew angle $\theta s1$ is set within the range of $360°/13$ to $360°/11$ in electrical angle. That is, the skew angle $\theta s1$ is set within the range of 27.7° to 32.7° in electrical angle.

Setting the skew angle $\theta s1$ as above, it is possible to increase the amount of magnet magnetic flux alternating between N and S and crossing the axial central parts of the electrical conductors 523, thereby increasing the winding factor of the stator coil 521.

The skew angle $\theta s2$ of the two axial end parts of each electrical conductor 523 is set to be larger than the above-described skew angle $\theta s1$ and smaller than 90° in electrical angle. That is, $\theta s1 < \theta s2 < 90°$.

In the stator coil 521, the electrical conductors 523 located at the radially inner layer and the electrical conductors 523 located at the radially outer layer can be connected to one another by welding or bonding ends of the electrical conductors 523 or by bending the electrical conductor material. At one of the two coil end parts of the stator coil 521, ends of the phase windings of the stator coil 521 are electrically connected to the electric power converter (or the inverter unit 530) via busbars. Therefore, one of the following configurations may be employed where the connection between the electrical conductors 523 at the busbar-side coil end part 526 is different from the connection between the electrical conductors 523 at the anti-busbar-side coil end part 526.

As the first configuration, at the busbar-side coil end part 526, the electrical conductors 523 are connected to one another by welding; at the anti-busbar-side coil end part 526, the electrical conductors 523 are connected to one another by a method other than welding, for example by bending the electrical conductor material. At the busbar-side coil end part 526, the ends of the phase windings of the stator coil 521 are connected to the busbars by welding. Therefore, connecting the electrical conductors 523 at the busbar-side coil end part 526 also by welding, it is possible to perform both the connection of the ends of the phase windings to the busbars and the connection of the electrical conductors 523 at the busbar-side coil end part 526 in a single step (i.e., welding step), thereby improving the productivity.

As the second configuration, at the busbar-side coil end part 526, the electrical conductors 523 are connected to one another by a method other than welding; at the anti-busbar-side coil end part 526, the electrical conductors 523 are connected to one another by welding. If the electrical conductors 523 are connected to one another by welding at the busbar-side coil end part 526, it is necessary to secure sufficient clearances between the busbars and the busbar-side coil end part 526 so as to prevent interference between the busbars and the welds formed between the electrical conductors 523. In contrast, with the second configuration, it is possible to reduce the clearances between the busbars and the busbar-side coil end part 526. Consequently, it is possible to relax constraints on the axial length of the stator coil 521 and the busbars.

As the third configuration, the electrical conductors 523 are connected to one another by welding at both the coil end parts 526. In this case, it is possible to reduce the length of the electrical conductor material; it is also possible to improve the productivity since no bending step is necessary.

As the fourth configuration, the electrical conductors 523 are connected to one another by a method other than welding at both the coil end parts 526. In this case, it is possible to minimize the number of welds formed in the stator coil 521, thereby suppressing occurrence of insulation peeling during the welding step.

In the process of manufacturing the annular stator coil 521, it is possible to first form planar band-shaped windings and then roll the planar band-shaped windings into the annular shape. In this case, after forming the planar band-shaped windings, the electrical conductors of the windings may be welded at either or both of the coil end parts 526 as necessary. Moreover, in rolling the planar band-shaped windings into the annular shape, a cylindrical jig may be used which has the same outer diameter as the stator core 522. In this case, the planar band-shaped windings are rolled around the cylindrical jig into the annular shape. Alternatively, the planar band-shaped windings may be rolled directly on the stator core 522.

Furthermore, the configuration of the stator coil 521 may be modified as follows.

For example, in the stator coil 521 shown in FIG. 54(*a*) and FIG. 54(*b*), the skew angle of the two axial end parts of each electrical conductor 523 may be set to be equal to the skew angle of the axial central part of each electrical conductor 523.

Moreover, in the stator coil 521 shown in FIG. 54(*a*) and FIG. 54(*b*), each pair of ends of circumferentially adjacent electrical conductors 523 of the same phase may be connected with a bridging wire that extends perpendicular to the axial direction.

In the stator coil 521, the number of radially-stacked layers of the electrical conductors 523 may be set to 2×n, where n is a natural number. That is, the number of radially-stacked layers of the electrical conductors 523 may be set to other positive even numbers than 2, such as 4 or 6.

Next, the inverter unit 530, which is an electric power conversion unit, will be described with reference to FIGS. 56 and 57.

Figure 56:
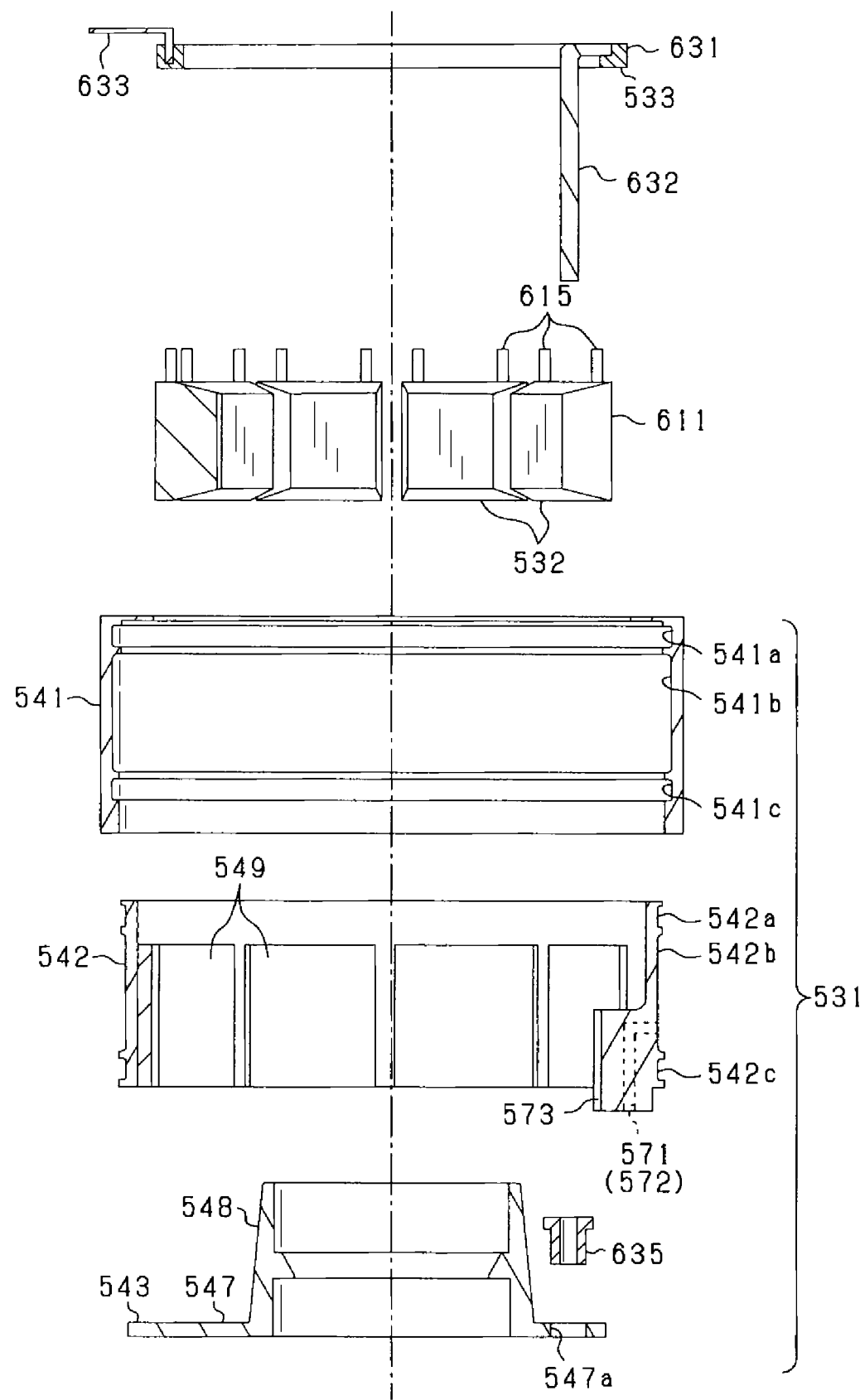
FIG. 56 is an exploded cross-sectional view of an inverter unit of the rotating electric machine according to the third embodiment.

FIG. 56 is an exploded cross-sectional view of the inverter unit 530. FIG. 57 is another exploded cross-sectional view of the inverter unit 530, where components of the inverter unit 530 are assembled into two subassemblies.

Figure 57:
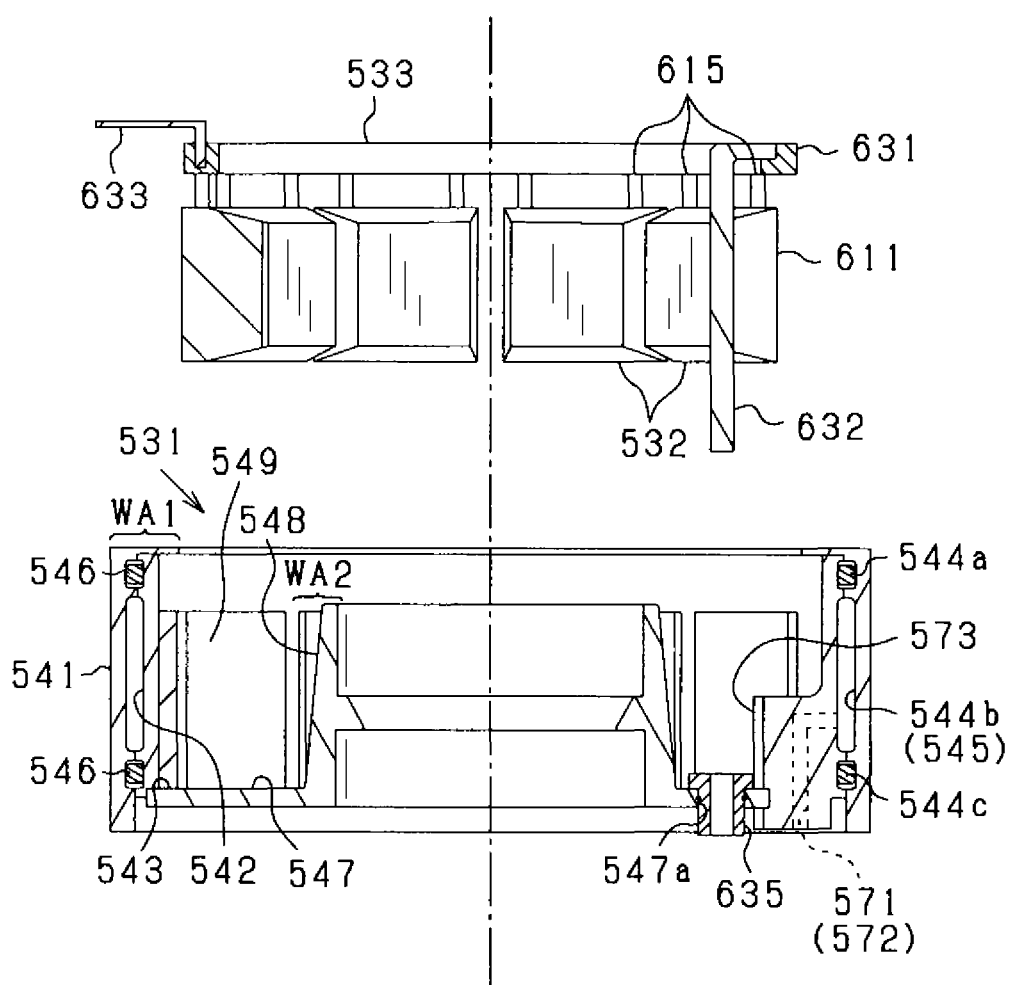
FIG. 57 is another exploded cross-sectional view of the inverter unit, where components of the inverter unit are assembled into two subassemblies.

As shown in FIGS. 56 and 57, the inverter unit 530 includes an inverter housing 531, a plurality of electrical modules 532 assembled to the inverter housing 531, and a busbar module 533 for electrically connecting the electrical modules 532.

The inverter housing 531 includes a hollow cylindrical outer wall member 541, a hollow cylindrical inner wall member 542 having an outer diameter smaller than an inner diameter of the outer wall member 541 and arranged radially inside the outer wall member 541, and a boss-forming member 543 fixed to one axial end of the inner wall member 542. All of these members 541-543 are formed of an electrically conductive material, such as Carbon Fiber-Reinforced Plastic (CFRP). The inverter housing 531 is formed by assembling the outer wall member 541 and the inner wall member 542 to radially overlap each other and assembling the boss-forming member 543 to one axial end (i.e., lower end in FIGS. 56 and 57) of the inner wall member 542. The inverter housing 531 in the assembled state is shown in FIG. 57.

To the radially outer periphery of the outer wall 541 of the inverter housing 531, there is fixed to the stator core 522 (see FIGS. 49 and 50). Consequently, the stator 520 and the inverter unit 530 are integrated into one piece.

As shown in FIG. 56, the outer wall member 541 has a plurality of recesses 541*a*, 541*b* and 541*c* formed in an inner circumferential surface thereof. The inner wall member 542 has a plurality of recesses 542*a*, 542*b* and 542*c* formed in an outer circumferential surface thereof. Upon the outer wall member 541 and the inner wall member 542 being assembled to each other, three hollow portions 544*a*, 544*b* and 544*c* are formed between the two members 541 and 542 (see FIG. 57). Of the three hollow portions 544*a*-544*c*, the center hollow portion 544*b* constitutes a cooling water passage 545 through which cooling water flows as a coolant. The remaining two hollow portions 544*a* and 544*c* are located respectively on opposite axial sides of the hollow portion 544*b* (or cooling water passage 545). In each of the hollow portions 544*a* and 544*c*, there is received one seal member 546 (see FIG. 57). Consequently, the hollow portion 544*b* (or cooling water passage 545) is hermetically sealed by the seal members 546 received in the hollow portions 544a and 544c. The cooling water passage 545 will be described in more detail later.

The boss-forming member 543 includes an annular end plate 547 and a boss portion 548 that axially protrudes from a radially inner periphery of the annular end plate 547 toward the inside of the inverter housing 531. The boss portion 548 has a hollow cylindrical shape.

Referring back to FIG. 51, the inner wall member 542 has an axially opposite pair of first and second ends; the second end is located closer than the first end to the vehicle body. The boss-forming member 543 is fixed to the second end (i.e., the left end in FIG. 51) of the inner wall member 542.

In addition, in the wheel 400 shown in FIGS. 45-47, the base plate 405 is fixed to the inverter housing 531 (more specifically, the end plate 547 of the boss-forming member 543 of the inverter housing 531).

The inverter housing 531 is configured to have a double circumferential wall formed around the central axis of the inverter housing 531. Of the double circumferential wall, an outer circumferential wall WA1 is constituted of both the outer wall member 541 and the inner wall member 542 while an inner circumferential wall WA2 is constituted of the boss portion 548 of the boss-forming member 543.

In the inverter housing 531, there is formed an annular space between the outer circumferential wall WA1 and the inner circumferential wall WA2. In the annular space, the electrical modules 532 are arranged along the circumferential direction (see FIG. 50). Moreover, the electrical modules 532 are fixed to the inner circumferential surface of the inner wall member 542 by, for example, bonding or screw fastening. In addition, in the present embodiment, the inverter housing 531 corresponds to a "housing member" and the electrical modules 532 correspond to "electrical components".

As shown in FIG. 49, on the radially inner side of the inner circumferential wall WA2 (or the boss portion 548), there is received the bearing 560 by which the rotating shaft 501 is rotatably supported. In the present embodiment, the bearing 560 is configured as a hub bearing which is provided in a central part of the wheel 400 to rotatably support the wheel 400. The bearing 560 is axially located so as to radially overlap the rotor 510, the stator 520 and the inverter unit 530.

In the rotating electric machine 500 according to the present embodiment, with reduction in the thickness of the magnet unit 512 of the rotor 510 and employment of both the slot-less structure and the flat conductor structure in the stator 520, the radial thickness of the magnetic circuit part is reduced, thereby making it possible to expand the hollow space on the radially inner side of the magnetic circuit part. Consequently, it becomes possible to arrange the magnetic circuit part, the inverter unit 530 and the bearing 560 in radial alignment with each other. In addition, the boss portion 548 constitutes a bearing holding portion that holds the bearing 560 on the radially inner side thereof.

The bearing 560 is implemented by, for example, a radial ball bearing. The bearing 560 includes an inner ring (or inner raceway) 561, an outer ring (or outer raceway) 562 having an inner diameter larger than an outer diameter of the inner ring 561 and arranged radially outside the inner ring 561, and a plurality of balls 563 arranged between the inner ring 561 and the outer ring 562. The bearing 560 is fixed to the inverter housing 531 by assembling the outer ring 562 to the boss-forming member 543. The inner ring 561 of the bearing 560 is fixed to the rotating shaft 501. In addition, each of the inner ring 561, the outer ring 562 and the balls 563 is formed of a metal material such as carbon steel.

The inner ring 561 of the bearing 560 has a cylindrical portion 561a for receiving the rotating shaft 501 and a flange 561b formed at one axial end of the cylindrical portion 561a to extend radially outward. The flange 561b is configured to abut the end plate 514 of the rotor carrier 511 from the axially inner side. After the assembly of the rotating electric machine 500, the rotor carrier 511 is held with its end plate 514 axially sandwiched between the flange 502 of the rotating shaft 501 and the flange 561b of the inner ring 561 of the bearing 560 (see FIG. 49). The angles made by the flange 502 of the rotating shaft 501 and the flange 561b of the inner ring 561 of the bearing 560 with the axial direction are equal (more particularly, both equal to 90° in the present embodiment).

With the inner ring 561 of the bearing 560 supporting the end plate 514 of the rotor carrier 511 from the axially inner side, it is possible to keep the angle made by the end plate 514 of the rotor carrier 511 with the axial direction at a suitable angle (e.g., 90° in the present embodiment), thereby maintaining high parallelism between the magnet unit 512 and the rotating shaft 501. Consequently, though the rotor carrier 511 is configured to radially expand, it is still possible to secure high resistance thereof to vibration.

Next, the electrical modules 532 received in the inverter housing 531 will be described.

The electrical modules 532 are obtained by dividing electrical components, such as semiconductor switching elements and smoothing capacitors, into a plurality of groups and modularizing each of the groups. The electrical modules 532 include switch modules (or power modules) 532A, which include the respective semiconductor switching elements, and capacitor modules 532B each including one smoothing capacitor.

As shown in FIGS. 49 and 50, on the inner circumferential surface of the inner wall member 542 of the inverter housing 531, there are fixed a plurality of spacers 549 each having a flat surface. On the flat surface of each of the spacers 549, there is mounted one of the electrical modules 532.

More specially, the inner circumferential surface of the inner wall member 542 of the inverter housing 531 is a smooth cylindrical surface whereas mounting surfaces of the electrical modules 532 are each a flat surface. Therefore, the spacers 549 each having a flat surface are first arranged on and fixed to the inner circumferential surface of the inner wall member 542 of the inverter housing 531 and then the mounting surfaces of the electrical modules 532 are respectively arranged on and fixed to the flat surfaces of the spacers 549.

It is not necessarily required to interpose the spacers 549 between the inner wall member 542 of the inverter housing 531 and the electrical modules 532. For example, as an alternative, the inner circumferential surface of the inner wall member 542 of the inverter housing 531 may be constituted of a plurality of flat surfaces to which the electrical modules 532 are respectively directly mounted. As another alternative, the mounting surfaces of the electrical modules 532 may be each formed as a curved surface, thereby allowing the electrical modules 532 to be directly mounted to the inner circumferential surface of the inner wall member 542 of the inverter housing 531. As yet another alternative, the electrical modules 532 may be fixed to the inverter housing 531 without abutting the inner circumferential surface of the inner wall member 542 of the inverter housing 531. For example, the electrical modules 532 may alternatively be fixed to the end plate 547 of the boss-forming member 543 of the inverter housing 531. As still another alternative, of the electrical modules 532, only the capacitor modules 532B may be fixed to the inverter housing 531 without abutting the inner circumferential surface of the inner wall member 542 of the inverter housing 531 while the switch modules 532A are fixed to abut the inner circumferential surface of the inner wall member 542.

In addition, in the case of interposing the spacers 549 between the inner wall member 542 of the inverter housing 531 and the electrical modules 532, the outer circumferential wall WA1 and the spacers 549 together correspond to a "tubular portion". In contrast, in the case of no spacers 549 being employed, the outer circumferential wall WA1 alone corresponds to the "tubular portion".

As described previously, in the outer circumferential wall WA1 of the inverter housing 531, there is formed the cooling water passage 545 through which cooling water flows as a coolant. Consequently, the electrical modules 532 can be cooled by the cooling water flowing through the cooling water passage 545. In addition, as the coolant, cooling oil may be employed instead of cooling water.

The cooling water passage 545 is formed over the entire circumference of the outer circumferential wall WA1 into an annular shape. Cooling water flows in the cooling water passage 545 from the upstream side to the downstream side, cooling the electrical modules 532. In the present embodiment, the cooling water passage 545 is annular-shaped and arranged to radially overlap the electrical modules 532 and surround the electrical modules 532 from the radially outer side of them.

As shown in FIGS. 49 and 50, in the inner wall member 542 of the inverter housing 531, there are also formed both an inflow passage 571 via which the cooling water flows into the cooling water passage 545 and an outflow passage 572 via which the cooling water flows out of the cooling water passage 545. Specifically, as described previously, in the present embodiment, the electrical modules 532 are fixed to the inner circumferential surface of the inner wall member 542. The electrical modules 532 are arranged in the circumferential direction with gaps formed therebetween. Moreover, one of the gaps formed between the circumferentially adjacent electrical modules 532 is considerably wider than the remaining gaps. In this wider gap, there is arranged a protruding portion 573 of the inner wall member 542 which protrudes radially inward. Both the inflow passage 571 and the outflow passage 572 are formed in the protruding portion 573 of the inner wall member 542 in circumferential alignment with each other.

Next, the arrangement of the electrical modules 532 in the inverter housing 531 will be described with reference to FIG. 58.

Figure 58:
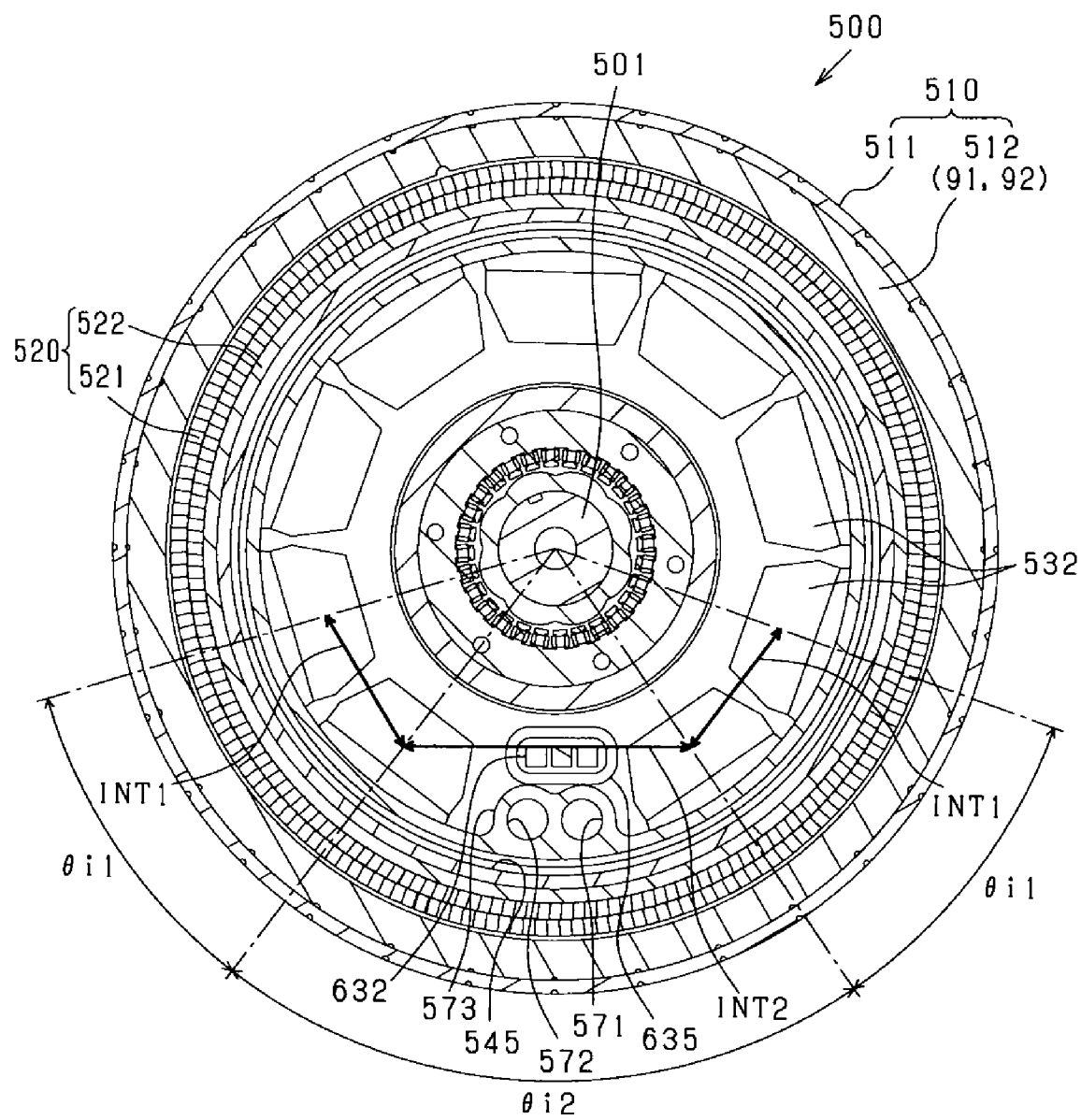
FIG. 58 is a schematic cross-sectional view illustrating the arrangement of electrical modules in an inverter housing of the inverter unit.

As shown in FIG. 58, the electrical modules 532 are arranged at predetermined intervals in the circumferential direction. The predetermined intervals between the electrical modules 532 include first intervals INT1 and a second interval INT2 that is wider than the first intervals INT1. Each of the predetermined intervals is represented by, for example, a circumferential distance between center positions of one circumferentially-adjacent pair of the electrical modules 532. Moreover, each of the first intervals INT1 is provided between one circumferentially-adjacent pair of the electrical modules 532 between which no protruding portion 573 is interposed. In contrast, the second interval INT2 is provided between the circumferentially-adjacent pair of the electrical modules 532 between which the protruding portion 573 of the inner wall member 542 is interposed. In addition, the protruding portion 573 is located at, for example, the center of the second interval INT2.

The intervals INT1 and INT2 may be defined on the same circle whose center is on the central axis of the rotating shaft 501. In this case, each of the intervals is represented by the circumferential distance (or the length of arc) on the circle between the center positions of one circumferentially-adjacent pair of the electrical modules 532. Alternatively, each of the intervals may be represented by the angular range $\theta i1$ or $\theta i2$ between the center positions of one circumferentially-adjacent pair of the electrical modules 532. In this case, $\theta i1$ represents the first intervals INT1 while $\theta i2$ represents the second interval INT2 ($\theta i1 < \theta i2$).

In addition, the first intervals INT1 may alternatively be eliminated (or set to zero). In this case, the electrical components 532 are arranged in the circumferential direction in contact with one another.

Referring back to FIG. 48, in the end plate 547 of the boss-forming member 543 of the inverter housing 531, there is provided a cooling water port 574 where ends of the inflow passage 571 and the outflow passage 572 are formed. Both the inflow passage 571 and the outflow passage 572 are configured to be included in a cooling water circulation path 575 through which the cooling water circulates. The cooling water circulation path 575 also includes cooling water pipes, a cooling water pump 576 and a heat dissipation device 577. In operation, with the drive of the cooling water pump 576, the cooling water circulates through the cooling water circulation path 575. In addition, the cooling water pump 576 is implemented by an electric pump. The heat dissipation device 577 is implemented by, for example, a radiator configured to dissipate heat of the cooling water to the atmosphere.

As shown in FIG. 50, the stator 520 is arranged on the radially outer side of the outer circumferential wall WA1 of the inverter housing 531 while the electrical modules 532 are arranged on the radially inner side of the outer circumferential wall WA1. Consequently, heat generated in the stator 520 is transmitted to the outer circumferential wall WA1 from the radially outer side while heat generated in the electrical modules 532 is transmitted to the outer circumferential wall WA1 from the radially inner side. As a result, the stator 520 and the electrical modules 532 can be cooled at the same time by the cooling water flowing through the cooling water passage 545. That is, it is possible to effectively dissipate heat generated in these components of the rotating electric machine 500.

Next, the electrical configuration of an inverter (or electric power converter) 600, which is formed in the inverter unit 530, will be described with reference to FIG. 59.

Figure 59:
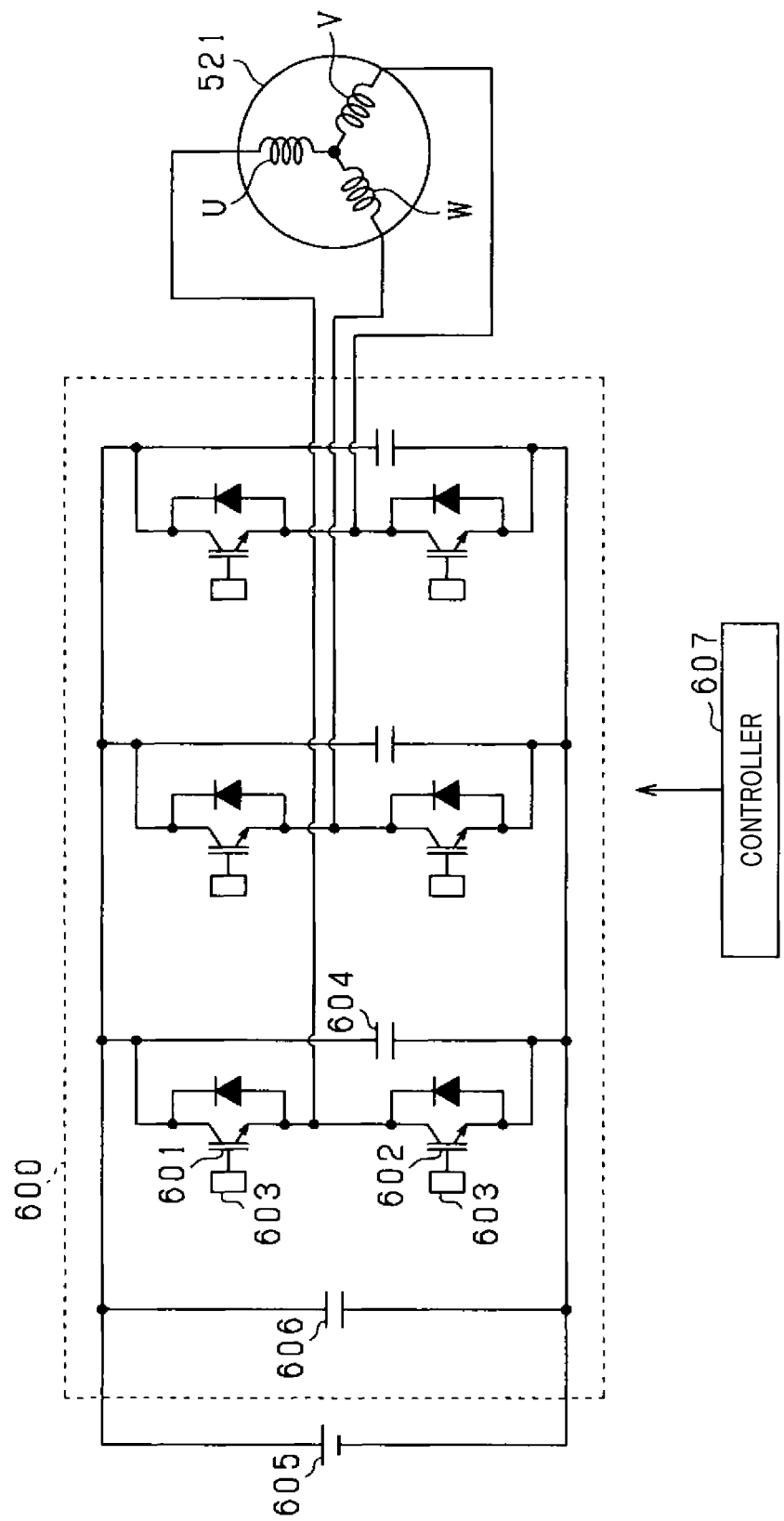
FIG. 59 is a schematic circuit diagram illustrating the electrical configuration of an inverter formed in the inverter unit.

As shown in FIG. 59, in the present embodiment, the stator coil 521 is comprised of the U, V, and W phase windings. The inverter 600 is electrically connected with the stator coil 521.

In the inverter 600, there is formed a full bridge circuit having a plurality of pairs of upper and lower arms. The number of pairs of the upper and lower arms is equal to the number of the phase windings of the stator coil 521 (i.e., three in the present embodiment). The full bridge circuit includes, for each of the U, V and W phases, one serially-connected switch pair consisting of an upper-arm switch 601 and a lower-arm switch 602. Each of the switches 601 and 602 is turned on and off by a corresponding drive circuit 603, so as to supply alternating current to a corresponding one of the U, V, and W phase windings. Each of the switches 601 and 602 is configured with a semiconductor switching element such as a MOSFET or an IGBT. Moreover, each serially-connected switch pair, which corresponds to one of the U, V and W phases and consists of one upper-arm switch

601 and one lower-arm switch 602, has a charge supply capacitor 604 connected in parallel therewith to supply electric charge required for the on/off operation of the switches 601 and 602.

Operation of the inverter 600 is controlled by a controller (or control unit) 607. The controller 607 includes a microcomputer which is configured with a CPU and various memories. Based on various types of detected information on the rotating electric machine 500 and power running drive and electric power generation requests, the controller 607 performs energization control by turning on and off the switches 601 and 602 of the inverter 600. More specifically, the controller 607 controls the on/off operation of each of the switches 601 and 602 by, for example, PWM control at a predetermined switching frequency (or carrier frequency) or a rectangular wave control. The controller 607 may be either a built-in controller incorporated in the rotating electric machine 500 or an external controller provided outside the rotating electric machine 500.

In the present embodiment, the electrical time constant of the rotating electric machine 500 is lowered with reduction in the inductance of the stator 520. When the electrical time constant is lowered, it is preferable to increase the switching frequency (or carrier frequency) and the switching speed. In this regard, with the charge supply capacitor 604 connected in parallel with the serially-connected switch pair of each phase, the wiring inductance is lowered. Consequently, even with the increased switching speed, it is still possible to suitably cope with surge.

The inverter 600 has its high potential-side terminal connected to a positive terminal of a DC power supply 605 and its low potential-side terminal connected to a negative terminal of the DC power supply 605 (or ground). Moreover, between the high potential-side and low potential-side terminals of the inverter 600, there are further connected smoothing capacitors 606 in parallel with the DC power supply 605. It should be noted that for the sake of simplicity, only one smoothing capacitor 606 is shown in FIG. 59.

Each of the switch modules 532A includes those components corresponding to one phase which include the upper-arm and lower-arm switches 601 and 602 (i.e., semiconductor switching elements), the drive circuit 603 (more specifically, electrical elements constituting the drive circuit 603) and the charge supply capacitor 604. On the other hand, each of the capacitor modules 532B includes one of the smoothing capacitors 606.

Figure 60:
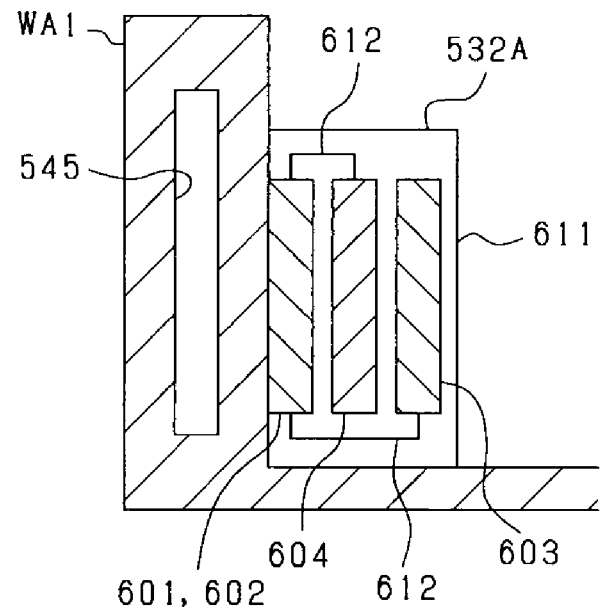
FIG. 60 is a schematic cross-sectional view illustrating a configuration example of switch modules of the inverter unit.

FIG. 60 shows a specific configuration example of the switch modules 532A.

As shown in FIG. 60, each of the switch modules 532A includes a module case 611 as a receiving case. In the module case 611, there are received those components corresponding to one phase which include the upper-arm and lower-arm switches 601 and 602, the drive circuit 603 and the charge supply capacitor 604. In addition, the drive circuit 603 is configured as a dedicated IC or circuit board.

The module case 611 is formed of an electrically insulative material such as a resin. The module case 611 is fixed to the outer circumferential wall WA1 of the inverter housing 531 with a side surface of the module case 611 abutting the inner circumferential surface of the inner wall member 542 of the inverter housing 531. A molding material (e.g., a resin) is filled in the module case 611. Moreover, in the module case 611, electrical connection between the switches 601 and 602 and the drive circuit 603 and between the switches 601 and 602 and the charge supply capacitor 604 is made by wirings 612.

In addition, each of the switch modules 532A is mounted to the outer circumferential wall WA1 of the inverter housing 531 via the corresponding spacer 549. However, for the sake of simplicity, the corresponding spacer 549 is not shown in FIG. 60.

In the state of each of the switch modules 532A being fixed to the outer circumferential wall WA1 of the inverter housing 531, the cooling performance in the switch module 532A increases with decrease in the distance from the outer circumferential wall WA1, i.e., with decrease in the distance from the cooling water passage 545. Therefore, in each of the switch modules 532A, the upper-arm and lower-arm switches 601 and 602, the drive circuit 603 and the charge supply capacitor 604 are arranged taking into account the above-described cooling performance therein. More specifically, the amounts of heat generated by these components decrease in the order of the switches 601 and 602, the charge supply capacitor 604 and the drive circuit 603. Therefore, as shown in FIG. 60, these components are sequentially arranged from the outer circumferential wall WA1 side in the order of the switches 601 and 602, the charge supply capacitor 604 and the drive circuit 603. In addition, the contact surface of each of the switch modules 532A may be smaller than the contactable surface provided in the inner circumferential surface of the inner wall member 542 of the inverter housing 531.

In addition, though not shown in the figures, each of the capacitor modules 532B also includes a module case that has the same shape and size and the module cases 611 of the switch modules 532A. In the module case of each of the capacitor modules 532B, there is received one of the smoothing capacitors 606. Similar to the switch modules 532A, the capacitor modules 532B are also fixed to the outer circumferential wall WA1 of the inverter housing 531 with a side surface of the module case thereof abutting the inner circumferential surface of the inner wall member 542 of the inverter housing 531.

On the radially inner side of the outer circumferential wall WA1 of the inverter housing 531, the switch modules 532A and the capacitor modules 532B are not necessarily arranged on the same circle (or at the same radial position). For example, the switch modules 532A may be arranged radially inside or radially outside the capacitor modules 532B.

During operation of the rotating electric machine 500, heat exchange is made between the switch modules 532A and the capacitor modules 532B and the cooling water flowing through the cooling water passage 545 via the inner wall member 542 of the inverter housing 531. Consequently, the switch modules 532A and the capacitor modules 532B are cooled.

Each of the electrical modules 532 may alternatively be configured so that the cooling water flows from the cooling water passage 545 into the electrical module 532, thereby cooling the components of the electrical module 532.

Figure 61A:
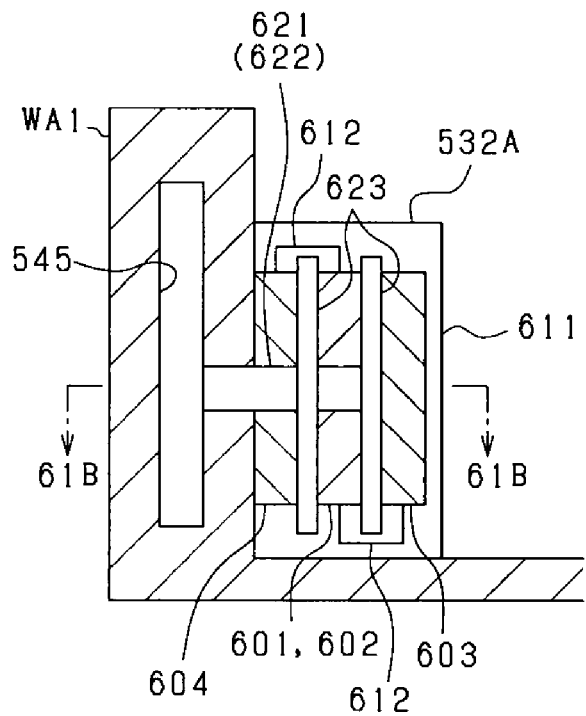
FIG. 61A is a schematic cross-sectional view illustrating a first exemplary water-cooling structure of the switch modules of the inverter unit.
Figure 61B:
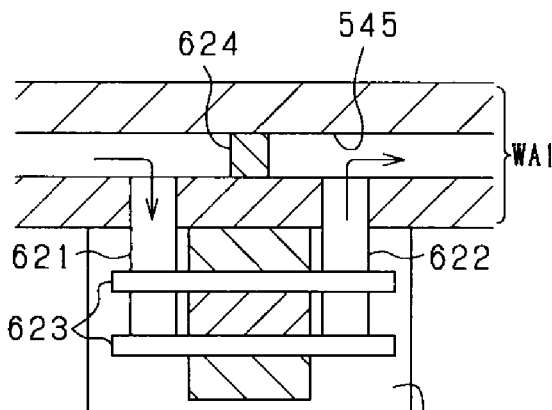
FIG. 61B is a schematic cross-sectional view taken along the line 61B-61B in FIG. 61A.

FIGS. 61A and 61B together show a first exemplary water-cooling structure of the switch modules 532A. FIG. 61A is a schematic cross-sectional view corresponding to FIG. 60. FIG. 61B is a schematic cross-sectional view taken along the line 61B-61B in FIG. 61A.

As shown in FIGS. 61A and 61B, the first exemplary water-cooling structure includes a pair of cooling water pipes 621 and 622 and at least one radiator 623. The cooling water pipe 621 is an inflow pipe via which the cooling water flows from the cooling water passage 545 formed in the outer circumferential wall WA1 of the inverter housing 531 into the at least one radiator 623. In contrast, the cooling water pipe 622 is an outflow pipe via which the cooling water flows out of the at least one radiator 623, returning to the cooling water passage 545 formed in the outer circumferential wall WA1. The at least one radiator 623 is provided according to the cooling targets. In the example shown FIGS. 61A and 61B, there are provided two radiators 623 that are radially spaced from and aligned with each other. The cooling water is supplied to the radiators 623 via the inflow and outflow cooling water pipes 621 and 622. Each of the radiators 623 is configured to be, for example, hollow inside. It should be noted that each of the radiators 623 may have inner fins formed therein.

In the case of the number of the radiators 623 being equal to two, there are the following three locations in the switch module 532A to arrange the electrical components (i.e., the cooling targets): (1) a location on the outer circumferential wall WA1 side of the radiators 623; (2) a location between the radiators 623; and (3) a location on the opposite side of the radiators 623 to the outer circumferential wall WA1. The cooling performance at these locations decreases in the order of (2), (1) and (3). That is, the cooling performance is highest at the location (2) between the radiators 623 and lowest at the location (3) which is furthest from the outer circumferential wall WA1 (or the cooling water passage 545) and adjoins only one of the radiators 623. Therefore, of the electrical components of the switch module 532A, the switches 601 and 602 are arranged at the location (2); the charge supply capacitor 604 is arranged at the location (1); and the drive circuit 603 is arranged at the location (3). In addition, as an alternative, though not shown in the figures, the drive circuit 603 may be arranged at the location (1) and the charge supply capacitor 604 may be arranged at the location (3).

In any of the above-described cases, in the module case 611, electrical connection between the switches 601 and 602 and the drive circuit 603 and between the switches 601 and 602 and the charge supply capacitor 604 is made by the wirings 612. Moreover, with the switches 601 and 602 interposed between the drive circuit 603 and the charge supply capacitor 604, the extending direction of the wiring 612 that extends from the switches 601 and 602 to the drive circuit 603 is opposite to the extending direction of the wiring 612 that extends from the switches 601 and 602 to the charge supply capacitor 604.

As shown in FIG. 61B, the pair of inflow and outflow cooling water pipes 621 and 622 are arranged in the circumferential direction (or the flow direction of the cooling water in the cooling water passage 545) so as to be respectively located on the upstream and downstream sides with respect to the flow of the cooling water in the cooling water passage 545. The cooling water flows into the radiators 623 via the inflow cooling water pipe 621 located on the upstream side, and then flows out of the radiators 623 via the outflow cooling water pipe 622 located on the downstream side. In addition, to facilitate the flow of the cooling water into the radiators 623, a flow regulator 624 may be arranged, in the cooling water passage 545, between the inflow and outflow cooling water pipes 621 and 622 in the circumferential direction to regulate the flow of the cooling water through the cooling water passage 545. The flow regulator 624 may be configured to block the cooling water passage 545 or to reduce the cross-sectional area of the cooling water passage 545.

Figure 62A:
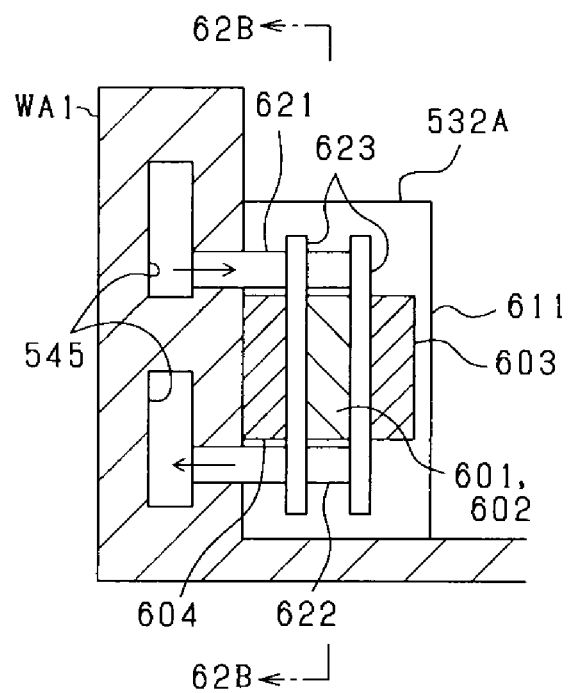
FIG. 62A is a schematic cross-sectional view illustrating a second exemplary water-cooling structure of the switch modules of the inverter unit.
Figure 62B:
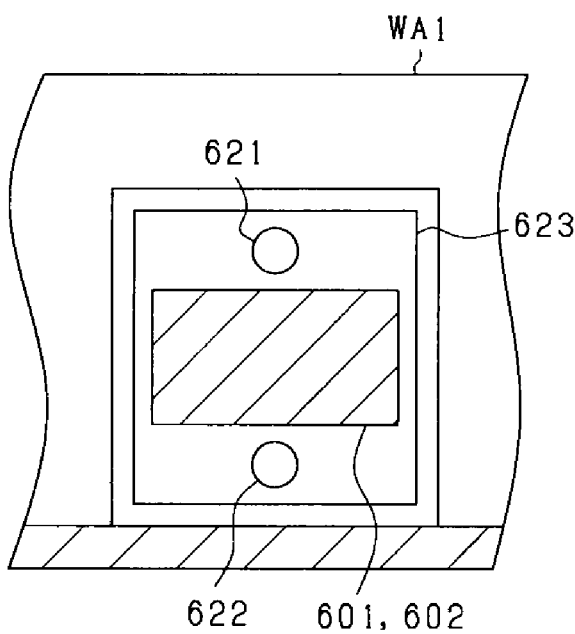
FIG. 62B is a schematic cross-sectional view taken along the line 62B-62B in FIG. 62A.
Figure 62C:
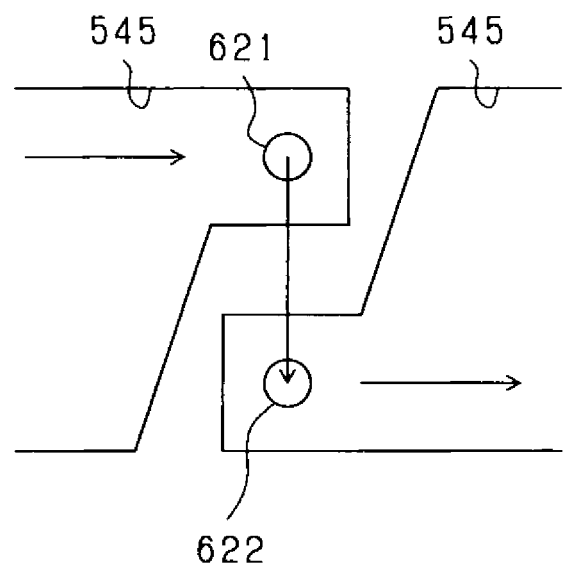
FIG. 62C is a schematic view illustrating the positional relationship between a pair of inflow and outflow cooling water pipes in the second exemplary water-cooling structure.

FIGS. 62A-62C together show a second exemplary water-cooling structure of the switch modules 532A. FIG. 62A is a schematic cross-sectional view corresponding to FIG. 60. FIG. 62B is a schematic cross-sectional view taken along the line 62B-62B in FIG. 62A. FIG. 62C is a schematic view illustrating the positional relationship between the inflow and outflow cooling water pipes 621 and 622 in the second exemplary water-cooling structure.

As shown in FIGS. 62A-62C, in the second exemplary water-cooling structure, the inflow and outflow cooling water pipes 621 and 622 are arranged in the axial direction, more specifically, spaced from and aligned with each other in the axial direction. Moreover, the cooling water passage 545 is partitioned into two parts that are separated from each other in the axial direction and respectively communicate with the inflow and outflow cooling water pipes 621 and 622 (see FIG. 62C). The two parts of the cooling water passage 545 are fluidically connected with each other via the inflow cooling water pipe 621, the radiators 623 and the outflow cooling water pipe 622.

Figure 63A:
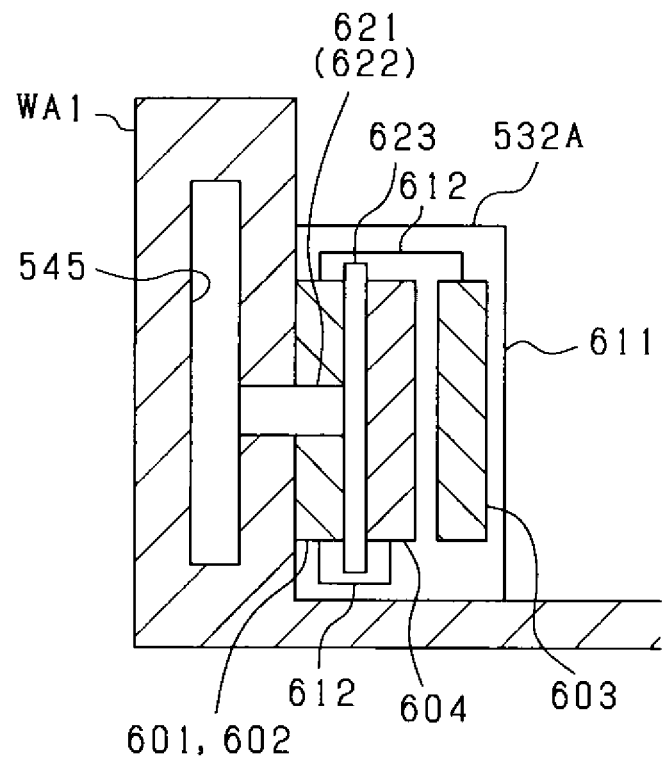
FIG. 63A is a schematic cross-sectional view illustrating a third exemplary water-cooling structure of the switch modules of the inverter unit.

FIG. 63A shows a third exemplary water-cooling structure of the switch modules 532A. In this water-cooling structure, the number of the radiators 623 is reduced to one from two in the example shown in FIGS. 61A and 61B. Consequently, with the single radiator 623, there are the following three locations in the switch module 532A where the electrical components (i.e., the cooling targets) can be arranged: (1) a location on the outer circumferential wall WA1 side of the radiator 623; (2) a location on the opposite side of the radiator 623 to the outer circumferential wall WA1 and immediately adjacent to the radiator 623; and (3) a location on the opposite side of the radiator 623 to the outer circumferential wall WA1 and apart from the radiator 623. The cooling performance at these locations decreases in the order of (1), (2) and (3). Therefore, of the electrical components of the switch module 532A, the switches 601 and 602 are arranged at the location (1); the charge supply capacitor 604 is arranged at the location (2); and the drive circuit 603 is arranged at the location (3).

As described above, in the present embodiment, each of the switch modules 532A includes those components corresponding to one phase which include the upper-arm and lower-arm switches 601 and 602, the drive circuit 603 and the charge supply capacitor 604. As an alternative, each of the switch modules 532A may include the upper-arm and lower-arm switches 601 and 602 and one of the drive circuit 603 and the charge supply capacitor 604. In this case, each of the switch modules 532A may have a water-cooling structure as shown in FIG. 63B.

Figure 63B:
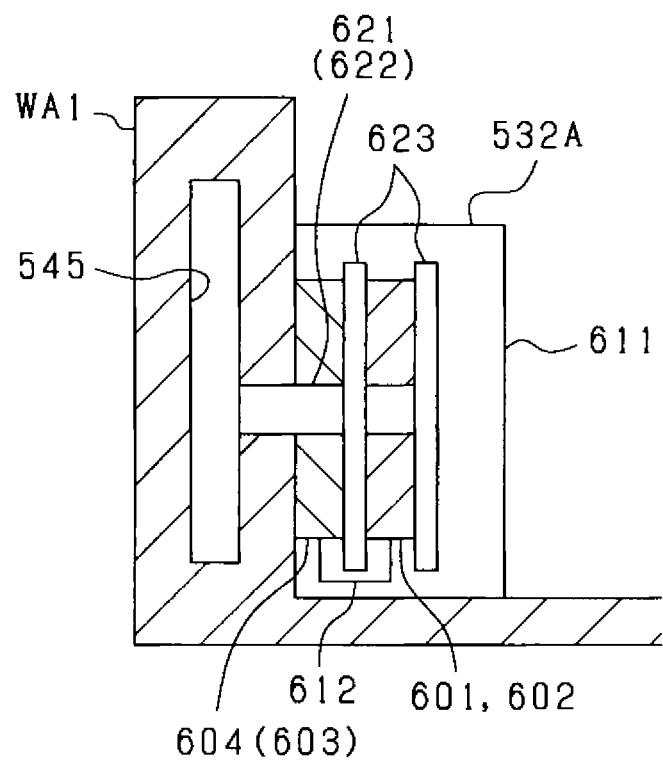
FIG. 63B is a schematic cross-sectional view illustrating a fourth exemplary water-cooling structure of the switch modules of the inverter unit.

In the fourth exemplary water-cooling structure shown in FIG. 63B, there are provided two radiators 623 as in the example shown in FIGS. 61A and 61B. Therefore, the switches 601 and 602 are arranged at the location between the radiators 623, where the cooling performance is highest. One of the drive circuit 603 and the charge supply capacitor 604 (i.e., the drive circuit 603 or the charge supply capacitor 604) is arranged at the location on the outer circumferential wall WA1 side of the radiators 623. Alternatively, the switches 601 and 602 and the drive circuit 603 may be integrated into a semiconductor module and the semiconductor module may be arranged at the location between the radiators 623 while the charge supply capacitor 604 is arranged at the location on the outer circumferential wall WA1 side of the radiators 623.

In addition, in the fourth exemplary water-cooling structure shown in FIG. 63B, the charge supply capacitor 604 may be provided at either or both of the location on the outer circumferential wall WA1 side of the radiators 623 and the location on the opposite side of the radiators 623 to the outer circumferential wall WA1.

In the present embodiment, of the electrical modules 532, only the switch modules 532A have a water-cooling structure formed therein. However, similar to the switch modules 532A, the capacitor modules 532B may also have a water-cooling structure formed therein.

Figure 64:
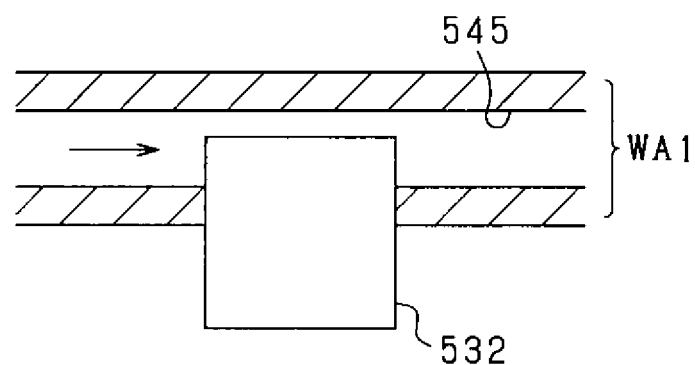
FIG. 64 is a schematic view illustrating a configuration example where each of the electrical modules of the inverter unit is arranged to have its outer surface directly exposed to cooling water.

Moreover, each of the electrical modules 532 may be arranged to have its outer surface directly exposed to the cooling water, thereby being cooled by the cooling water. For example, as shown in FIG. 64, each of the electrical modules 532 may be embedded into the outer circumferential wall WA1 to have its outer surface directly exposed to the cooling water flowing through the cooling water passage 545. Moreover, in the example shown in FIG. 64, only part of each of the electrical modules 532 is immersed in the cooling water. As an alternative, the radial dimension of the cooling water passage 545 may be increased to have the whole of each of the electrical modules 532 immersed in the cooling water. Furthermore, fins may be provided in the immersed module case 611 (or immersed part of the module case 611) of each of the electrical modules 532, thereby further improving the cooling performance.

In the present embodiment, the electrical modules 532 include the switch modules 532A and the capacitor modules 532B as described above. However, the amount of heat generated by the switch modules 532A is different from the amount of heat generated by the capacitor modules 532B. Therefore, it is preferable to arrange the electrical modules 532 in the inverter housing 531 taking into account the above fact.

Figure 65:
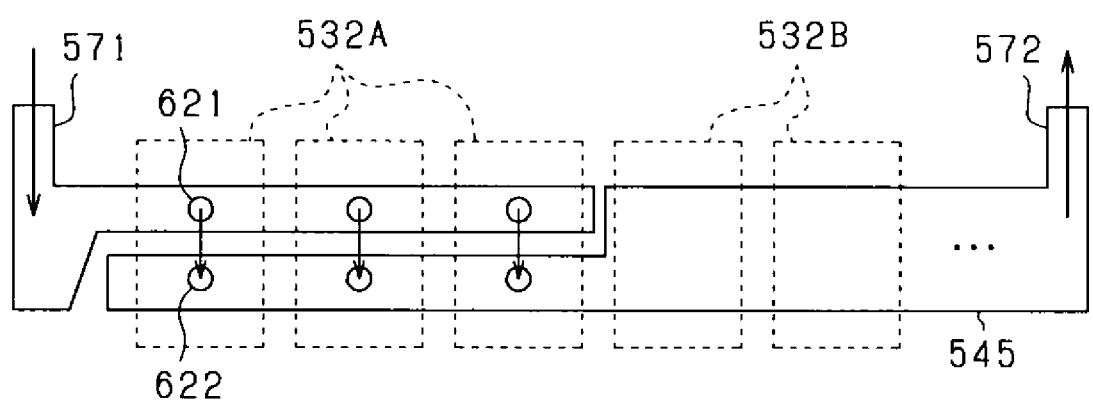
FIG. 65 is a schematic view illustrating an exemplary arrangement of the electrical modules with respect to a cooling water passage in the inverter unit.

For example, as shown in FIG. 65, all of the switch modules 532A may be arranged adjacent to one another in the circumferential direction and located on the upstream side of the cooling water passage 545 (or on the side closer to the inflow passage 571). In this case, the cooling water flowing into the cooling water passage 545 from the inflow passage 571 first cools the switch modules 532A and then cools the capacitor modules 532B located on the downstream side. In addition, in the example shown in FIG. 65, in each of the switch modules 532, the inflow and outflow cooling water pipes 621 and 622 are spaced from and aligned with each other in the axial direction as in the example shown in FIGS. 62A-62C. As an alternative, the inflow and outflow cooling water pipes 621 and 622 may be spaced from and aligned with each other in the circumferential direction as in the example shown in FIGS. 61A and 61B.

Next, electrical connection between the electrical modules 532 and the busbar module 533 will be described with reference to FIGS. 66 and 68.

Figure 66:
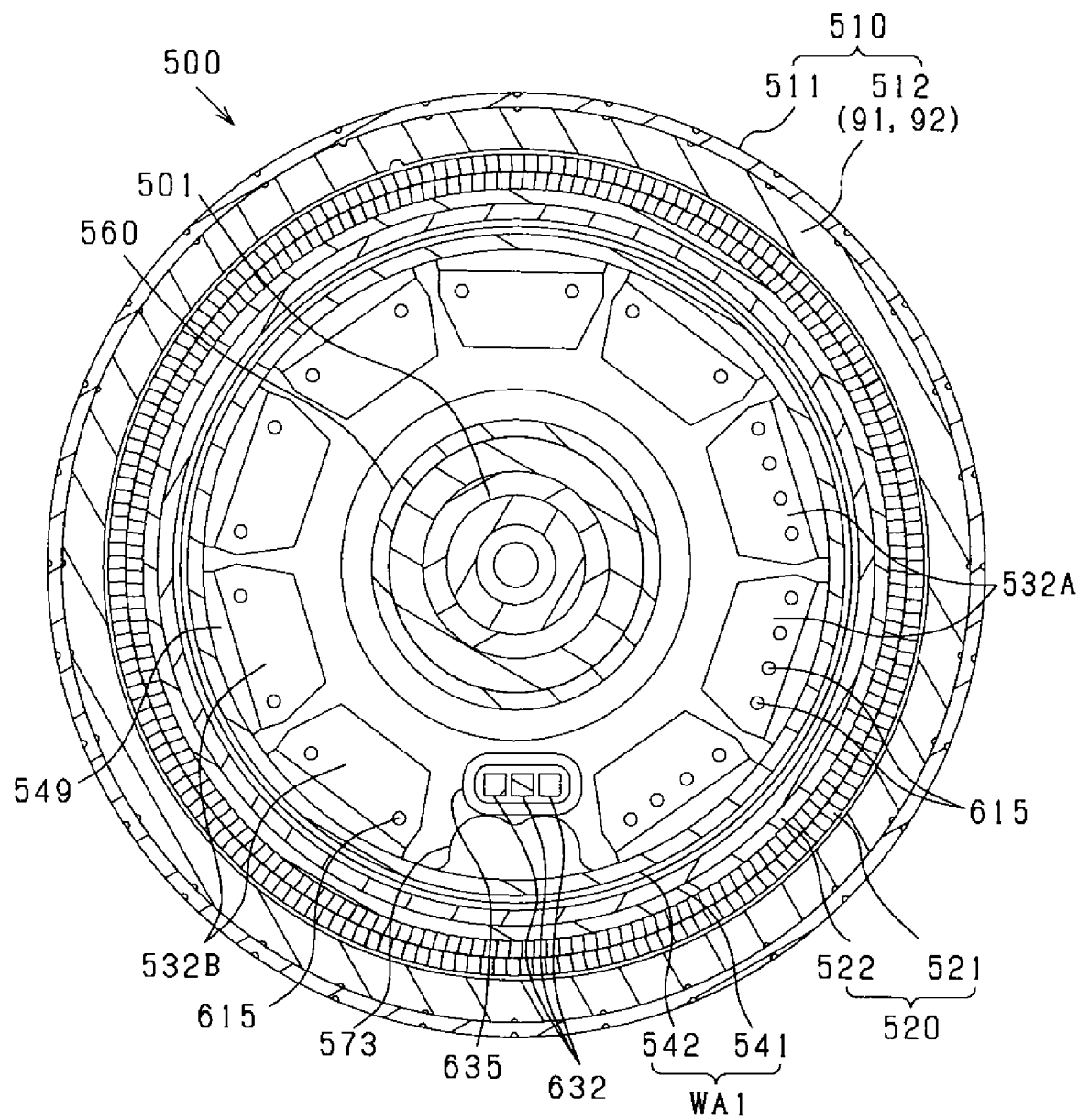
FIG. 66 is a cross-sectional view taken along the line 66-66 in FIG. 49.
Figure 67:
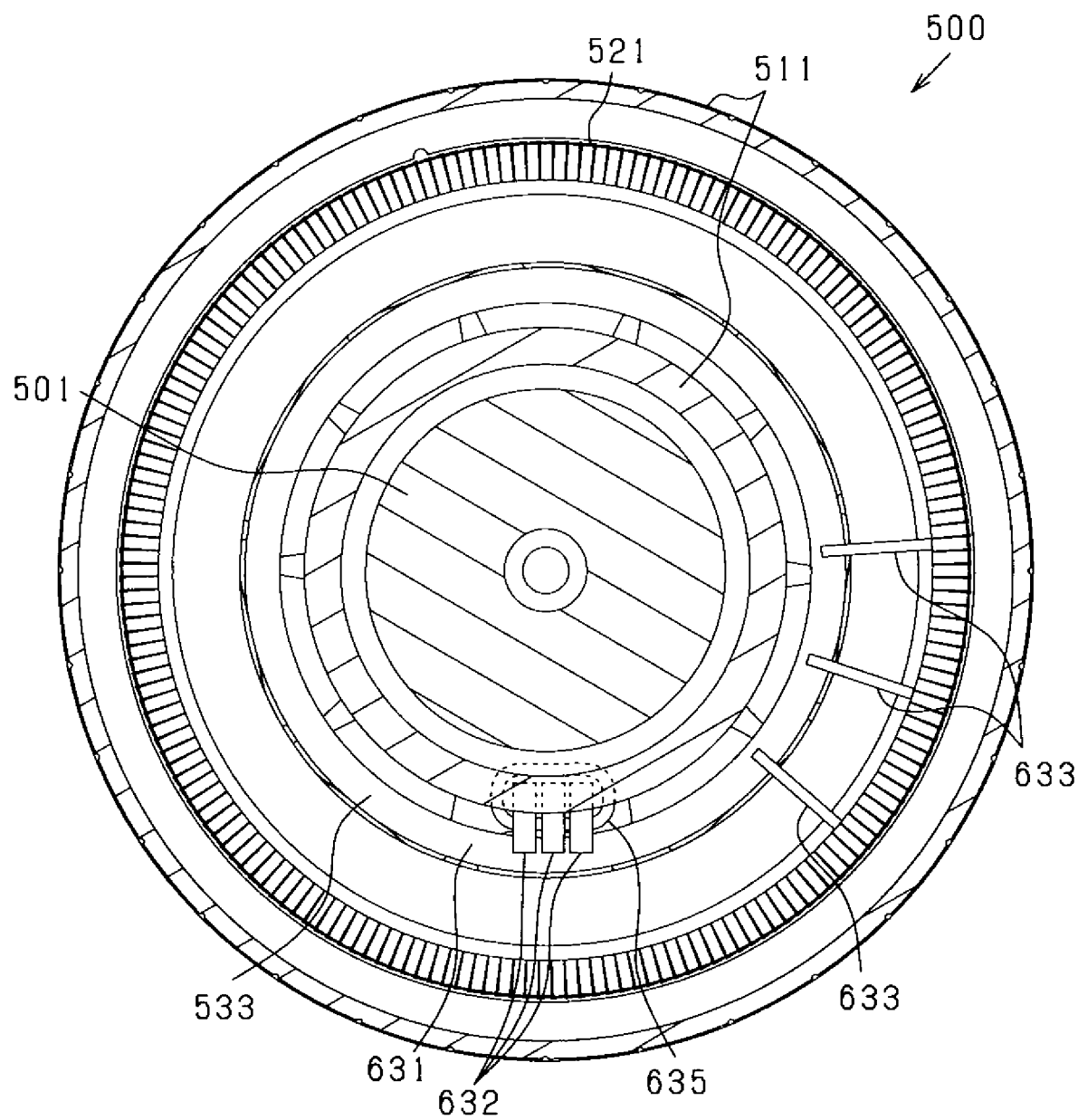
FIG. 67 is a cross-sectional view taken along the line 67-67 in FIG. 49.

FIG. 66 is a cross-sectional view taken along the line 66-66 in FIG. 49. FIG. 67 is a cross-sectional view taken along the line 67-67 in FIG. 49. FIG. 68 is a perspective view of the busbar module 533.

As shown in FIG. 66, in the inverter housing 531, at a location circumferentially adjacent to the protruding portion 573 of the inner wall member 542 of the inverter housing 531 (i.e., the protruding portion 573 where both the inflow passage 571 and the outflow passage 572 are formed), three switch modules 532A are arranged adjacent to one another in the circumferential direction. Following the switch modules 532A, six capacitor modules 532B are arranged adjacent to one another in the circumferential direction. More specifically, the space radially inside the outer circumferential wall WA1 of the inverter housing 531 is equally divided into ten (i.e., the number of the electrical modules+1) regions in the circumferential direction. Of the ten regions, each of nine regions has one of the electrical modules 532 arranged therein; the remaining region has the protruding portion 573 of the inner wall member 542 received therein. In addition, the three switch modules 532A respectively correspond to the U, V and W phases.

Referring again to FIGS. 56 and 57 together with FIG. 66, each of the electrical modules 532 (i.e., switch modules 532A and capacitor modules 532B) has a plurality of module terminals 615 axially extending from the module case 611 thereof. The module terminals 615 are module input/output terminals via which electrical input/output of the electrical module 532 is made. The module terminals 615 are formed to extend from the module case 611 toward the inside of the rotor carrier 511 (or the outside of the vehicle) in the axial direction (see FIG. 51).

Each of the module terminals 615 of the electrical modules 532 is connected with the busbar module 533. The number of the module terminals 615 provided in each of the switch module 532A is different from the number of the module terminals 615 provided in each of the capacitor modules 532B. More particularly, in the present embodiment, the number of the module terminals 615 provided in each of the switch module 532A is equal to four while the number of the module terminals 615 provided in each of the capacitor modules 532B is equal to two.

Figure 68:
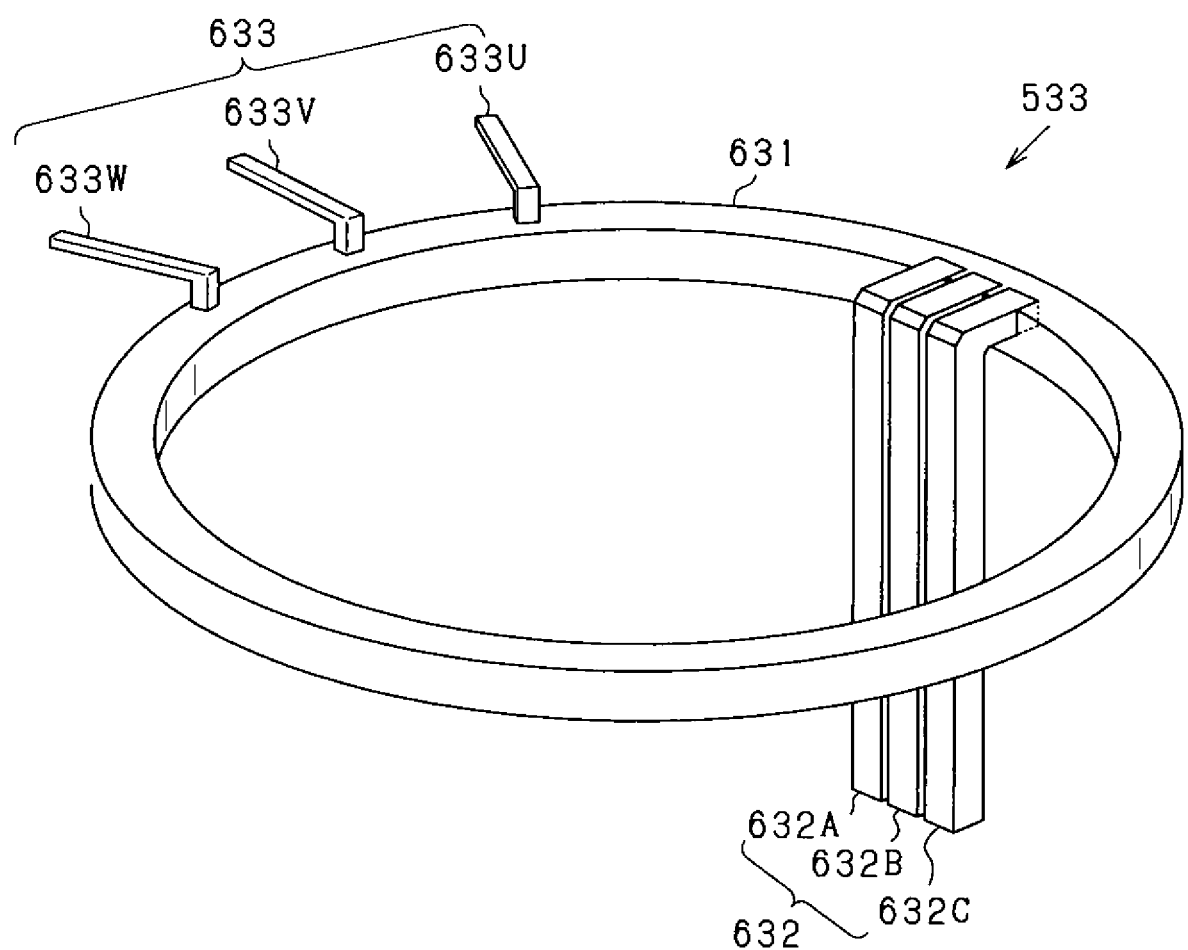
FIG. 68 is a perspective view of a busbar module of the inverter unit.

As shown in FIG. 68, the busbar module 533 has an annular main body 631, three external connection terminals 632 each axially extending from the annular main body 631 so as to be connected to the DC power supply 605 or an external ECU (Electronic Control Unit), and three winding connection terminals 633 to be respectively connected to the phase windings of the stator coil 521. In addition, the busbar module 533 corresponds to a "terminal module".

The annular main body 631 is located radially inside the outer circumferential wall WA1 of the inverter housing 531 and on one axial side of the electrical modules 532. The annular main body 631 includes an annular insulating member formed of an electrically insulative material (e.g., a resin) and a plurality of busbars embedded in the insulating member. The busbars are connected with the module terminals 615 of the electrical modules 532, the external connection terminals 632 and the phase windings of the stator coil 521. The configuration of the busbars will be described in detail later.

The external connection terminals 632 include a high potential-side power terminal 632A connected to the positive terminal of the DC power supply 605, a low potential-side power terminal 632B connected to the negative terminal of the DC power supply 605, and a signal terminal 632C connected to the external ECU. The external connection terminals 632 (i.e., 632A-632C) are arranged in alignment with each other in the circumferential direction and extend in the axial direction on the radially inner side of the annular main body 631.

As shown in FIG. 51, after the assembly of the inverter unit 530, each of the external connection terminals 632 has one end axially protruding from the end plate 547 of the boss-forming member 543 of the inverter housing 531. More specifically, as shown in FIGS. 56 and 57, in the end plate 547 of the boss-forming member 543, there are formed insertion holes 547a. Each of the insertion holes 547a has a hollow cylindrical grommet 635 inserted therein. The external connection terminals 632 extend respectively through the insertion holes 547a with the respective grommets 635 inserted therein. In addition, the grommets 635 function as hermetic connectors.

The winding connection terminals 633 are formed to extend from the annular main body 631 radially outward, so as to be respectively connected to ends of the phase windings of the stator coil 521. The winding connection terminals 633 include a U-phase winding connection terminal 633U connected to one end of the U-phase winding of the stator coil 521, a V-phase winding connection terminal 633V connected to one end of the V-phase winding of the stator coil 521, and a W-phase winding connection terminal 633W connected to one end of the W-phase winding of the stator coil 521. Moreover, current sensors 634 (see FIG. 70) may be provided to detect electric currents (i.e., U-phase current, V-phase current or W-phase current) respectively flowing through the winding connection terminals 633 and the phase windings of the stator coil 521.

In addition, the current sensors 634 may be arranged outside the electrical modules 532 and close to the respect winding connection terminals 633, or arranged inside the electrical modules 532.

Hereinafter, electrical connection between the electrical modules 532 and the busbar module 533 will be described in more detail with reference to FIGS. 69 and 70.

Figure 69:
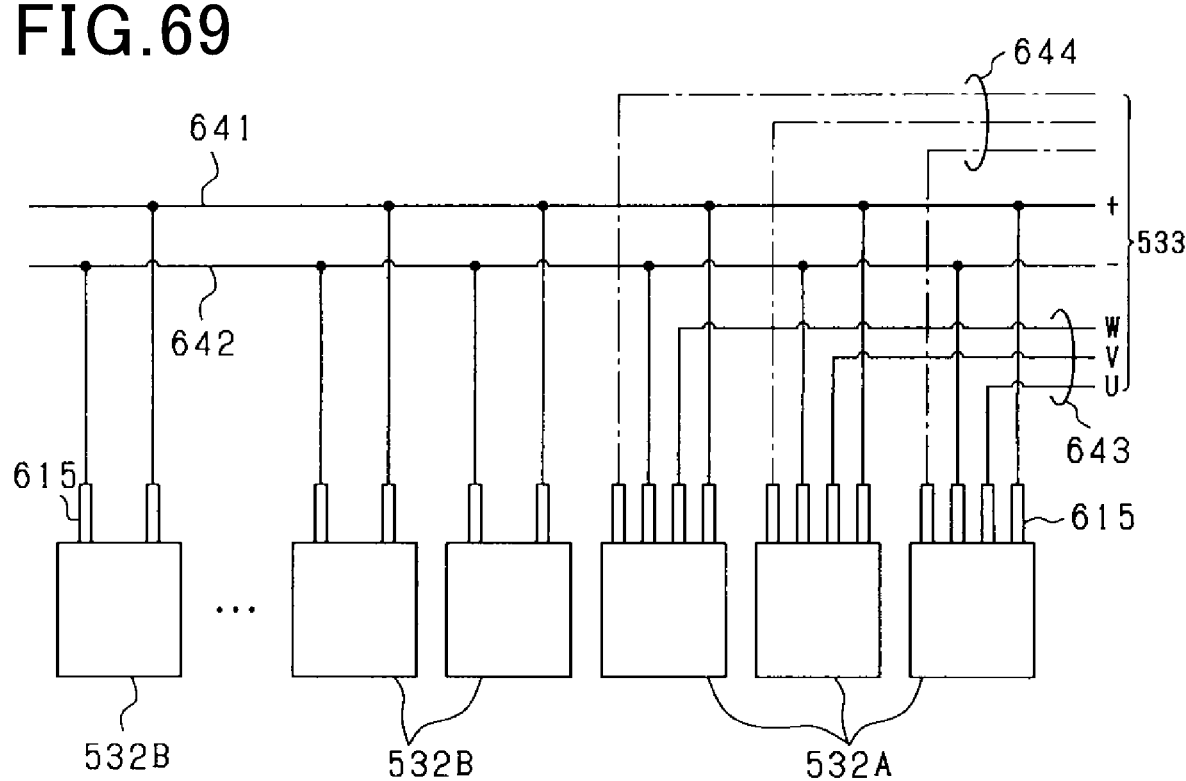
FIG. 69 is a development of the electrical modules illustrating electrical connection between the electrical modules and the busbar module.

FIG. 69 is a development of the electrical modules 532 illustrating electrical connection between the electrical modules 532 and the busbar module 533. FIG. 70 is a schematic view illustrating electrical connection between the electrical modules 532, which are arranged in an annular shape, and the busbar module 533. In addition, in FIG. 69, electric power transmission paths are shown with solid lines while signal transmission paths are shown with one-dot chain lines. On the other hand, in FIG. 70, only the electric power transmission paths are shown with solid lines, omitting the signal transmission paths.

The busbar module 533 includes a first busbar 641, a second busbar 642 and three third busbars 643 as electric power transmission busbars. The first busbar 641 is connected with the high potential-side power terminal 632A. The second busbar 642 is connected with the low potential-side power terminal 632B. The three third busbars 643 are respectively connected with the U-phase, V-phase and W-phase winding connection terminals 633U, 633V and 633W.

It is particularly easy for heat to be generated in the winding connection terminals 633 and the third busbars 643 by operation of the rotating electric machine 500. Therefore, a terminal block (not shown) may be provided between the winding connection terminals 633 and the third busbars 643 and arranged to abut the inverter housing 531 that has the cooling water passage 545 formed therein. Alternatively, the winding connection terminals 633 and the third busbars 643 may be crank-shaped and arranged to abut the inverter housing 531 that has the cooling water passage 545 formed therein.

With either of the above configurations, it is possible to dissipate heat generated in the winding connection terminals 633 and the third busbars 643 to the cooling water flowing through the cooling water passage 545.

Figure 70:
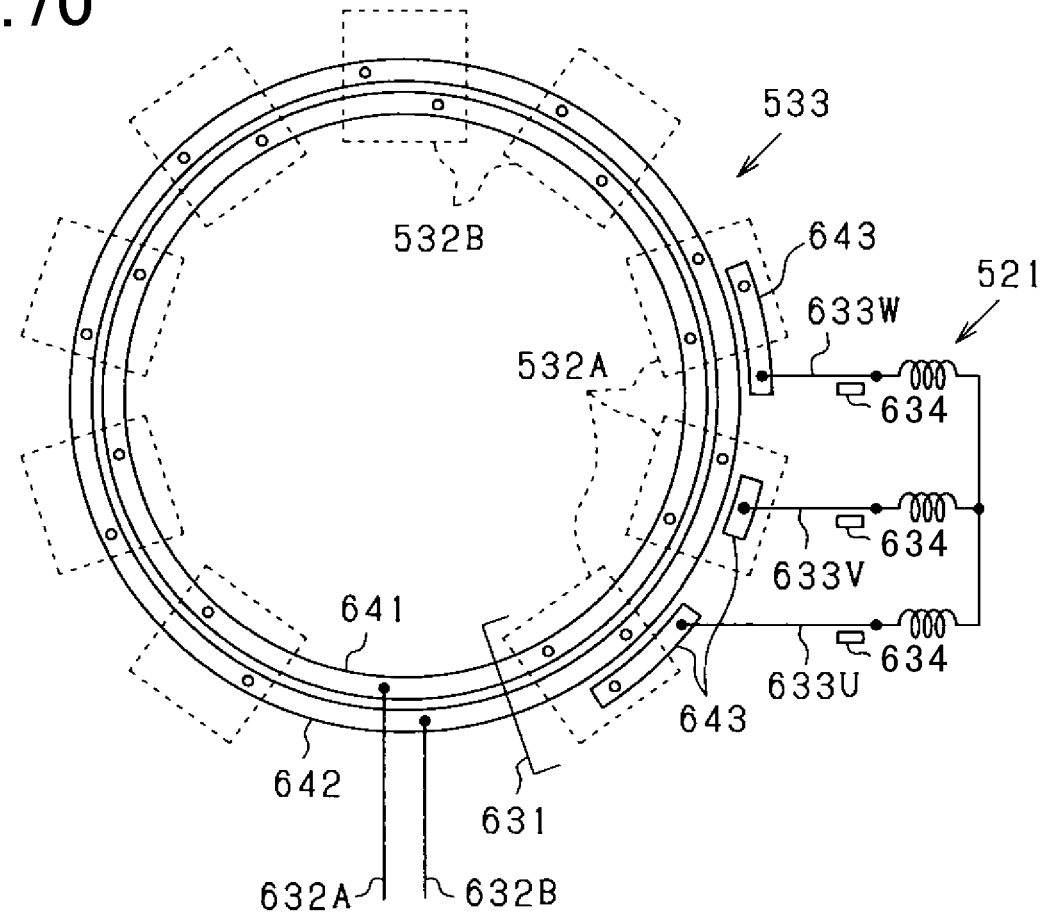
FIG. 70 is a schematic view illustrating electrical connection between the electrical modules, which are arranged in an annular shape, and the busbar module.

In addition, in the example shown in FIG. 70, each of the first busbar 641 and the second busbar 642 is annular-shaped. However, each of the first busbar 641 and the second busbar 642 may have other shapes, such as a substantially C-shape with two separate circumferential ends. Moreover, in the example shown in FIG. 70, the U-phase, V-phase and W-phase winding connection terminals 633U, 633V and 633W are respectively connected to the U-phase, V-phase and W-phase switch modules 532A via the third busbars 643. As an alternative, the U-phase, V-phase and W-phase winding connection terminals 633U, 633V and 633W may be respectively directly connected to the U-phase, V-phase and W-phase switch modules 532A, omitting the third busbars 643.

On the other hand, each of the switch modules 532A has four module terminals 615, i.e., a positive terminal, a negative terminal, a winding connection terminal and a signal terminal. The positive terminal is connected to the first busbar 641. The negative terminal is connected to the second busbar 642. The winding connection terminal is connected to a corresponding one of the third busbars 643.

Moreover, the busbar module 533 further includes three fourth busbars 644 as signal transmission busbars. The signal terminals of the U-phase, V-phase and W-phase switch modules 532A are respectively connected to the three fourth busbars 644, and all of the fourth busbars 644 are connected to the signal terminal 632C.

In the present embodiment, control signals are inputted from the external ECU to the switch modules 532A via the signal terminal 632C. Consequently, the switches 601 and 602 of the switch modules 532A are turned on and off according to the control signals inputted via the signal terminal 632C.

That is, in the present embodiment, the external ECU corresponds to the controller 607 shown in FIG. 59. Therefore, the switch modules 532A are connected to the signal terminal 632C without any built-in control of the rotating electric machine 500 connected therebetween.

As an alternative, it is possible to employ a controller built in the rotating electric machine 500 and have control signals inputted from the built-in controller to the switch modules 532A. This alternative configuration is shown in FIG. 71.

Figure 71:
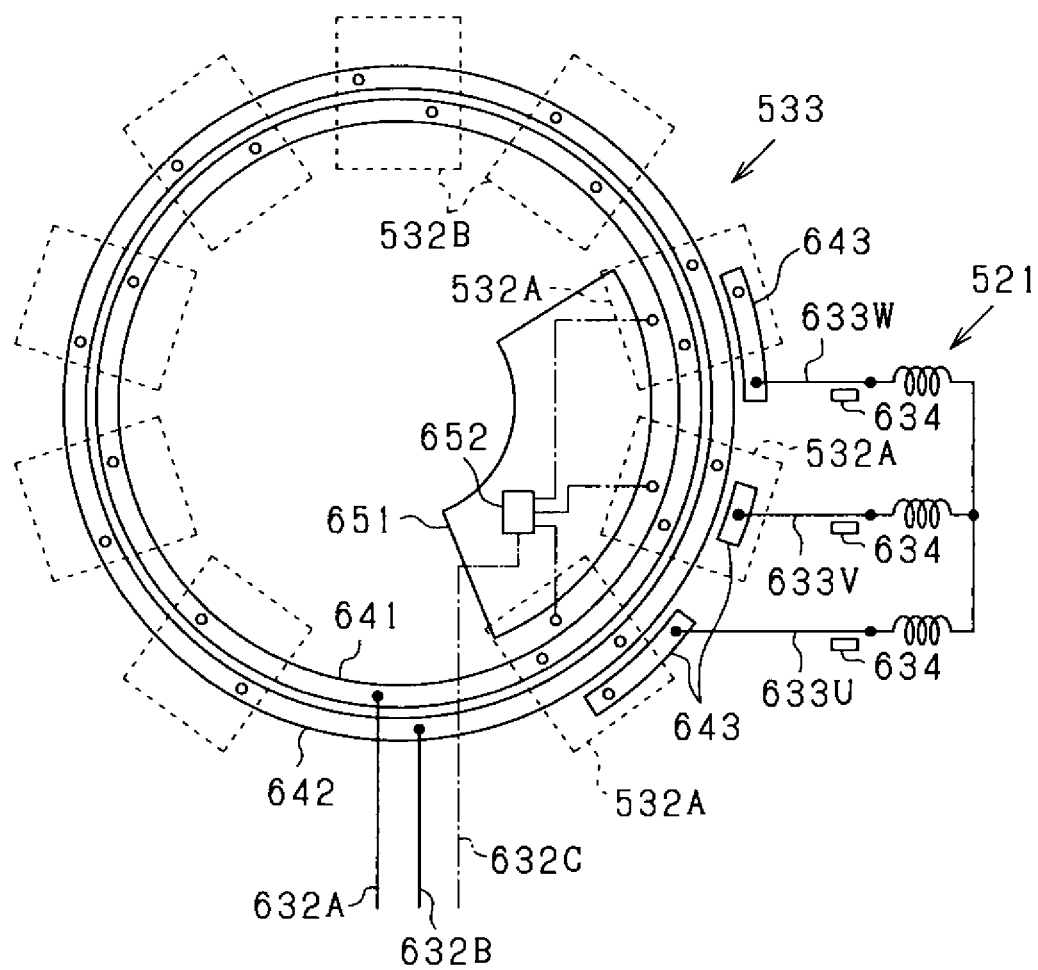
FIG. 71 is a schematic view illustrating an alternative of the electrical connection shown in FIG. 70.

In the configuration shown in FIG. 71, the rotating electric machine 500 includes a control substrate 651 on which a controller 652 is mounted. The controller 652 is connected with each of the switch modules 532A as well as with the signal terminal 632C. The controller 652 receives a command signal from an external ECU, which is an upper-level (or host) control apparatus, via the signal terminal 632C; the command signal is indicative of a command on power running drive or electric power generation. Then, according to the command signal, the controller 652 generates and outputs controls signals (or operation signals) to the switch modules 532A, thereby turning on and off the switches 601 and 602 of the switch modules 532A.

In the inverter unit 530, the control substrate 651 shown in FIG. 71 may be arranged more outside the vehicle (i.e., closer to the bottom of the rotor carrier 511) than the busbar module 533. Alternatively, the control substrate 651 may be arranged between the electrical modules 532 and the end plate 547 of the boss-forming member 543 of the inverter housing 531. In addition, the control substrate 651 may be arranged so that at least part of the control substrate 651 overlaps the electrical modules 532 in the axial direction.

Referring back to FIG. 69, each of the capacitor modules 532B has two module terminals 615, i.e., a positive terminal and a negative terminal. The positive terminal is connected to the first busbar 641. The negative terminal is connected to the second busbar 642.

As shown in FIGS. 49 and 50, in the inverter housing 531, as described previously, the protruding portion 573 of the inner wall member 542 is located between one circumferentially-adjacent pair of the electrical modules 532. The protruding portion 573 has both the inflow passage 571 and the outflow passage 572 formed therein. The external connection terminals 632 are arranged radially adjacent to the protruding portion 573. In other words, the external connection terminals 632 are circumferentially located at the same angular position as the protruding portion 573. More particularly, in the present embodiment, the external connection terminals 632 are located radially inside the protruding portion 573. Moreover, when viewed from the inside of the vehicle, the cooling water port 574 and the external connection terminals 632 are located in radial alignment with each other on the end plate 547 of the boss-forming member 543 of the inverter housing 531 (see FIG. 48).

By arranging the protruding portion 573 and the external connection terminals 632 in circumferential alignment with the electrical modules 532 as above, it becomes possible to minimize the size of the inverter unit 530 and thus the size of the entire rotating electric machine 500.

Referring back to FIGS. 45 and 47, the cooling water piping H2 is connected to the cooling water port 574 while the electrical wiring H1 is connected to the external connection terminals 632. In this connected state, both the electrical wiring H1 and the cooling water piping H2 are received in the receiving duct 440.

Referring again to FIG. 50, in the inverter housing 531, at a location circumferentially adjacent to the external connection terminals 632, the three switch modules 532A are arranged adjacent to one another in the circumferential direction. Further, following the switch modules 532A, the six capacitor modules 532B are arranged adjacent to one another in the circumferential direction.

As an alternative, the three switch modules 532A may be arranged at a location furthest from the external connection terminals 632, i.e., at a location on the opposite side of the rotating shaft 501 to the external connection terminals 632. With this arrangement, it is possible to suppress malfunction due to mutual inductance between the external connection terminals 632 and the switch modules 532A.

As another alternative, the switch modules 532A may be arranged in a distributed manner such that each of the switch modules 532A is interposed between one pair of the capacitor modules 532B in the circumferential direction.

Next, the configuration of a resolver 660, which is provided as a rotation angle sensor in the rotating electric machine 500, will be described with reference to FIGS. 49-51.

As shown in FIGS. 49-51, in the present embodiment, the resolver 660 is arranged in the inverter housing 531 to detect the electrical angle θ of the rotating electric machine 500. The resolver 660 is, for example, of an electromagnetic induction type. The resolver 660 includes a resolver rotor 661 fixed on the rotating shaft 501 and a resolver stator 662 that is arranged radially outside the resolver rotor 661 to face the resolver rotor 661. The resolver rotor 661 is annular plate-shaped and has the rotating shaft 501 inserted therein so as to be coaxial with the rotating shaft 501. The resolver stator 662 includes an annular stator core 663 and a stator coil 664 wound on a plurality of teeth formed in the stator core 663. The stator coil 664 is comprised of an excitation coil corresponding to one phase and a pair of output coils respectively corresponding to two phases.

The excitation coil of the stator coil 664 is excited, by an excitation signal in the form of a sine wave, to generate magnetic flux that crosses the output coils. The relationship of relative arrangement between the excitation coil and the output coils cyclically changes with the rotation angle of the resolver rotor 661 (i.e., the rotation angle of the rotating shaft 501). Accordingly, the amount of magnetic flux generated by the excitation coil and crossing the output coils also cyclically changes with the rotation angle of the resolver rotor 661. In the present embodiment, the excitation coil and the output coils are arranged so that voltages generated respectively in the output coils are offset in phase from each other by $\pi/2$. Consequently, the output voltages of the output coils are in the form of modulated waves that are obtained by modulating the excitation signal respectively with modulating waves of sin θ and cos θ. More specifically, the modulated waves can be respectively represented by (sin θ×sin Ωt) and (cos θ×sin Ωt), where sin Ωt represents the excitation signal.

The resolver 660 further includes a resolver digital converter. The resolver digital converter calculates the electrical angle θ on the basis of the modulated waves and the excitation signal. The resolver 660 is connected with the signal terminal 632C, and the calculation results of the resolver digital converter are outputted to the external ECU via the signal terminal 632C. In addition, in the case of the rotating electric machine 500 having the built-in controller 652 as shown in FIG. 71, the calculation results of the resolver digital converter are inputted to the built-in controller 652.

Next, the assembly structure of the resolver 660 in the inverter housing 531 will be described.

As shown in FIGS. 49 and 51, the boss portion 548 of the boss-forming member 543 of the inverter housing 531 is hollow cylindrical-shaped. On the inner circumferential surface of the boss portion 548, there is formed a protrusion 548a that protrudes radially inward. The resolver stator 662 is arranged to abut the protrusion 548a in the axial direction and fixed to the protrusion 548a by screws or the like. In the hollow space of the boss portion 548, the bearing 560 is arranged on one axial side of the protrusion 548a while the resolver 660 is arranged on the other axial side of the protrusion 548a.

Moreover, in the hollow space of the boss portion 548, there is mounted, on the opposite axial side of the resolver 660 to the protrusion 548a, an annular plate-shaped housing cover 666 to close the receiving space of the resolver 660 (i.e., that part of the hollow space of the boss portion 548 where the resolver 666 is received). The housing cover 666 is formed of an electrically conductive material, such as Carbon Fiber-Reinforced Plastic (CFRP). In a central part of the housing cover 666, there is formed a through-hole 666a through which the rotating shaft 501 extends. In the through-hole 666a, there is provided a seal member 667 to block the gap between the inner wall surface of the through-hole 666a and the outer circumferential surface of the rotating shaft 501. Consequently, the receiving space of the resolver 660 is hermetically sealed by the seal member 667. In addition, the seal member 667 may be implemented by, for example, a sliding seal formed of a resin material.

The receiving space of the resolver 660 is surrounded by the inner circumferential surface of the hollow cylindrical boss portion 548 and closed by the bearing 560 and the housing cover 666 respectively at opposite axial ends thereof. That is, the resolver 660 is enclosed by electrically conductive members. Consequently, it becomes possible to suppress influence of electromagnetic noise on the resolver 660.

Moreover, in the present embodiment, as described previously, the inverter housing 531 has the double circumferential wall consisting of the outer circumferential wall WA1 and the inner circumferential wall WA2 (see FIG. 57). The stator 520 is arranged radially outside the double circumferential wall (i.e., radially outside the outer circumferential wall WA1). The electrical modules 532 are arranged between the outer circumferential wall WA1 and the inner circumferential wall WA2. The resolver 660 is arranged radially inside the double circumferential wall (i.e., radially inside the inner circumferential wall WA2). The inverter housing 531 is formed of an electrically conductive material. Therefore, the stator 520 and the resolver 660 are separated by an electrically conductive partition wall (more particularly, by the electrically-conductive double circumferential wall in the present embodiment). Consequently, it becomes possible to effectively suppress occurrence of magnetic interference between the stator 520 (or the magnetic circuit) and the resolver 660.

Next, the rotor cover 670, which is provided at the open end of the rotor carrier 511, will be described.

As shown in FIGS. 49 and 51, the rotor carrier 511 is open at one axial end thereof. The rotor cover 670 is substantially annular plate-shaped and mounted to the open end of the rotor carrier 511. The rotor core 670 is fixed to the rotor carrier 511 by, for example, welding, bonding or screw fastening. The rotor cover 670 has its inner diameter set to be smaller than the diameter of the inner circumferential surface of the rotor carrier 511, so as to suppress axial displacement of the magnet unit 512. Moreover, the rotor cover 670 has its outer diameter set to be equal to the outer diameter of the rotor carrier 511 and its inner diameter set to be slightly larger than the outer diameter of the inverter housing 531. In addition, the outer diameter of the inverter housing 531 is equal to the inner diameter of the stator 520.

As described previously, the stator 520 is fixed on the radially outer side of the inverter housing 531. At the boundary between the stator 520 and the inverter housing 531 (or the joint where the stator 520 and the inverter housing 531 are joined to each other), part of the inverter housing 531 axially protrudes from the stator 520. The rotor cover 670 is mounted to surround the protruding part of the inverter housing 531. Moreover, a seal member 671 is provided between the inner circumferential surface of the rotor cover 670 and the outer circumferential surface of the protruding part of the inverter housing 531, so as to block the gap therebetween. Consequently, the receiving space of the magnet unit 512 and the stator 520 is hermetically sealed by the seal member 671. In addition, the seal member 671 may be implemented by, for example, a sliding seal formed of a resin material.

According to the present embodiment, it is possible to achieve the following advantageous effects.

In the rotating electric machine 500 according to the present embodiment, on the radially inner side of the magnetic circuit part which is constituted of the magnet unit 512 and the stator coil 521, there is arranged the outer circumferential wall WA1 of the inverter housing 531. Moreover, in the outer circumferential wall WA1, there is formed the cooling water passage 545. Furthermore, on the radially inner side of the outer circumferential wall WA1, there are arranged the electrical modules 532 in the circumferential direction along the outer circumferential wall WA1.

With the above configuration, it becomes possible to arrange the magnetic circuit part, the cooling water passage 545 and the inverter 600 (or electric power converter) in a radially stacked manner, thereby realizing efficient part arrangement while minimizing the axial length of the rotating electric machine 500. Moreover, it also becomes possible to effectively cool the electrical modules 532 forming the inverter 600. As a result, it becomes possible to realize high efficiency and a small size of the rotating electric machine 500.

In the present embodiment, the electrical modules 532 (i.e., the switch modules 532A and the capacitor modules 532B), which include heat-generating components such as semiconductor switching elements and the capacitors, are arranged in contact with the inner circumferential surface of the outer circumferential wall WA1 of the inverter housing 531. Consequently, heat generated in the electrical modules 532 can be transmitted to the outer circumferential wall WA1 and dissipated by heat exchange in the outer circumferential wall WA1. As a result, it becomes possible to effectively cool the electrical modules 532.

In the present embodiment, in each of the switch modules 532A, the switches 601 and 602 are interposed between the two radiators 623. Moreover, at least one of a location on the opposite side of one of the two radiators 623 to the switches 601 and 602 and a location on the opposite side of the other of the two radiators 623 to the switches 601 and 602, there is arranged the capacitor 604. Consequently, it becomes possible to effectively cool the capacitor 604 while effectively cooling the switches 601 and 602.

In the present embodiment, in each of the switch modules 532A, the switches 601 and 602 are interposed between the two radiators 623. Moreover, the drive circuit 603 is arranged on the opposite side of one of the two radiators 623 to the switches 601 and 602 while the capacitor 604 is arranged on the opposite side of the other of the two radiators 623 to the switches 601 and 602. Consequently, it becomes possible to effectively cool both the drive circuit 603 and the capacitor 604 while effectively cooling the switches 601 and 602.

In the present embodiment, each of the switch modules 532A is configured so that the cooling water flows from the cooling water passage 545 into the switch module 532A, cooling the components (e.g., the switches 601 and 602) of the switch module 532A. Consequently, each of the switch modules 532A can be cooled by the cooling water flowing in the switch module 532A as well as by the cooling water flowing in the cooling water passage 545. As a result, it becomes possible to more effectively cool each of the switch modules 532A.

In the present embodiment, the cooling water flows into the cooling water passage 545 via the inflow passage 571, and flows out of the cooling water passage 545 via the outflow passage 572. Moreover, in the cooling water passage 545, the switch modules 532A are arranged on the upstream side closer to the inflow passage 571 while the capacitor modules 532B are arranged on the downstream side closer to the outflow passage 572. With the above arrangement, since the temperature of the cooling water flowing through the cooling water passage 545 is lower on the upstream side than on the downstream side, it is possible to preferentially cool the switch modules 532A.

In the present embodiment, one of the intervals between the circumferentially adjacent electrical modules 532 (i.e., the second interval INT2) is set to be wider than the remaining intervals (i.e., the first intervals INT1). In this wider interval, there is arranged the protruding portion 573 of the inner wall member 542 which has both the inflow passage 571 and the outflow passage 572 formed therein. Consequently, it becomes possible to suitably form both the inflow passage 571 and the outflow passage 572 on the radially inner side of the outer circumferential wall WA1. More specifically, to improve the cooling performance, it is necessary to secure high flow rate of the cooling water. Accordingly, it is necessary to set the opening areas of the inflow passage 571 and the outflow passage 572 to be large. In this regard, with the above arrangement of the protruding portion 573 in the wider interval (i.e., the second interval INT2), it becomes possible to suitably form, on the radially inner side of the outer circumferential wall WA1, both the inflow passage 571 and the outflow passage 572 having sufficiently large opening areas.

In the present embodiment, the external connection terminals 632 of the busbar module 533 are arranged, on the radially inner side of the outer circumferential wall WA1, in radial alignment with the protruding portion 573 of the inner wall member 542. That is, the external connection terminals 632 are arranged, together with the protruding portion 573, in the wider interval (i.e., the second interval INT2). Consequently, it becomes possible to suitably arrange the external connection terminals 632 without causing interference between the external connection terminals 632 and the electrical modules 532.

In the rotating electric machine 500 according to the present embodiment, the stator 520 is fixed on the radially outer side of the outer circumferential wall WA1 while the electrical modules 532 are arranged on the radially inner side of the outer circumferential wall WA1. Consequently, heat generated in the stator 520 is transmitted to the outer circumferential wall WA1 from the radially outer side while heat generated in the electrical modules 532 is transmitted to the outer circumferential wall WA1 from the radially inner side. As a result, the stator 520 and the electrical modules 532 can be cooled at the same time by the cooling water flowing through the cooling water passage 545. That is, it is possible to effectively dissipate heat generated in these components of the rotating electric machine 500.

In the rotating electric machine 500 according to the present embodiment, the electrical modules 532 arranged on the radially inner side of the outer circumferential wall WA1 of the inverter housing 531 and the stator coil 521 arranged on the radially outer side of the outer circumferential wall WA1 are electrically connected via the winding connection terminals 633 of the busbar module 533. Moreover, the winding connection terminals 633 are located axially apart from the cooling water passage 545. Consequently, though there is interposed between the electrical modules 532 and the stator coil 521 the annular cooling water passage 545 formed in the outer circumferential wall WA1, it still becomes possible to suitably connect the electrical modules 532 and the stator coil 521.

In the rotating electric machine 500 according to the present embodiment, torque limit due to magnetic saturation occurring in the stator core 522 is suppressed by reducing in size or eliminating teeth of the stator core 522 interposed between the circumferentially adjacent electrical conductors 523 forming the stator coil 521. Moreover, torque reduction is suppressed by configuring the electrical conductors 523 to be flat and thin in shape. Furthermore, for the same outer diameter of the rotating electric machine 500, it becomes possible to expand the region radially inside the magnetic circuit part by reducing the radial thickness of the stator 520. Consequently, it becomes possible to suitably arrange, in the expanded region, the outer circumferential wall WA1 in which the cooling water passage 545 is formed and the electrical conductor modules 532.

In the rotating electric machine 500 according to the present embodiment, magnet magnetic flux is concentrated on the d-axis side in the magnet unit 512 and thus the magnet magnetic flux at the d-axis is intensified, thereby achieving torque improvement. Moreover, with reduction in the radial thickness of the magnet unit 512, it becomes possible to further expand the region radially inside the magnetic circuit part. Consequently, it becomes possible to more suitably arrange, in the further expanded region, the outer circumferential wall WA1 in which the cooling water passage 545 is formed and the electrical conductor modules 532.

In addition, it also becomes possible to suitably arrange, in the expanded region radially inside the magnetic circuit part, the bearing 560 and the resolver 660.

In the present embodiment, the rotating electric machine 500 is used, as an in-wheel motor, in the vehicle wheel 400. The wheel 400 is mounted to the vehicle body via the base plate 405, which is fixed to the inverter housing 531, and a mounting mechanism such as the suspension apparatus. With reduction in the size of the rotating electric machine 500, it becomes possible to reduce the space required for mounting the wheel 400 to the vehicle body. Consequently, it becomes possible to expand the arrangement region of other components of the vehicle, such as the battery, and/or expand the vehicle compartment space.

[First Modification of Third Embodiment]

In the rotating electric machine 500 according to the third embodiment, the electrical modules 532 and the busbar module 533 are arranged on the radially inner side of the outer circumferential wall WA1 of the inverter housing 531 while the stator 520 is arranged on the radially outer side of the outer circumferential wall WA1. Moreover, the winding connection terminals 633 of the busbar module 533 radially extend across the outer circumferential wall WA1 to connect the busbar module 533 to the phase windings of the stator coil 521.

In the rotating electric machine 500, the relative position of the busbar module 533 to the electrical modules 532 may be arbitrarily set. Moreover, the location of guiding winding connection members (e.g., the winding connection terminals 633) may also be arbitrarily set.

For example, regarding the relative position of the busbar module 533 to the electrical modules 532, either of the following arrangements may be employed:

(α1) arranging the busbar module 533 in the axial direction more outside the vehicle (i.e., closer to the bottom of the rotor carrier 511) than the electrical modules 532; or (α2) arranging the busbar module 533 in the axial more inside the vehicle (i.e., further from the bottom of the rotor carrier 511) than the electrical modules 532.

On the other hand, regarding the location of guiding the winding connection members, either of the following arrangements may be employed:

(β1) arranging the winding connection members to be guided at a location more outside the vehicle (i.e., closer to the bottom of the rotor carrier 511) than the electrical modules 532; or (β2) arranging the winding connection members to be guided at a location more inside the vehicle (i.e., further from the bottom of the rotor carrier 511) than the electrical modules 532.

Hereinafter, four arrangement examples of the electrical modules 532, the busbar module 533 and the winding connection members will be described with reference to FIGS. 72A-72D.

In FIGS. 72A-72D, the reference numeral 637 designates the winding connection members connecting the busbar module 533 to the phase windings of the stator coil 521. The winding connection members 637 correspond to the winding connection terminals 633 described in the third embodiment. In addition, in each of FIGS. 72A-72D, the vertically upper side corresponds to the outside of the vehicle while the vertically lower side corresponds to the inside of the vehicle.

Figure 72A:
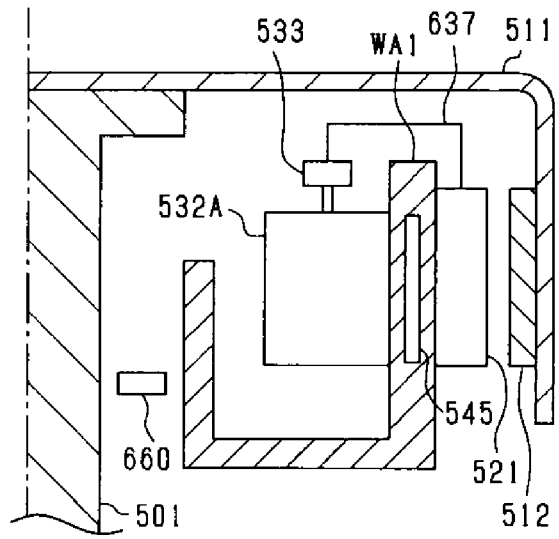
FIGS. 72A-72D are schematic cross-sectional views respectively illustrating four arrangement examples of the electrical modules, the busbar module and winding connection members according to a first modification of the third embodiment.

In the example shown in FIG. 72A, regarding the relative position of the busbar module 533 to the electrical modules 532, the above arrangement (α1) is employed; regarding the location of guiding the winding connection members 637, the above arrangement (β1) is employed. That is, in this example, both the connection between the electrical modules 532 and the busbar module 533 and the connection between the stator coil 521 and the busbar module 533 are made at a location more outside the vehicle (i.e., closer to the bottom of the rotor carrier 511) than the electrical modules 532. In addition, this example corresponds to the configuration of the rotating electric machine 500 shown in FIG. 49.

According to the example shown in FIG. 72A, it is possible to provide the cooling water passage 545 in the outer circumferential wall WA1 without the necessity of considering interference with the winding connection members 637. Moreover, it is also possible to easily connect the stator coil 521 and the busbar module 533 with the winding connection members 637.

Figure 72B:
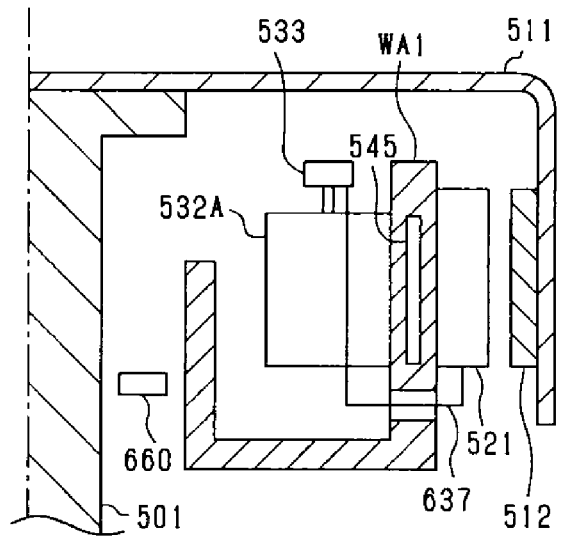

In the example shown in FIG. 72B, regarding the relative position of the busbar module 533 to the electrical modules 532, the above arrangement (α1) is employed; regarding the location of guiding the winding connection members 637, the above arrangement (β2) is employed. That is, in this example, the connection between the electrical modules 532 and the busbar module 533 is made at a location more outside the vehicle (i.e., closer to the bottom of the rotor carrier 511) than the electrical modules 532, while the connection between the stator coil 521 and the busbar module 533 is made at a location more inside the vehicle (i.e., further from the bottom of the rotor carrier 511) than the electrical modules 532.

According to the example shown in FIG. 72B, it is possible to provide the cooling water passage 545 in the outer circumferential wall WA1 without the necessity of considering interference with the winding connection members 637.

Figure 72C:
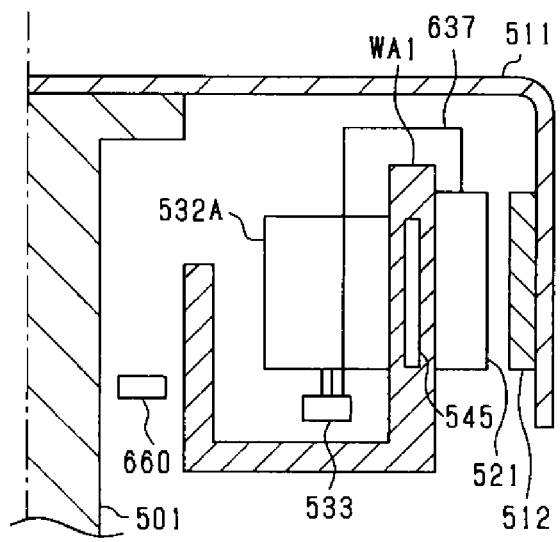

In the example shown in FIG. 72C, regarding the relative position of the busbar module 533 to the electrical modules 532, the above arrangement (α2) is employed; regarding the location of guiding the winding connection members 637, the above arrangement (β1) is employed. That is, in this example, the connection between the electrical modules 532 and the busbar module 533 is made at a location more inside the vehicle (i.e., further from the bottom of the rotor carrier 511) than the electrical modules 532, while the connection between the stator coil 521 and the busbar module 533 is made at a location more outside the vehicle (i.e., closer to the bottom of the rotor carrier 511) than the electrical modules 532.

Figure 72D:
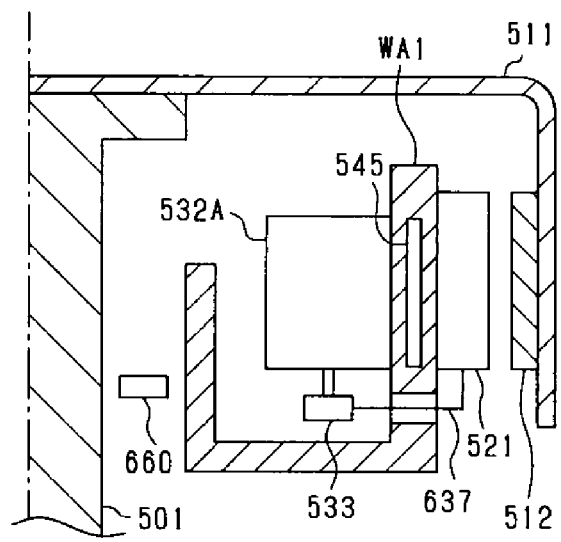

In the example shown in FIG. 72D, regarding the relative position of the busbar module 533 to the electrical modules 532, the above arrangement (α2) is employed; regarding the location of guiding the winding connection members 637, the above arrangement (β2) is employed. That is, in this example, both the connection between the electrical modules 532 and the busbar module 533 and the connection between the stator coil 521 and the busbar module 533 are made at a location more inside the vehicle (i.e., further from the bottom of the rotor carrier 511) than the electrical modules 532.

According to the examples shown in FIGS. 72C and 72D, when electrical components (e.g., a fan motor) are added to the rotating electric machine 500, with the busbar module 533 arranged more inside the vehicle (i.e., further from the bottom of the rotor carrier 511) than the electrical modules 532, it is easy to perform the wiring of the added electrical components. Moreover, the distance between the busbar module 533 and the resolver 660 is shortened, thereby facilitating the wiring therebetween.

[Second Modification of Third Embodiment]

In the rotating electric machine 500 according to the third embodiment, the rotating shaft 501, the rotor carrier 511 and the inner ring 561 of the bearing 560 together constitute a rotating body that rotates during operation of the rotating electric machine 500. Moreover, the resolver rotor 661, which is annular plate-shaped, is mounted to the rotating body as shown in FIGS. 49 and 50.

In this modification, alternative mounting structures of the resolver rotor 661 to the rotating body will be described with reference to FIGS. 73A-73C.

Figure 73A:
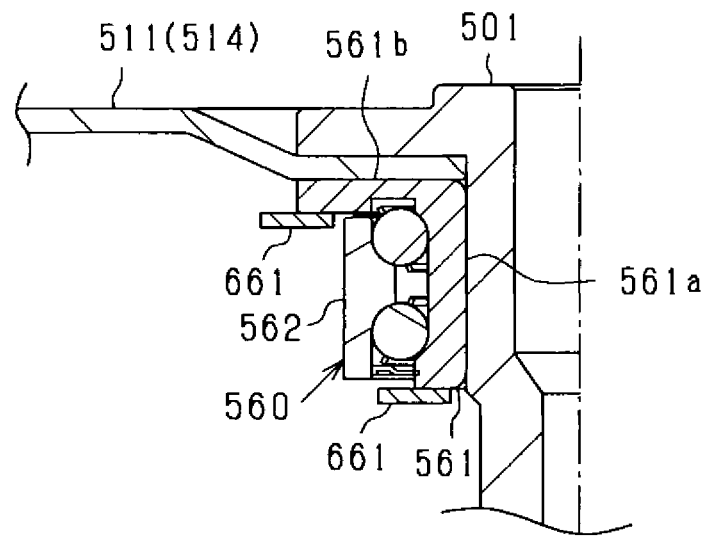
FIGS. 73A-73C are schematic cross-sectional views respectively illustrating three alternative mounting structures of a resolver rotor according to a second modification of the third embodiment.
Figure 73B:
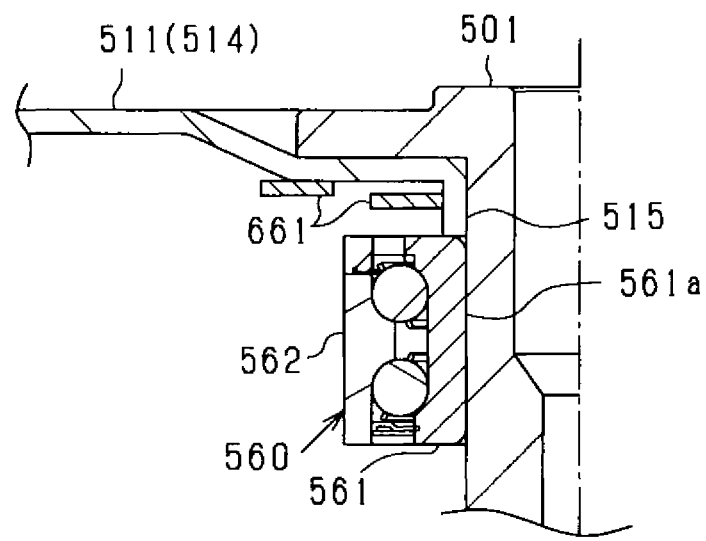
Figure 73C:
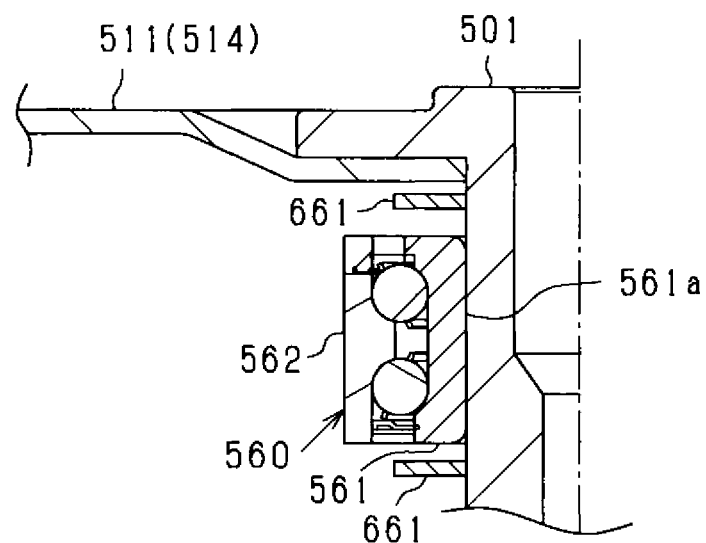

In each of the mounting structures shown in FIGS. 73A-73C, the resolver 660 is provided in a space enclosed by the rotor carrier 511 and the inverter housing 531, thereby being protected from foreign substances such as water and dust. Moreover, in the mounting structure shown in FIG. 73A, the bearing 560 has the same configuration as shown in FIG. 49. In contrast, in the mounting structures shown in FIGS. 73B and 73C, the bearing 560 has a configuration different from that shown in FIG. 49 and is located apart from the end plate 514 of the rotor carrier 511. Furthermore, in each of FIGS. 73A-73C, there are illustrated two alternative locations where the resolver rotor 661 can be mounted. In addition, though not shown in the figures, the resolver stator 662 is fixed to the boss portion 548 of the boss-forming member 543 of the inverter housing 531; the boss portion 548 may be formed to extend to the vicinity of the radially outer periphery of the resolver rotor 661.

In the mounting structure shown in FIG. 73A, the resolver rotor 661 is mounted to the inner ring 561 of the bearing 560. More specifically, the resolver rotor 661 is mounted to either an axial end face of the flange 561b of the inner ring 561 or an axial end face of the cylindrical portion 561a of the inner ring 561.

In the mounting structure shown in FIG. 73B, the resolver rotor 661 is mounted to the rotor carrier 511. More specifically, the resolver rotor 661 is mounted to either the inner surface of the end plate 514 of the rotor carrier 511 or the outer circumferential surface of a cylindrical portion 515 of the rotor carrier 511. That is, in this mounting structure, the rotor carrier 511 is configured to further have the cylindrical portion 515 extending from a radially inner edge of the end plate 514 along the rotating shaft 501. In addition, in the case of the resolver rotor 661 being mounted to the outer circumferential surface of the cylindrical portion 515, the resolver rotor 661 is located between the end plate 514 of the rotor carrier 511 and the bearing 560.

In the mounting structure shown in FIG. 73C, the resolver rotor 661 is mounted to the rotating shaft 501. More specifically, the resolver rotor 661 is mounted to either a portion of the rotating shaft 501 between the end plate 514 of the rotor carrier 511 and the bearing 560 or a portion of the rotating shaft 501 on the opposite side of the bearing 560 to the end plate 514 of the rotor carrier 511.

[Third Modification of Third Embodiment]

The rotating electric machine 500 according to the third embodiment includes the inverter housing 531 and the rotor cover 670 that are configured as shown in FIGS. 49 and 51.

In this modification, alternative configurations of the inverter housing 531 and the rotor cover 670 will be described with reference to FIGS. 74A and 74B.

Figure 74A:
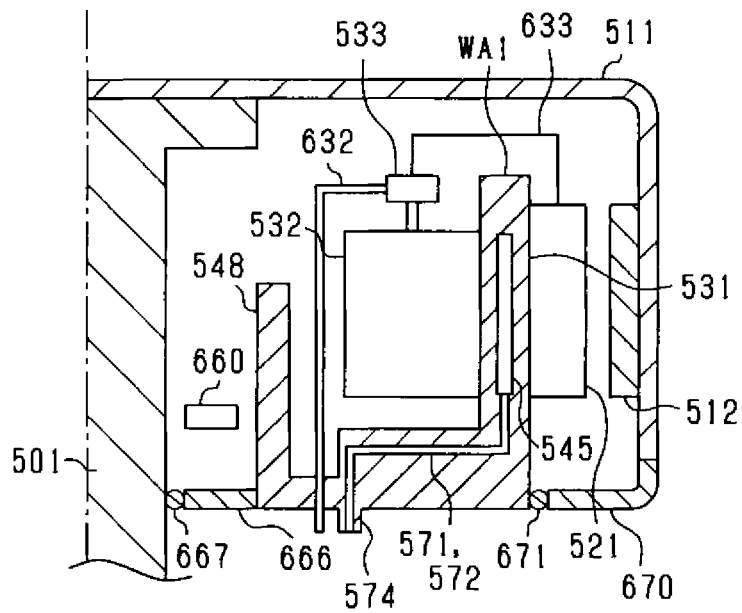
FIGS. 74A and 74B are schematic cross-sectional views respectively illustrating two alternative configurations of the inverter housing and a rotor cover according to a third modification of the third embodiment.

The configuration shown in FIG. 74A is similar to that shown in FIGS. 49 and 51. On the other hand, the configuration shown in FIG. 74B is different from that shown in FIGS. 49 and 51.

Specifically, in the configuration shown in FIG. 74A, the rotor cover 670, which is substantially annular plate-shaped and fixed to the open end of the rotor carrier 511, is arranged to surround the outer circumferential wall WA1 of the inverter housing 531. That is, the rotor cover 670 is configured to have its inner circumferential surface radially facing the outer circumferential surface of the outer circumferential wall WA1. The seal member 671 is provided between the inner circumferential surface of the rotor cover 670 and the outer circumferential surface of the outer circumferential wall WA1 to block the gap therebetween. Moreover, in the hollow space of the boss portion 548 of the inverter housing 531, there is mounted the housing cover 666 to close the receiving space of the resolver 660. The seal member 667 is provided between the housing cover 666 and the rotating shaft 501 to block the gap therebetween. The external connection terminals 632 of the busbar module 533 penetrate the inverter housing 531 to extend toward the inside of the vehicle (i.e., downward in FIG. 74A). Furthermore, in the inverter housing 531, there are formed the inflow passage 571 and the outflow passage 572, both of which communicate with the cooling water passage 545, and the cooling water port 574 that includes ends of the inflow passage 571 and the outflow passage 572.

Figure 74B:
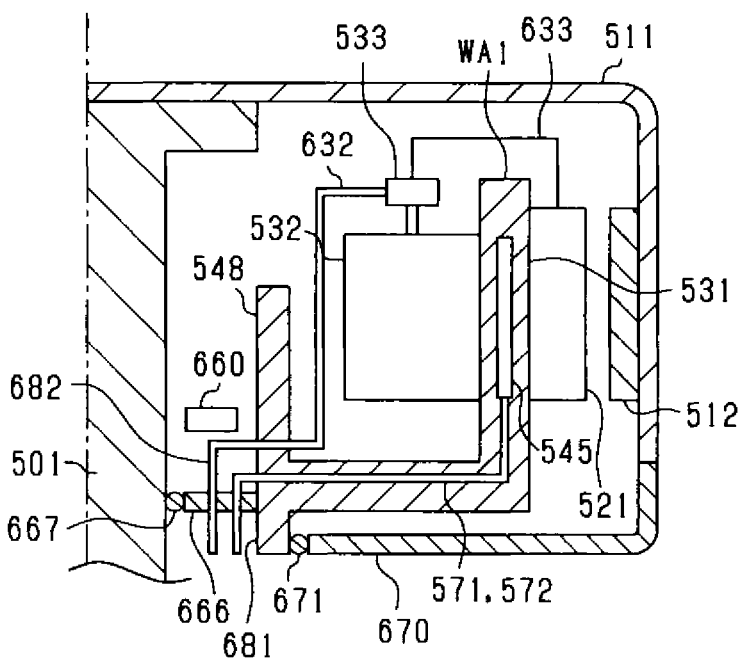

In contrast, in the configuration shown in FIG. 74B, in the inverter housing 531 (more specifically, the boss-forming member 543 thereof), there is formed an annular protrusion 681 that extends toward the protruding side of the rotating shaft 501 (or toward the inside of the vehicle). The rotor cover 670 is provided to surround the annular protrusion 681 of the inverter housing 531. That is, the inner circumferential surface of the rotor cover 670 and the outer circumferential surface of the annular protrusion 681 radially face each other, with the seal member 671 provided therebetween. Moreover, the external connection terminals 632 of the busbar module 533 first penetrate the boss portion 548 of the inverter housing 531 to extend radially inward (i.e., leftward in FIG. 74B) to the hollow space of the boss portion 548 and then penetrate the housing cover 666 to axially extend toward the inside of the vehicle (i.e., downward in FIG. 74B). Furthermore, in the inverter housing 531, there are formed the inflow passage 571 and the outflow passage 572 both of which communicate with the cooling water passage 545. The inflow passage 571 and the outflow passage 572 first extend radially inward from the cooling water passage 545 to the hollow space of the boss portion 548 and then extend, via relay passages 682, axially toward the inside of the vehicle (i.e., downward in FIG. 74B) penetrating the housing cover 666. In addition, those portions of the inflow passage 571 and the outflow passage 572 which protrude outside from the housing cover 666 constitute the cooling water port 574.

With each of the configurations shown in FIGS. 74A and 74B, it is possible to allow the rotor carrier 511 and the rotor cover 670 to suitably rotate relative to the inverter housing 531 while keeping the internal space defined by the rotor carrier 511 and the rotor cover 670 hermetic (or airtight).

In particular, in the configuration shown in FIG. 74B, the inner diameter of the rotor cover 670 is reduced in comparison with the configuration shown in FIG. 74A. Consequently, at a location more inside the vehicle (i.e., further from the bottom of the rotor carrier 511) than the electrical modules 532, the inverter housing 531 and the rotor cover 670 overlap each other in the axial direction, thereby suppressing occurrence of problems in the electrical modules 532 due to electromagnetic noise. Moreover, with the reduction in the inner diameter of the rotor cover 670, the sliding diameter of the seal member 671 is accordingly reduced, thereby suppressing mechanical loss at the rotational sliding parts.

[Fourth Modification of Third Embodiment]

Figure 75:
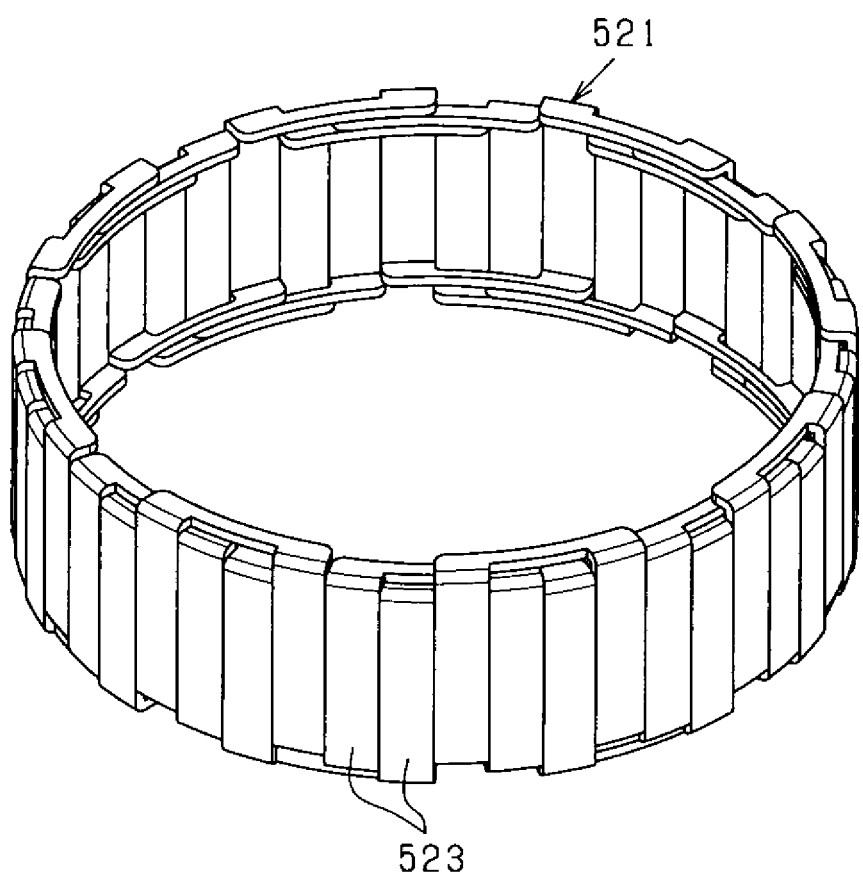
FIG. 75 is a schematic perspective view of a stator coil according to a fourth modification of the third embodiment.

As shown in FIG. 75, in this modification, the stator coil 521 is formed of electrical conductors 523 each of which has a rectangular cross section and is wave-wound to have the longer sides of the cross section extending in the circumferential direction. Moreover, in each of the electrical conductors 523, straight portions of the electrical conductor 523, which are included in the coil side part 525 of the stator coil 521 (see also FIG. 54), are spaced from each other in the circumferential direction at predetermined intervals; the straight portions are connected with one another by turn portions of the electrical conductor 523 which are included in the coil end parts 526 of the stator coil 521. Furthermore, in the coil side part 525 of the stator coil 521, the straight portions of the electrical conductors 523 are arranged to have each facing pair of circumferential side surfaces of the straight portions abutting each other or separated by a minute clearance.

Moreover, in this modification, each of the electrical conductors 523 is radially bent at the coil end parts of the stator coil 521. More specifically, each of the electrical conductors 523 is radially bent at right angles to have the turn portions offset radially inward from the straight portions by the radial thickness of the electrical conductors 523. Consequently, it becomes possible to prevent interference between the electrical conductors 523 forming the U-phase, V-phase and W-phase windings of the stator coil 521. In addition, all the straight portions of the electrical conductors 523 have the same axial length.

In assembling the stator core 522 to the stator coil 521 to form the stator 520, the stator coil 521 is first formed in a substantially C-shape to have two circumferential ends separated from each other. After assembling the stator core 522 to the radially inner periphery of the stator coil 521, the separated circumferential ends are joined to each other, thereby transforming the stator coil 521 into an annular shape.

As an alternative, the stator core 522 may be divided in the circumferential direction into a plurality (e.g., three or more) of stator core segments. In assembling the stator core 522 to the stator coil 521 to form the stator 520, the stator core segments may be assembled to the radially inner periphery of the annular-shaped stator coil 521, together constituting the stator core 522.

[Other Modifications of Third Embodiment]

In addition to the first to the fourth modifications, the following modifications may also be made to the third embodiment.

(1) In the rotating electric machine 500 according to the third embodiment, the inflow passage 571 and the outflow passage 572 are together provided at a single location in the circumferential direction (see FIG. 50).

As an alternative, the inflow passage 571 and the outflow passage 572 may be respectively provided at two different locations in the circumferential direction. For example, the inflow passage 571 and the outflow passage 572 may be offset from each other by 180° in the circumferential direction.

In addition, in the rotating electric machine 500 according to the third embodiment, there are provided only one inflow passage 571 and only one outflow passage 572. Alternatively, in the rotating electric machine 500, there may be provided a plurality of inflow passages 571 and/or a plurality of outflow passages 572.

(2) In the rotating electric machine 500 according to the third embodiment, the rotating shaft 501 is configured to protrude outside the wheel 400 on only one axial side of the wheel 400.

As an alternative, the rotating shaft 501 may be configured to protrude outside the wheel 400 on both axial sides of the wheel 400. This alternative configuration is particularly suitable for use in the case of the vehicle having only a single front wheel or a single rear wheel.

(3) The rotating electric machine 500 according to the third embodiment is configured as an outer rotor type rotating electric machine. Alternatively, the rotating electric machine 500 may be configured as an inner rotor type rotating electric machine.

Fourth Embodiment

This embodiment illustrates a configuration of the busbar module 533 which is different from the configuration of the busbar module 533 described in the third embodiment.

In the present embodiment, the rotating electric machine 500 includes the rotor 510, the stator 520, the inverter unit 530, the bearing 560 and the rotor cover 670, as described in the third embodiment. Of these components of the rotating electric machine 500, the rotor 510 and the stator 520 together correspond to a "dynamoelectric unit" while the inverter unit 530 corresponds to an "electric power conversion device".

Figure 76:
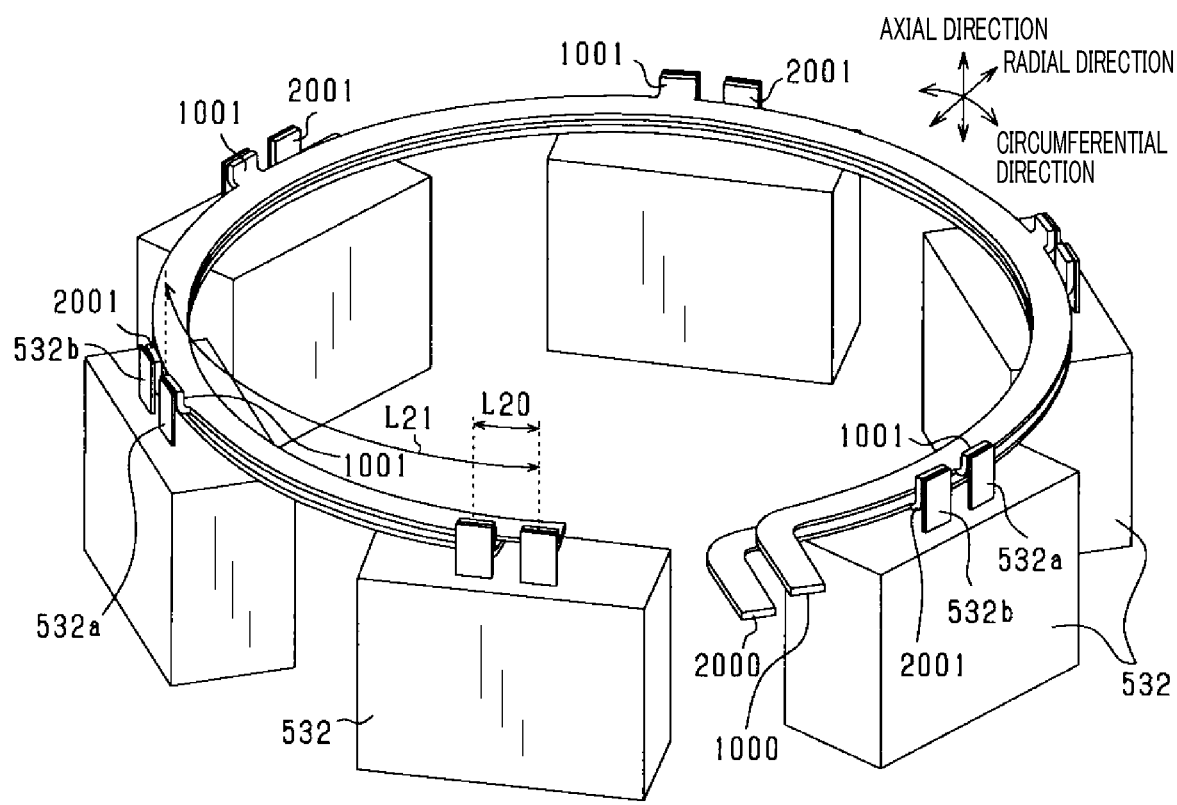
FIG. 76 is a schematic perspective view illustrating the configuration of busbars of a busbar module according to a fourth embodiment.

As shown in FIG. 76, the busbar module 533 according to the present embodiment includes a first busbar 1000 that is a positive busbar and a second busbar 2000 that is a negative busbar. Both the first and second busbars 1000 and 2000 are embedded in an insulating member of a main body 631 of the busbar module 533 as described in the third embodiment. It should be noted that the main body 631 is not shown in FIG. 76 for the sake of simplicity.

Each of the first and second busbars 1000 and 2000 is an electric power transmission busbar. The first busbar 1000 is connected with the high potential-side power terminal 632A while the second busbar 2000 is connected with the low potential-side power terminal 632B.

In the present embodiment, each of the first and second busbars 1000 and 2000 is wide band-shaped. Moreover, each of the first and second busbars 1000 and 2000 is arc-shaped and arranged around the rotating shaft 501 to extend in the circumferential direction. That is, each of the first and second busbars 1000 and 2000 is not annular-shaped, but substantially C-shaped to be discontinuous in the circumferential direction. Furthermore, the first and second busbars 1000 and 2000 are provided according to the arrangement of the electrical modules 532 that are electrical components. In addition, though not shown in the figures, in the present embodiment, the insulating member of the main body 631 may be arc-shaped conforming to the shapes of the first and second busbars 1000 and 2000.

Moreover, each of the first and second busbars 1000 and 2000 is arranged to be wider in a radial direction than in the axial direction. More specifically, each of the first and second busbars 1000 and 2000 is arranged so that in a cross section of the busbar perpendicular to the circumferential direction, the shorter sides of the cross section extend in the axial direction. Moreover, the longitudinal direction of the cross section coincides with the radial direction.

The inventors of the present application have found that when a conventional band-shaped busbar is arranged to be wider in a radial direction than in the axial direction, the vibration resistance of the busbar is low.

Figure 77:
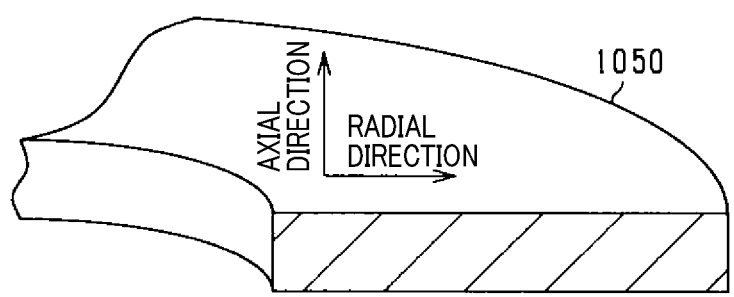
FIG. 77 is a partially cross-sectional perspective view showing the cross-sectional shape of a conventional busbar.

Specifically, FIG. 77 shows part of a conventional band-shaped busbar 1050. As seen from FIG. 77, the busbar 1050 is thin flat plate-shaped to have a rectangular cross section perpendicular to the circumferential direction; the shorter sides of the cross section extend in the axial direction while the longer sides of the cross section extend in the radial direction. However, with the above configuration, the geometrical moment of inertia (or second moment of area) in the lateral direction (or the direction of shorter sides) of the rectangular cross section is low, making it easy for the busbar 1050 to vibrate. In particular, when the busbar 1050 is employed in an in-wheel motor, the connection between the busbar 1050 and terminals of other electrical components may be broken (e.g., welds formed therebetween may be damaged) due to high vibration, causing a connection failure to occur.

Figure 78:
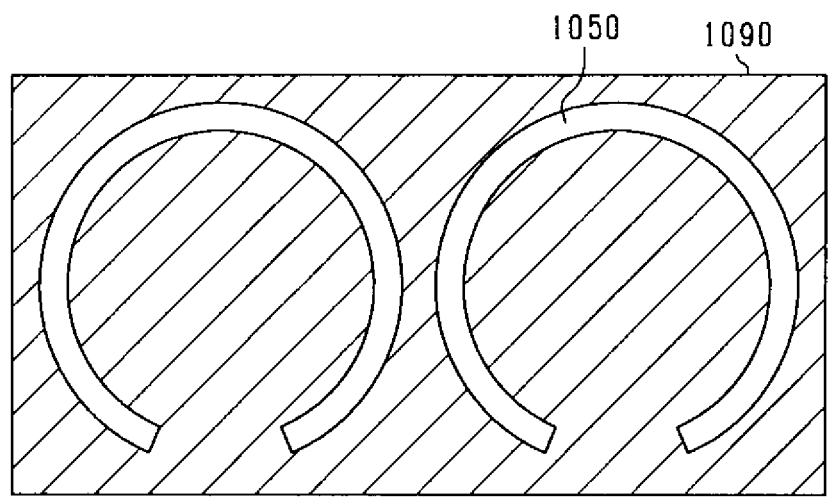
FIG. 78 is a schematic view illustrating a method of manufacturing the conventional busbar.

Moreover, as shown in FIG. 78, the conventional busbar 105, which is arc-shaped or annular-shaped, is generally manufactured by blanking it out from a thin flat steel plate. However, in this case, the percentage of scrap 1090 (i.e., the hatched part in FIG. 78) is high, lowering the yield rate (or productivity).

Figure 79:
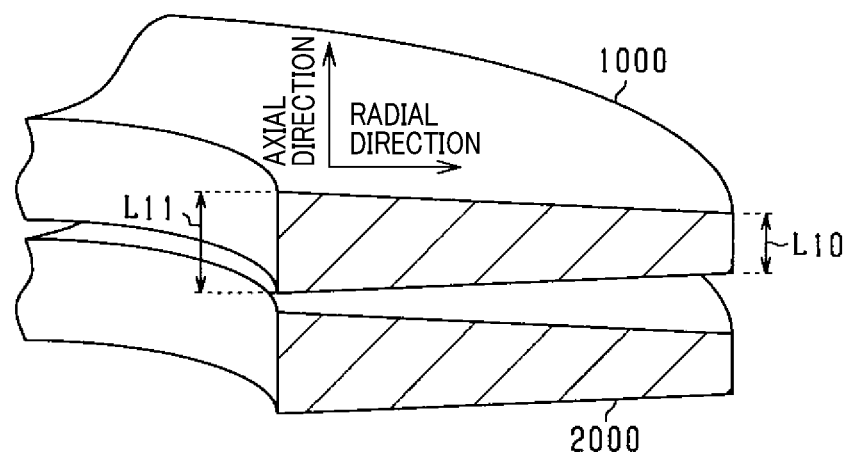
FIG. 79 is a partially cross-sectional perspective view showing the cross-sectional shape of the busbars of the busbar module according to the fourth embodiment.

To solve the above problems, in the present embodiment, as shown in FIG. 79, the first busbar 1000 is configured so that in a cross section of the first busbar 1000 perpendicular to the circumferential direction, the thickness L10 in the axial direction (or the lateral direction of the cross section) at one end in the radial direction (or the longitudinal direction of the cross section) is smaller than the thickness L11 in the axial direction at the other end in the radial direction. More specifically, the cross section of the first busbar 1000 is tapered radially outward so that the axial thickness of the first busbar 1000 gradually decreases from the radially inner end (or inner periphery) to the radially outer end (or outer periphery) of the cross section. Moreover, the first busbar 1000 has the tapered cross-sectional shape over the entire circumference thereof.

In addition, in the present embodiment, as shown in FIG. 79, the second busbar 2000 is identically configured to the first busbar 1000; therefore, description of the configuration of the second busbar 2000 is omitted hereinafter.

Moreover, the first and second busbars 1000 and 2000 are arranged to at least partially overlap each other in the axial direction. More particularly, in the present embodiment, as shown in FIG. 79, the outer and inner diameters of the first busbar 1000 are respectively equal to the outer and inner diameters of the second busbar 2000. That is, the radial width of the first busbar 1000 is equal to the radial width of the second busbar 2000. Moreover, the first and second busbars 1000 and 2000 have the same central axis (i.e., the central axis of the rotating shaft 501). In other words, the first and second busbars 1000 and 2000 are arranged coaxially with each other. Consequently, the first and second busbars 1000 and 2000 completely overlap each other in the axial direction.

Referring back to FIG. 76, in the first busbar 1000, there are formed a plurality of connection terminals 1001 each protruding radially outward from the radially outer periphery of the first busbar 1000. Similarly, in the second busbar 2000, there are formed a plurality of connection terminals 2001 each protruding radially outward from the radially outer periphery of the second busbar 2000.

The connection terminals 1001 of the first busbar 1000 are arranged at predetermined intervals in the circumferential direction. Moreover, each of the connection terminals 1001 is bent to have its distal part extending in the axial direction. More particularly, in the present embodiment, each of the connection terminals 1001 is bent to have its distal part extending toward the opposite axial side to the electrical modules 532 (i.e., upward in FIG. 76). The connection terminals 1001 of the first busbar 1000 are respectively joined to high potential-side terminals 532a of the electrical modules 532. More specifically, the high potential-side terminals 532a of the electrical modules 532 are formed to extend in the axial direction toward the first busbar 1000 side (i.e., upward in FIG. 76). Moreover, the high potential-side terminals 532*a* of the electrical modules 532 are arranged to respectively radially overlap and abut the distal parts of the connection terminals 1001 of the first busbar 1000.

Similarly, the connection terminals 2001 of the second busbar 2000 are arranged at predetermined intervals in the circumferential direction. Moreover, each of the connection terminals 2001 is bent to have its distal part extending in the axial direction. More particularly, in the present embodiment, each of the connection terminals 2001 is bent to have its distal part extending toward the opposite axial side to the electrical modules 532 (i.e., upward in FIG. 76). The connection terminals 2001 of the second busbar 2000 are respectively joined to low potential-side terminals 532*b* of the electrical modules 532. More specifically, the low potential-side terminals 532*b* of the electrical modules 532 are formed to extend in the axial direction toward the second busbar 2000 side (i.e., upward in FIG. 76). Moreover, the low potential-side terminals 532*b* of the electrical modules 532 are arranged to respectively radially overlap and abut the distal parts of the connection terminals 2001 of the second busbar 2000.

Moreover, the bending positions of the connection terminals 1001 and 2001 of the first and second busbars 1000 and 2000 are set to have all the distances of the distal parts of the connection terminals 1001 and 2001 from the central axis of the rotating shaft 501 substantially equal. Furthermore, the first and second busbars 1000 and 2000 are arranged to have all the distances of the distal parts of the connection terminals 1001 and 2001 from the central axis of the rotating shaft 501 substantially equal. On the other hand, the terminals 532*a* and 532*b* of the electrical modules 532 are formed to have all the distances of the terminals 532*a* and 532*b* from the central axis of the rotating shaft 501 substantially equal. Furthermore, the electrical modules 532 are arranged to have all the distances of the terminals 532*a* and 532*b* from the central axis of the rotating shaft 501 substantially equal.

As shown in FIG. 76, the circumferential interval L20 between each circumferentially-adjacent pair of the connection terminals 1001 and 2001 of the first and second busbars 1000 and 2000 is smaller than the circumferential interval L21 between each circumferentially-adjacent pair of the connection terminals 1001 of the first busbar 1000. Moreover, the circumferential interval L20 between each circumferentially-adjacent pair of the connection terminals 1001 and 2001 of the first and second busbars 1000 and 2000 is also smaller than the circumferential interval between each circumferentially-adjacent pair of the connection terminals 2001 of the second busbar 2000.

The first busbar 1000 has one circumferential end portion thereof bent to protrude radially outward; the circumferential end portion is connected to the high potential-side power terminal 632A (see FIG. 68) of the busbar module 533. Similarly, the second busbar 2000 has one circumferential end portion thereof bent to protrude radially outward; the circumferential end portion is connected to the low potential-side power terminal 632B (see FIG. 68) of the busbar module 533.

Next, a method of manufacturing the first busbar 1000 according to the present embodiment will be described.

In addition, the second busbar 2000 can be manufactured by the same method as the first busbar 1000. Therefore, description of the manufacturing method of the second busbar 2000 is omitted hereinafter.

First, referring to FIG. 80A, a flat rectangular steel plate 3000 is prepared which has a substantially uniform thickness.

Then, a plurality of plate members 3001 are blanked out from the steel plate 3001. In addition, each of the plate members 3001 corresponds to one first busbar 1001.

As shown from FIG. 80B, each of the plate members 3001 has a main body 3002 and a plurality of protruding portions 3003. The main body 3002 is flat and straight band-shaped to have a substantially rectangular cross section perpendicular to its longitudinal direction. Each of the protruding portions 3003 protrudes from one side of the main body 3002 in the direction of the longer sides of the rectangular cross section of the main body 3003. Moreover, the protruding portions 3003 are spaced at predetermined intervals in the longitudinal direction of the plate member 3001. With the above configuration, it becomes possible to blank out the plurality of plate members 3001 from the single steel plate 3000. In addition, each of the protruding portions 3003 corresponds to one of the connection terminals 1001.

Next, as shown in FIG. 80C, each of the protruding portions 3003 is bent to one side in the lateral direction (or the direction of shorter sides) of the rectangular cross section of the plate member 3001.

Thereafter, as shown in FIG. 80D, the straight band-shaped plate member 3001 is edge-wise bent into an arc shape. That is, the straight band-shaped plate member 3001 is bent into an arc shape whose radial direction coincides with the width direction of the plate member 3001 (or the direction of longer sides of the rectangular cross section of the plate member 3001). Consequently, by the edge-wise bending, the straight band-shaped plate member 3001 is transformed into the arc-shaped first busbar 1000 which has, over the entire circumference thereof, a cross-sectional shape tapering (or gradually becoming thinner) from the radially inner end to the radially outer end (see FIG. 79).

According to the present embodiment, it is possible to achieve the following advantageous effects.

It should be noted that though the advantageous effects will be described with respect to the first busbar 1000 hereinafter, the same advantageous effects can also be achieved with the second busbar 2000.

In the present embodiment, as shown in FIG. 79, the first busbar 1000 is configured so that in a cross section of the first busbar 1000 perpendicular to the circumferential direction, the thickness L10 in the axial direction (or the lateral direction of the cross section) at one end in the radial direction (or the longitudinal direction of the cross section) is smaller than the thickness L11 in the axial direction at the other end in the radial direction. More specifically, the cross section of the first busbar 1000 is tapered radially outward so that the axial thickness of the first busbar 1000 gradually decreases from the radially inner end (or inner periphery) to the radially outer end (or outer periphery) of the cross section. Consequently, it becomes possible to increase the geometrical moment of inertia (or second moment of area) in the lateral direction (or the axial direction), thereby improving the vibration resistance of the first busbar 1000 in comparison with the case of the conventional busbar 1050 as shown in FIG. 77 having the same cross-sectional area as the first busbar 1000. Moreover, since the thickness L11 at the radially inner end, where the wiring is relatively short, is set to be relatively large, it becomes possible to reduce the loss (or inductance) during the flow of electric current through the first busbar 1000.

In the present embodiment, the first busbar 1000 is formed by: blanking the straight band-shaped plate member 3001 as shown in FIG. 80B out from the flat rectangular steel plate 3000 as shown in FIG. 80A; and bending the straight band-shaped plate member 3001 into the annular shape as shown in FIG. 80D whose radial direction coincides with the width direction of the straight band-shaped plate member 3001. Consequently, the first busbar 1000 has, over the entire circumference thereof, the cross-sectional shape tapering (or gradually becoming thinner) from the radially inner end to the radially outer end. As a result, it becomes possible to lower the percentage of the scrap 3090 (i.e., the hatched part in FIG. 80A), thereby improving the yield rate (or productivity) in comparison with the case of blanking the arc-shaped conventional busbar 1050 out from a flat rectangular steel plate as shown in FIG. 78. Moreover, by the bending process, the first busbar 1000 is hardened, thereby further improving the vibration resistance.

In the present embodiment, the electrical modules 532, which are connected with the first busbar 1000, are arranged in alignment with each other in the circumferential direction. Moreover, the first busbar 1000 is formed into the arc shape along the circumferential direction. Consequently, it becomes possible to shorten the wiring between the electrical modules 532 and the first busbar 1000, thereby lowering the inductance due to the wiring. Furthermore, the first busbar 1000 is arranged to have the lateral direction of the cross section thereof coinciding with the axial direction of the rotor 510 (see FIG. 79). Consequently, it becomes possible to set the axial dimension of the first busbar 1000 to be small.

In the present embodiment, each of the connection terminals 1001 of the first busbar 1000 is bent to have its distal part extending in the axial direction (see FIG. 76). Consequently, it becomes possible to more easily connect (or weld) the connection terminals 1001 of the first busbar 1000 respectively to the electrical modules 532 in comparison of the case of the connection terminals extending straight radially outward without being bent. More specifically, in connecting the connection terminals 1001 of the first busbar 1000 respectively to the electrical modules 532 arranged in the inverter housing 531, it is possible to insert a connection tool from the opening of the inverter housing 531, thereby easily performing the connection process. Moreover, with the connection terminals 1001 bent to have their respective distal parts extending in the axial direction, the vibration resistance of the first busbar 1000 in the axial direction is further improved. Furthermore, by the bending process, the connection terminals 1001 are hardened, thereby further improving the vibration resistance of the first busbar 1000.

The first busbar 1000 and the second busbar 2000 are arranged to at least partially overlap each other in the axial direction. More particularly, in the present embodiment, the first and second busbars 1000 and 2000 are arranged to completely overlap each other in the axial direction (see FIG. 76). Consequently, it becomes possible to shorten the wiring between the electrical modules 532 and the first and second busbars 1000 and 2000, thereby lowering the inductance due to the wiring. Moreover, it also becomes possible to minimize the radial size of the entire busbar module 533.

In the present embodiment, the circumferential interval L20 between each circumferentially-adjacent pair of the connection terminals 1001 and 2001 of the first and second busbars 1000 and 2000 is smaller than the circumferential interval L21 between each circumferentially-adjacent pair of the connection terminals 1001 of the first busbar 1000 and also smaller than the circumferential interval between each circumferentially-adjacent pair of the connection terminals 2001 of the second busbar 2000 (see FIG. 76). Consequently, it becomes possible to further shorten the wiring between the electrical modules 532 and the first and second busbars 1000 and 2000, thereby further lowering the inductance due to the wiring. Moreover, it also becomes possible to more effectively minimize the radial size of the entire busbar module 533.

[First Modification of Fourth Embodiment]

In the above-described fourth embodiment, the first and second busbars 1000 and 2000 are configured so that surfaces of the first and second busbars 1000 and 2000, which face each other in the axial direction, are not in parallel with each other (see FIG. 79).

Figure 81:
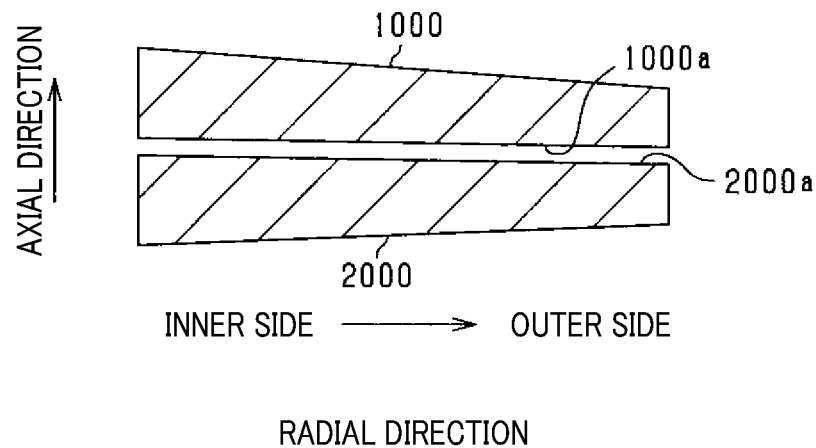
FIG. 81 is a schematic cross-sectional view illustrating the configuration of busbars according to a first modification of the fourth embodiment.

In contrast, in this modification, as shown in FIG. 81, the first and second busbars 1000 and 2000 are configured so that a surface 1000a of the first busbar 1000 and a surface 2000a of the second busbar 2000, which face each other in the axial direction, extend parallel to each other.

With the above configuration shown in FIG. 81, it becomes possible to reduce the volume (or gap) between the first and second busbars 1000 and 2000 in comparison with the configuration shown in FIG. 79.

To electrically insulate the first and second busbars 1000 and 2000 from each other, it is necessary to embed the first and second busbars 1000 and 2000 in the insulating member of the main body 631 of the busbar module 533 with a minimum clearance therebetween.

However, when electric current flows through the busbar module 533, the first and second busbars 1000 and 2000 together form a pseudo capacitor, producing a parasitic capacitance (or stray capacitance).

Accordingly, in the present embodiment, by reducing the volume between the first and second busbars 1000 and 2000, it becomes possible to lower the parasitic capacitance as well as the inductance.

[Second Modification of Fourth Embodiment]

In the above-described fourth embodiment, each of the connection terminals 1001 and 2001 of the first and second busbars 1000 and 2000 is bent to have its distal part extending in the axial direction (see FIG. 76).

Figure 82:
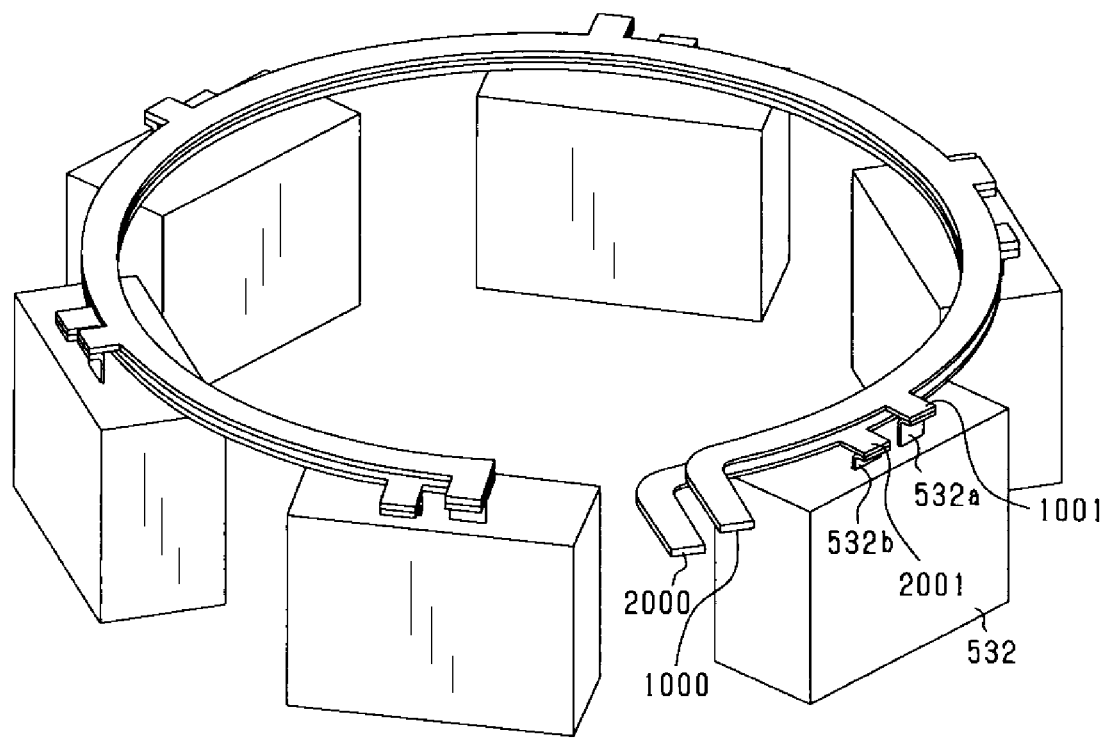
FIG. 82 is a schematic perspective view illustrating the configuration of busbars according to a second modification of the fourth embodiment.

In contrast, in this modification, as shown in FIG. 82, each of the connection terminals 1001 and 2001 of the first and second busbars 1000 and 2000 is configured to extend straight radially outward without being bent. Moreover, each of the terminals 532a and 532b of the electrical modules 532 is bent to have its distal part extending radially outward, so as to increase the contact area between each corresponding pair of the connection terminals 1001 and 2001 of the first and second busbars 1000 and 2000 and the terminals 532a and 532b of the electrical modules 532.

[Third Modification of Fourth Embodiment]

In the above-described fourth embodiment, in the first and second busbars 1000 and 2000, there are formed the connection terminals 1001 and 2001 that are respectively connected to the terminals 532a and 532b of the electrical modules 532 (see FIG. 76).

In contrast, in this modification, though not shown in the figures, the first and second busbars 1000 and 2000 have no connection terminals formed therein. Therefore, the terminals 532a and 532b of the electrical modules 532 are directly connected to corresponding ones of the main bodies of the first and second busbars 1000 and 2000.

[Fourth Modification of Fourth Embodiment]

In the above-described fourth embodiment, the connection terminals 1001 and 2001 are formed to protrude from the radially outer peripheries of the first and second busbars 1000 and 2000 (see FIG. 76).

Figure 83:
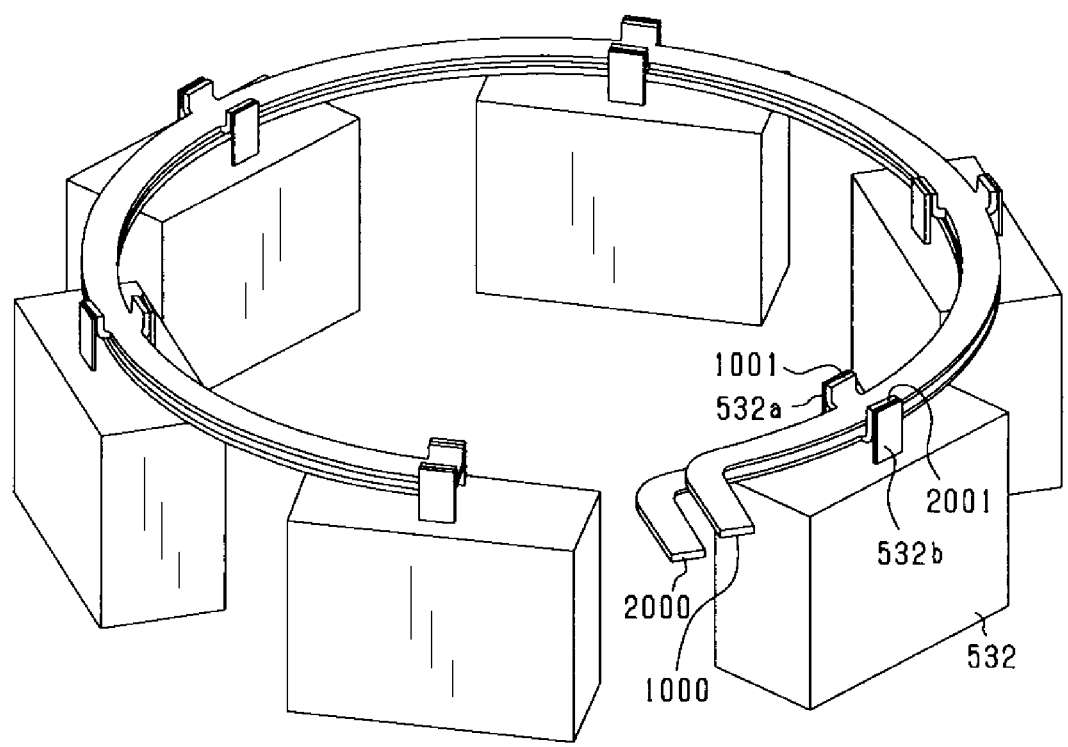
FIG. 83 is a schematic perspective view illustrating the configuration of busbars according to both fourth and fifth modifications of the fourth embodiment.

In contrast, in this modification, as shown in FIG. 83, the connection terminals 1001 are formed to protrude from the radially inner periphery of the first busbar 1000. In addition, though not shown in the figures, the connection terminals 2001 may also be formed to protrude from the radially inner periphery of the second busbar 2000.

[Fifth Modification of Fourth Embodiment]

In the above-described fourth embodiment, each of the connection terminals 1001 of the first busbar 1000 is formed so as not to be in radial alignment with any of the connection terminals 2001 of the second busbar 2000 (see FIG. 76).

In contrast, in this modification, as shown in FIG. 83, each of the connection terminals 1001 of the first busbar 1000 is formed in radial alignment with one of the connection terminals 2001 of the second busbar 2000.

More specifically, in this modification, the connection terminals 1001 are formed to protrude from the radially inner periphery of the first busbar 1000, whereas the connection terminals 2001 are formed to protrude from the radially outer periphery of the second busbar 2000. Moreover, each of the connection terminals 1001 of the first busbar 1000 is located in radial alignment with one of the connection terminals 2001 of the second busbar 2000.

With the above configuration, it is also possible to shorten the wiring between the electrical modules 532 and the first and second busbars 1000 and 2000, thereby lowering the inductance due to the wiring. Moreover, the first and second busbars 1000 and 2000 are radially sandwiched between the terminals 532a and 532b of the electrical modules 532. Consequently, it becomes possible to suppress radial vibration of the first and second busbars 1000 and 2000, thereby more reliably maintaining the electrical connection between the electrical modules 532 and the first and second busbars 1000 and 2000.

[Sixth Modification of Fourth Embodiment]

Each of the first and second busbars 1000 and 2000 may have, instead of the cross-sectional shape shown in FIG. 79, any other cross-sectional shape such that in the cross section, the thickness L10 in the axial direction (or the lateral direction of the cross section) at one end in the radial direction (or the longitudinal direction of the cross section) is smaller than the thickness L11 in the axial direction at the other end in the radial direction.

Figure 84:
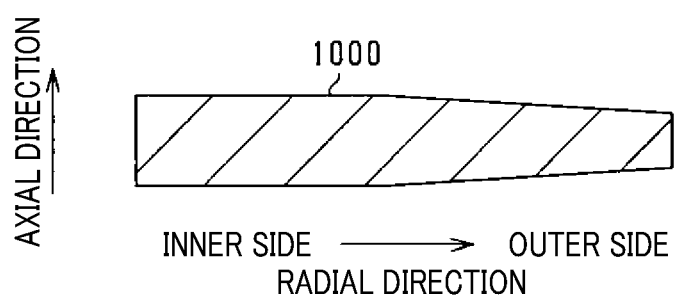
FIG. 84 is a schematic cross-sectional view illustrating the configuration of busbars according to a sixth modification of the fourth embodiment.

For example, in this modification, each of the first and second busbars 1000 and 2000 has a trapezoidal cross-sectional shape as shown in FIG. 84.

[Seventh Modification of Fourth Embodiment]

Figure 85:
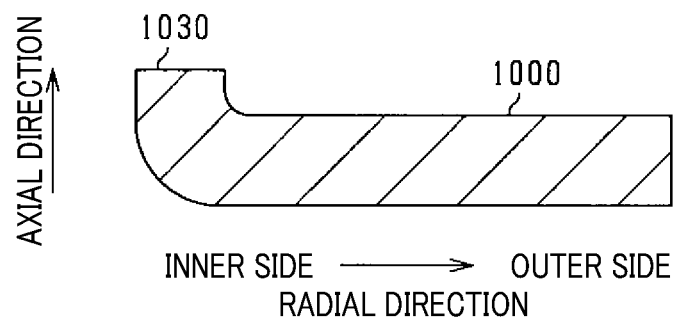
FIG. 85 is a schematic cross-sectional view illustrating the configuration of busbars according to a seventh modification of the fourth embodiment.

In this modification, as shown in FIG. 85, a radially inner end portion 1030 of the first busbar 1000 is bent in the axial direction (or the lateral direction of the cross section) to make the thickness in the axial direction at the radially inner end larger than the thickness in the axial direction at the radially outer end.

[Eighth Modification of Fourth Embodiment]

Figure 86:
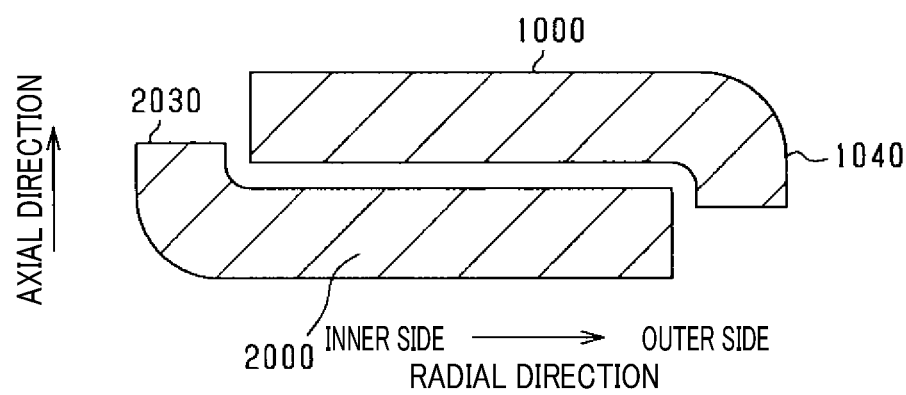
FIG. 86 is a schematic cross-sectional view illustrating the configuration of busbars according to an eighth modification of the fourth embodiment.

In this modification, as shown in FIG. 86, a radially outer end portion 1040 of the first busbar 1000 is bent in the axial direction (or the lateral direction of the cross section) to make the thickness in the axial direction at the radially outer end larger than the thickness in the axial direction at the radially inner end. In contrast, a radially inner end portion 2030 of the second busbar 2000 is bent in the axial direction (or the lateral direction of the cross section) to make the thickness in the axial direction at the radially inner end larger than the thickness in the axial direction at the radially outer end. Moreover, the bent portion 1040 of the first busbar 1000 is located radially outside the radially outer periphery of the second busbar 2000, while the bent portion 2030 of the second busbar 2000 is located radially inside the radially inner periphery of the first busbar 1000. That is, the bent portion 1040 of the first busbar 1000 is arranged on the radially opposite side to the bent portion 2030 of the second busbar 2000. With this arrangement, it becomes possible to minimize the axial dimension of the entire busbar module 533 without causing interference between the bent portions 1040 and 2030 and other portions of the first and second busbars 1000 and 2000.

[Ninth Modification of Fourth Embodiment]

In the above-described fourth embodiment, each of the first and second busbars 1000 and 2000 is configured to have the tapered cross-sectional shape over the entire circumference thereof.

In contrast, in this modification, though not shown in the figures, each of the first and second busbars 1000 and 2000 is configured to have the tapered cross-sectional shape for only part of the circumference thereof.

[Tenth Modification of Fourth Embodiment]

In the above-described fourth embodiment, each of the first and second busbars 1000 and 2000 is substantially C-shaped to be discontinuous in the circumferential direction (see FIG. 76).

In contrast, in this modification, each of the first and second busbars 1000 and 2000 is annular-shaped to be continuous in the circumferential direction, as the first and second busbars 641 and 642 described in the third embodiment (see FIG. 70).

[Eleventh Modification of Fourth Embodiment]

In the above-described fourth embodiment, the first and second busbars 1000 and 2000 are arranged to overlap each other in the axial direction (see FIG. 76).

In contrast, in this modification, though not shown in the figures, the first and second busbars 1000 and 2000 are arranged so as not to overlap each other in the axial direction. More specifically, the first busbar 1000 is arranged radially inside or radially outside the second busbar 2000 to radially overlap the second busbar 2000. With this arrangement, it is possible to more effectively minimize the axial dimension of the entire busbar module 533.

While the above particular embodiments and modifications have been shown and described, it will be understood by those skilled in the art that various further modifications, changes, and improvements may be made without departing from the spirit of the present disclosure.

For example, at least part of various functions of the controllers described in the first and third embodiments may be realized by software stored in a tangible memory device and a computer that executes the software, by hardware, or by a combination of the aforementioned means.

Moreover, the above-described embodiments and modifications are not irrelevant to each other; they may be suitably combined with each other unless the combination is obviously impossible. Moreover, in the above-described embodiments, elements constituting the embodiments are not necessarily essential unless they are particularly specified as being essential or can be considered to be obviously essential in principle. Moreover, in the above-described embodiments, when numerical values, such as the numbers, values, quantities or ranges of the constituting elements of the embodiments, are mentioned, the present disclosure is not limited to the particular numerical values unless they are particularly specified as being essential or the present disclosure is obviously limited to the particular numerical values in principle. Moreover, in the above-described embodiments, when the shapes or positional relationships of the constituting elements are mentioned, the present disclosure is not limited to the particular shapes or positional relationships unless they are particularly specified as being essential or the present disclosure is obviously limited to the particular shapes or positional relationships in principle.

What is claimed is:

1. A rotating electric machine comprising:
a field including a magnet unit having a plurality of magnetic poles, the plurality of magnetic poles having alternately different polarities in a circumferential direction, the field being configured as a rotor that is rotatably provided;
an armature including a multi-phase armature coil, the armature being configured as a stator that is arranged to face the rotor; and
an electric power conversion device configured to perform electric power conversion and supply electric power resulting from the electric power conversion to the armature, the electric power conversion device including:
at least one band-shaped busbar through which electric current flows during the electric power conversion, the at least one band-shaped busbar being formed in an annular shape or an arc shape along the circumferential direction and the at least one band-shaped busbar having a cross section defined to include:
at a first end in a radial direction of the rotor, a first thickness in the axial direction of the rotor, and
at a second end in the radial direction of the rotor, a second thickness in an axial direction of the rotor, the first thickness being smaller than the second thickness, and
a plurality of electrical components that are connected to the at least one band-shaped busbar and arranged in alignment with each other in the circumferential direction, wherein:
the cross section of the band-shaped busbar is tapered radially outward such that an axial thickness decreases from the second end of the cross section to the first end of the cross section, and
the at least one band-shaped busbar has the tapered cross-sectional shape over an entire circumference of the band-shaped busbar.

2. The rotating electric machine as set forth in claim 1, wherein:
the at least one band-shaped busbar has at least one connection terminal formed on an inner periphery or an outer periphery of the band-shaped busbar, the at least one connection terminal protruding in the radial direction of the rotor, and
the at least one connection terminal is bent to have a distal part extending in the axial direction of the rotor.

3. The rotating electric machine as set forth in claim 1, wherein:
the at least one band-shaped busbar includes a positive busbar and a negative busbar, each of which having a same cross section as recited in the band-shaped busbar, and
the positive and negative busbars are arranged to at least partially overlap each other in the axial direction of the rotor.

4. The rotating electric machine as set forth in claim 3, wherein the positive and negative busbars are arranged to have a surface of the positive busbar and a surface of the negative busbar facing each other in the axial direction of the rotor, and the respective surfaces of the positive busbar and the negative busbar extend parallel to each other.

5. The rotating electric machine as set forth in claim 3, wherein:
each of the positive busbar and the negative busbar has a plurality of connection terminals formed to be spaced from each other around each of the respective positive and negative busbars in the circumferential direction, and
a circumferential interval between each circumferentially-adjacent pair of the connection terminals of the positive busbar and the negative busbar is smaller than a circumferential interval between each circumferentially-adjacent pair of the connection terminals of the positive busbar, and the negative busbar, respectively.

6. The rotating electric machine as set forth in claim 5, wherein each of the connection terminals of the positive busbar is aligned with one of the connection terminals of the negative busbar in the radial direction of the rotor.

7. The rotating electric machine as set forth in claim 1, wherein the magnet is configured so that on a side of an axis of easy magnetization that is closer to a d-axis side, the axis of easy magnetization being oriented to be more parallel to the d-axis than to a q-axis side, the d-axis representing an axis that extends in the radial direction of the rotor through centers of the magnetic poles and the q-axis representing an axis that extends in the radial direction of the rotor through boundaries between the magnetic poles.

8. The rotating electric machine as set forth in claim 1, wherein the magnet is constituted of a plurality of magnets having intrinsic coercive force that is higher than or equal to 400 kiloampere per meter [kA/m] and residual flux density that is higher than or equal to 1.0 tesla [T].

9. The rotating electric machine as set forth in claim 1, wherein:
the armature coil includes a plurality of electrical conductors arranged at predetermined intervals in the circumferential direction and facing the field, and
the armature has one of:
(A) a configuration in which inter-conductor members are provided between the circumferentially adjacent electrical conductors, and the inter-conductor members are formed of a magnetic material that satisfies the relationship of Wt×Bs≤Wm×Br, where Wt is a total circumferential width of the inter-conductor members in each magnetic pole, Bs is a saturation flux density of the inter-conductor members, Wm is a circumferential width of each magnetic pole of the magnet unit and Br is a residual flux density of the magnet;
(B) a configuration in which inter-conductor members are provided between the circumferentially adjacent electrical conductors, and the inter-conductor members are formed of a nonmagnetic material; and
(C) a configuration in which no inter-conductor members are provided between the circumferentially adjacent electrical conductors.

10. The rotating electric machine as set forth in claim 1, wherein:
the armature coil includes a plurality of electrical conductors arranged at predetermined intervals in the circumferential direction and facing the field, and
a thickness in the radial direction of the rotor of the electrical conductors is smaller than a circumferential width of the electrical conductors of each phase of each magnetic pole.

11. The rotating electric machine as set forth in claim 1, wherein:
the armature coil includes a plurality of electrical conductors units arranged at predetermined intervals in the circumferential direction and facing the field,
each of the electrical conductors is constituted of a bundle of wires, and
a resistance between the wires is higher than a resistance of each of the wires.

12. A method of manufacturing the rotating electric machine as set forth in claim 1, the method comprising the steps of:
preparing a straight band-shaped plate member having a length, a width and a thickness; and
bending the straight band-shaped plate member into an annular or arc shape to form the at least one band-shaped busbar, a radial direction of the annular or arc shape coinciding with the width direction of the straight band-shaped plate member.

13. An electric power conversion device configured to perform electric power conversion and supply electric power resulting from the electric power conversion to a dynamo-electric unit, the electric power conversion device comprising:
at least one band-shaped busbar through which electric current flows during the electric power conversion, the at least one band-shaped busbar having a cross section defined to include:
at a first end in a radial direction of the at least one band-shaped busbar, a first thickness in an axial direction of the at least one band-shaped busbar, and
at a second end in the radial direction of the at least one band-shaped busbar, a second thickness in an axial direction of the at least one band-shaped, the first thickness being smaller than the second thickness, wherein:
the cross section of the band-shaped busbar is tapered radially outward such that an axial thickness of the cross section decreases from the second end of the cross section to the first end of the cross section, and
the at least one band-shaped busbar has the tapered cross-sectional shape over an entire circumference of the band-shaped busbar.

* * * * *